United States Patent
Chiu et al.

(10) Patent No.: US 12,447,469 B2
(45) Date of Patent: Oct. 21, 2025

(54) METHODS AND APPARATUS FOR SINGLE BIOLOGICAL NANOPARTICLE ANALYSIS

(71) Applicant: UNIVERSITY OF WASHINGTON, Seattle, WA (US)

(72) Inventors: Daniel T. Chiu, Seattle, WA (US); Seung Ryoung Jung, Shoreline, WA (US); Jingang Wang, Bothell, WA (US); Bryant S. Fujimoto, Seattle, WA (US)

(73) Assignee: University of Washington, Seattle, WA (US)

( * ) Notice: Subject to any disclaimer, the term of this patent is extended or adjusted under 35 U.S.C. 154(b) by 866 days.

(21) Appl. No.: 15/733,720

(22) PCT Filed: Mar. 29, 2019

(86) PCT No.: PCT/US2019/025033
§ 371 (c)(1),
(2) Date: Oct. 2, 2020

(87) PCT Pub. No.: WO2019/199499
PCT Pub. Date: Oct. 17, 2019

(65) Prior Publication Data
US 2021/0016276 A1 Jan. 21, 2021

Related U.S. Application Data

(60) Provisional application No. 62/657,278, filed on Apr. 13, 2018.

(51) Int. Cl.
*B01L 3/00* (2006.01)
*G01N 15/14* (2024.01)
(Continued)

(52) U.S. Cl.
CPC ... *B01L 3/502715* (2013.01); *B01L 3/502776* (2013.01); *G01N 15/1459* (2013.01);
(Continued)

(58) Field of Classification Search
CPC ......... B01L 3/502715; B01L 3/502776; B01L 2200/0636; B01L 2200/0647;
(Continued)

(56) References Cited

U.S. PATENT DOCUMENTS

| 6,214,563 B1 | 4/2001 | Negulescu et al. |
| 9,310,376 B2 | 4/2016 | Cao et al. |

(Continued)

FOREIGN PATENT DOCUMENTS

| CN | 101454653 A | 6/2009 |
| CN | 101765462 A | 6/2010 |

(Continued)

OTHER PUBLICATIONS

Kuyper CL, Budzinski KL, Lorenz RM, Chiu DT. Real-time sizing of nanoparticles in microfluidic channels using confocal correlation spectroscopy. J Am Chem Soc. Jan. 25, 2006;128(3): pp. 730-731. (Year: 2006).*

(Continued)

*Primary Examiner* — Benjamin R Whatley
*Assistant Examiner* — Curtis A Thompson
(74) *Attorney, Agent, or Firm* — Christensen O'Connor Johnson Kindness PLLC

(57) ABSTRACT

The present disclosure relates to methods, systems, and devices for performing analyses of biological nanoparticles. More specifically, the present disclosure relates to methods, systems, and devices for performing single biological nanoparticle size determination on a sample while the biological nanoparticle is in transit through a microfluidic chip. In other aspects, the present disclosure relates to methods, systems, (Continued)

and devices for selectively capturing biological nanoparticles on a coated planar surface, the capturing being facilitated by centrifugation.

18 Claims, 26 Drawing Sheets

(51) Int. Cl.
- *G01N 33/543* (2006.01)
- *B82Y 35/00* (2011.01)
- *G01N 15/10* (2006.01)

(52) U.S. Cl.
CPC ............... *G01N 33/54366* (2013.01); *B01L 2200/0636* (2013.01); *B01L 2200/0647* (2013.01); *B82Y 35/00* (2013.01); *G01N 2015/1006* (2013.01); *G01N 2015/1493* (2013.01)

(58) Field of Classification Search
CPC ..... B01L 2200/0652; B01L 2200/0663; B01L 2300/0654; G01N 15/1459; G01N 33/54366; G01N 2015/1006; G01N 2015/1493; G01N 2001/2826; B82Y 35/00
See application file for complete search history.

(56) References Cited

U.S. PATENT DOCUMENTS

| | | | |
|---|---|---|---|
| 9,810,707 | B2 | 11/2017 | Schilffarth et al. |
| 10,227,004 | B2 | 3/2019 | Hanada et al. |
| 2002/0095602 | A1 | 7/2002 | Pherson et al. |
| 2003/0059822 | A1* | 3/2003 | Chan .................. C12Q 1/6869 850/61 |
| 2006/0001875 | A1* | 1/2006 | Christodoulou ... G01N 15/1459 356/342 |
| 2006/0244536 | A1* | 11/2006 | Heydari .................. H03F 3/604 330/286 |
| 2007/0037172 | A1 | 2/2007 | Chiu et al. |
| 2007/0229823 | A1 | 10/2007 | Sung et al. |
| 2008/0248499 | A1 | 10/2008 | Chiu et al. |
| 2008/0318324 | A1 | 12/2008 | Chiu et al. |
| 2009/0042737 | A1 | 2/2009 | Katz et al. |
| 2009/0244536 | A1* | 10/2009 | Mitchell ............ G01N 15/1433 250/573 |
| 2010/0009431 | A1 | 1/2010 | Cho et al. |
| 2010/0086919 | A1* | 4/2010 | McKeon ................ C07K 16/00 435/7.1 |
| 2010/0118300 | A1* | 5/2010 | Wang ........................ G01J 3/44 356/310 |
| 2010/0124763 | A1 | 5/2010 | Walsh et al. |
| 2010/0245815 | A1 | 9/2010 | Ducree |
| 2012/0224053 | A1* | 9/2012 | Vykoukal .......... B01L 3/502715 348/135 |
| 2013/0228705 | A1* | 9/2013 | Nishikawa ......... G01N 15/1433 250/459.1 |
| 2014/0370567 | A1 | 12/2014 | Jiang et al. |
| 2016/0103077 | A1* | 4/2016 | Smith ................ G01N 15/1459 356/336 |
| 2016/0146823 | A1 | 5/2016 | Chiu et al. |
| 2016/0266138 | A1* | 9/2016 | Yates ................. G01N 33/6845 |
| 2016/0289756 | A1* | 10/2016 | Cao ...................... G01N 33/582 |
| 2016/0338954 | A1* | 11/2016 | Brinker ................ A61K 9/5115 |
| 2016/0356695 | A1* | 12/2016 | Gabriel .............. G01N 33/5044 |
| 2017/0045451 | A1* | 2/2017 | Nolan ................ G01N 15/1429 |
| 2017/0121756 | A1* | 5/2017 | Abate ..................... C12Q 1/686 |
| 2017/0227444 | A1 | 8/2017 | Jalai et al. |

FOREIGN PATENT DOCUMENTS

| | | |
|---|---|---|
| CN | 105518464 A | 4/2016 |
| WO | 2001061357 A2 | 8/2001 |
| WO | 2009/128948 A1 | 10/2009 |
| WO | 2015/002975 A1 | 1/2015 |
| WO | 2017041809 | 3/2017 |

OTHER PUBLICATIONS

Wikipedia, "Protein structure", https://web.archive.org/web/20180310190458/https://en.wikipedia.org/wiki/Protein_structure (Year: 2018).*
Joudeh, et al., ("Nanoparticle classification, physicochemical properties, characterization, and applications: a comprehensive review for biologists.", J Nanobiotechnol 20, 262 (2022). https://doi.org/10.1186/s12951-022-01477-8 (Year: 2022).*
Piyasena, Menake E, and Steven W Graves. "The intersection of flow cytometry with microfluidics and microfabrication." Lab on a chip vol. 14,6 (2014): 1044-59. doi:10.1039/c3lc51152a (Year: 2014).*
Malvern, "Zetasizer Nano Series User Manual", Apr. 2013 (Year: 2013).*
Lee, J-J. et al., "Synthetic Ligand-Coated Magnetic Nanoparticles for Microfluidic Bacterial Separation from Blood," Nano Letters, 14(1):1-5, 2014.
Hucknall, A. et al., "In Pursuit of Zero: Polymer Brushes that Resist the Adsorption of Proteins," Adv. Mater., 21 (23):2441-2446, 2009.
McCafferty, J. et al., "Phage antibodies: filamentous phage displaying antibody variable domains," Nature, 348:552-554, 1990.
International Preliminary Report on Patentability mailed Oct. 22, 2020, for International Patent Application No. PCT/US2019/025033, filed Mar. 29, 2019, 10 pages.
European Examination Report mailed on Jun. 21, 2023 issued in corresponding European Application No. 19786207.1, filed Mar. 29, 2019, 11 pages.
Extended European Search Report mailed Dec. 16, 2021, issued in European Application No. 19786207.1, 10 pages.
Chen et al. "Multiparameter Quantification of Liposomal Nanomedicines at the Single-Particle Level by High-Sensitivity Flow Cytometry" ACS Applied Materials Interfaces 2017, 9, pp. 13913-13919.
Friedrich et al. "A nano flow cytometer for single lipid vesicle analysis" Journal, Lab on a Chip 2017, 17, pp. 830-841.
Kuyper, C. et al. "Real-Time Sizing of Nanoparticles in Microfluidic Channels Using Confocal Correlation Spectroscopy" Journal of the American Chemical Society, 2006, 128, 3, pp. 730-731.
Mitra, A. et al. "Real-time optical detection of single human and bacterial viruses based on dark-field interferometry" Biosensors and Bioelectronics, Jan. 15, 2012, 31(1), pp. 499-504.
Schiro et al. "High-Throughput Fluorescence-Activated Nanoscale Subcellular Sorter with Single-Molecule Sensitivity", article, J. Phys. Chem. B 2012, 116, pp. 10490-10495.
Stoner et al. "High Sensitivity Flow Cytometry of Membrane Vesicles" Cytometry Part A 2016, 89A, pp. 196-206.
Zhao et al. "Optical gradient flow focusing" Optics Express, Published May 3, 2007, vol. 15, No. 10, pp. 6167-6176.
Zhu et al. "Light-Scattering Detection below the Level of Single Fluorescent Molecules for High-Resolution Characterization of Functional Nanoparticles" Article ACS Nano, 2014, 8(10), pp. 10998-11006.
International Search Report and Written Opinion, issued in correspondence with PCT/US2019/025033, filed Mar. 29, 2019, mailed Jun. 11, 2019, 13 pages.
First Chinese Office Action mailed on May 8, 2024, issued in the corresponding Chinese Application No. 201980025654.0, filed on Mar. 29, 2019; 28 pages.
Zhu, et al., "Preparation of Silver Nanoparticles and their Influencing Factors," China Powder Science and Technology, vol. 6, Dec. 15, 2009 , and an English translation of the Abstract.
Second Chinese Office Action mailed on Nov. 20, 2024, issued in Chinese Application No. 201980025654.0; 21 pages.
Canadian Office Action mailed on Dec. 19, 2024, issued in Canadian Application No. 3,093,811; 5 pages.

(56) References Cited

OTHER PUBLICATIONS

Third Chinese Office Action mailed on Feb. 12, 2025, issued in Chinese Application No. 201980025654.0; 11 pages.

* cited by examiner

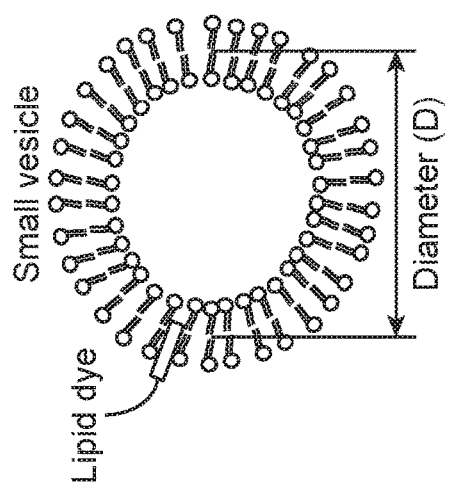
FIG. 3A
$$\text{Intensity } (I_1) \sim \text{Surface area} = 4*pi*R^2 = pi*D^2$$
$$D = C_1 * (I_1/pi)^{1/2}$$
Where, D is diameter of small vesicles, $C_1$ is correction factor, $I_1$ is intensity of lipid dye, and pi is 3.14
FIG. 3B
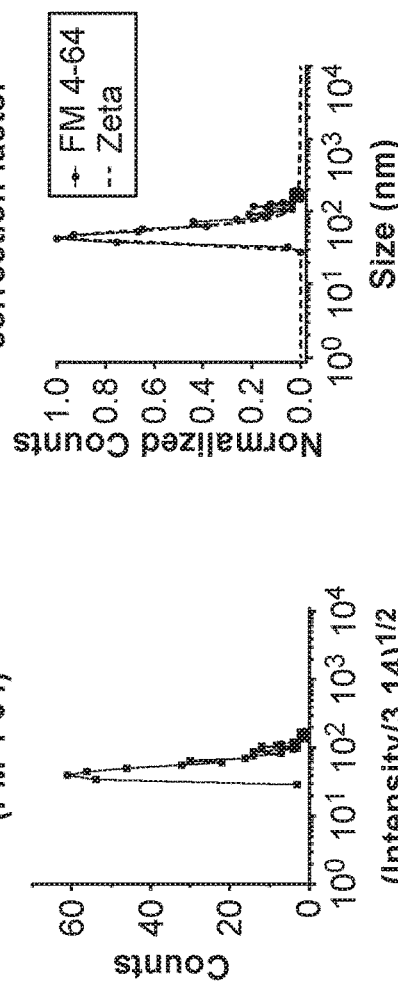
FIG. 3C
FIG. 3D
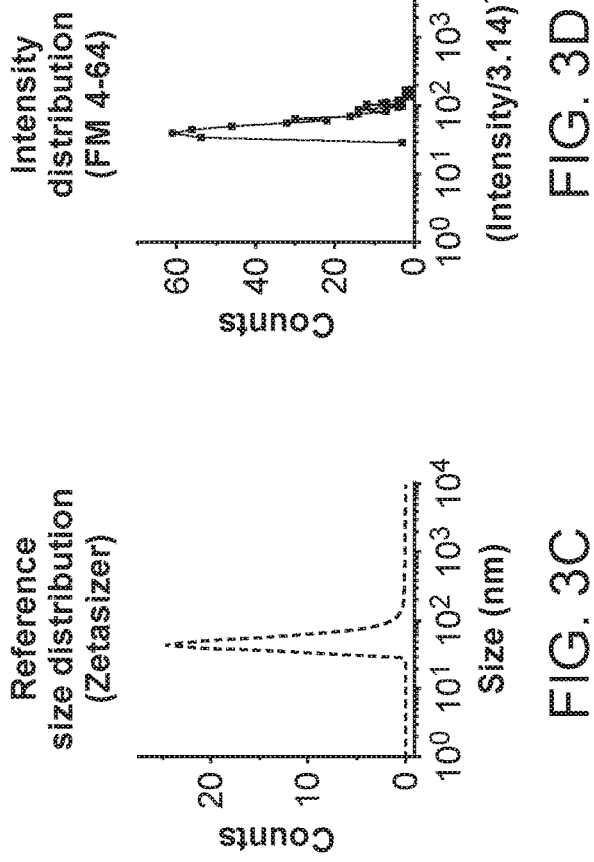
FIG. 3E

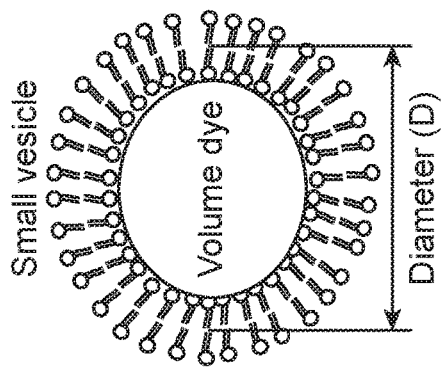
FIG. 4A
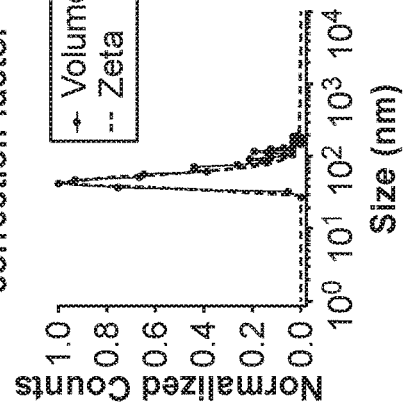
FIG. 4B
Intensity ($I_2$) ~ Volume = $4/3 \cdot pi \cdot R^3 = pi \cdot D^3/6$
$$D = C_2 \cdot (6 \cdot I_2 / pi)^{1/3}$$
Where, D is diameter of small vesicles, $C_2$ is correction factor, $I_2$ is intensity of Volume dye, and pi is 3.14
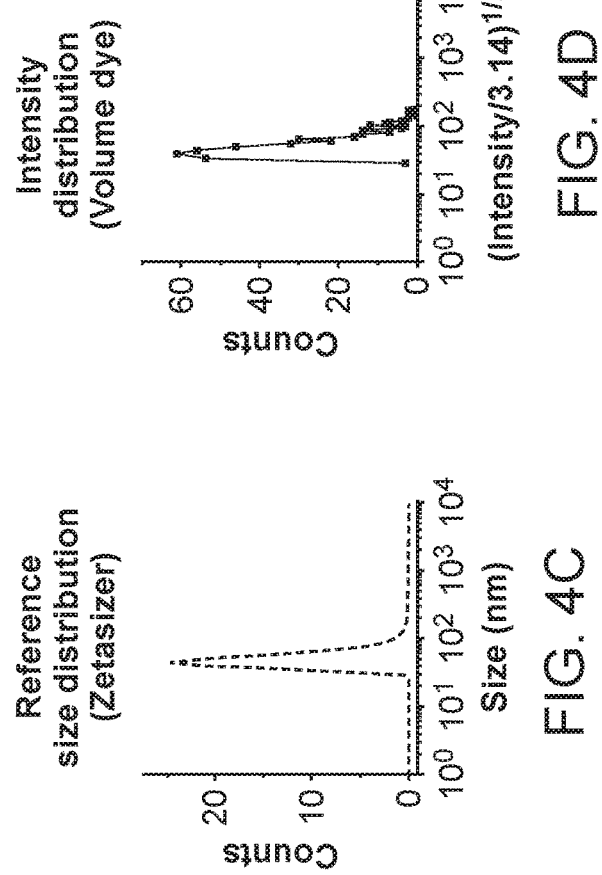
FIG. 4C
FIG. 4D
FIG. 4E Surface area = $I_1 * C_1^2$ Volume = $I_2 * C_2^3$ Surface area/volume = $(I_1^2 * C_1) / (I_2 * C_2^3)$ Where, $I_1$ and $I_2$ are intensities from lipid and volume dyes, respectively. $C_1$ and $C_2$ are correction factors for lipid and volume dyes, respectively.

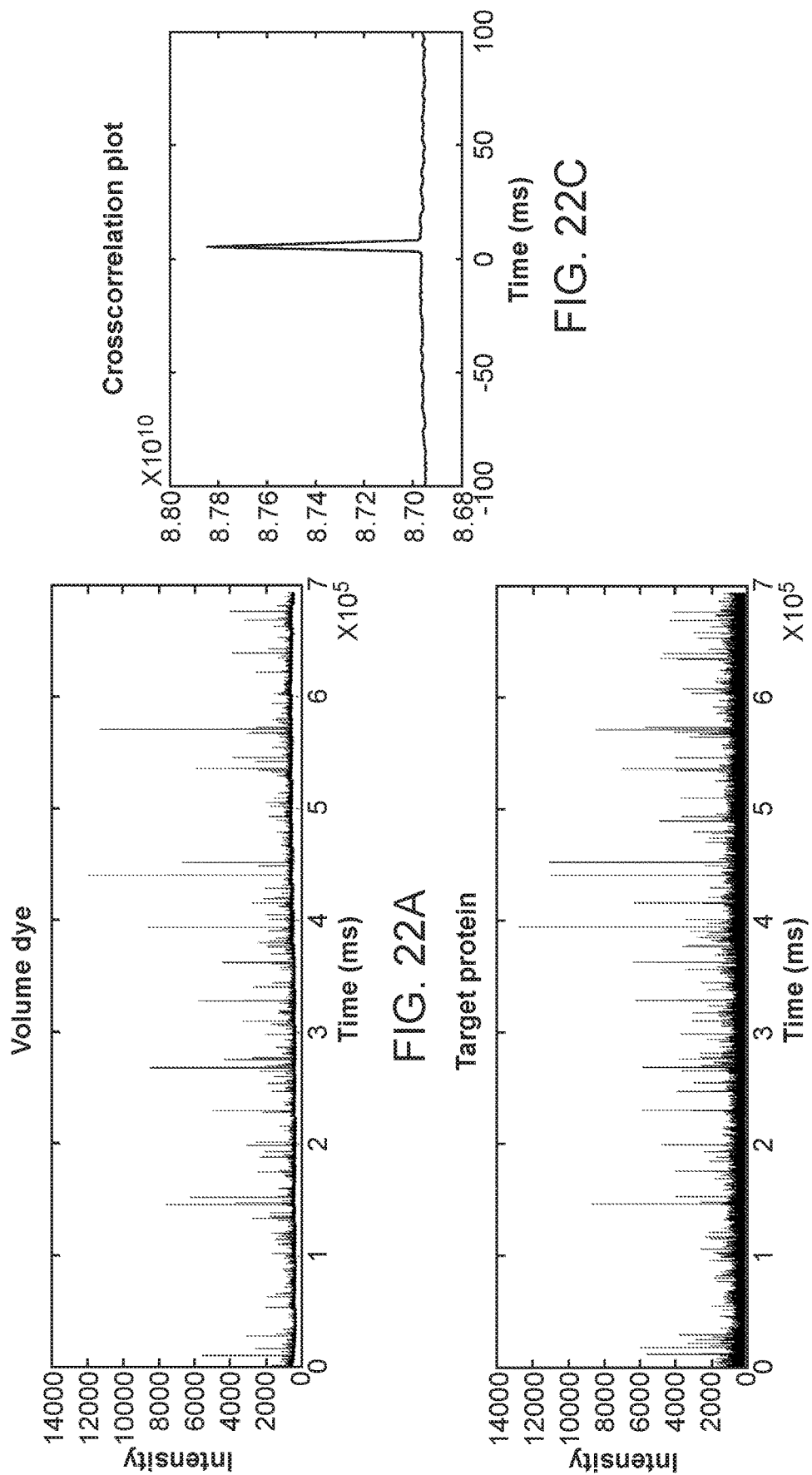

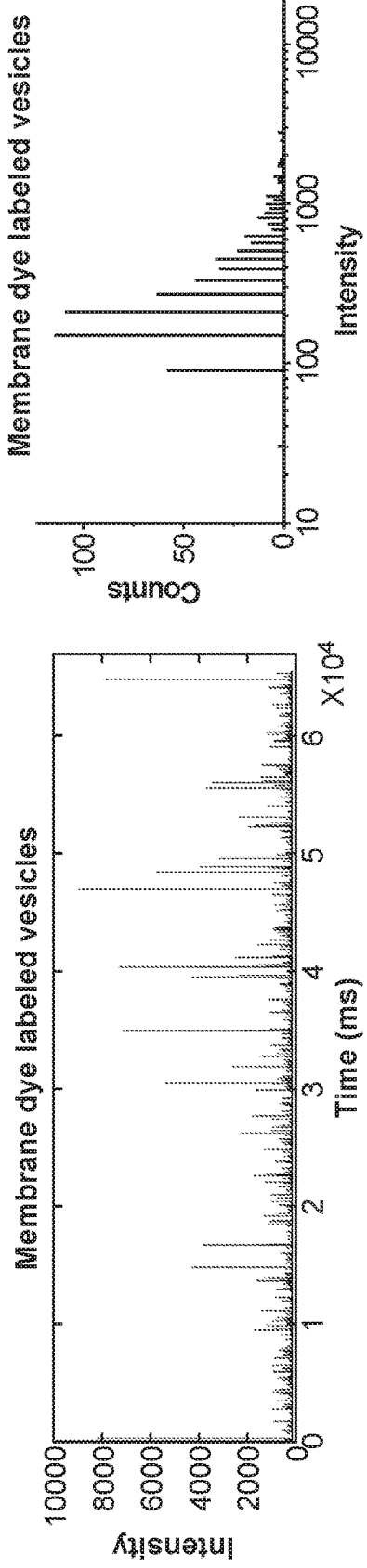
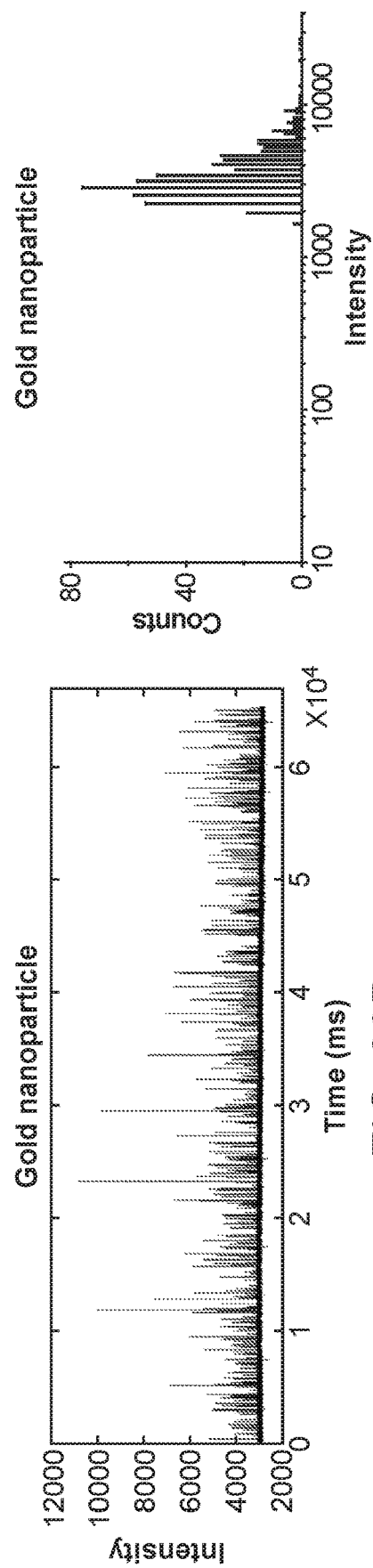

METHODS AND APPARATUS FOR SINGLE BIOLOGICAL NANOPARTICLE ANALYSIS

CROSS-REFERENCE TO RELATED APPLICATIONS

This application claims the benefit of U.S. Provisional Application No. 62/657,278, filed Apr. 13, 2018, which application is incorporated herein by reference in its entirety for all purposes.

BACKGROUND OF THE INVENTION

Microfluidics has become an important component in bioanalytical research. Successful microfluidic bioanalytical applications include DNA sequencing and fragment sizing, PCR amplification, protein analysis, immunoassays, and cell sorting and manipulation. Some of these examples utilize the low sample and reagent volumes as well as the unique physical properties of microscale fluid flow to enable new research. Near-nanoscale microfluidic methods are particularly well suited for the study of sub-cellular organelles, macromolecular complexes, and other nanoscale materials.

Conventional flow cytometers and sorters have been used for cell sorting in a broad range of biological research and clinical applications, including diagnosing and monitoring carcinomas and examining virus-cell interactions. Microfabricated flow cytometers have emerged as a low-cost, disposable alternative to traditional flow cytometers and can show a higher sensitivity when applied to sorting objects like fluorescent beads and *E. coli* cells. The sensitivity of these microfabricated cytometers can still remain insufficient for analyzing and/or sorting nanoscale systems such as sub-cellular organelles and can lack the necessary sorting speed and throughput or information content (e.g., size information).

Further analysis of sub-cellular organelles and other biological nanoparticles has been accomplished with the concentration of bionanoparticles using, for example, ultracentrifugation. However, this concentration can require a large amount of time (typically 4-5 hours), often uses specialized and expensive equipment involving centrifugal forces on the order of 200,000-fold gravity, and frequently results in contaminated concentrates due to a lack of specificity in the concentration process. A more specified capture and separation of bionanoparticles may be accomplished using beads coated with capturing coatings using, e.g., streptavidin or antibodies. However, such a method can still result in contaminated or ill-characterized samples, and any downstream analysis of the captured nanoparticles may require release from the beads, which can lead to decreased yield, damaged bionanoparticles, and decreased accuracy of results. Furthermore, capture of biological nanoparticles using beads can necessitate the use of expensive equipment, frequent manual handling, advanced technical skills, and/or long incubation periods.

SUMMARY OF THE INVENTION

The present disclosure provides methods, systems, and devices for performing analyses of biological nanoparticles.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various aspects, the present disclosure provides a method for determining the size of a biological nanoparticle in a fluid sample, the method comprising: providing a microfluidic chip comprising at least one microfluidic channel; introducing the fluid sample into the microfluidic chip, the fluid sample comprising a plurality of biological nanoparticles; flowing a portion of the plurality of biological nanoparticles through the at least one microfluidic channel; illuminating in the at least one microfluidic channel at least one biological nanoparticle from the portion of the plurality of biological nanoparticles on a particle-by-particle basis; detecting a light intensity emitted from the at least one biological nanoparticle; and assigning a size value to the at least one biological nanoparticle while in transit through the microfluidic chip, wherein the biological nanoparticle has a hydrodynamic diameter of less than 1 µm. In certain aspects, the method comprises illuminating the portion of the plurality of biological nanoparticles. In some aspects, the method comprises illuminating in the at least one microfluidic channel at least 90% of the portion of the plurality of illuminated biological nanoparticles on the particle-by-particle basis.

In some aspects, the microfluidic chip comprises a plurality of parallel microfluidic channels. In some aspects, the method comprises illuminating the plurality of parallel microfluidic channels with a single radiation source. In some aspects, the method comprises providing a plurality of detectors configured to detect a signal from a single microfluidic channel from the plurality of parallel microfluidic channels. In some aspects, the signal comprises the light intensity emitted from the at least one biological nanoparticle. In some aspects, the method comprises detecting the light intensity emitted from the at least one biological nanoparticle in a detection region with a detector.

In some aspects, the at least one microfluidic channel comprises at least one constriction. In some aspects, the detection region is within the at least one constriction. In some aspects, the detection region has an area of less than 10 µm$^2$. In some aspects, the method comprises detecting the portion of the plurality of biological nanoparticles. In some aspects, greater than 90% of the detected biological nanoparticles in the portion of the plurality of biological nanoparticles are detected within the detection region on a particle-by-particle basis.

In some aspects, the method comprises measuring the light intensity emitted from the at least one biological nanoparticle. In some aspects, measuring of the light intensity emitted from the at least one biological nanoparticle comprises the use of time bins. In some aspects, the time bins have a range of less than 2 ms and greater than 1 µs. In some aspects, the light intensity emitted from the at least one biological nanoparticle has a signal-to-noise ratio greater than 10:1.

In some aspects, the illuminating of the least one biological nanoparticle comprises using an illumination source having a beam width of less than 2 µm. In some aspects, the illumination source illuminates a region within the at least one microfluidic channel having an area of less than 10 µm$^2$.

In some aspects, the detecting a light intensity comprises using a light collection system having a numerical aperture equal to or greater than 1.0 and no greater than 1.5.

In some aspects, the assigning of the size value while in transit comprises assigning the size value while the biological nanoparticle is in flow. In some aspects, the flow is uninterrupted.

In some aspects, the size value is assigned according to the light intensity. In some aspects, the light intensity comprises fluorescence, scattered light, or any combination thereof. In some aspects, the biological nanoparticle is associated with a detectable agent. In some aspects, the detectable agent is attached to the surface of the biological nanoparticle, the detectable agent is in the surface of the biological nanoparticle, the detectable agent is within the interior of the biological nanoparticle, or a combination thereof. In some aspects, the detectable agent is fluorescent, the detectable agent is luminescent, or any combination thereof. In some aspects, the biological nanoparticle is associated with a plurality of detectable agents. In some aspects, at least one of the plurality of detectable agents is attached to the surface of the biological nanoparticle, at least one of the plurality of detectable agents is in the surface of the biological nanoparticle, at least one of the plurality of detectable agents is within the interior of the biological nanoparticle, or a combination thereof. In some aspects, the plurality of detectable agents have overlapping emission profiles. In some aspects, the plurality of detectable agents have the same emission profiles. In some aspects, the emission profiles have the same peak wavelengths. In some aspects, the plurality of detectable agents comprise the same detectable agent. In some aspects, the plurality of detectable agents comprise more than one type of detectable agent.

In certain aspects, the plurality of detectable agents have different emission profiles. In some aspects, the emission profiles have different peak wavelengths. In some aspects, the peak wavelengths are separated by more than 10 nanometers, by more than 20 nanometers, by more than 30 nanometers, by more than 40 nanometers, by more than 50 nanometers, by more than 75 nanometers, by more than 100 nanometers, by more than 120 nanometers, by more than 140 nanometers, by more than 160 nanometers, by more than 180 nanometers, by more than 200 nanometers, by more than 300 nanometers, by more than 400 nanometers, by more than 500 nanometers, by more than 600 nanometers, or by more than 700 nanometers.

In some aspects, the plurality of detectable agents comprise a fluorescent detectable agent. In some aspects, the light intensity is emitted from the detectable agent. In some aspects, the assigning of the size value comprises the use of the measured light intensity. In some aspects, the assigning of the size value comprises the use of a modulation index. In some aspects, the assigning of the size value comprises the use of the measured light intensity and the use of a modulation index. In some aspects, the modulation index is an amplitude modulation index. In some aspects, the modulation index is a frequency modulation index. In some aspects, the modulation index is a phase modulation index.

In some aspects, the size value is a relative size value. In some aspects, the relative size value is determined by a difference in the measured light intensity.

In some aspects, the method comprises determining an actual size value of the biological nanoparticle by calibrating the measured light intensity to a standard. In some aspects, the method comprises calibrating the measuring of the light intensity with a standard. In some aspects, the calibrating occurs prior to the introducing of the sample comprising at least one biological nanoparticle. In some aspects, the size value is an actual size value of the biological nanoparticle. In some aspects, the standard comprises a gold nanoparticle. In some aspects, the standard comprises a plurality of lipids. In some aspects, the standard comprises a lipid vesicle. In some aspects, the standard comprises a silica bead, a polystyrene bead, a fluorescent bead, a polymer bead, a polymer nanoparticle, or a combination thereof. In some aspects, the fluid sample further comprises a second biological nanoparticle, and wherein the standard comprises the second biological nanoparticle. In some aspects, the size of the standard is measured with dynamic light scattering.

In various aspects, the method comprises directing the flow of the biological nanoparticle based on the size value. In some aspects, the directing directs the biological nanoparticle to a collection, generating a collection of biological nanoparticles based on the size value. In some aspects, the directing takes no more than 1 ms. In some aspects, the directing of the flow comprises flow displacement. In some aspects, the directing of the flow comprises electro-osmotic flow. In some aspects, the directing of the flow comprises the application of pressure.

In some aspects, the method comprises quantifying the number of biological nanoparticles having the size value. In some aspects, the method comprises determining the concentration of the sample. In some aspects, the concentration of the sample is determined by counting a spike frequency of the sample. In some aspects, the method comprises comparing the spike frequency of the sample to a calibration particle standard spike frequency. In some aspects, the concentration of the sample is determined by counting the spike frequency of the sample and comparing it to the volume of the sample. In some aspects, the concentration of the sample is determined by counting the spike frequency of the sample, comparing it to a calibration particle standard spike frequency, and comparing the spike frequency of the sample to the volume of the sample.

In some aspects, the method comprises filtering the sample. In some aspects, the filtering occurs prior to the assigning of the size value. In some aspects, the filtering removes debris. In some aspects, the filtering prevents clogging.

In some aspects, the method comprises collecting the biological nanoparticle for analysis. In some aspects, the analysis comprises nucleic acid analysis. In some aspects, the nucleic acid analysis comprises sequencing, PCR, or digital PCR. In some aspects, the analysis comprises protein analysis. In some aspects, the protein analysis comprises ELISA, digital ELISA, or mass spectrometry. In some aspects, the analysis comprises lipid analysis. In some aspects, the analysis comprises small-molecule analysis. In some aspects, the small-molecule analysis comprises analysis of metabolites, analysis of signaling molecules, analysis of drugs, or a combination thereof. In some aspects, the analysis comprises mass spectrometry. In some aspects, the analysis comprises carbohydrate analysis. In some aspects, the carbohydrate analysis comprises mass spectrometry, nuclear magnetic resonance, Fourier-transform spectroscopy, or a combination thereof.

In some aspects, the microfluidic chip is a planar device and comprises at least one microfluidic channel. In some aspects, the at least one microfluidic channel has a maximum height, a maximum width, and/or a maximum cross sectional area. In some aspects, the at least one microfluidic channel comprises a constriction. In some aspects, the constriction has a width less than 25% the maximum width of the microfluidic channel. In some aspects, the constriction has a height less than 25% the maximum height of the microfluidic channel. In some aspects, the constriction has a cross sectional area less than 5% the maximum cross sectional area of the microfluidic channel. In some aspects, the maximum width has a value less than 500 µm and greater than 10 µm. In some aspects, the maximum height has a value less than 500 µm and greater than 10 µm. In some aspects, the maximum cross sectional area has a value less than 250,000 µm$^2$ and greater than 250 µm$^2$. In some aspects, at least a portion of the at least one microfluidic channel has a width of less than 10 µm, a width of less than 5 µm, or a width of less than 2 µm. In some aspects, at least a portion of the at least one microfluidic channel has a height of less than 10 µm, a height of less than 5 µm, or a height of less than 2 µm. In some aspects, at least a portion of the at least one microfluidic channel has a cross sectional area of less than 100 µm$^2$, a cross sectional area of less than 90 µm$^2$, a cross sectional area of less than 80 µm$^2$, a cross sectional area of less than 70 µm$^2$, a cross sectional area of less than 60 µm$^2$, a cross sectional area of less than 50 µm$^2$, a cross sectional area of less than 40 µm$^2$, a cross sectional area of less than 30 µm$^2$, a cross sectional area of less than 20 µm$^2$, a cross sectional area of less than 10 µm$^2$, a cross sectional area of less than 5 µm$^2$, or a cross sectional area of less than 2 µm$^2$.

In some aspects, the microfluidic chip comprises a plurality of microfluidic channels that intersect at junctions. In some aspects, one channel intersects with at least 3 different microfluidic channels at a junction. In some aspects, the junction lacks dead volume.

In some aspects, the light intensity comprises scattered light. In some aspects, the scattered light is backscattered light, side-scattered light, or forward-scattered light. In some aspects, the light intensity comprises both scattered light and fluorescence.

In some aspects, the detecting of the light intensity from the at least one biological nanoparticle being detected while in transit through the at least one microfluidic channel. In some aspects, the detecting of the light intensity has single-nanoparticle sensitivity, or the detecting of the light intensity has single-molecule sensitivity. In some aspects, the detecting of the light intensity detects a single antibody comprising multiple detectable agents.

In some aspects, the biological nanoparticle comprises at least one biomarker. In some aspects, the method comprises determining at least one copy number of the at least one biomarker.

In some aspects, the assigning of the size value uses a light beam modified by stimulated emission depletion (STED). In some aspects, the size value of the biological nanoparticle is a hydrodynamic diameter. In some aspects, the hydrodynamic diameter is less than 900 nanometers, less than 800 nanometers, less than 700 nanometers, less than 600 nanometers, less than 500 nanometers, less than 400 nanometers, less than 300 nanometers, less than 200 nanometers, less than 150 nanometers, less than 100 nanometers, less than 90 nanometers, less than 80 nanometers, less than 70 nanometers, less than 60 nanometers, less than 50 nanometers, less than 40 nanometers, or less than 30 nanometers. In some aspects, the assigning of the size value uses detection of a duty cycle.

In some aspects, the biological nanoparticle comprises an extracellular vesicle, an organelle, a microvesicle, a cell-derived vesicle, a protein aggregate, a nucleic acid aggregate, a lipid aggregate, a virus, a bacterium, or an exosome. In some aspects, biological nanoparticles transit through the microfluidic chip at a rate of more than 1 million particles per hour, more than 2 million particles per hour, more than 3 million particles per hour, more than 4 million particles per hour, more than 5 million particles per hour, more than 6 million particles per hour, more than 7 million particles per hour, more than 8 million particles per hour, more than 9 million particles per hour, more than 10 million particles per hour, more than 15 million particles per hour, more than 20 million particles per hour, more than 25 million particles per hour, more than 30 million particles per hour, more than 35 million particles per hour, more than 40 million particles per hour, more than 45 million particles per hour, or more than 50 million particles per hour.

In some aspects, the method comprises sorting the at least one nanoparticle into an enriched population. In some aspects, the sorting comprises flow-displacement sorting. In some aspects, the sorting does not include acoustic sorting or the use of physical barriers. In some aspects, the sorting is determined by the size value, the presence of a biomarker, the detected light intensity, an emitted wavelength, a plurality of emitted wavelengths, an identification of the biological nanoparticle, or a combination thereof. In some aspects, the enriched population has a diameter variance of less than 100%. In some aspects, the enriched population has a diameter range within 500% of a diameter value, within 400% of a diameter value, within 300% of a diameter value, within 200% of a diameter value, within 100% of a diameter value, within 50% of a diameter value, or within 25% of a diameter value. In some aspects, greater than 80% of the biological nanoparticles of the enriched population is associated with a detectable agent.

In some aspects, the fluid sample comprises a bodily fluid. In some aspects, the biological nanoparticle is an exosome. In some aspects, the bodily fluid comprises serum, plasma, spinal fluid, or lymph fluid. In some aspects, the biological nanoparticle is isolated. In some aspects, the biological nanoparticle is associated with at least one biomarker.

In some aspects, the method further comprises: detecting the at least one biomarker associated with the biological nanoparticle; and assigning a biomarker value to the biological nanoparticle. In some aspects, the biomarker value is assigned from a binary system. In some aspects, the biomarker value is assigned from a plurality of values. In some aspects, the biomarker is a protein biomarker. In some aspects, protein biomarker is selected from the group consisting of a tetraspanin, a heat shock protein, a membrane transporter, a cell-adhesion protein, a lipid bound protein, a transmembrane protein, an enzyme, or a combination thereof. In some aspects, the biomarker is a nucleic acid biomarker. In some aspects, the nucleic acid biomarker is selected from the group consisting of miR-141, miR-375, miRNA-21, miRNA-1246, miR-320c, miR-6068, miR-9, miR-107, miRNA-128, miRNA134, miRNA-137, miRNA124, miR-21, miR-141, miR-200a, miR-200b, miR-200c, miR-203, miR-205, miR-214; miR-17, miR-3p, miR-21, miR-20b, miR-223, miR-301, miR-141, miR-375, miR-21, miR-1246; miR-21, let-7f, and other Let-7 miRNAs.

In some aspects, the method further comprises directing the flow of the biological nanoparticle based on the size value, the biomarker value, or a combination thereof. In some aspects, the method further comprises sorting the biological nanoparticle into an enriched population, wherein the sorting is determined by the size value, the biomarker value, or a combination thereof.

In some aspects, the biological nanoparticle is associated with at least one tag. In some aspects, the method further comprises: detecting the at least one tag associated with the biological nanoparticle; and assigning a tag value to the biological nanoparticle. In some aspects, the tag value is assigned from a binary system. In some aspects, the tag value is assigned from a plurality of values. In some aspects, the tag is selected from the group consisting of a signal derived from protein markers associated with the biological nanoparticle, a signal derived from the size of the biological nanoparticle, a signal derived from membrane dyes associated with the biological nanoparticle, a signal derived from volume dyes associated with the biological nanoparticle, a signal derived from dyes associated with nucleic acids of a biological nanoparticle, a signal derived from dyes associated with lipids of a biological nanoparticle, and a signal derived from dyes associated with a biological nanoparticle. In some aspects, the method further comprises directing the flow of the biological nanoparticle based on the size value and/or the tag value. In some aspects, the method further comprises sorting the biological nanoparticle into an enriched population, wherein the sorting is determined by the size value and/or the tag value.

In various aspects, the present disclosure provides a device for determining the size of a biological nanoparticle in a fluid sample, the device comprising: a microfluidic chip; at least one detector configured to detect the presence or absence of biological nanoparticles on a particle-by-particle basis while the biological nanoparticles are in flow through at least a portion of the microfluidic chip; and a computer with software for: ranking biological nanoparticles based on the presence or absence of an emitted detectable light intensity of the biological nanoparticles; and measuring a size value of biological nanoparticles based on the emitted detectable light intensity of the biological nanoparticles.

In some aspects, the microfluidic chip comprises at least one microfluidic channel. In some aspects, the at least one microfluidic channel comprises a constriction. In some aspects, the device further comprises a source for interrogating. In some aspects, the source for interrogating comprises a source of electromagnetic radiation. In some aspects, the source for interrogating is selected from the group consisting of a solid state laser, a diode-pumped laser, a light-emitting diode (LED), a lamp, an arc discharge, a magnetic pulse, and a natural light. In some aspects, the detector detects fluorescent light, luminescent light, or any combination thereof. In some aspects, the detector can detect a plurality of different emission profiles. In some aspects, the detector can detect scattered light. In some aspects, the detector has single-nanoparticle sensitivity, the detector has single-molecule sensitivity, or any combination thereof.

In some aspects, the ranking corresponds with the measuring of the size value. In some aspects, the size value is a relative size value. In some aspects, the size value is measured by a difference in the detected light intensity. In some aspects, the size value is measured based on a detected modulation index. In some aspects, the size value is measured based on the detected light intensity and a detected modulation index. In some aspects, the modulation index comprises an amplitude modulation index, a frequency modulation index, a phase modulation index, or a combination thereof. In some aspects, the size value is an actual size value.

In some aspects, the device further comprises a mechanism for directing the flow of a biological nanoparticle. In some aspects, the mechanism for directing flow of a biological nanoparticle can direct flow in no more than 1 ms. In some aspects, the mechanism for directing flow uses flow displacement. In some aspects, the mechanism for directing flow uses electroosmotic flow, the application of pressure, or a combination thereof. In some aspects, the device further comprises software for quantifying the number of biological nanoparticles having the size value. In some aspects, the device further comprises software for determining the concentration of the fluid sample.

In some aspects, the device further comprises a filter. In some aspects, the microfluidic chip is a planar device and comprises at least one microfluidic channel. In some aspects, at least a portion of the at least one microfluidic channel has a width of less than 10 µm, a width of less than 5 µm, or a width of less than 2 µm. In some aspects, at least a portion of the at least one microfluidic channel has a height of less than 10 µm, a height of less than 5 µm, or a height of less than 2 µm. In some aspects, at least a portion of the at least one microfluidic channel has a cross sectional area of less than 100 µm$^2$, a cross sectional area of less than 90 µm$^2$, a cross sectional area of less than 80 µm$^2$, a cross sectional area of less than 70 µm$^2$, a cross sectional area of less than 60 µm$^2$, a cross sectional area of less than 50 µm$^2$, a cross sectional area of less than 40 µm$^2$, a cross sectional area of less than 30 µm$^2$, a cross sectional area of less than 20 µm$^2$, a cross sectional area of less than 10 µm$^2$, a cross sectional area of less than 5 µm$^2$, or a cross sectional area of less than 2 µm$^2$.

In some aspects, the device further comprises software for determining at least one copy number of a biomarker. In some aspects, the source for interrogating is modified by stimulated emission depletion (STED). In some aspects, the detecting, ranking, and measuring occurs with a rate of more than 1 million particles per hour, more than 2 million particles per hour, more than 3 million particles per hour, more than 4 million particles per hour, more than 5 million particles per hour, more than 6 million particles per hour, more than 7 million particles per hour, more than 8 million particles per hour, more than 9 million particles per hour, more than 10 million particles per hour, more than 15 million particles per hour, more than 20 million particles per hour, more than 25 million particles per hour, more than 30 million particles per hour, more than 35 million particles per hour, more than 40 million particles per hour, more than 45 million particles per hour, or more than 50 million particles per hour. In some aspects, the rate is more than 5 million particles per hour.

In some aspects, the device comprises more than one microfluidic channel, and the mechanism for directing flow can sort biological nanoparticles into each of the two or more microfluidic channels. In some aspects, the sorting generates an enriched population. In some aspects, the device further comprises software for sorting the biological nanoparticles. In some aspects, the sorting depends on the size value. In some aspects, the sorting depends on the ranking.

In various aspects, the present disclosure provides a method for capturing biological nanoparticles on a coated planar surface, the method comprising: providing at least one planar surface having a coating, the coating comprising: a non-specific adsorption resisting material; and a plurality of capturing molecules; contacting a fluid sample comprising a plurality of biological nanoparticles with the coating; centrifuging the fluid sample in contact with the at least one planar surface to facilitate contact of the biological nanoparticles with the coating; and capturing at least some of the plurality of nanoparticles with at least some of the plurality of capturing molecules.

In some aspects, at least a portion of the fluid sample has a layer thickness less than 10 mm, less than 9 mm, less than 5 mm, less than 1 mm, less than 900 µm, less than 800 µm, less than 700 µm, less than 600 µm, less than 500 µm, less than 400 µm, less than 300 µm, less than 200 µm, or less than 100 µm. In some aspects, the at least one planar surface comprises glass. In some aspects, the method further comprises covering the fluid sample with an evaporation prevention layer. In some aspects, the evaporation prevention layer is tape. In some aspects, the evaporation prevention layer is mineral oil.

In some aspects, the method further comprises filtering the fluid sample. In some aspects, the filtering step occurs prior to the contacting step. In some aspects, the filtering is driven by centrifugal force.

In some aspects, the method further comprises analyzing the at least one planar surface. In some aspects, the analyzing comprises counting the number of biological nanoparticles associated with the coating. In some aspects, the analyzing comprises measuring an emitted light intensity from the biological nanoparticles associated with the coating. In some aspects, the analyzing comprises imaging the biological nanoparticles associated with the coating. In some aspects, the non-specific adsorption resisting material comprises polyethylene glycol. In some aspects, the non-specific adsorption resisting material comprises a zwitterionic surface. In some aspects, the zwitterionic surface comprises carboxybetaine. In some aspects, the non-specific adsorption resisting material comprises bovine serum albumin.

In some aspects, the plurality of capturing molecules comprises an antibody. In some aspects, the antibody is biotinylated. In some aspects, the plurality of capturing molecules comprises a biotin or a streptavidin. In some aspects, the plurality of capturing molecules comprises a nucleic acid. In some aspects, the plurality of biological nanoparticles comprise an extracellular vesicle, an organelle, a microvesicle, a cell-derived vesicle, a protein aggregate, a nucleic acid aggregate, a lipid aggregate, a virus, a bacterium, an exosome, or a combination thereof. In some aspects, the plurality of biological nanoparticles comprise an exosome.

In certain aspects, the at least one planar surface has a diameter of between 0.1 mm and 100 cm, between 0.1 mm and 20 cm, between 1 mm and 20 cm, between 5 mm and 10 cm, between 1 mm and 5 cm, between 10 mm and 10 cm, between 5 mm and 5 cm, or between 1 cm and 50 cm. In some aspects, the at least one planar surface has a diameter of greater than 1 cm. In some aspects, the at least one planar surface has a width of between 1 cm and 100 cm, between 1 mm and 1 cm, between 1 mm and 20 cm, between 5 mm and 20 cm, between 10 mm and 20 cm, between 100 mm and 20 cm, between 1 cm and 20 cm, or between 1 cm and 50 cm. In some aspects, the at least one planar surface has a length of between 0.1 mm and 100 cm, between 1 mm and 20 cm, between 1 mm and 10 cm, between 5 mm and 20 cm, between 10 mm and 20 cm, between 100 mm and 20 cm, between 1 cm and 20 cm, or between 1 cm and 50 cm. In some aspects, the at least one planar surface has a surface area, wherein the surface area is between 200 $cm^2$ and 100 $cm^2$, the surface area is between 150 $cm^2$ and 80 $cm^2$, the surface area is between 150 $cm^2$ and 1 $cm^2$, the surface area is between 200 $cm^2$ and 1 $mm^2$, the surface area is between 120 $cm^2$ and 1 $mm^2$, the surface area is between 80 $cm^2$ and 1 $mm^2$, the surface area is between 50 $cm^2$ and 1 $mm^2$, the surface area is between 20 $cm^2$ and 1 $mm^2$, the surface area is between 1 $cm^2$ and 1 $mm^2$, the surface area is between 75 $mm^2$ and 1 $mm^2$, the surface area is between 50 $mm^2$ and 1 $mm^2$, the surface area is between 25 $mm^2$ and 1 $mm^2$, or the surface area is between 10 $mm^2$ and 1 $mm^2$.

In some aspects, the method further comprises associating a detectable agent with at least one of the plurality of nanoparticles. In some aspects, the detectable agent is selected from the group consisting of a fluorescently labeled antibody, a fluorescently labeled protein, a fluorescently labeled nucleic acid, a fluorescently labeled lipid, a membrane dye, a fluorogenic dye, a dye, a polymer dot, and a combination thereof.

In certain aspects, the method further comprises providing a containing device comprising a plurality of compartments, wherein at least one of the plurality of compartments comprise the at least one planar surface and the fluid sample. In some aspects, the containing device is a well plate. In some aspects, the plurality of compartments comprises a well. In some aspects, the containing device is a microfluidic chip. In some aspects, the plurality of compartments comprises a microfluidic channel. In some aspects, the containing device is a block, and the plurality of compartments comprise a plurality of holes.

In some aspects, the method further comprises attaching the containing device to the at least one planar surface. In some aspects, the containing device is attached to a top device. In some aspects, the top device comprises a filter. In some aspects, the top device comprises a microfluidic device. In some aspects, the top device comprises a multi-well plate.

In some aspects, the method further comprises removing the at least one planar surface from the containing device. In some aspects, the removing occurs after the capturing. In some aspects, the centrifugation takes place for a period of time, and the number of biological nanoparticles associated with the coating is at least 100% greater than a comparable experiment omitting the centrifuging step, wherein the comparable fluidic sample is in contact with the coating for the same period of time. In some aspects, the period of time is less than 1 hour, less than 30 minutes, less than 15 minutes, less than 10 minutes, less than 5 minutes, or less than 1 minute.

In some aspects, at least 10% of the plurality of nanoparticles are captured with the coating.

In some aspects, the method further comprises increasing the stability of the coated planar surface. In some aspects, the increasing of the stability comprises lyophilization. In some aspects, the increasing of the stability occurs prior to the capturing of at least some of the plurality of nanoparticles with at least some of the plurality of capturing molecules associated with the coating.

In some aspects, the at least one planar surface is compatible with microscopy. In some aspects, the at least one planar surface comprises a coverslip. In some aspects, the centrifugal force is applied simultaneously to a plurality of the planar surfaces.

In some aspects, the plurality of capturing molecules are attached to the planar surface via a linking moiety. In some aspects, the method further comprises cleaving the linking moiety. In some aspects, the method further comprises releasing at least some of the plurality of biological nanoparticles from the coating. In some aspects, the releasing comprises elution with biotin. In some aspects, the released biological nanoparticle is structurally intact. In some aspects, the released biological nanoparticle is lyzed, and wherein the lysate is collected for analysis. In some aspects, the analysis is selected from the group consisting of nucleic acid analysis, sequencing, polymerase chain reaction, protein analysis, ELISA, mass spectrometry, carbohydrate analysis, small molecule analysis, drug analysis, and lipid analysis.

In some aspects, the method further comprises washing the planar surface to remove at least some of the fluid sample that has not been captured by the at least some of the plurality of capturing molecules. In some aspects, the at least some of the plurality of nanoparticles captured with the coating are imaged. In some aspects, the imaging comprises fluorescence microscopy. In some aspects, the fluorescence microscopy is super-resolution imaging. In some aspects, the fluorescence microscopy uses at least one membrane dye associated with the biological nanoparticles. In some aspects, the at least one membrane dye comprises FM 143, ANEPPS, or a combination thereof. In some aspects, the imaging comprises atomic force microscopy. In some aspects, the imaging comprises transmission electron microscopy. In some aspects, the imaging provides a set of information. In some aspects, the set of information comprises identifying the biomarkers present on the nanoparticles. In some aspects, the set of information comprises identifying the antibodies present on the nanoparticles. In some aspects, the set of information comprises determining the size of the nanoparticles.

In certain aspects, the size of the nanoparticle is a relative size value, and wherein the relative size value is determined by a difference in measured light intensity. In some aspects, the method further comprises calibrating the measured light intensity with a standard to determine the actual size value of the nanoparticle. In some aspects, the calibrating occurs prior to the measuring of the light intensity. In some aspects, the size of the nanoparticle is an actual size value of the biological nanoparticle. In some aspects, the standard comprises a gold nanoparticle. In some aspects, the standard comprises a plurality of lipids. In some aspects, the standard comprises a lipid vesicle. In some aspects, the standard comprises a silica bead, a polystyrene bead, a silicone bead, a polymer bead, a polymer nanoparticle, or a combination thereof.

In some aspects, the fluid sample further comprises a second biological nanoparticle, and wherein the standard comprises the second biological nanoparticle. In some aspects, the size of the standard is measured with dynamic light scattering. In some aspects, the measured light intensity has single-nanoparticle sensitivity. In some aspects, the measured light intensity has single-molecule sensitivity. In some aspects, the measured light intensity detects a single antibody comprising multiple detectable agents.

In some aspects, the set of information comprises identifying the concentration of the sample. In some aspects, the set of information comprises identifying the copy number of biomolecules. In some aspects, the biological nanoparticle comprises at least one biomarker. In some aspects, the biological nanoparticle is associated with a plurality of detectable agents. In some aspects, at least one of the plurality of detectable agents is attached to the surface of the biological nanoparticle, at least one of the plurality of detectable agents is in the surface of the biological nanoparticle, at least one of the plurality of detectable agents is within the interior of the biological nanoparticle, or a combination thereof. In some aspects, plurality of detectable agents comprise more than one type of detectable agent. In some aspects, the plurality of detectable agents have different emission profiles. In some aspects, the emission profiles have different peak wavelengths. In some aspects, the peak wavelengths are separated by more than 10 nanometers, by more than 20 nanometers, by more than 30 nanometers, by more than 40 nanometers, by more than 50 nanometers, by more than 75 nanometers, by more than 100 nanometers, by more than 120 nanometers, by more than 140 nanometers, by more than 160 nanometers, by more than 180 nanometers, by more than 200 nanometers, by more than 300 nanometers, by more than 400 nanometers, by more than 500 nanometers, by more than 600 nanometers, or by more than 700 nanometers. In some aspects, the plurality of detectable agents are colocalized. In some aspects, the presence of colocalized detectable agents provides a set of information. In some aspects, the set of information comprises the presence of the at least one biomarker, the absence of the at least one biomarker, or a combination thereof.

In some aspects, the at least one planar surface is translucent. In some aspects, the at least one planar surface is transparent.

In various aspects, the present disclosure provides a kit for capturing nanoparticles, the kit comprising: at least one planar surface having a coating, the coating comprising: a non-specific adsorption resisting material; and a plurality of capturing molecules; and a containing device comprising a plurality of compartments, the containing device being compatible with centrifugation.

In some aspects, the containing device is a well plate. In some aspects, the plurality of compartments comprises a well. In some aspects, the containing device is a microfluidic chip. In some aspects, the plurality of compartments comprises a microfluidic channel. In some aspects, the containing device is a block, and the plurality of compartments comprise a plurality of holes. In some aspects, the at least one planar surface comprises glass. In some aspects, the non-specific adsorption resisting material comprises polyethylene glycol. In some aspects, the non-specific adsorption resisting material comprises a zwitterionic surface. In some aspects, the zwitterionic surface comprises carboxybetaine. In some aspects, the non-specific adsorption resisting material comprises bovine serum albumin.

In some aspects, the plurality of capturing molecules comprises an antibody. In some aspects, the antibody is biotinylated. In some aspects, the plurality of capturing molecules comprises a biotin or a streptavidin. In some aspects, the plurality of capturing molecules comprises a nucleic acid.

In some aspects, the kit further comprises a plurality of biological nanoparticles, wherein the plurality of biological nanoparticles comprise an extracellular vesicle, an organelle, a microvesicle, a cell-derived vesicle, a protein aggregate, a nucleic acid aggregate, a lipid aggregate, a virus, a bacterium, an exosome, or a combination thereof.

In some aspects, the kit further comprises instructions. In some aspects, the kit further comprises a detectable agent. In some aspects, the detectable agent is fluorescent. In some aspects, the detectable agent is luminescent. In some aspects, the detectable agent is selected from the group consisting of a fluorescently labeled antibody, a fluorescently labeled protein, a fluorescently labeled nucleic acid, a fluorescently labeled lipid, a membrane dye, a fluorogenic dye, a dye, a polymer dot, and a combination thereof.

In some aspects, the kit further comprises a plurality of detectable agents. In some aspects, the plurality of detectable agents have overlapping emission profiles. In some aspects, the plurality of detectable agents have the same emission profiles. In some aspects, the emission profiles have the same peak wavelengths. In some aspects, the plurality of detectable agents comprise the same detectable agent. In some aspects, the plurality of detectable agents comprise more than one type of detectable agent. In some aspects, the plurality of detectable agents have different emission profiles. In some aspects, the emission profiles have different peak wavelengths. In some aspects, the peak wavelengths are separated by more than 10 nanometers, by more than 20 nanometers, by more than 30 nanometers, by more than 40 nanometers, by more than 50 nanometers, by more than 75 nanometers, by more than 100 nanometers, by more than 120 nanometers, by more than 140 nanometers, by more than 160 nanometers, by more than 180 nanometers, by more than 200 nanometers, by more than 300 nanometers, by more than 400 nanometers, by more than 500 nanometers, by more than 600 nanometers, or by more than 700 nanometers.

In some aspects, the kit further comprises a standard for calibrating. In some aspects, the standard comprises a gold nanoparticle. In some aspects, the standard comprises a plurality of lipids. In some aspects, the standard comprises a lipid vesicle. In some aspects, the standard comprises a silica bead, a polystyrene bead, a silicone bead, a polymer bead, a polymer nanoparticle, or a combination thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3A-E depicts a biological nanoparticle size determination using surface membrane dye. FIG. 3A depicts a biological nanoparticle with a dye associated with the surface of the biological nanoparticle. FIG. 3B shows that intensity emitted from a surface dye can be proportional to the surface area. FIG. 3C depicts a reference size distribution of a standard. FIG. 3D depicts an uncorrected histogram having an intensity distribution. FIG. 3E depicts a histogram overlaid with a reference size distribution.

FIG. 4A-E depicts a biological nanoparticle size determination using volume dye. FIG. 4A depicts a biological nanoparticle with a volume dye encapsulated by the biological nanoparticle. FIG. 4B shows that intensity emitted from a volume dye can be proportional to the biological nanoparticle volume. FIG. 4C depicts a reference size distribution of a standard. FIG. 4D depicts an uncorrected histogram having an intensity distribution. FIG. 4E depicts a histogram overlaid with a reference size distribution.

FIG. 5A depicts a biological nanoparticle with a volume dye encapsulated by the biological nanoparticle and a dye associated with the surface of the biological nanoparticle. FIG. 5B shows that intensity emitted from a volume dye and a surface dye can be proportional to the surface area and volume of a biological nanoparticle.

FIG. 15A depicts biological nanoparticles visualized on a coated planar surface. FIG. 15B depicts a comparison of the number of biological nanoparticles captured on a coated planar surface with and without centrifugation.

FIG. 17A depicts a microfluidic chip and optical apparatus that can detect the backscatter light from Au nanoparticles for use as internal calibration and/or for normalizing detected optical signals. FIG. 17B shows a signal trace demonstrating the detected fluorescence has single dye molecule sensitivity.

FIG. 20A depicts a signal time trace showing detected photon spikes from vesicles bound with Alexa561-tagged antibodies against VGlut1 (Protein A). FIG. 20B depicts signal time trace showing the detected photon spikes from vesicles bound with Alexa647-tagged antibodies against VATPase (Protein B). FIG. 20C depicts a cross-correlation analysis of the co-localization between Protein A (FIG. 20A) and Protein B (FIG. 20B) on the same vesicle.

FIG. 21A depicts a signal time trace showing the detected photon spikes from vesicles labeled with the membrane dye ANEPPS. FIG. 21B depicts an example signal time trace showing the detected photon spikes from vesicles bound with Alexa647-tagged antibodies against CD63. FIG. 21C shows the cross-correlation analysis of the co-localization between the membrane dye ANEPPS and the anti-CD63 fluorescent antibody on the same vesicle. FIG. 21D depicts the fluorescence intensity distribution of single free fluorescent antibody, and of the antibodies bound to the vesicle based on co-localization with the membrane dye.

FIG. 22A-C depicts co-localization of different protein biomarkers on individual vesicles using different color antibodies that bind specifically to different proteins on the vesicle together with a volume dye that reports the presence of intact membrane-bound volume and/or size of the vesicle. FIG. 22A depicts a signal time trace showing the detected photon spikes from vesicles labeled with the volume dye Oregon Green Diacetate. FIG. 22B depicts a signal time trace showing the detected photon spikes from vesicles bound with Alexa647-tagged antibodies against SV2A. FIG. 22C depicts the cross-correlation analysis of the co-localization between the volume dye Oregon Green and the anti-SV2A fluorescent antibody on the same vesicle; the co-localization percentage is calculated to be 68%.

FIG. 23A-D depicts signal intensity calibration using the back-scattered light from gold nanoparticles as an internal standard. FIG. 23A depicts a signal time trace showing the detected photon spikes from exosomes labeled with membrane dye ANEPPS. FIG. 23B depicts a signal time trace showing the detected photon spikes from gold nanoparticles. FIG. 23C depicts an example signal intensity histogram from the membrane dye-labeled vesicles (n=636 events).

FIG. 23D shows an example signal intensity histogram from the gold nanoparticles (n=538 events) measured together with membrane-dye labeled exosomes in the same experiment at the same time.

FIG. 24A depicts the fluorescence intensity of membrane dye ANEPPS. FIG. 24B depicts insets showing examples of a large vesicle (1), a medium vesicle (2), and a small vesicle (3). FIG. 24C shows the co-localization and relative copy numbers of Alexa647-tagged antibodies, as reflected by the differences in measured fluorescence intensities on the exosomes.

DETAILED DESCRIPTION OF THE INVENTION

Figure 1:
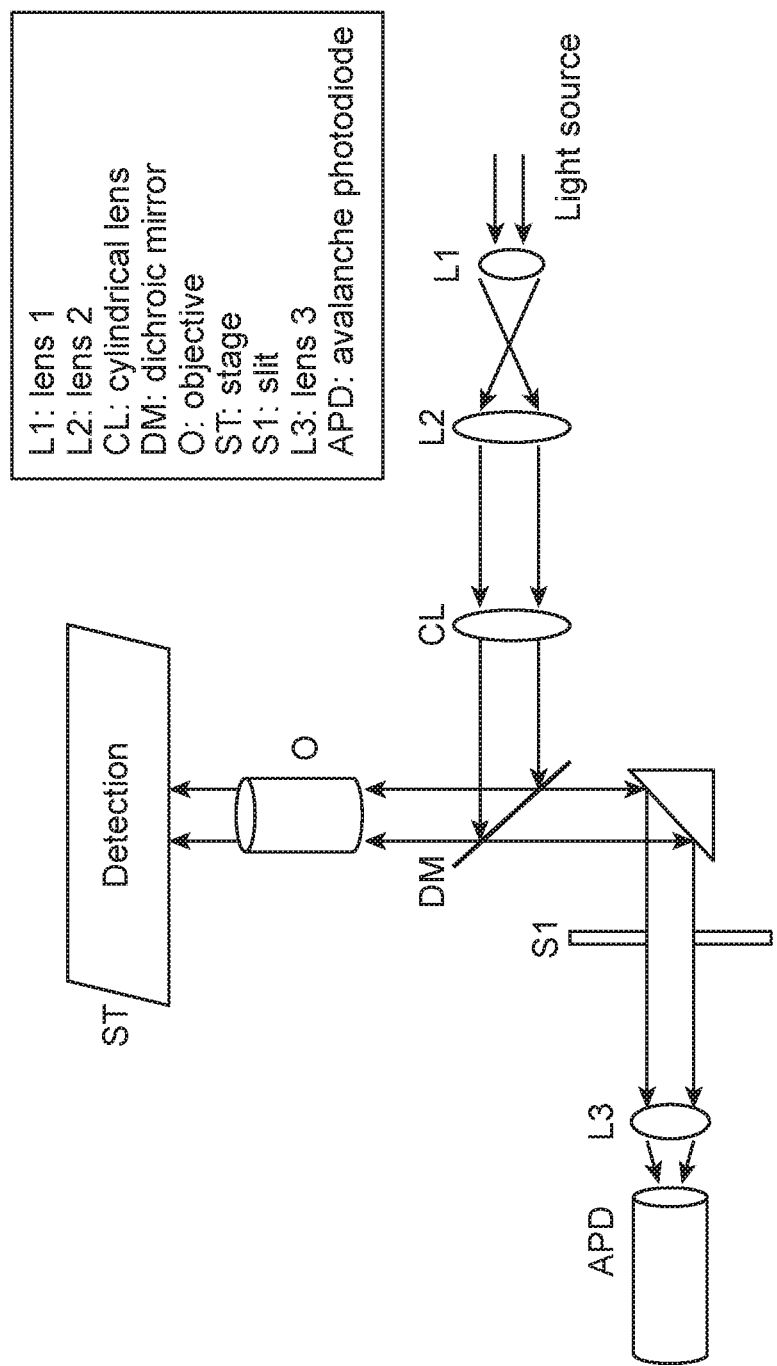
FIG. 1 depicts an apparatus configured to detect scattered light.

The present disclosure relates to methods, systems, and devices for performing analyses of biological nanoparticles. More specifically, in some aspects, the present disclosure relates to methods, systems, and devices for performing single biological nanoparticle size determination on a sample while the biological nanoparticle is in transit. In other aspects, the present disclosure relates to methods, systems, and devices for selectively capturing biological nanoparticles on a coated planar surface, the capturing being facilitated by centrifugation.

An important application for the identification of biological nanoparticles is the sorting or enrichment of nanoparticles of interest. Bodily fluids comprise a plethora of biological nanoparticles, which have a rich diversity. Many biological nanoparticles have utility in biomedical applications, serve as biomarkers for disease, or aid in malady identification. Biological nanoparticles may be rare, the bodily fluids that comprise the nanoparticles frequently express them in low concentrations, and the fluid further comprises other biological structures or debris. The isolation, purification, or enrichment of biological nanoparticles of interest can aid in biomedical treatments, and can additionally increase the local concentration of the biological nanoparticles. The use of a microfluidic device can increase the efficiency and/or can facilitate the isolation, purification, or enrichment of biological nanoparticles of interest. Biological nanoparticles can be classed by size, so the rapid identification of nanoparticle size has numerous benefits.

The capture or isolation of the rare biological nanoparticles can aid in research, nanoparticle identification, and medical treatments. Because the nanoparticles of interest are frequently expressed in low concentrations, a method of increasing their capture would prove beneficial. Beads coated with a capturing material have been used to isolate particles of interest (see, e.g., Lee, *Nano Lett,* 2014, 14(1), pp 1-5), but small biological nanoparticles cannot be readily analyzed while on beads, requiring a cleaving step that can damage the nanoparticles and decrease yields. The use of beads also can lead to issues associated with non-specific binding, thus can result in samples of insufficient purity and/or can lead to low recovery efficiency. The low concentrations of biological nanoparticles in bodily fluid can result in slow capture or low yield and/or low purity in capture and isolation using conventional means. Additionally, the use of beads can be prone to problems that arise from non-specific binding, resulting in "dirty" samples. A method aiding the capture or isolation of biological nanoparticles, and decreasing the amount of time to do so, would be beneficial in hospital and laboratory settings.

In view of the above, there is a need to rapidly determine the size of biological nanoparticles while they are in transit through, e.g., a microfluidic chip. There is a further need for the identification, characterization, isolation, or enrichment of biological nanoparticles of interest. Due to the low concentration of most biological nanoparticles, there is an additional need to quickly capture the nanoparticles in a manner that offers high recovery efficiency, purity, and sensitivity, and which also can be readily analyzed without requiring further processing. The present disclosure provides for these needs and more.

Apparatus and Methods of Biological Nanoparticle Size Determination in Transit

In some embodiments, the present disclosure provides methods, systems, devices, and apparatuses for the determination (also referred to as identification), manipulation, and analyses of biological nanoparticles that are rapid and versatile, and can be conducted while the nanoparticles are in transit. In some embodiments, the methods, systems, devices, and apparatuses of this disclosure include a microfluidic chip which can facilitate the manipulation, detection, analyses, determination, and/or identification of the biological nanoparticles in transit. Microfluidic chips can be used to process small volumes of fluidic samples, and offer advantages over traditional macro-scale devices (e.g., microfluidic chips require only minute volumes of fluidic samples, require less reagent, and are processed in a smaller amount of time, adding to efficiency in comparison to macro-scale devices). Microfluidic chips are planar devices and thus can facilitate the detection and analyses of bionanoparticles by enabling the use of objectives, lenses, or light collection systems with high numerical apertures, which enhances light collection and thus facilitates the detection, analyses, determination, and/or identification of the biological nanoparticles in transit. Microfluidic chips are planar devices, enhancing their compatibility with a microscope setup. Microfluidic chips additionally can allow for the design and generation of interconnected fluidic networks without having dead volumes, which in turn can facilitate the detection and manipulation of bionanoparticles (e.g., sorting using flow displacement at a junction of three or more fluidic channels). Dead volume is a portion of volume within the microfluidic chip that is outside of the flow path (e.g., a volume into which liquid, potentially carrying sample nanoparticles, can diffuse into, thus potentially decreasing accuracy). Microfluidic chips, through methods of microfabrication, can allow for the creation of channels with cross sections that are non-spherical or non-square (e.g., rectangular), which can facilitate the detection, analyses, determination, and/or identification of the biological nanoparticles in transit. Microfluidic chips can facilitate the creation of channels with different widths or heights along the length of the channel (e.g., a constriction or a step change in width and/or height of the channel) to facilitate the manipulation, detection, analyses, determination, and/or identification of the biological nanoparticles in transit. Microfluidic chips can be formed by bonding to a coverslip of a desirable thickness as well as having a desirable material property (e.g. refractive index) to enhance compatibility with high-efficiency light collection system (e.g., a high numerical aperture objective requiring the appropriate coverslip thickness and refractive index for maximal light collection and/or minimal distortion) to facilitate the manipulation, detection, analyses, determination, and/or identification of the biological nanoparticles in transit. Microfluidic chips provide an attractive and versatile platform for the manipulation, isolation, sorting, and/or transport of bionanoparticles.

In certain aspects, nanoparticles traveling through a microfluidic channel of a microfluidic device can be exposed to radiation, including infrared, visible light, and microwave radiation. An effect of exposing the biological nanoparticles to the radiation is a resultant light intensity emitted by the nanoparticles or by the molecules associated with the nanoparticles. Measuring the intensity of light emitted by a nanoparticle provides for a corresponding measure of the nanoparticle's size value. The size value can be a relative size value, or can be a true size value. This method of measuring an emitted intensity of light while the bionanoparticle is in flow through a microfluidic device allows for a size value to be assigned to the nanoparticle while said nanoparticle is in transit. In some embodiments, a detector can be configured to detect the presence or absence of a biological nanoparticle on a particle-by-particle basis while the biological nanoparticle is in flow through at least a portion of the microfluidic chip. In some embodiments, the microfluidic chip comprises a microfluidic channel, and the biological nanoparticle is in flow through the microfluidic channel. In some embodiments, the microfluidic channel comprises a constriction, and the biological nanoparticle is in flow through the constriction. The method provides an unexpected benefit to traditional nanoparticle size determination, at least because the use of a microfluidic device provides for surprisingly efficient analysis with a high throughput and frequency of detecting and/or sorting events. The compact size of the microfluidic chip allows for the use of the methods, apparatuses, systems, and devices of this disclosure in many settings that could not support a traditional laboratory setup, and the accuracy of data obtained using the microfluidic device is better than what one would anticipate by simply scaling down traditional macro-scale devices. The determination of a nanoparticle size value while in flow avoids the requirement of bionanoparticle capture and downstream release utilized in prior methods. The methods of the present disclosure can be applied to a variety of apparatuses and systems.

In certain embodiments, a size value is assigned to a biological nanoparticle while the bionanoparticle is in flow. The terms "in flow" and "in transit" are used interchangeably herein. In certain embodiments, the flow is uninterrupted. The terms "uninterrupted flow", "in continuous flow", and variations thereof are used interchangeably herein. The term "uninterrupted flow" (and variations thereof) refers to a state of flow such that the flow is not stopped for more than 1 second. In certain aspects, the flow can be directionally specified.

As used herein, the term "assigning" refers to designating a quantitative property, qualitative property, or importance of a biological nanoparticle categorization to the biological nanoparticle subject of the assigning. In one embodiment, a size value can be assigned to a biological nanoparticle. As used herein, the term "size value" refers to a relative size value or to an actual size value. The size value provides a true or relative measure of a linear distance. In certain embodiments, the assigning is performed by a computer and a software representing an assigning algorithm.

As used herein, the term "ranking" refers to assessing a quantitative property, qualitative property, or importance of a nanoparticle by categorization. In one embodiment, a biological nanoparticle may be ranked as either null (for example, when a nanoparticle has an emission intensity below a detectable threshold), or nonzero (for example, when a nanoparticle is detected). In some embodiments, the ranking is binary. For example, each nanoparticle having a detected light intensity above a threshold limit is assigned a value of 1, while each measured sample not having a detected light intensity above the threshold limit is assigned a value of 0, thus forming a binary ranking. In other embodiments, a nanoparticle may be ranked according to additional categories, e.g., which correlate with the identity of the nanoparticle, the presence of a detectable characteristic, the presence of a distinguishing feature, and the like. The rankings may be assigned an arbitrary number corresponding to one of a number of predetermined quantitative or qualitative categories. In other embodiments, the ranking is non-binary, for example, the value is assigned based on the amount of emitted light intensity measured from a biological nanoparticle. In certain embodiments, the ranking is performed by a computer and a software representing a ranking algorithm.

As used herein, a "detectable characteristic" refers to an observable property associated with a biological nanoparticle, for example, a photoactive, electroactive, bioactive, or magnetic property that is associated with the biological nanoparticle, or which is intrinsic to the nanoparticle. In certain embodiments, the "detectable characteristic" includes the association of the biological nanoparticle with a detectable agent, or a biomarker.

Examples of photoactive properties include, for example, alterations in optical intensity (optical reflection, scattering, deflection, transmission, absorbance, or emission) commonly induced by bioparticle morphology (particle size, internal subcellular structures), fluorescence, luminescence, immunofluorescence, and the like. Detection of the photoactive properties can, for example, report the size, mass, surface area, volume, protein content, membrane area, lipid content, enzyme content, metabolite content, carbohydrate content, nucleic-acid content, protein identity, or nucleic-acid identity on, in, or associated with the nanoparticle.

As used herein, the terms "biological nanoparticle", "bionanoparticle," and "bioparticle" are used interchangeably. The general term "nanoparticle" refers to a biological nanoparticle. The term "biological nanoparticle" refers to a biological unit having a hydrodynamic diameter of less than 1 μm. A non-limiting example of a biological nanoparticle is an exosome.

Microfluidic Device

In some aspects, the present disclosure provides for the use of a microfluidic chip. Microfluidic chips may be formed from substrates (e.g., silicon, glass, ceramic, plastic, organosilicon, quartz, or a combination thereof) and may include a network of microfluidic channels through which fluid flows. Microfluidic devices can be used to process minute volumes of fluidic samples, and offer advantages over traditional macro-scale devices (e.g., by requiring substantially smaller volumes of fluidic samples, requiring less reagent use, and processing time is decreased in comparison to macro-scale devices). Microfluidic chips provide an attractive and versatile platform for the manipulation, isolation, sorting, and/or transport of bionanoparticles. The ease with which arrays of microfluidic channels can be pattered and integrated within microfluidic devices makes these microfluidic devices an attractive platform for applications involving biological nanoparticles. Microfluidic chips are planar devices and thus can facilitate the detection and analyses of bionanoparticles by enabling the use of objectives, lenses, or light collection systems with high numerical apertures, which enhances light collection and thus facilitate the detection, analyses, determination, and/or identification of the biological nanoparticles in transit.

Microfluidic chips are planar devices and thus also can enhance their compatibility with a microscope setup. Microfluidic chips additionally can allow for the design and generation of interconnected fluidic networks without having dead volumes, which in turn can facilitate the detection and manipulation of bionanoparticles (e.g., sorting using flow displacement at the junction of three or more fluidic channels). Microfluidic chips, through methods of microfabrication, can allow for the creation of channels with cross sections that are non-spherical or non-square (e.g., rectangular), which can facilitate the detection, analyses, determination, and/or identification of the biological nanoparticles in transit. Microfluidic chips can facilitate the creation of channels with different widths or heights along the length of the channel (e.g., a constriction or a step change in width and/or height of the channel) to facilitate the manipulation, detection, analyses, determination, and/or identification of the biological nanoparticles in transit. Microfluidic chips can be formed by bonding to a coverslip of a desirable thickness as well as having a desirable material property (e.g., refractive index) to enhance compatibility with high-efficiency light collection system (e.g., high numerical aperture objective requiring the appropriate coverslip thickness and refractive index for maximal light collection and/or minimal distortion) to facilitate the manipulation, detection, analyses, determination, and/or identification of the biological nanoparticles in transit. Microfluidic chips and apparatuses using microfluidic chips allow for a large number of biological nanoparticles to be transported, combined, separated, sorted, and/or otherwise manipulated in a rapid manner. As used herein, the terms "microfluidic chip", "microfluidic device", and "microfluidic channel device" can be used interchangeably.

Figure 2A:
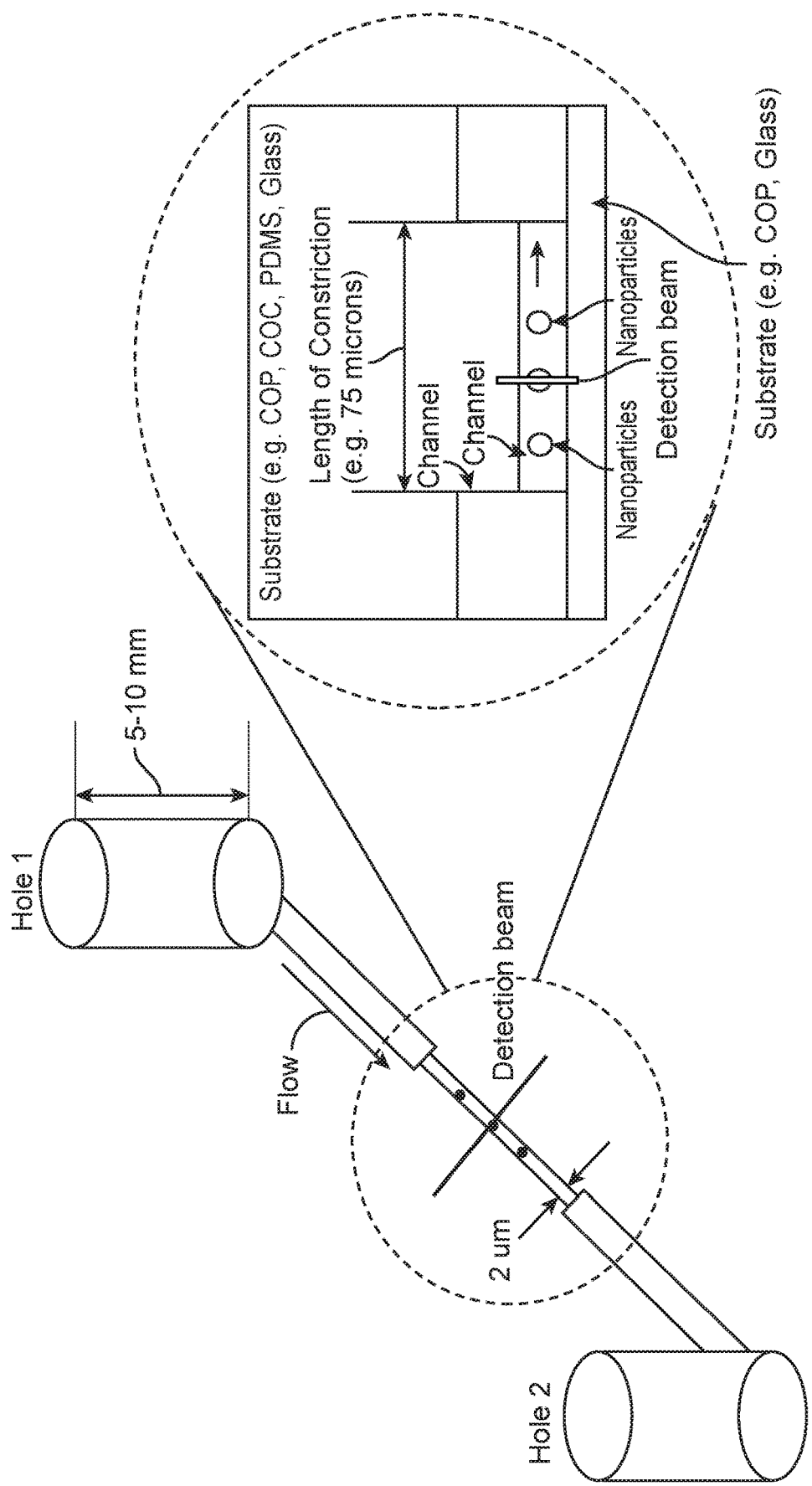
FIG. 2A depicts an apparatus comprising a microfluidic channel, an inlet, a constriction, and an outlet having nanoparticles in flow.

In some embodiments, the microfluidic chip comprises an inlet, an outlet, and a microfluidic channel which can be analyzed using a detection beam to detect nanoparticles (see, e.g., FIG. 2A). In certain embodiments, the microfluidic chip comprises an inlet, an outlet, a microfluidic channel which can be analyzed using a detection beam to detect nanoparticles, and two flow focusing channels to focus nanoparticles in the plane of the microfluidic chip (see, e.g., FIG. 2B). In some embodiments, the microfluidic chip comprises an inlet, an outlet, a microfluidic channel which can be analyzed using a detection beam to detect nanoparticles, and four flow focusing channels to focus nanoparticles both in the plane of the microfluidic chip and orthogonal to the plane of the microfluidic chip (see, e.g., FIG. 2C).

In certain embodiments, the microfluidic chip comprises an input channel, a first output channel, a second output channel, and a directional flow channel. In some embodiments, the microfluidic chip further comprises a valve, wherein the valve is separable from the microfluidic chip. In some embodiments, the flow of a first fluid in the directional flow channel is regulated; and the flow of the first fluid in the directional flow channel directs the flow of a second fluid from the input channel to the first output channel, the second output channel, or a combination thereof. In certain embodiments, a detector is configured to detect a signal emitted from a biological nanoparticle, and a processor is configured to assign a value to the biological nanoparticle and operate the flow-regulation mechanism. In some aspects, the flow-regulation mechanism is an electro-actuated mechanism.

The microfluidic chip can be fabricated to provide for an efficient active sorting scheme and subsequent purification (e.g., purification chamber) scheme. The microfluidic chip can be composed of two layers on a silicon master and can be fabricated with one-step molding into polymeric substrate. The microfluidic chip can be finished with bonding to a glass substrate or a polymeric substrate.

In some aspects, the silicon master can be fabricated using photolithography processes. The features can be designed using standard software (e.g., AutoCAD, Autodesk, San Rafael, CA), and can be written on a chrome mask. In these cases, positive resist lithography and deep reactive ion etching (DRIE) can be used to form a first layer. In some aspects, the positive photo resist (e.g., AZ 1512) is achieved by a process that can include a DRIE process. The DRIE process can achieve a depth (e.g., 2-5 μm) suitable for various features.

In some aspects, a second layer of the microfluidic chip features can be fabricated using a negative photoresist (e.g., SU-8-3050 from MicroChem, Newton, MA), and the height of the feature can be controlled (e.g., 50 μm). The master can be silanized using, for example, tridecafluoro-1,1,2,2-tetrahydrooctyl-1-trichlorosilane (Sigma-Aldrich, St. Louis, MO). The silanized master and silicon wafer can be coated with uncured PDMS and baked (e.g., for 2 hours at 70° C.). In some aspects, the piece of PDMS with the desired micro-features can be peeled off the silicon master, and then bonded with a piece of cover glass using the standard process of plasma oxidation to complete the fabrication of the microfluidic chip.

In some aspects, a microfluidic chip provided herein can comprise a flow channel or chamber enclosed by walls fabricated from materials including, but not limited to, polymeric materials (polydimethylsiloxane (PDMS), polyurethane-methacrylate (PUMA), polymethylmethacrylate (PMMA), polyethylene, polyester (PET), polytetrafluoroethylene (PTFE), polycarbonate, parylene, polyvinyl chloride, fluoroethylpropylene, lexan, polystyrene, cyclic olefin polymers, cyclic olefin copolymers, polyurethane, polyestercarbonate, polypropylene, polybutylene, polyacrylate, polycaprolactone, polyketone, polyphthalamide, cellulose acetate, polyacrylonitrile, polysulfone, epoxy polymers, thermoplastics, fluoropolymer, and polyvinylidene fluoride, polyamide, polyimide), inorganic materials (glass, quartz, silicon, GaAs, silicon nitride), fused silica, ceramic, glass (organic), and/or other materials and combinations thereof.

In some aspects, wall materials can be fabricated of porous membranes, woven or non-woven fibers (such as cloth or mesh) of wool, metal (e.g., stainless steel or Monel), glass, paper, or synthetic (e.g., nylon, polypropylene, polycarbonate, parylene, and various polyesters), sintered stainless steel and other metals, and porous inorganic materials such as alumina, silica or carbon.

In some embodiments, the microfluidic chip comprises at least a first input channel and at least two exit channels.

In certain embodiments, a microfluidic chip is provided and comprises a plurality of microfluidic channels. In some embodiments, the microfluidic chip may comprise channels for channeling biological nanoparticles based on ranking. In certain embodiments, the microfluidic chip may comprise channels for channeling biological nanoparticles based on size value. In some embodiments, the device may further comprise electrodes for tracking and manipulating directional flow of bioparticles.

In certain embodiments, a microfluidic chip provided herein may comprise a plurality of flow channels, including one or more input flow channels (i.e., channels that bring a bionanoparticle to a detection volume) and one or more output channels (i.e., channels that take a biological nanoparticle away from a detection volume. In some embodiments, an apparatus as provided herein may comprise a combination of at least about 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, or more input channels and at least about 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, or more output channels. In certain embodiments, the plurality of flow channels are in a parallel configuration.

In certain embodiments, a microfluidic chip may comprise multiple flow channels connecting to the main channel to inject additional fluid to alter the local velocity.

Channels of the microfluidic chip may intersect at junctions. In some aspects, one channel intersects with a different channel at a junction. In some aspects, one channel intersects with more than one different channels at a junction. In some aspects, one channel intersects with at least 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95 or 100 different channels at a junction. In some aspects, more than one channel intersects with a different channel at a junction. In some aspects, at least 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100 different channels intersect with one different channel at a junction. In certain embodiments, the junctions do not have any dead volume.

Channels of the microfluidic chip may not intersect at junctions. In some aspects, one channel intersects with a different channel at a location on the microfluidic chip that is not a junction. In some aspects, one channel intersects with more than one different channels at a location on the microfluidic chip that is not a junction. In some aspects, one channel intersects with at least 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95 or 100 different channels at a location on the microfluidic chip that is not a junction. In some aspects, more than one channel intersects with a different channel at a location on the microfluidic chip that is not a junction. In some aspects, at least 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95 or 100 different channels intersect with one different channel at a location on the microfluidic chip that is not a junction.

In certain embodiments, the microfluidic device is a planar device and allows for the use of high numerical aperture detection or imaging. A planar microfluidic device prevents image or light-collection distortion or aberration (e.g., spherical or chromatic aberration) that is frequently present during the analysis of non-planar systems (e.g., capillary tubes, wherein the cylindrical inner and/or outer surface can act as a cylindrical lens, thus causing distortions in both the focusing of the light and/or the collection of the signal). The ability to use high numerical aperture objectives also maximizes the efficiency of light collection. Furthermore, a planar microfluidic device does not suffer from the same distance constraints observed when detecting or imaging using non-planar systems. Additionally, a planar microfluidic device does not have the materials constraints of other systems (e.g., a planar microfluidic device can comprise a coverslip having a specific thickness, refractive index, and optical properties), the effects of which are observed when detecting or imaging using non-planar systems. In certain embodiments, detection, imaging, or a combination thereof comprises epi-illumination, and employs a light collection system having a numerical aperture greater than 1.0. In some embodiments, detection or imaging employing the microfluidic device uses light collection systems with a numerical aperture equal to or greater than 0.8, equal to or greater than 0.9, equal to or greater than 1.0, equal to or greater than 1.1, equal to or greater than 1.2, equal to or greater than 1.3, or equal to or greater than 1.4. In some embodiments, detection or imaging employing the microfluidic device uses light collection systems with a numerical aperture equal to or greater than 0.8 and no greater than 1.5, equal to or greater than 0.9 and no greater than 1.5, equal to or greater than 1.0 and no greater than 1.5, equal to or greater than 1.1 and no greater than 1.5, equal to or greater than 1.2 and no greater than 1.5, equal to or greater than 1.3 and no greater than 1.5, or equal to or greater than 1.4 and no greater than 1.5. In preferred embodiments, the planar microfluidic device can be imaged using light collection systems with a numerical aperture equal to or greater than 1.2.

In some embodiments, the microfluidic chip is a planar device and comprises at least one microfluidic channel. In some embodiments, at least a portion of at least one microfluidic channel has a width of less than 500 µm, a width of less than 400 µm, a width of less than 300 µm, a width of less than 200 µm, a width of less than 100 µm, a width of less than 75 µm, a width of less than 50 µm, a width of less than 40 µm, a width of less than 30 µm, a width of less than 25 µm, a width of less than 20 µm, a width of less than 15 µm, a width of less than 10 µm, a width of less than 5 µm, a width of less than 2 µm, a width of less than 1 µm, a width of less than 900 nm, a width of less than 850 nm, a width of less than 800 nm, a width of less than 750 nm, a width of less than 700 nm, a width of less than 650 nm, a width of less than 600 nm, a width of less than 550 nm, or a width of less than 500 nm. In some embodiments, the at least one microfluidic channel has a maximum width of less than 500 µm, less than 400 µm, less than 300 µm, less than 200 µm, less than 100 µm, less than 75 µm, less than 50 µm, less than 40 µm, less than 30 µm, less than 25 µm, less than 20 µm, less than 15 µm, less than 10 µm, less than 5 µm, less than 2 µm, less than 1 µm, less than 900 nm, less than 850 nm, less than 800 nm, less than 750 nm, less than 700 nm, less than 650 nm, less than 600 nm, less than 550 nm, or less than 500 nm. In preferred embodiments, at least a portion of at least one microfluidic channel has a width of less than 10 µm, a width of less than 5 µm, or a width of less than 2 µm. In preferred embodiments, at least a portion of at least one microfluidic channel has a width of between 1 µm and 10 µm.

In some embodiments, at least a portion of at least one microfluidic channel has a height of less than 500 µm, a height of less than 400 µm, a height of less than 300 µm, a height of less than 200 µm, a height of less than 150 µm, a height of less than 125 µm, a height of less than 100 µm, a height of less than 75 µm, a height of less than 50 µm, a height of less than 40 µm, a height of less than 30 µm, a height of less than 25 µm, a height of less than 20 µm, a height of less than 15 µm, a height of less than 10 µm, a height of less than 5 µm, a height of less than 2 µm, or a height of less than 1 µm. In some embodiments, the at least one microfluidic channel has a maximum height of less than 500 µm, less than 400 µm, less than 300 µm, less than 200 µm, less than 150 µm, less than 125 µm, less than 100 µm, less than 75 µm, less than 50 µm, less than 40 µm, less than 30 µm, less than 25 µm, less than 20 µm, less than 15 µm, less than 10 µm, less than 5 µm, less than 2 µm, or less than 1 µm. In preferred embodiments, at least a portion of at least one microfluidic channel has a height of less than 10 µm, a height of less than 5 µm, or a height of less than 2 µm. In preferred embodiments, at least a portion of at least one microfluidic channel has a height of between 1 µm and 10 µm.

In some embodiments, the at least one microfluidic channel comprises a constriction. In some embodiments, the at least one microfluidic channel comprises a plurality of constrictions. In some embodiments, the microfluidic chip comprises a plurality of microfluidic channels, at least a portion of which comprise a constriction. In some embodiments, the microfluidic chip comprises a plurality of microfluidic channels, each of which comprises a constriction. A constriction is a portion of the microfluidic channel that is narrower (i.e., constricted) than other portions of the microfluidic channel. A fluid sample is capable of flowing through a constriction. In certain embodiments, the constriction comprises the narrowest region of the microfluidic channel.

In some embodiments, the constriction has a width smaller than the widest part (i.e., the maximum width) of the microfluidic channel. In certain embodiments, the constriction has a width relative to the widest part of the microfluidic channel. In some embodiments, the constriction has a width less than 50%, less than 45%, less than 40%, less than 35%, less than 30%, less than 25%, less than 20%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1% the maximum width of the microfluidic channel. As a non-limiting example, a microfluidic channel having a maximum width of 100 µm can have a constriction that is less than 25% the value of the maximum width (i.e., less than 25 µm). In preferred embodiments, the constriction has a width less than 10% the width of the maximum width of the microfluidic channel.

In some embodiments, the maximum width of the microfluidic channel has a value less than 900 µm and greater than 0.1 µm, less than 800 µm and greater than 0.5 µm, less than 700 µm and greater than 1 µm, less than 600 µm and greater than 5 µm, less than 500 µm and greater than 10 µm, less than 1,000 µm and greater than 10 µm, less than 900 µm and greater than 10 µm, less than 800 µm and greater than 10 µm, less than 700 µm and greater than 10 µm, less than 600 µm and greater than 10 µm, less than 500 µm and greater than 10 µm, less than 400 µm and greater than 10 µm, less than 300 µm and greater than 10 µm, less than 500 µm and greater than 0.1 µm, less than 500 µm and greater than 1 µm, less than 500 µm and greater than 2 µm, less than 500 µm and greater than 5 µm, less than 800 µm and greater than 0.1 µm, less than 700 µm and greater than 0.1, less than 600 µm and greater than 0.1, less than 500 µm and greater than 0.1, less than 400 µm and greater than 0.1, or less than 300 µm and greater than 0.1. In preferred embodiments, the maximum width of the microfluidic channel has a value less than 500 µm and greater than 10 µm.

In some embodiments, the constriction has a width smaller than the average width of the microfluidic channel. In certain embodiments, the constriction has a width relative to the average width of the microfluidic channel. In some embodiments, the constriction has a width less than 50%, less than 45%, less than 40%, less than 35%, less than 30%, less than 25%, less than 20%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1% the average width of the microfluidic channel.

In some embodiments, the average width of the microfluidic channel has a value less than 900 µm and greater than 0.1 µm, less than 800 µm and greater than 0.5 µm, less than 700 µm and greater than 1 µm, less than 600 µm and greater than 5 µm, less than 500 µm and greater than 10 µm, less than 1,000 µm and greater than 10 µm, less than 900 µm and greater than 10 µm, less than 800 µm and greater than 10 µm, less than 700 µm and greater than 10 µm, less than 600 µm and greater than 10 µm, less than 500 µm and greater than 10 µm, less than 400 µm and greater than 10 µm, less than 300 µm and greater than 10 µm, less than 500 µm and greater than 0.1 µm, less than 500 µm and greater than 1 µm, less than 500 µm and greater than 2 µm, less than 500 µm and greater than 5 µm, less than 800 µm and greater than 0.1, less than 700 µm and greater than 0.1, less than 600 µm and greater than 0.1, less than 500 µm and greater than 0.1, less than 400 µm and greater than 0.1, or less than 300 µm and greater than 0.1. In preferred embodiments, the average width of the microfluidic channel has a value less than 500 µm and greater than 10 µm.

In some embodiments, the constriction has a height smaller than greatest height value (i.e., the maximum height) of the microfluidic channel. In certain embodiments, the constriction has a height relative to the maximum height of the microfluidic channel. In some embodiments, the constriction has a height less than 50%, less than 45%, less than 40%, less than 35%, less than 30%, less than 25%, less than 20%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1% of the maximum height of the microfluidic channel. As a non-limiting example, a microfluidic channel having a maximum height of 20 µm can have a constriction that is less than 10% the value of the maximum height (i.e., less than 2 µm). In preferred embodiments, the constriction has a height less than 25% the maximum height of the microfluidic channel.

In some embodiments, the maximum height of the microfluidic channel has a value less than 900 µm and greater than 0.1 µm, less than 800 µm and greater than 0.5 µm, less than 700 µm and greater than 1 µm, less than 600 µm and greater than 5 µm, less than 500 µm and greater than 10 µm, less than 1,000 µm and greater than 10 µm, less than 900 µm and greater than 10 µm, less than 800 µm and greater than 10 µm, less than 700 µm and greater than 10 µm, less than 600 µm and greater than 10 µm, less than 500 µm and greater than 10 µm, less than 400 µm and greater than 10 µm, less than 300 µm and greater than 10 µm, less than 500 µm and greater than 0.1 µm, less than 500 µm and greater than 1 µm, less than 500 µm and greater than 2 µm, less than 500 µm and greater than 5 µm, less than 800 µm and greater than 0.1, less than 700 µm and greater than 0.1, less than 600 µm and greater than 0.1, less than 500 µm and greater than 0.1, less than 400 µm and greater than 0.1, or less than 300 µm and greater than 0.1. In preferred embodiments, the maximum height of the microfluidic channel has a value less than 500 µm and greater than 10 µm.

In some embodiments, the constriction has a height smaller than the average height of the microfluidic channel. In certain embodiments, the constriction has a height relative to the average height of the microfluidic channel. In some embodiments, the constriction has a height less than 50%, less than 45%, less than 40%, less than 35%, less than 30%, less than 25%, less than 20%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1% of the average height of the microfluidic channel.

In some embodiments, the average height of the microfluidic channel has a value less than 900 µm and greater than 0.1 µm, less than 800 µm and greater than 0.5 µm, less than 700 µm and greater than 1 µm, less than 600 µm and greater than 5 µm, less than 500 µm and greater than 10 µm, less than 1,000 µm and greater than 10 µm, less than 900 µm and greater than 10 µm, less than 800 µm and greater than 10 µm, less than 700 µm and greater than 10 µm, less than 600 µm and greater than 10 µm, less than 500 µm and greater than 10 µm, less than 400 µm and greater than 10 µm, less than 300 µm and greater than 10 µm, less than 500 µm and greater than 0.1 µm, less than 500 µm and greater than 1 µm, less than 500 µm and greater than 2 µm, less than 500 µm and greater than 5 µm, less than 800 µm and greater than 0.1, less than 700 µm and greater than 0.1, less than 600 µm and greater than 0.1, less than 500 µm and greater than 0.1, less than 400 µm and greater than 0.1, or less than 300 µm and greater than 0.1. In preferred embodiments, the average height of the microfluidic channel has a value less than 500 µm and greater than 10 µm.

In some embodiments, the constriction has a cross sectional area less than the greatest cross sectional area (i.e., the maximum cross sectional area) of the microfluidic channel. In certain embodiments, the constriction has a cross sectional area relative to the maximum cross sectional area of the microfluidic channel. In some embodiments, the constriction has a cross sectional area less than 50%, less than 45%, less than 40%, less than 35%, less than 30%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, less than 1%, less than 0.5%, less than 0.2%, less than 0.1%, less than 0.05%, less than 0.02%, less than 0.01%, less than 0.005%, less than 0.002%, or less than 0.001% of the maximum cross sectional area of the microfluidic channel. As a non-limiting example, a microfluidic channel having a maximum cross sectional area of 200 µm$^2$ can have a constriction that is less than 10% the value of the maximum cross sectional area (i.e., less than 20 µm$^2$). In preferred embodiments, the constriction has a cross sectional area between 10% and 0.01% the maximum cross sectional area of the microfluidic channel.

In some embodiments, maximum cross sectional area of the microfluidic channel has a value less than 1,000,000 µm$^2$ and greater than 10 µm$^2$, less than 750,000 µm$^2$ and greater than 25 µm$^2$, less than 500,000 µm$^2$ and greater than 100 µm$^2$, less than 250,000 µm$^2$ and greater than 250 µm$^2$, less than 900,000 µm$^2$ and greater than 100 µm$^2$, less than 800,000 µm$^2$ and greater than 100 µm$^2$, less than 700,000 µm$^2$ and greater than 100 µm$^2$, less than 600,000 µm$^2$ and greater than 100 µm$^2$, less than 400,000 µm$^2$ and greater than 100 µm$^2$, less than 300,000 µm$^2$ and greater than 100 µm$^2$, less than 200,000 µm$^2$ and greater than 100 µm$^2$, less than 100,000 µm$^2$ and greater than 100 µm$^2$, less than 50,000 µm$^2$ and greater than 100 µm$^2$, less than 25,000 µm$^2$ and greater than 100 µm$^2$, less than 10,000 µm$^2$ and greater than 100 µm$^2$, less than 1,000 µm$^2$ and greater than 100 µm$^2$, less than 2,000,000 µm$^2$ and greater than 250 µm$^2$, less than 1,000,000 µm$^2$ and greater than 250 µm$^2$, less than 900,000 µm$^2$ and greater than 250 µm$^2$, less than 800,000 µm$^2$ and greater than 250 µm$^2$, less than 700,000 µm$^2$ and greater than 250 µm$^2$, less than 600,000 µm$^2$ and greater than 250 µm$^2$, less than 400,000 µm$^2$ and greater than 250 µm$^2$, less than 300,000 µm$^2$ and greater than 250 µm$^2$, less than 200,000 µm$^2$ and greater than 250 µm$^2$, less than 100,000 µm$^2$ and greater than 250 µm$^2$, less than 50,000 µm$^2$ and greater than 250 µm$^2$, less than 25,000 µm$^2$ and greater than 250 µm$^2$, less than 10,000 µm$^2$ and greater than 250 µm$^2$, or less than 1,000 µm$^2$ and greater than 250 µm$^2$. In preferred embodiments, the maximum cross sectional area of the microfluidic channel has a value less than 250,000 µm$^2$ and greater than 250 µm$^2$.

In some embodiments, the constriction has a cross sectional area less than the average cross sectional area of the microfluidic channel. In certain embodiments, the constriction has a cross sectional area relative to the average cross sectional area of the microfluidic channel. In some embodiments, the constriction has a cross sectional area less than 50%, less than 45%, less than 40%, less than 35%, less than 30%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, less than 1%, less than 0.5%, less than 0.2%, less than 0.1%, less than 0.05%, less than 0.02%, less than 0.01%, less than 0.005%, less than 0.002%, or less than 0.001% of the average cross sectional area of the microfluidic channel.

In some embodiments, average cross sectional area of the microfluidic channel has a value less than 1,000,000 µm$^2$ and greater than 10 µm$^2$, less than 750,000 µm$^2$ and greater than 25 µm$^2$, less than 500,000 µm$^2$ and greater than 100 µm$^2$, less than 250,000 µm$^2$ and greater than 250 µm$^2$, less than 900,000 µm$^2$ and greater than 100 µm$^2$, less than 800,000 µm$^2$ and greater than 100 µm$^2$, less than 700,000 µm$^2$ and greater than 100 µm$^2$, less than 600,000 µm$^2$ and greater than 100 µm$^2$, less than 400,000 µm$^2$ and greater than 100 µm$^2$, less than 300,000 µm$^2$ and greater than 100 µm$^2$, less than 200,000 µm$^2$ and greater than 100 µm$^2$, less than 100,000 µm$^2$ and greater than 100 µm$^2$, less than 50,000 µm$^2$ and greater than 100 µm$^2$, less than 25,000 µm$^2$ and greater than 100 µm$^2$, less than 10,000 µm$^2$ and greater than 100 µm$^2$, less than 1,000 µm$^2$ and greater than 100 µm$^2$, less than 2,000,000 µm$^2$ and greater than 250 µm$^2$, less than 1,000,000 µm$^2$ and greater than 250 µm$^2$, less than 900,000 µm$^2$ and greater than 250 µm$^2$, less than 800,000 µm$^2$ and greater than 250 µm$^2$, less than 700,000 µm$^2$ and greater than 250 µm$^2$, less than 600,000 µm$^2$ and greater than 250 µm$^2$, less than 400,000 µm$^2$ and greater than 250 µm$^2$, less than 300,000

μm² and greater than 250 μm², less than 200,000 μm² and greater than 250 μm², less than 100,000 μm² and greater than 250 μm², less than 50,000 μm² and greater than 250 μm², less than 25,000 μm² and greater than 250 μm², less than 10,000 μm² and greater than 250 μm², or less than 1,000 μm² and greater than 250 μm². In preferred embodiments, the average cross sectional area of the microfluidic channel has a value less than 250,000 μm² and greater than 250 μm².

In some embodiments, the constriction has a height of less than 10 μm, a height of less than 9 μm, a height of less than 8 μm, a height of less than 7 μm, a height of less than 6 μm, a height of less than 5 μm, a height of less than 4 μm, a height of less than 3 μm, a height of less than 2 μm, or a height of less than 1 μm. In some embodiments, the constriction has a width of less than 10 μm, a width of less than 9 μm, a width of less than 8 μm, a width of less than 7 μm, a width of less than 6 μm, a width of less than 5 μm, a width of less than 4 μm, a width of less than 3 μm, a width of less than 2 μm, or a width of less than 1 μm.

In some embodiments, the at least one microfluidic channel comprises one, two, three, four, five, six, seven, eight, nine, ten, or more than ten constrictions. In some embodiments, the microfluidic chip comprises a plurality of microfluidic channels, at least a portion of which each comprise one, two, three, four, five, six, seven, eight, nine, ten, or more than ten constrictions. In some embodiments, the microfluidic chip comprises a plurality of microfluidic channels, the majority of which each comprise one, two, three, four, five, six, seven, eight, nine, ten, or more than ten constrictions. In some embodiments, the microfluidic chip comprises a plurality of microfluidic channels, each of which comprises one, two, three, four, five, six, seven, eight, nine, ten, or more than ten constrictions. In some embodiments, a microfluidic channel comprising at least one constriction can avoid the buildup of back-pressure as the sample flows through the microfluidic channel, compared to another microfluidic channel having the dimensions of the constriction.

In some embodiments, at least a portion of at least one microfluidic channel has a cross sectional area of less than 10,000 μm², a cross sectional area of less than 5,000 μm², a cross sectional area of less than 3,000 μm², a cross sectional area of less than 1,000 μm², a cross sectional area of less than 800 μm², a cross sectional area of less than 600 μm², a cross sectional area of less than 400 μm², a cross sectional area of less than 200 μm², or a cross sectional area of less than 100 μm². In preferred embodiments, at least a portion of at least one microfluidic channel has a cross sectional area of less than 100 μm², a cross sectional area of less than 90 μm², a cross sectional area of less than 80 μm², a cross sectional area of less than 70 μm², a cross sectional area of less than 60 μm², a cross sectional area of less than 50 μm², a cross sectional area of less than 40 μm², a cross sectional area of less than 30 μm², a cross sectional area of less than 20 μm², a cross sectional area of less than 10 μm², a cross sectional area of less than 5 μm², a cross sectional area of less than 2 μm², or a cross sectional area of less than 1 μm². In some embodiments, the at least one microfluidic channel has a maximum cross sectional area of less than 250,000 μm², less than 100,000 μm², less than 50,000 μm², less than 25,000 μm², less than 10,000 μm², less than 5,000 μm², less than 3,000 μm², less than 1,000 μm², less than 800 μm², less than 600 μm², less than 400 μm², less than 200 μm², or less than 100 μm². In some embodiments, the at least one microfluidic channel has a maximum cross sectional area of less than 100 μm², less than 90 μm², less than 80 μm², less than 70 μm², less than 60 μm², less than 50 μm², less than 40 μm², less than 30 μm², less than 20 μm², less than 10 μm², less than 5 μm², less than 2 μm², or less than 1 μm². In preferred embodiments, at least a portion of at least one microfluidic channel has a cross sectional area of between 1 μm² and 100 μm². In some embodiments, the at least one microfluidic channel has a maximum cross sectional area of between 100 μm² and 10,000 μm².

In certain embodiments, at least a portion of at least one microfluidic channel comprises a discontinuous change in at least one of its width or height (e.g., achieved using techniques of microfabrication). The microfluidic chip used herein can comprise a microfluidic channel with a step gradient or a step change of at least one of its height or width, which is in contrast to a microfluidic channel comprising a continuous change in height or width. Channels comprising a continuous change in height or width is common in devices comprising, e.g., glass tubes, which can be achieved by pulling a heated tube. In specific embodiments, at least a portion of at least one microfluidic channel has a height and a width that are changed independently from one another. The independent change of height and width is in contrast to, for example, glass tubes, wherein fabrication of a decreased height is accompanied by a corresponding decrease of width (e.g., the drawing and thinning of a glass tube that has been heated close to its melting temperature).

In certain embodiments, the apparatuses provided herein may comprise a flow channel or chamber that has been pre-treated with a chemical or biological molecule. For example, a channel or chamber may be treated with an anticoagulant compound to prevent or reduce the association of a biological nanoparticle in the fluid sample, or a compound that prevents or reduces the agglomeration or aggregation of bionanoparticles in the fluid sample.

In particular embodiments, the microfluidic chip comprises translucent or transparent characteristics. For example, a microfluidic chip that comprises at least one surface that is translucent or transparent may be provided a fluidic sample comprising a biological nanoparticle, and the at least one translucent or transparent surface allows the source of interrogating to interact with the biological nanoparticle, such that the biological nanoparticle emits a light intensity that passes through the at least one surface that is translucent or transparent, such that it is detected.

Apparatuses

In one aspect, the present disclosure provides a device for detecting and measuring a biological nanoparticle in a fluid sample. In one embodiment, the device comprises: (a) at least a first input channel; (b) at least two exit channels; (c) at least one detector capable of detecting one or more biological nanoparticles in a fluid sample; (d) a mechanism for directing the flow of a biological nanoparticle; and (e) a ranking device capable of assigning a value to the biological nanoparticle based on the presence, absence, identity, composition, size value, or light emission of the biological nanoparticle, or based on the presence, absence, identity, composition, light emission, or quantity of detectable agents associated with the biological nanoparticle, wherein the computer is in communication with the detector and the mechanism for directing the flow of the biological nanoparticle. In preferred embodiments, the at least first input channel and at least two exit channels are in a microfluidic chip. In preferred embodiments, the biological nanoparticle does not stop during its transit through the microfluidic chip, and the detecting and/or assigning of a value occurs while the biological nanoparticle is in transit through the microfluidic chip.

In another aspect, the present disclosure provides a device for detecting biological nanoparticles in a fluid sample, said device comprising: (a) one or more detectors for detecting the presence or absence of biological nanoparticles; (b) a computer with software for ranking biological nanoparticles based on an emitted detectable light intensity; and (c) a microfluidic chip. In one embodiment, the ranking is binary. In other embodiments, the ranking is non-binary. Non-binary ranking may be used, for example, when the device is used to detect multiple types or sizes of bionanoparticles.

In another aspect, the present disclosure provides a device for determining the size of a biological nanoparticle in a fluid sample, the device comprising: (a) a microfluidic chip; (b) at least one detector configured to detect the presence or absence of biological nanoparticles; and (c) a computer with software for (i) ranking biological nanoparticles based on the presence or absence of an emitted detectable light intensity; and (ii) measuring a size value of biological nanoparticles based on the light intensity emitted by the biological nanoparticles, wherein the detecting, ranking, and measuring occur while the biological nanoparticle is in flow through the microfluidic chip.

In certain embodiments of the devices and apparatuses provided herein, the device comprises one or more detectors that are selected from a camera, an electron multiplier, a charge-coupled device (CCD) image sensor, a photomultiplier tube (PMT), a microchannel plate PMT (MCP), a hybrid PMT detector, an avalanche photodiode (APD), a single-photon avalanche diode (SPAD), or a complementary metal oxide semiconductor (CMOS) image sensor. In some embodiments, the detector detects fluorescent light. In certain embodiments, the detector detects luminescent light. In some embodiments, the detector detects a plurality of different emission profiles. In some embodiments, the detector detects scattered light.

In certain embodiments, the detector has single-nanoparticle sensitivity. In preferred embodiments, the detector has single-molecule sensitivity.

In certain embodiments of the devices and apparatuses provided herein, the device may further comprise one or more sources for interrogating one or more biological nanoparticle from the fluid sample. A source for interrogating a biological nanoparticle may be, for example, a source of electromagnetic radiation. In particular embodiments, the one or more sources for interrogating are selected from a laser (solid state, diode-pumped, ion, or dye), a light-emitting diode (LED), a lamp, an arc discharge, a magnetic pulse, or a natural light. In yet other embodiments, a source for interrogation of the biological nanoparticle is not required when the biological nanoparticle exhibits light emission such as chemiluminescence or bioluminescence.

In particular embodiments, the source for interrogating is modified by stimulated emission depletion (STED).

In certain embodiments, the source for interrogating causes the biological nanoparticle to emit a light intensity. In preferred embodiments, the light intensity is detectable and is associated with a size value. In certain embodiments, wherein the biological nanoparticle intrinsically exhibits luminescence, or wherein the biological nanoparticle is associated with a detectable agent that exhibits luminescence, the apparatus may not require a source for interrogating the biological nanoparticle. A light intensity signal can have a signal to noise ratio, wherein a signal peak is observable over the background noise of the light intensity output. A high signal-to-noise ratio can provide increased accuracy and improved detection and measurement. In some embodiments, the light intensity has a signal-to-noise ratio of greater than 3:1, greater than 4:1, greater than 5:1, greater than 6:1, greater than 7:1, greater than 8:1, greater than 9:1, greater than 10:1, greater than 11:1, greater than 12:1, greater than 13:1, greater than 14:1, greater than 15:1, greater than 16:1, greater than 17:1, greater than 18:1, greater than 19:1, greater than 20:1, greater than 30:1, greater than 40:1, greater than 50:1, greater than 60:1, greater than 70:1, greater than 80:1, greater than 90:1, greater than 100:1, greater than 125:1, greater than 150:1, greater than 175:1, greater than 200:1, greater than 250:1, greater than 500:1, or greater than 1000:1. In preferred embodiments, the light intensity has a signal-to-noise ratio of greater than 10:1.

In certain embodiments, the biological nanoparticles transit through a microfluidic chip at a high rate. In specific embodiments, the detecting, ranking, and measuring of biological nanoparticles occurs with a rate of more than 1 million particles per hour, more than 2 million particles per hour, more than 3 million particles per hour, more than 4 million particles per hour, more than 5 million particles per hour, more than 6 million particles per hour, more than 7 million particles per hour, more than 8 million particles per hour, more than 9 million particles per hour, more than 10 million particles per hour, more than 15 million particles per hour, more than 20 million particles per hour, more than 25 million particles per hour, more than 30 million particles per hour, more than 35 million particles per hour, more than 40 million particles per hour, more than 45 million particles per hour, or more than 50 million particles per hour. In preferred embodiments, the rate is more than 5 million nanoparticles per hour.

In certain embodiments, the apparatus provided herein may comprise a flow channel enclosed by walls and/or microfabricated on a substrate, with design features to minimize inadvertent damage to bionanoparticles. The flow channel may further comprise channels with hydrodynamically designed features or filtration structures to exclude undesired matter or debris with minimal stress or damage as described in US Patent Application Nos. 2007/0037172 and 2008/0248499. Such channels, referred to in the aforementioned patent applications as channels with one-dimensional ("1-D") apertures, reduce the hydrodynamic pressure experienced by the bionanoparticles during the exclusion process and therefore reduce the likelihood of lysis. Channels with 1-D apertures may be strategically arranged in an array according to "effusive filtration" configuration as described in US Patent No. 2008/0318324 to further re-direct, partition, dampen, or disperse the flow, consequently reducing the force of impact experienced by the nanoparticles at the moment of exclusion. The walls that enclose the flow channel may be fabricated using a UV-curing process in accordance with the procedures described in PCTPCT/US2009/02426, from a biocompatible substrate material that is a medical-device grade polymer, so that the apparatus would be in compliance with regulations governing medical device manufacturing.

In certain embodiments, the mechanism for directing the flow of the biological nanoparticle comprises an electrode, a magnetic element, an acoustic element, an electro-actuated element, an electric field, or a magnetic field. In some embodiments, the mechanism for directing the flow of the bionanoparticle comprises one or more electro-actuated valves or pistons, wherein the valves or pistons control the flow of a liquid in at least a first directional flow channel that intersects with the first input channel and the two exit channels at a first junction. In one embodiment, solenoid pistons are subcomponents of electro-actuated solenoid valves. In another embodiment, solenoid pistons are embedded in device by molding. In yet another embodiment, the embedded solenoid pistons may be replaced by solenoid valves in fluidic communication via tubings. In one particular embodiment, an apparatus provided herein may comprise one or more electrodes for tracking and/or manipulating the trajectory or flow of a particle, biological nanoparticle, or fluid sample. In certain embodiments, the electrode may enhance the separation of a nanoparticle based on phenomena such dielectrophoresis or electrowetting. In embodiments wherein the biological nanoparticle has a hydrodynamic diameter of less than 100 nm, acoustical elements and/or sheath flow focusing are not sufficient to adequately manipulate the trajectory of a biological nanoparticle for the methods and apparatus disclosed herein. See, e.g.: *Optics Express* Vol. 15, Issue 10, pp. 6167-6176 (2007), which is incorporated herein by reference. Accordingly, in some embodiments, the mechanism for directing the flow of the biological nanoparticle excludes sheath flow focusing, acoustic flow focusing, or a combination thereof. In some embodiments, the biological nanoparticle is directed, with the proviso that said directing does not use acoustic focusing, sheath flow focusing, or a combination thereof.

In some embodiments, the apparatuses provided herein may further comprise a magnetic element for the separation of a bionanoparticle having intrinsic magnetism, and/or a bionanoparticle associated with a magnetic particle. In certain embodiments, the magnetic particle may enhance the separation of a bionanoparticle based on the magnetic susceptibility of the nanoparticle or the micro-magnetic or nano-magnetic particles associated with a biological nanoparticle. In certain embodiments, an apparatus provided herein may comprises the use of fluidic pressure changes, flow-rate changes, or electroosmotic flow changes to manipulate the trajectory of select particles or cells.

In some embodiments, the mechanism for directing flow of a biological nanoparticle can alter the trajectory or otherwise direct flow of a biological nanoparticle in less than 10 ms, 5 ms, 1 ms, 500 μs, less than 250 μs, less than 200 μs, less than 150 μs, less than 100 μs, less than 50 μs, less than 40 μs, less than 30 μs, less than 20 μs, less than 10 μs, or less than 5 μs. In preferred embodiments, the mechanism for directing flow of a biological nanoparticle can direct flow in no more than 1 ms.

In certain embodiments, the mechanism for directing flow uses flow displacement. In some embodiments, the mechanism for directing flow uses electroosmotic flow. In some embodiments, the mechanism for directing flow uses the application of pressure.

In some embodiments, the mechanism for directing flow can sort biological nanoparticles into one of a plurality of microfluidic channels in a microfluidic chip. In certain embodiments, the directing of flow to one of a plurality of microfluidic channels generates an enriched population of biological nanoparticles.

In certain embodiments, a ranking device may be selected from a computer, a controller, a chip with integrated circuits, a circuit board, an electronic element, software, an algorithm, or a combination thereof. In some embodiments, a measuring device may be selected from a computer, a controller, a chip with integrated circuits, a circuit board, an electronic element, software, an algorithm, or a combination thereof. In certain embodiments, the ranking device and/or the measuring device integrate an assigning device.

In some embodiments, the ranking corresponds with the measuring of the size value. In certain embodiments, the size value is a relative size value. In other embodiments, the size value is a true size value. In particular embodiments, the size value is measured by a difference in the detected light intensity. In some embodiments, the size value is measured based on a detected modulation index. In certain embodiments, the size value is measured based on the detected light intensity and the detected modulation index. The modulation index can comprise an amplitude modulation index, a frequency modulation index, a phase modulation index, or a combination thereof.

In certain embodiments, the apparatuses provided herein may further comprise additional elements useful for performing assays, processes, or tests in a fashion that is coupled to the methods provided herein. In one embodiment, an apparatus provided herein may further comprise one or more resistive heating elements to perform on-chip cellular assays such as Polymerase Chain Reaction (PCR) or Real-Time Polymerase Chain Reaction (RT-PCR). In certain embodiments, an apparatus provided herein may further comprises one or more electrodes, for example, to conduct on-chip chemical assay such as electrophoresis or eletrochromatography.

In some embodiments, an apparatus provided herein may further comprise a filter. In a particular embodiment, the filter element may be in the form of microposts, microimpactors, microsieves, channels with apertures larger than bionanoparticles, channels with apertures such that a bionanoparticle may freely pass through the filter, but larger matter or debris in the fluid sample is blocked by the filter, microbeads, porous membranes, protrusions from the walls, adhesive coating, woven or non-woven fibers (such as cloth or mesh) of wool, metal (e.g. stainless steel or Monel), glass, paper, or synthetic (e.g. nylon, polypropylene, polycarbonate, parylene, and polyester), sintered stainless steel or other metals, or porous inorganic materials such as alumina, silica, or carbon.

In some embodiments, the filter is placed such that the filtering occurs prior to introduction of the fluid sample to the microfluidic chip. In other embodiments, the filter is placed such that the filtering occurs prior to detection or sorting. In preferred embodiments, the filtering occurs prior to the assigning of a size value. In certain embodiments, the method as disclosed herein further comprises filtering the fluid sample. In particular embodiments, the filtering occurs prior to the assigning of a size value. In some embodiments, the filtering removes debris. In certain embodiments, the filtering prevents clogging.

Figure 16:
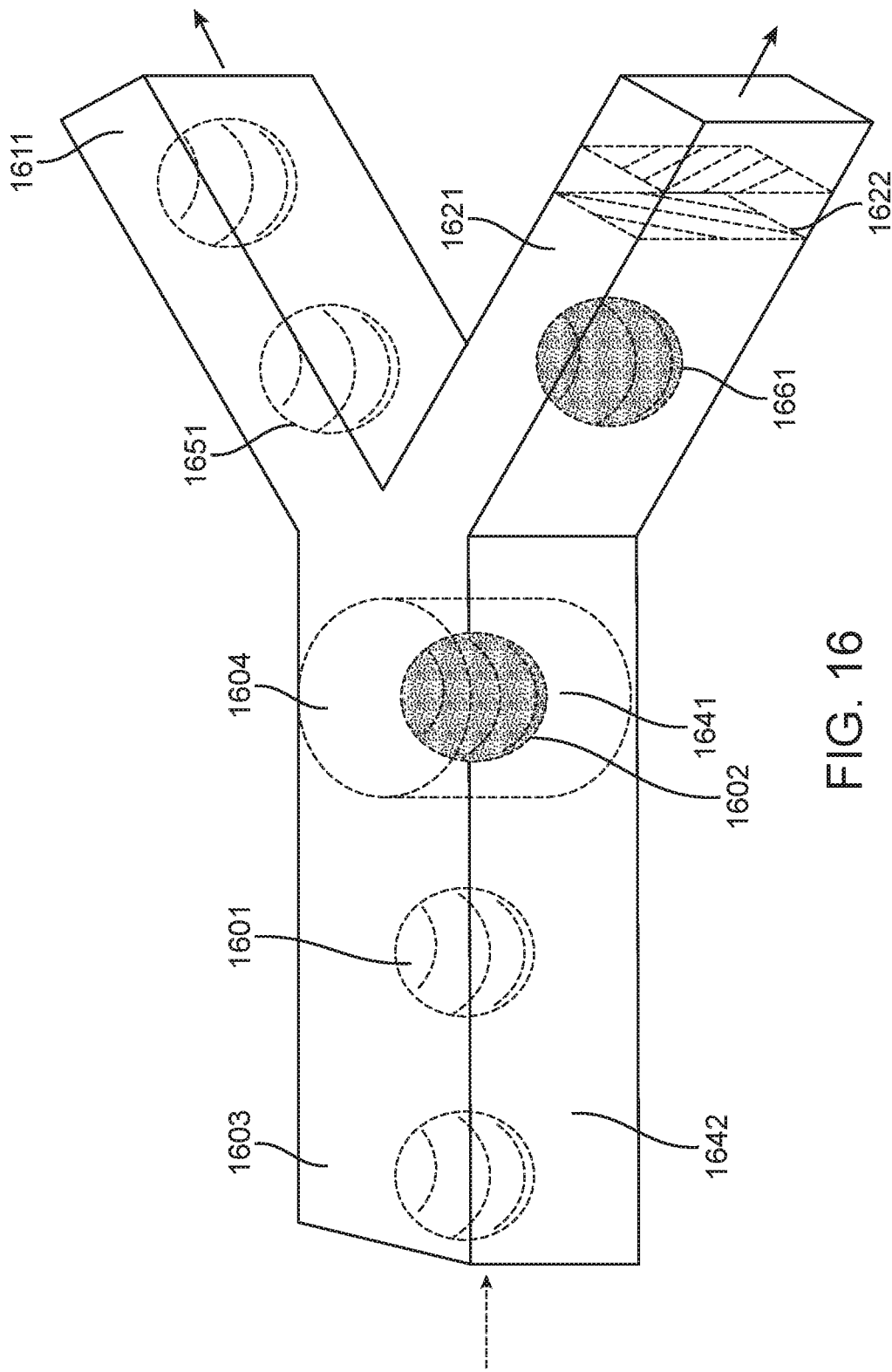
FIG. 16 depicts a microfluidic chip that can sort biological nanoparticles.

In yet another embodiment, an apparatus provided herein may be coupled to a conventional flow cytometer. For example, FIG. 16 illustrates an outlet channel (1621) that may be in fluidic communication to a conventional flow cytometer (with or without a detection region 1622) such that sorted bionanoparticle (1661) containing detectable agent (1602) is further examined or sorted serially (one bionanoparticle by one bionanoparticle).

In some aspects of the present disclosure, the system also includes an imaging device, such as a microscope (e.g., a confocal microscope, spinning disk microscope, multi-photon microscope, planar illumination microscope, Bessel beam microscope, differential interference contrast microscope, phase contrast microscope, epifluorescent microscope, transmission electron microscope, or a combination thereof). Optionally, the source of interrogating is a component of the imaging device, e.g., provides illumination for imaging. In certain aspects, the imaging device is used to obtain image data of the biological nanoparticles, e.g., when in transit through a microfluidic chip. Optionally, the image data is used as a basis for assigning a true size value. In some aspects, this process occurs manually, e.g., a user views the image data and input instructions to assign a true size value to biological nanoparticles that may have previously been assigned a relative size value. In other aspects, this process occurs automatically, e.g., one or more processors analyze the image data, such as by using computer vision or image analysis algorithms, and assign a size value to the biological nanoparticles without requiring user input. In alternative aspects, the assigning is semi-automated, e.g., involving some user input and some automatic processing.

In some aspects, the systems described herein include a computer comprising one or more processors and a memory device with executable instructions stored thereon. In some aspects, the computer is used to perform the methods described herein. In various aspects, a computer can be used to implement any of the systems or methods illustrated and described above. In some aspect, a computer includes a processor that communicates with a number of peripheral subsystems via a bus subsystem. These peripheral subsystems can include a storage subsystem, comprising a memory subsystem and a file storage subsystem, user interface input devices, user interface output devices, and a network interface subsystem.

In some aspects, a bus subsystem provides a mechanism for enabling the various components and subsystems of the computer to communicate with each other as intended. The bus subsystem can include a single bus or multiple busses.

In some aspects, a network interface subsystem provides an interface to other computers and networks. The network interface subsystem can serve as an interface for receiving data from and transmitting data to other systems from a computer. For example, a network interface subsystem can enable a computer to connect to the Internet and facilitate communications using the Internet.

In some aspect, the computer includes user interface input devices such as a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to a computer.

In some aspects, the computer includes a storage subsystem that provides a computer-readable storage medium for storing the basic programming and data constructs. In some aspects, the storage subsystem stores software (programs, code modules, instructions) that when executed by a processor provides the functionality of the methods and systems described herein. These software modules or instructions can be executed by one or more processors. A storage subsystem can also provide a repository for storing data used in accordance with the present disclosure. The storage subsystem can include a memory subsystem and a file/disk storage subsystem.

The software can be used for ranking biological nanoparticles based on the presence or absence of an emitted detectable light intensity, and measuring a size value of biological nanoparticles based on the light intensity emitted by the biological nanoparticles.

In some embodiments, the software can be used for quantifying the number of biological nanoparticles having a particular size value. In certain embodiments, the software can be used for determining the concentration of a fluid sample. In particular embodiments, the software can be used for determining the concentration of particular biological nanoparticles in a fluid sample.

In some embodiments, the software can be used for determining at least one copy number of a biomarker associated with the biological nanoparticle.

In certain embodiments, the software can be used for sorting the biological nanoparticles. In specific embodiments, the sorting depends on the size value. In particular embodiments, the sorting depends on the ranking.

In some aspects, the computer includes a memory subsystem that can include a number of memories including a main random access memory (RAM) for storage of instructions and data during program execution and a read only memory (ROM) in which fixed instructions are stored. A file storage subsystem provides a non-transitory persistent (non-volatile) storage for program and data files, and can include a hard disk drive, a solid-state drive along with associated removable media, a Compact Disk Read Only Memory (CD-ROM) drive, an optical drive, removable media cartridges, and other like storage media.

The computer can be of various types including a personal computer, a portable computer, a tablet, a smart phone, a workstation, a network computer, a mainframe, a kiosk, a server or any other data processing system, such as field-programmable gate array (FPGA). Due to the ever-changing nature of computers and networks, the description of computer contained herein is intended only as a specific example for purposes of illustrating the aspect of the computer. Many other configurations having more or fewer components than the system described herein are possible.

Detection of Biological Nanoparticles

In some aspects, the current disclosure provides for a method of detecting the size of a biological nanoparticle in a fluid sample, the method comprising the steps of: (a) providing a microfluidic chip; (b) introducing the fluid sample into the microfluidic chip, the fluid sample comprising at least one biological nanoparticle; (c) measuring a light intensity from the biological nanoparticle; and (d) assigning a size value to the biological nanoparticle while in transit through the microfluidic chip, wherein the biological nanoparticle has a hydrodynamic diameter of less than 1 µm. In certain aspects, the microfluidic chip comprises a plurality of microfluidic channels. In specific embodiments, the microfluidic chip comprises a mechanism for directing flow, and is used to enrich and isolate biological nanoparticles. In some embodiments, the fluid sample comprises a plurality of biological nanoparticles. In certain embodiments, a portion of the plurality of biological nanoparticles is introduced into the microfluidic chip. In some embodiments, a portion of the plurality of biological nanoparticles are flowed through a microfluidic channel.

In certain aspects, the methods of this disclosure further provide controlling flow direction. In some embodiments, the directional flow is controlled in response to the ranking of a biological nanoparticle. In certain embodiments, the flow direction is controlled in response to the detection of the light intensity emitted by a bioparticle. In specific embodiments, the flow or collection of nanoparticles is directed based on a size value assigned to a biological nanoparticle. In another specific embodiment, the flow or collection of nanoparticles is directed based on the detection of a marker associated with a biological nanoparticle. In yet another specific embodiment, the flow or collection of nanoparticles is directed based on both a size value assigned to a biological nanoparticle and the detection of a marker associated with the biological nanoparticle. In certain embodiments, the method may comprise concentrating the bioparticles by collecting nanoparticles with similar rankings. In specific embodiments, the method may comprise using a mechanism for directing flow to control flow direction.

In one aspect, the present disclosure provides a method for detecting a biological nanoparticle in a fluid sample, the method comprising the steps of: (a) measuring a light intensity emitted from the biological nanoparticle; and (b) assigning a size value to the biological nanoparticle while in transit, the size value being based on the emitted light intensity that is detected. In certain embodiments, the biological nanoparticle has a hydrodynamic diameter of less than 1 µm. In specific embodiments, the measuring occurs while the biological nanoparticle is located within a microfluidic chip. Optionally, the assigning occurs while the biological nanoparticle is located within the microfluidic chip. Preferably, the measuring and/or assigning occurs while the biological nanoparticle is in flow through the microfluidic chip.

In some embodiments, the biological nanoparticle is associated with a detectable agent. In certain embodiments, the detectable agent is a luminescent dye, a fluorescent dye, a fluorescently labeled antibody, a fluorescently labeled protein, a fluorescently labeled nucleic acid, a fluorescently labeled lipid, a fluorescently labeled carbohydrate, a fluorescently labeled small molecule, a membrane dye, a fluorogenic dye, a dye, a polymer dot, a fluorogenic substrate of an enzyme, or a combination thereof. In some embodiments, the detectable agent is fluorescent. In other embodiments, the detectable agent is luminescent. As used herein, "associated" includes interaction via covalent and/or non-covalent interactions. For example, the detectable agent can be covalently attached to the biological nanoparticle. Alternatively, the detectable agent can, for example, be embedded in the membrane of a biological nanoparticle. In particular embodiments, the detectable agent can be embedded in the membrane of a biological nanoparticle via non-covalent interactions, such as van der Waals forces or electrostatic forces.

In specific embodiments, a detectable agent is associated with the surface of the biological nanoparticle. In some embodiments, a detectable agent can be covalently and/or non-covalently attached to the surface of the biological nanoparticle. In other embodiments, a detectable agent can be embedded within the surface of the biological nanoparticle. In specific embodiments, a detectable agent is surrounded by the surface of the biological nanoparticle, e.g., a membrane dye embedded into the lipid layer of an exosome. The relation of detectable agents associated with the surface of a biological nanoparticle provides information on the size of the bionanoparticle. For example, a biological nanoparticle having a large surface area will associate with a large number of detectable agents, while a biological nanoparticle having a small surface area will associate with a smaller number of detectable agents. The relation of the number of detectable agents associated with the biological nanoparticle surface provides a correlation between light intensity and nanoparticle surface area. In this manner, the amount of emitted light intensity corresponds with the size of the biological nanoparticle, and specifically corresponds with the surface area of the biological nanoparticle.

In other embodiments, a detectable agent is associated with the interior of the biological nanoparticle. In some embodiments, the detectable agent is not associated with the surface of the biological nanoparticle, and is embedded within the biological nanoparticle, or otherwise is surrounded by the biological nanoparticle. In specific embodiments, the detectable agent is encompassed by the biological nanoparticle, but does not associate with the internal surface, e.g., a dye floating freely within an exosome that does not associate internally with its lipid membrane. Internal detectable agents are also referred to herein as "volume dyes". The relation of a volume dye surrounded by a biological nanoparticle provides information on the size of the bionanoparticle. For example, a biological nanoparticle having a large volume will comprise a large number of volume dyes, while a biological nanoparticle having a small volume will comprise fewer volume dyes. The relation of the number of volume dyes within the biological nanoparticle provides a correlation between light intensity and nanoparticle volume. In this manner, the amount of emitted light intensity corresponds with the size of the biological nanoparticle, and specifically corresponds with the volume of the biological nanoparticle.

In some embodiments, a biological nanoparticle comprises both a volume dye and a detectable agent associated with the surface. A nanoparticle comprising both a volume dye and surface-associated detectable agent can provide information relating to both the surface area and the volume of the biological nanoparticle. In some embodiments, the volume dye and the surface area detectable agent are the same. In other embodiments, the volume dye and the surface area detectable agent are different. In certain embodiments, the volume dye can provide information regarding the identity or type of biological nanoparticle being detected or isolated. In some embodiments, the use of a volume dye that is a fluorogenic substrate can provide information regarding the identity or type of biological nanoparticle being detected or isolated. In a specific embodiment, the use of a volume dye that is a fluorogenic substrate of an enzyme specific to a biological nanoparticle, such as an exosome, can further provide information regarding the identity or type of biological nanoparticle being detected or isolated.

In certain embodiments, the biological nanoparticle is non-spherical. In some embodiments, information about the shape of a biological nanoparticle can be extracted by analyzing the ratio of a signal associated with the biological nanoparticle. In specific embodiments, biological nanoparticles comprising a surface membrane dye and a volume dye provide an emission ratio. In specific embodiments, biological nanoparticles comprising a surface membrane dye and a volume dye provide a surface-to-volume ratio. In certain embodiments, the ratio of the surface membrane dye and volume dye provides information about the shape of the biological nanoparticle.

In some embodiments, detectable agents specifically bind to one or more binding targets associated with a biological nanoparticle. In certain aspects, the binding target is a polypeptide, such as a protein, and the detectable agent is a fluorescently labeled antibody that specifically binds to the target polypeptide.

In certain embodiments, a biological nanoparticle comprises a plurality of detectable agents. In some embodiments, the plurality of detectable agents comprise a luminescent dye, a fluorescent dye, a fluorescently labeled antibody, a fluorescently labeled protein, a fluorescently labeled nucleic acid, a fluorescently labeled lipid, a fluorescently labeled carbohydrate, a fluorescently labeled small molecule, a membrane dye, a fluorogenic dye, a dye, a polymer dot, a fluorogenic substrate of an enzyme, or a combination thereof. In certain embodiments, at least one of the plurality of detectable agents is associated with the surface of a biological nanoparticle. In some embodiments, the plurality of detectable agents comprises a volume dye. In specific embodiments, the plurality of detectable agents comprise at least one detectable agent associated with the surface of a biological nanoparticle and further comprises a volume dye. As used herein, the term "plurality of detectable agents" refers to more than one detectable agent associated with a biological nanoparticle.

In some embodiments, a plurality of detectable agents have overlapping emission profiles. In certain embodiments, a plurality of detectable agents have overlapping emission and absorption profiles. In certain embodiments, the detectable agents have the same emission profiles. In certain embodiments, the detectable agents have the same emission and absorption profiles. In specific embodiments, the detectable agents have emission profiles having the same peak wavelengths. In some embodiments, the plurality of detectable agents comprise the same detectable agent. As a non-limiting example, a biological nanoparticle may be associated with a plurality of detectable agents associated with the surface, wherein all the detectable agents are the same (e.g., have the same emission and absorption profiles and peak wavelengths).

In certain embodiments, a plurality of detectable agents comprise more than one type of detectable agent. In some embodiments, the detectable agents have different emission profiles. In certain embodiments, the detectable agents have emission profiles having different peak wavelengths. In specific embodiments, the peak wavelengths can be separated by more than 10 nanometers, by more than 20 nanometers, by more than 30 nanometers, by more than 40 nanometers, by more than 50 nanometers, by more than 75 nanometers, by more than 100 nanometers, by more than 120 nanometers, by more than 140 nanometers, by more than 160 nanometers, by more than 180 nanometers, by more than 200 nanometers, by more than 300 nanometers, by more than 400 nanometers, by more than 500 nanometers, by more than 600 nanometers, by more than 700 nanometers, or by more than 800 nanometers. In some embodiments, the detectable agents have different absorption profiles. In certain embodiments, the detectable agents have absorption profiles having different peak wavelengths. In specific embodiments, the peak wavelengths can be separated by more than 10 nanometers, by more than 20 nanometers, by more than 30 nanometers, by more than 40 nanometers, by more than 50 nanometers, by more than 75 nanometers, by more than 100 nanometers, by more than 120 nanometers, by more than 140 nanometers, by more than 160 nanometers, by more than 180 nanometers, by more than 200 nanometers, by more than 300 nanometers, by more than 400 nanometers, by more than 500 nanometers, by more than 600 nanometers, by more than 700 nanometers, or by more than 800 nanometers. In some embodiments, the detectable agents have different emission and absorption profiles. As a non-limiting example, a biological nanoparticle may be associated with a plurality of detectable agents associated with the surface, wherein all the surface detectable agents are the same (e.g., have the same emission and absorption profiles and peak wavelengths), and the biological nanoparticle may further comprise a plurality of volume dyes, wherein the plurality of volume dyes have the same emission profiles and peak wavelengths, but wherein the peak wavelengths of the surface dyes differ from the peak wavelengths of the volume dyes. Such a biological nanoparticle could provide information on the size of the bionanoparticle using both the emitted light intensity of the volume dye and the emitted light intensity of the surface dye, which may increase accuracy in size determination. As a second non-limiting example, a biological nanoparticle may be associated with a plurality of detectable agents associated with the surface, wherein several of the plurality of detectable agents are the same (e.g., have the same emission and absorption profiles and peak wavelengths), and at least one of the plurality of detectable agents is different (e.g., has a non-overlapping peak wavelength). In an example such as this, the at least one of the plurality of detectable agents that is different may be associated with, e.g., a specific protein on the bionanoparticle surface. In this second non-limiting example, the associated detectable agents could provide information on the size of the biological nanoparticle, as well as the identity of the nanoparticle, and/or the surface protein makeup of the biological nanoparticle.

In certain embodiments, the plurality of detectable agents can comprise more than one plurality of detectable agent groupings, wherein each of the groupings sharing characteristics. In some embodiments, the plurality of detectable agents comprises one detectable agent grouping, two detectable agent groupings, three detectable agent groupings, four detectable agent groupings, five detectable agent groupings, six detectable agent groupings, seven detectable agent groupings, eight detectable agent groupings, nine detectable agent groupings, ten detectable agent groupings, or more than ten detectable agent groupings. Each of the detectable agent groupings can comprise a plurality of detectable agents that have the same emission and absorption profiles and peak wavelengths. Each of the detectable agent groupings can comprise a plurality of detectable agents that are the same. As a non-limiting example, a biological nanoparticle may be associated with a first detectable agent grouping comprising a plurality of detectable agents associated with the surface, and wherein all the surface detectable agents are the same (e.g., have the same emission and absorption profiles and peak wavelengths); and the biological nanoparticle may further comprise a second detectable agent grouping comprising a plurality of volume dyes, wherein all the volume dyes have the same emission and absorption profiles and peak wavelengths; the peak wavelengths of the first detectable agent grouping and the second detectable agent grouping can be different. Such a biological nanoparticle could provide information on the size of the bionanoparticle using both the emitted light intensity of the first detectable agent grouping and the emitted light intensity of the second detectable agent grouping, which may increase accuracy in size determination. As another non-limiting example, a biological nanoparticle may be associated with a first detectable agent grouping comprising a plurality of detectable agents associated with the surface, a second detectable agent grouping comprising a plurality of detectable agents associated with a specific protein on the bionanoparticle, a third detectable agent grouping comprising a plurality of detectable agents associated with a different specific protein on the bionanoparticle, and a fourth detectable agent grouping comprising a plurality of volume dyes, which in combination can provide both accurate size information and identity or protein makeup of the bionanoparticle.

In some embodiments, a detector configured to detect the presence or absence of a biological nanoparticle is used. In certain embodiments, the detector is used to measure a light intensity emitted by a bionanoparticle. In specific embodiments, the light emitted by the biological nanoparticle is detected by the detector. In certain embodiments, light emitted by a detectable agent associated with the biological nanoparticle is detected by the detector.

In certain aspects, the detector is selected from the group consisting of a camera, an electron multiplier, a charge-coupled device (CCD) image sensor, a photomultiplier tube (PMT), a microchannel plate PMT (MCP), a hybrid PMT detector, an avalanche photodiode (APD), a single-photon avalanche diode (SPAD), a silicon photomultiplier (SiPM), and a complementary metal oxide semiconductor (CMOS) image sensor.

In some embodiments, the emitted light comprises luminescent light. In certain embodiments, the emitted light comprises fluorescent light. In some embodiments, the emitted light comprises scattered light. In specific embodiments, the emitted light comprises luminescent light, fluorescent light, scattered light, or a combination thereof.

The emitted light detected by the detector provides a measure of light intensity. In certain aspects, the assigning of a size value to a biological nanoparticle comprises the use of measured light intensity. As a non-limiting example, a first bionanoparticle having a first light intensity that is two times larger than a second light intensity from a second bionanoparticle informs the observer of a relative size difference, wherein the first bionanoparticle is larger than the second bionanoparticle. In some aspects, the measured light intensity comprises fluorescence. In certain embodiments, the measured light intensity comprises luminescence. In some embodiments, the measured light intensity comprises scattered light.

In certain embodiments, a source for interrogating the fluid sample configured to activate an emission of light from the biological nanoparticle. The source for interrogating the fluid sample may be a source of electromagnetic radiation. In certain embodiments, the source for interrogating the fluid sample comprises a laser (solid state, diode-pumped, ion, or dye), a light-emitting diode (LED), a lamp, an arc discharge, a magnetic pulse, or a natural light. The source for interrogating the fluid sample may be adjusted to increase the intensity of light emitted by a biological nanoparticle. As a non-limiting example, a laser wavelength may be selected to have the same value as $\lambda_{abs}$ of a fluorescent detectable agent associated with a biological nanoparticle, and a detector may be calibrated to detect the fluorescence emitted by the detectable agent, $\lambda_{em}$. Such a selection of source for interrogating and detection provides for a favorable light intensity emission and detection. In some embodiments, the source for interrogating activates a fluorescent light intensity. In certain embodiments, the source for interrogating activates a scattered light intensity. In specific embodiments, the source for interrogating activates a backscattered light intensity, a side-scattered light intensity, a forward-scattered light intensity, or a combination thereof. In specific embodiments, the source for interrogating activates both a scattered light intensity and a fluorescent light intensity. As a non-limiting example, a laser may be used to interrogate a fluid sample, and a passing nanoparticle may emit scattered light, and detectable agents associated with the nanoparticle may emit fluorescent light. A measure of the scattered light and the fluorescent light intensities inform parameters relating to the biological nanoparticle. In embodiments wherein the emitted light comprises luminescent light, a source for interrogating may not be required.

In certain aspects the source for interrogating is a source of electromagnetic radiation (e.g., a light source). In some embodiments, the source of electromagnetic radiation includes a laser, a lamp (e.g., a mercury lamp, halogen lamp, metal halide lamp, or other suitable lamp), an LED, or a combination thereof. In some embodiments, the source for interrogation comprises epi-illumination. In some embodiments, the source for interrogating comprises Line Confocal Detection (LCD), line illumination (e.g., for use with an array detector), or a combination thereof. In certain embodiments, the illumination from the source for interrogating is in the form of a line that crosses the width of the microfluidic channel (e.g., with use of LCD or line illumination). As non-limiting examples, the source for interrogating can use line confocal detection. In some aspects, the peak wavelength emitted by the source of light is between about 200 nm and about 300 nm, about 250 nm and about 350 nm, about 300 nm and about 400 nm, about 350 nm and about 450 nm, about 400 nm and about 500 nm, about 450 nm and about 550 nm, about 500 nm and about 600 nm, about 550 nm and about 650 nm, about 600 nm and about 700 nm, about 650 nm and about 750 nm, about 700 nm and about 800 nm, about 750 nm and about 850 nm, about 800 nm and about 900 nm, about 850 nm and about 950 nm, or about 900 nm and about 1000 nm. In some aspects, two or more light sources having distinct peak wavelengths can be used. In some aspects, light emitted by the light source is spectrally filtered by a light filtering apparatus. In some aspects, the light filtering apparatus includes a filter, e.g., a bandpass filter that only allows light wavelengths falling within a certain range to pass through it towards the biological nanoparticles. In some aspects, the light filtering apparatus includes a multichroic mirror that can separate light into distinct spectral components, such that it only allows light wavelengths falling within a certain range to be directed towards the bionanoparticles. In some aspects, the longest wavelength that passes through a light filtering apparatus is less than 300 nm, less than 400 nm, less than 500 nm, less than 600 nm, less than 700 nm, less than 800 nm, less than 900 nm, or less than 1000 nm. In some aspects, the shortest wavelength that passes through a light filtering apparatus is more than 200 nm, more than 300 nm, more than 400 nm, more than 500 nm, more than 600 nm, more than 700 nm, more than 800 nm, or more than 900 nm.

In some embodiments, the source for interrogating has a beam width of less than 10 μm, less than 9 μm, less than 8 μm, less than 7 μm, less than 6 μm, less than 5.0 μm, less than 4.5 μm, less than 4.0 μm, less than 3.5 μm, less than 3.0 μm, less than 2.5 μm, less than 2.0 μm, less than 1.5 μm, less than 1.0 μm, less than 950 nm, less than 900 nm, less than 850 nm, less than 800 nm, less than 750 nm, less than 700 nm, less than 650 nm, less than 600 nm, less than 550 nm, less than 500 nm, less than 450 nm, less than 400 nm, less than 350 nm, or less than 300 nm. In some embodiments, the source for interrogating is a light beam having a width of less than 10 μm, less than 9 μm, less than 8 μm, less than 7 μm, less than 6 μm, less than 5.0 μm, less than 4.5 μm, less than 4.0 μm, less than 3.5 μm, less than 3.0 μm, less than 2.5 μm, less than 2.0 μm, less than 1.5 μm, less than 1.0 μm, less than 950 nm, less than 900 nm, less than 850 nm, less than 800 nm, less than 750 nm, less than 700 nm, less than 650 nm, less than 600 nm, less than 550 nm, less than 500 nm, less than 450 nm, less than 400 nm, less than 350 nm, or less than 300 nm. In certain embodiments, the source for interrogating has a beam width of greater than or equal to 0.5 μm and less than or equal to 2 μm. In some embodiments, the source for interrogating has a beam width of greater than 0.1 μm and less than 20 μm, greater than 0.1 μm and less than 10 μm, greater than 0.1 μm and less than 9 μm, greater than 0.1 μm and less than 8 μm, greater than 0.1 μm and less than 7 μm, greater than 0.1 μm and less than 6 μm, greater than 0.1 μm and less than 5 μm, greater than 0.1 μm and less than 4 μm, greater than 0.1 μm and less than 3 μm, greater than 0.1 μm and less than 2 μm, greater than 0.2 μm and less than 10 μm, greater than 0.2 μm and less than 5 μm, greater than 0.2 μm and less than 4 μm, greater than 0.2 μm and less than 3 μm, greater than 0.2 μm and less than 2 μm, greater than 0.3 µm and less than 5 µm, greater than 0.3 µm and less than 4 µm, greater than 0.3 µm and less than 3 µm, greater than 0.3 µm and less than 2 µm, greater than 0.4 µm and less than 5 µm, greater than 0.4 µm and less than 4 µm, greater than 0.4 µm and less than 3 µm, greater than 0.4 µm and less than 2 µm, greater than 0.5 µm and less than 5 µm, greater than 0.5 µm and less than 4 µm, greater than 0.5 µm and less than 3 µm, or greater than 0.5 µm and less than 2 µm.

In some embodiments, the source for interrogating ("source for illuminating" or "illumination source") of at least one biological nanoparticle comprises using an illumination source having a beam width of less than 2 µm. In some embodiments, the illumination source has a beam width of less than 2 µm at the location of detection in the microfluidic channel.

A measurable light intensity may be an emitted light intensity (e.g., an emission peak intensity or an emission intensity range), an emission wavelength (e.g., an emission peak wavelength or an emission wavelength range), an emission lifetime, an excitation wavelength (e.g., an excitation peak wavelength or an excitation wavelength range), an absorption wavelength (e.g., an absorption peak wavelength or an absorption wavelength range) or a spectral intensity. Detecting an emitted light intensity can comprise measuring an emission intensity (e.g., an emission peak intensity or an emission intensity range), an emission wavelength (e.g., an emission peak wavelength or an emission wavelength range), an emission lifetime, an excitation wavelength (e.g., an excitation peak wavelength or an excitation wavelength range), an absorption wavelength (e.g., an absorption peak wavelength or an absorption wavelength range) a spectral intensity, or a combination thereof. In some cases, a spectral intensity can comprise a ratio, for example, of a plurality of emission peak intensities, emission peak wavelengths, range of emission intensities, range of emission wavelengths, emission wavelength spectra, excitation peak wavelengths, range of excitation wavelengths, absorption peak wavelengths, or range of absorption wavelengths. For example, detecting or measuring the spectral intensity of a biological nanoparticle comprising more than one detectable agent can comprise detecting or measuring the emission intensity of the detectable agents produced by probe at two or more wavelengths (e.g., within two or more ranges of wavelengths) and, optionally, calculating a ratio of the intensities (e.g., intensity ranges) at the two or more wavelengths over which the intensities were detected or measured.

In some embodiments, an emitted light intensity can comprise a wavelength or range of wavelengths that include at least one wavelength of 200 nm, 300 nm, 400 nm, 500 nm, 600 nm, 700 nm, 800 nm, 900 nm, 1000 nm, or within a range defined by any two values thereof. A detectable emission of light or any aspect thereof (e.g., an emission peak intensity, an emission intensity range, an emission peak wavelength, an emission wavelength range, an excitation peak wavelength, an excitation wavelength range, an absorption peak wavelength, an absorption wavelength range, an emission lifetime, or a spectral intensity) can be used to determine the presence or absence of a target bionanoparticle. As a result, the methods and systems described herein can be used to facilitate determining, measuring, or indicating the presence or absence of one or more distinct target biological nanoparticles in a fluidic sample, or can be used to facilitate determining or indicating the presence or absence of one or more detectable agents associated with a biological nanoparticle in a fluidic sample.

Various types of detectable agent are suitable for use with the methods and systems of the present disclosure. In some aspects, the detectable agent comprises one or more chromophores (e.g., fluorophores). The chromophores described herein can be used to produce fluorescent light emissions according to various mechanisms. In some embodiments, converting a detectable agent from a first optical state to a second optical state comprises Förster resonance energy transfer (FRET)-based quenching of one or more chromophores, or removal of FRET-based quenching of one or more chromophores. In certain embodiments, the application of light energy triggers a compositional and/or structural change in an entity that interacts with the chromophore. For example, in some aspects, the detectable agent comprises at least one photochromic molecule that is converted (e.g., reversibly or irreversibly) to a different composition and/or structure upon exposure to light energy. Optionally, the photochromic molecule is a photochromic quencher that controllably quenches the fluorescence of the chromophore, depending on the conformation of the molecule, thereby producing a change in the optical state of the optical marker. Examples of photochromic molecules include but are not limited to azobenzenes, stilbenes, azostilbenes, diarylethenes, quinones, nitrones, fulgides, or derivatives or combinations thereof 1,2-bis(2,4-dimethyl-5-phenyl-3-thienyl)-3,3,4,4,5,5,-hexafluoro-1-cyclopentene (BTE) is an example of a diarylethene suitable for use in accordance with various aspects presented herein. In some aspects, BTE exhibits improved photoswitching kinetics, thermal stability, and fatigue resistance compared to other types of photochromic molecules.

In some embodiments, the chromophore itself undergoes a change in structure and/or composition when exposed to light energy which alters the optical properties of the chromophore. For example, in some aspects, a detectable agent comprises at least one photoactivatable chromophore that is irreversibly converted from a first optical state (e.g., exhibiting relatively low or no fluorescence) to a second optical state (e.g., exhibiting relatively high fluorescence) upon application of light energy. Examples of photoactivatable chromophores include but are not limited to photoactivatable green fluorescent protein (PA-GFP), PA-CFP2, PA-mRFP1, PA-mCherry1, Phamret, caged fluorescent dyes (e.g., 5-carboxymethoxy-2-nitrobenzyl (CMNB)-caged fluorescein, CMNB-caged carboxylfluorescein), or combinations or derivatives thereof. In some aspects, a photoactivatable fluorescent protein is capable of being genetically encoded and expressed biological nanoparticles.

In some aspects, a detectable agent includes at least one photoswitchable chromophore that is reversibly convertible between a first optical state (e.g., exhibiting relatively low or no fluorescence) and a second optical state (e.g., exhibiting relatively high fluorescence). In certain aspects, a photoswitchable chromophore is converted from a first optical state to a second optical state when exposed to a first light energy (e.g., a first wavelength of light), and from the second optical state to the first optical state when exposed to a second, different light energy (e.g., a second wavelength of light). Optionally, a photoswitchable chromophore is capable of being reversibly switched between the two optical states multiple times with minimal or no photobleaching, e.g., at least 3 times, 5 times, 10 times, 20 times, 50 times, or more. Examples of photoswitchable chromophores include but are not limited to Dronpa, rsFastLime, Padron, bsDronpa, E2GFP, rsCherry, rsCherryRev, or combinations or derivatives thereof. In other aspects, a detectable agent comprises at least one photoswitchable chromophoric polymer particle, as described further herein.

In certain embodiments, a chromophore is selected from the group consisting of SYBR green, Evagreen, SYTO-9, SYTO-82, fluorescein, FITC, FAM, rhodamine, HEX, VIC, JOE, TET, TAMRA, ROX, TRITC, Texas Red, GFP, phycoerythrin (PE), Cy3, Cy3.5, Cy5, Cy5.5, PE-Cy5, Calcein, a BODIPY, an Alexa Fluor, a DyLight Fluor, an ATTO, a Quasar, a Cal Fluor, a TYE, a Qdot, a Cy, a SYSTO, a derivative thereof, a chromophoric polymer, a semiconducting polymer, a semiconducting polymer dot, and a combination thereof.

Various types and compositions of semiconducting polymers are applicable for use in accordance with aspects of the present disclosure. The semiconducting polymer can be a homopolymer or a heteropolymer. For example, a number of semiconducting polymers are suitable for use in chromophoric polymer particles according to the present disclosure. Examples of semiconducting polymers include but are not limited to: polyfluorene-containing polymers, including but not limited to poly(9,9-dihexylfluorenyl-2,7-diyl) (PDHF) and poly(9,9-dioctylfluorenyl-2,7-diyl) (PFO); fluorene-containing copolymers, including but not limited to, poly[{9,9-dioctyl-2,7-divinylene-fluorenylene}-alt-co-{2-methoxy-5-(2-ethylhexyloxy)-1,4-phenylene}] (PFPV), poly[(9,9-dioctylfluorenyl-2,7-diyl)-co-(1,4-benzo-{2,1,3}-thiadiazole)] (PFBT), poly[(9,9-dioctylfluorenyl-2,7-diyl)-co-(4,7-Di-2-thienyl-2,1,3-benzothiadiazole)] (PFTBT), and poly[(9,9-dioctylfluorenyl-2,7-diyl)-co-(4,7-Di-2-thienyl-2,1,3-benzothiadiazole)] (PF-0.1TBT); phenylene vinylene-containing polymers, including but not limited to, poly[2-methoxy-5-(2-ethylhexyloxy)-1,4-phenylenevinylene] (MEH-PPV) and poly[2-methoxy-5-(2-ethylhexyloxy)-1,4-(1-cyanovinylene-1,4-phenylene)] (CN-PPV); phenylene ethynylene-containing polymers, including but not limited to, poly(2,5-di(3',7'-dimethyloctyl)phenylene-1,4-ethynylene (PPE); or a combination thereof. In certain embodiments, the semiconducting polymers can include, but are not limited to, polymers comprising a polyfluorene monomer, a fluorene monomer, a phenylene vinylene monomer, a phenylene ethynylene monomer, any derivative thereof, or a combination thereof. In some embodiments, the semiconducting polymers comprise a polyfluorene, a polyfluorene derivative, a fluorene, a fluorene derivative, a phenylene vinylene, a phenylene vinylene derivative, a phenylene ethynylene, a phenylene ethynylene derivative, or a combination thereof.

A wide variety of chromophoric polymer structures are suitable for use in accordance with various aspects of the present disclosure. In some aspects, the chromophoric polymer is a linear polymer. In other aspects, the chromophoric polymer is a branched polymer. In certain aspects, the chromophoric polymer is a dendrimer. In certain aspects, the chromophoric polymer is a brush polymer. In certain aspects, the chromophoric polymer is a star polymer.

In some aspects, the chromophoric polymer particles described herein contain a copolymer having one or more functionalized monomeric units, for example an amphiphilic polymer, including but not limited to: poly((meth)acrylic acid)-based copolymers such as: poly(acrylic acid-b-acrylamide), poly(acrylic acid-b-methyl methacrylate), poly(acrylic acid-b-N-isopropylacrylamide), poly(n-butylacrylate-b-acrylic acid), poly(sodium acrylate-b-methyl methacrylate), poly(methacrylic acid-b-neopentyl methacrylate), poly(methyl methacrylate-b-acrylic acid), poly(methyl methacrylate-b-methacrylic acid), poly(methyl methacrylate-b-N,N-dimethyl acrylamide), poly(methyl methacrylate-b-sodium acrylate), poly(methyl methacrylate-b-sodium methacrylate), poly(neopentyl methacrylate-b-methacrylic acid), poly(t-butyl methacrylate-b-ethylene oxide), poly(2-acrylamido-2-methylpropanesulfonic acid-b-acrylic acid); polydiene-based copolymers such as: poly(butadiene(1,2 addition)-b-ethylene oxide), poly(butadiene(1,2 addition)-b-methylacrylic acid, poly(butadiene(1,4 addition)-b-acrylic acid), poly(butadiene(1,4 addition)-b-ethylene oxide, poly(butadiene(1,4 addition)-b-sodium acrylate), poly(butadiene(1,4 addition)-b-N-methyl 4-vinyl pyridinium iodide), poly(isoprene-b-ethylene oxide), poly(isoprene-b-ethylene oxide), and poly(isoprene-b-N-methyl 2-vinyl pyridinium iodide); poly(ethylene oxide)-based copolymers such as: poly(ethylene oxide-b-acrylic acid), poly(ethylene oxide-b-acrylamide), poly(ethylene oxide-b-butylene oxide), poly(ethylene oxide-b-c-caprolactone), poly(ethylene oxide-b-lactide), poly(ethylene oxide-b-lactide), poly(ethylene oxide-b-methacrylic acid), poly(ethylene oxide-b-methyl acrylate), poly(ethylene oxide-b-N-isopropylacrylamide), poly(ethylene oxide-b-methyl methacrylate), poly(ethylene oxide-b-nitrobenzyl methacrylate), poly(ethylene oxide-b-N,N-dimethyl aminoethylmethacrylate), poly(ethylene oxide-b-propylene oxide), poly(ethylene oxide-b-t-butyl acrylate), poly(ethylene oxide-b-t-butyl methacrylate), poly(ethylene oxide-b-tetrahydrofurfuryl methacrylate), poly(ethylene oxide-b-2-ethyl oxazoline), poly(ethylene oxide-b-2-hydroxyethyl methacrylate), poly(ethylene oxide-b-2-methyl oxazoline); polyisobutylene-based copolymers such as poly(isobutylene-b-acrylic acid), poly(isobutylene-b-ethylene oxide), poly(isobutylene-b-methacrylic acid); polystyrene based copolymers such as poly(styrene-b-acrylamide), poly(styrene-b-acrylic acid), poly(styrene-b-cesium acrylate), poly (styrene-b-ethylene oxide), poly(styrene-b-ethylene oxide) acid cleavable at the block junction, poly(styrene-b-methacrylic acid), poly(4-styrenesulfonic acid-b-ethylene oxide), poly(styrenesulfonic acid-b-methylbutylene), poly(styrene-b-N,N-dimethylacrylamide), poly(styrene-b-N-isopropyl acrylamide), poly(styrene-b-N-methyl 2-vinyl pyridinium iodide), poly(styrene-b-N-methyl-4-vinyl pyridinium iodide), poly(styrene-b-propylacrylic acid), poly(styrene-b-sodium acrylate) poly(styrene-b-sodium methacrylate), polyp-chloromethyl styrene-b-acrylamide), poly(styrene-co-p-chloromethyl styrene-b-acrylamide), poly(styrene-co-p-chloromethyl styrene-b-acrylic acid), poly(styrene-b-methylbutylene-co-isoprene sulfonate); polysiloxane-based copolymers such as poly(dimethylsiloxane-b-acrylic acid), poly(dimethylsiloxane-b-ethylene oxide), poly(dimethylsiloxane-b-methacrylic acid); poly(ferrocenyldimethylsilane) based copolymers such as poly(ferrocenyldimethylsilane-b-ethylene oxide); poly(2-vinyl naphthalene)-based copolymers such as poly(2-vinyl naphthalene-b-acrylic acid), poly (vinyl pyridine and N-methyl vinyl pyridinium iodide)-based copolymers such as poly(2-vinyl pyridine-b-ethylene oxide), poly(2-vinyl pyridine-b-methyl acrylic acid), poly(N-methyl 2-vinyl pyridinium iodide-b-ethylene oxide), poly(N-methyl 4-vinyl pyridinium iodide-b-methyl methacrylate), poly(4-vinyl pyridine-b-ethylene oxide) PEO end functional OH; and poly(vinyl pyrrolidone)-based copolymers such as poly(vinyl pyrrolidone-b-D/L-lactide); and the like.

In certain aspects, the chromophoric polymer particle includes a blend of semiconducting polymers. The blends can include a combination of homopolymers, copolymers, and oligomers. Polymer blends used to form chromophoric polymer particles may be selected in order to tune the properties of the resulting polymer particles, for example, to achieve a desired excitation or emission spectra for the polymer particle.

Furthermore, a detectable agent can, for example, be a molecule of interest present in a biological nanoparticle to be analyzed (e.g., a nucleic acid or a biomarker). Alternatively, a detectable agent can be a molecule that associates with a molecule of interest (e.g., the nucleic acid molecule or the biomarker) associated with the bionanoparticle, thereby allowing the nanoparticle to be detected. In some embodiments, the detectable agent is fluorescent and, thus, can be detected by fluorescence-based detection methods known in the art. However, other detection methods (e.g., absorbance, chemiluminescence, turbidity, and/or scattering) can be used to analyze the biological nanoparticles. A variety of detectable agents suitable for the present disclosure are generally well known in the art and can, for example, be found in The Molecular Probes Handbook, $11^{th}$ Edition (2010).

Using the detection methods described herein, biological nanoparticles can be analyzed for association with a detectable agent or the lack of association. For a given sample of biological nanoparticles at a concentration, some of the biological nanoparticles can contain a detectable agent and some may not. Generally, a biological nanoparticle having a larger hydrodynamic radius associates with a larger number of detectable agents when compared to a biological nanoparticle having a small hydrodynamic radius. Accordingly, the biological nanoparticle having the larger hydrodynamic radius generally emits a higher intensity of light when compared to the biological nanoparticle having the small hydrodynamic radius.

In specific embodiments provided herein, the detecting of the light intensity from a biological nanoparticle occurs while the nanoparticle is in transit through a microfluidic chip. In specific embodiments, the biological nanoparticle is detected while it is in transit through a microfluidic chip, wherein the transit comprises uninterrupted flow.

Using the detection methods described herein, biological nanoparticles, detectable agents, tags, and the like may be detected with specificity. In some embodiments, the detecting, the measuring, or the detecting and measuring of a light intensity has single-nanoparticle sensitivity. For example, a single biological nanoparticle may be detected while in transit through a microfluidic chip, even if the fluidic sample comprises a plurality of biological nanoparticles. In some embodiments, a single biological nanoparticle may be detected, even when in the presence of other similar biological nanoparticles. As used herein, "single-nanoparticle sensitivity" refers to the detection of an individual biological nanoparticle.

The illumination of an individual biological nanoparticle can refer to a biological nanoparticle that is in a fluid sample comprising a plurality of biological nanoparticles, and is illuminated absent any of the other biological nanoparticles of the plurality. The illumination of an individual biological nanoparticle is distinct from the illumination of two or more biological nanoparticles that are randomly co-localized to the illumination region (i.e., two or more biological nanoparticles that happen to be present within the illumination region). The illumination of an individual biological nanoparticle is distinct from the illumination of an aggregation of biological nanoparticles (i.e., two or more biological nanoparticles). As a non-limiting example, an individual biological nanoparticle can pass through a light beam, and is thus illuminated. The individual biological nanoparticle can pass through the light beam in the absence of any of the other biological nanoparticles of the plurality, the individual biological nanoparticle thus being illuminated by itself. In some embodiments, the individual biological nanoparticle is a singular nanoparticle that can be interrogated by a light source in the absence of any of the other biological nanoparticles present in the fluidic sample (e.g., for a given light beam width, a single biological nanoparticle is present in the beam, thus allowing it to be illuminated absent any of the other biological nanoparticles of the plurality).

The detection of a light intensity from an individual biological nanoparticle can refer to a biological nanoparticle that is in a fluid sample comprising a plurality of biological nanoparticles, and is detected absent any of the other biological nanoparticles of the plurality. The detection of an individual biological nanoparticle is distinct from the detection of an aggregation of biological nanoparticles (i.e., two or more biological nanoparticles attached to each other). As a non-limiting example, an individual biological nanoparticle can pass through a light beam, resulting in a light intensity that is measured. The individual biological nanoparticle can pass through the light beam in the absence of any of the other biological nanoparticles of the plurality, the individual biological nanoparticle thus being detected by itself. In some embodiments, the individual biological nanoparticle is a singular nanoparticle that can be interrogated by a light source in the absence of any of the other biological nanoparticles present in the fluidic sample (e.g., for a given light beam width, a single biological nanoparticle is present in the beam, thus allowing it to be detected absent any of the other biological nanoparticles of the plurality).

In some embodiments, at least a portion of the plurality of biological nanoparticles of the plurality of biological nanoparticles are illuminated (i.e., are illuminated biological nanoparticles). As a non-limiting example, a biological nanoparticle that passes through a beam from an illumination source can be an illuminated biological nanoparticle. In some embodiments, a majority of the biological nanoparticles of the plurality of detected biological nanoparticles are illuminated in the absence of any of the other biological nanoparticles of the plurality. In certain embodiments, a majority of the illuminated biological nanoparticles are illuminated individually (i.e., are measured as individual biological nanoparticles). In some embodiments, greater than 10%, greater than 20%, greater than 30%, greater than 40%, greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, or greater than 99% of the illuminated biological nanoparticles in the plurality of biological nanoparticles are illuminated individually. In preferred embodiments, greater than 90% of the illuminated biological nanoparticles in the plurality of biological nanoparticles are illuminated individually.

In some embodiments, at least a portion of the plurality of biological nanoparticles of the plurality of biological nanoparticles are detected (i.e., are detected biological nanoparticles). As a non-limiting example, a biological nanoparticle that passes through a detection region can be a detected biological nanoparticle. In some embodiments, a majority of the biological nanoparticles of the plurality of detected biological nanoparticles are detected in the absence of any of the other biological nanoparticles of the plurality. In certain embodiments, a majority of the detected biological nanoparticles are detected individually (i.e., are detected as individual biological nanoparticles, also referred to as "individually detected"). In some embodiments, greater than 10%, greater than 20%, greater than 30%, greater than 40%, greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, or greater than 99% of the detected biological nanoparticles in the plurality of biological nanoparticles are detected individually. In preferred embodiments, greater than 90% of the biological nanoparticles in the plurality of the detected biological nanoparticles are detected individually.

In some embodiments, at least some of the plurality of biological nanoparticles are detected on a particle-by-particle basis. In some embodiments, at least some of the plurality of biological nanoparticles are illuminated on a particle-by-particle basis. A particle-by-particle basis describes the observation of a plurality of biological nanoparticles passing through a region (e.g., a light beam having a given width) individually (i.e., one at a time). As a non-limiting example of a particle-by-particle basis, a fluid sample comprising a plurality of biological nanoparticles can flow through a constriction of a microfluidic channel and pass through a light beam, such that at least some of the plurality of biological nanoparticles pass through the light beam individually (i.e., in the absence of any of the other biological nanoparticles of the plurality). As another non-limiting example of biological nanoparticles on a particle-by-particle basis, a fluid sample comprising a plurality of biological nanoparticles can flow through a microchannel and pass through a light beam, such that no more than one biological nanoparticle passes through the light beam at a time, without any overlap with other biological nanoparticles of the plurality. In some specific embodiments, a majority of the biological nanoparticles pass through the light beam, such that no more than one biological nanoparticle passes through the light beam at a time, without overlap with other biological nanoparticles of the plurality. In some embodiments, greater than 10%, greater than 20%, greater than 30%, greater than 40%, greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, or greater than 99% of the biological nanoparticles in the plurality of the illuminated biological nanoparticles are illuminated on a particle-by-particle basis. In preferred embodiments, greater than 90% of the illuminated biological nanoparticles in the plurality of biological nanoparticles are illuminated on a particle-by-particle basis. In some embodiments, greater than 10%, greater than 20%, greater than 30%, greater than 40%, greater than 50%, greater than 55%, greater than 60%, greater than 65%, greater than 70%, greater than 75%, greater than 80%, greater than 85%, greater than 90%, greater than 95%, greater than 96%, greater than 97%, greater than 98%, or greater than 99% of the biological nanoparticles in the plurality of the detected biological nanoparticles are detected on a particle-by-particle basis. In preferred embodiments, greater than 90% of the biological nanoparticles in the plurality of detected biological nanoparticles are detected on a particle-by-particle basis.

In some embodiments, the detecting of a light intensity has single-molecule sensitivity. For example, a single biological nanoparticle may be associated with a plurality of detectable agents, and a single detectable agent can be detected. As another example, a single biological nanoparticle may be associated with a plurality of the same type of detectable agent, and an individual of the plurality of detectable agents can be detected. As used herein, "single-molecule sensitivity" refers to the detection of an individual molecule, wherein the individual molecule is associated with a biological nanoparticle, or wherein the biological nanoparticle comprises the individual molecule. Single-molecule detection can include point detection, wherein detection is focused on a spatial region (e.g., a point or a line) and detection of light from said spatial region can correspond with the presence of a biological nanoparticle. Point detection can include the use of a point detector, such as an avalanche photodiode (APD), a multi-element photodiode, an electron multiplier, a photomultiplier tube (PMT), a microchannel plate PMT (MCP), a hybrid PMT detector, a single-photon avalanche diode (SPAD), or a silicon photomultiplier (SiPM). Single-molecule detection can include the detection of point illumination, or more preferably line illumination, wherein a source of illumination is focused on a spatial region (e.g., a beam of light illuminating a width, or a beam of light illuminating a point) and detection of light from said spatial region can correspond with the presence of a biological nanoparticle. Detection of point illumination or line illumination can include the use of a camera, an electron multiplier, a charge-coupled device (CCD) image sensor, a photomultiplier tube (PMT), a microchannel plate PMT (MCP), a hybrid PMT detector, an avalanche photodiode (APD), a single-photon avalanche diode (SPAD), a silicon photomultiplier (SiPM), and a complementary metal oxide semiconductor (CMOS) image sensor; as disclosed further above, the source of illumination (i.e., the source for interrogation) can include a laser, a lamp (e.g., a mercury lamp, halogen lamp, metal halide lamp, or other suitable lamp), an LED, or a combination thereof. In some embodiments, the detector comprises a line confocal detector or imager. In certain embodiments, the detecting of a biological nanoparticle uses line confocal detection or imaging.

In some embodiments, the detection of light from the spatial region comprises detecting the light intensity from the region (also referred to herein as the "detection region") with at least one detector. In some embodiments, the detection region has an area less than 250 $\mu m^2$, less than 200 $\mu m^2$, less than 150 $\mu m^2$, less than 100 $\mu m^2$, less than 90 $\mu m^2$, less than 80 $\mu m^2$, less than 70 $\mu m^2$, less than 60 $\mu m^2$, less than 50 $\mu m^2$, less than 45 $\mu m^2$, less than 40 $\mu m^2$, less than 35 $\mu m^2$, less than 30 $\mu m^2$, less than 25 $\mu m^2$, less than 20 $\mu m^2$, less than 19 $\mu m^2$, less than 18 $\mu m^2$, less than 17 $\mu m^2$, less than 16 $\mu m^2$, less than 15 $\mu m^2$, less than 14 $\mu m^2$, less than 13 $\mu m^2$, less than 12 $\mu m^2$, less than 11 $\mu m^2$, less than 10 $\mu m^2$, less than 9 $\mu m^2$, less than 8 $\mu m^2$, less than 7 $\mu m^2$, less than 6 $\mu m^2$, less than 5 $\mu m^2$, less than 4 $\mu m^2$, less than 3 $\mu m^2$, less than 2 $\mu m^2$, or less than 1 $\mu m^2$. In preferred embodiments, the detection region has an area greater than or equal to 1 $\mu m^2$ and less than or equal to 10 $\mu m^2$. In some embodiments, the detection region has an area greater than or equal to 0.1 $\mu m^2$ and less than or equal to 50 $\mu m^2$, greater than or equal to 0.2 $\mu m^2$ and less than or equal to 45 $\mu m^2$, greater than or equal to 0.3 $\mu m^2$ and less than or equal to 40 $\mu m^2$, greater than or equal to 0.4 $\mu m^2$ and less than or equal to 35 $\mu m^2$, greater than or equal to 0.5 $\mu m^2$ and less than or equal to 30 $\mu m^2$, greater than or equal to 0.6 $\mu m^2$ and less than or equal to 25 $\mu m^2$, greater than or equal to 0.7 $\mu m^2$ and less than or equal to 20 $\mu m^2$, greater than or equal to 0.8 $\mu m^2$ and less than or equal to 15 $\mu m^2$, greater than or equal to 0.9 $\mu m^2$ and less than or equal to 12.5 $\mu m^2$, or greater than or equal to 1 $\mu m^2$ and less than or equal to 10 $\mu m^2$. In some embodiments, the detection region overlaps, intersects, and/or is within at least one microfluidic channel. In some embodiments, the detection region overlaps, intersects, and/or is within a constriction of at least one microfluidic channel.

In some embodiments, at least one source for interrogating interrogates a region (also referred to herein as the "illumination region"). In some embodiments, the source of illumination illuminates the illumination region. In some embodiments, the illumination region has an area less than 250 $\mu m^2$, less than 200 $\mu m^2$, less than 150 $\mu m^2$, less than 100 $\mu m^2$, less than 90 $\mu m^2$, less than 80 $\mu m^2$, less than 70 $\mu m^2$, less than 60 $\mu m^2$, less than 50 $\mu m^2$, less than 45 $\mu m^2$, less than 40 $\mu m^2$, less than 35 $\mu m^2$, less than 30 $\mu m^2$, less than 25 $\mu m^2$, less than 20 $\mu m^2$, less than 19 $\mu m^2$, less than 18 $\mu m^2$, less than 17 $\mu m^2$, less than 16 $\mu m^2$, less than 15 $\mu m^2$, less than 14 $\mu m^2$, less than 13 $\mu m^2$, less than 12 $\mu m^2$, less than 11 $\mu m^2$, less than 10 $\mu m^2$, less than 9 $\mu m^2$, less than 8 $\mu m^2$, less than 7 $\mu m^2$, less than 6 $\mu m^2$, less than 5 $\mu m^2$, less than 4 $\mu m^2$, less than 3 $\mu m^2$, less than 2 $\mu m^2$, or less than 1 $\mu m^2$. In preferred embodiments, the illumination region has an area greater than or equal to 1 $\mu m^2$ and less than or equal to 100 $\mu m^2$. In some embodiments, the illumination region has an area greater than or equal to 0.1 $\mu m^2$ and less than or equal to 500 $\mu m^2$, greater than or equal to 0.2 $\mu m^2$ and less than or equal to 450 $\mu m^2$, greater than or equal to 0.3 $\mu m^2$ and less than or equal to 400 $\mu m^2$, greater than or equal to 0.4 $\mu m^2$ and less than or equal to 350 $\mu m^2$, greater than or equal to 0.5 $\mu m^2$ and less than or equal to 300 $\mu m^2$, greater than or equal to 0.6 $\mu m^2$ and less than or equal to 250 $\mu m^2$, greater than or equal to 0.7 $\mu m^2$ and less than or equal to 200 $\mu m^2$, greater than or equal to 0.8 $\mu m^2$ and less than or equal to 150 $\mu m^2$, greater than or equal to 0.9 $\mu m^2$ and less than or equal to 125 $\mu m^2$, or greater than or equal to 1 $\mu m^2$ and less than or equal to 100 $\mu m^2$.

In some embodiments, detecting of a light intensity comprises the use of time bins. The disclosed apparatus and methods for determination biological nanoparticle characteristics can be conducted swiftly, with a short signal-integration time, or fast bin time. A bin time can be used to assess, for example, a start-stop time of interrogation-fluorescence, in order to aid in the sorting of information. Time bins (also referred to herein as signal integration times) can disclose a time range in a histogram that an event takes place, or is observed. In some embodiments, the detection, measuring, and/or interrogation of a biological nanoparticle uses time bins. In some embodiments, the time bins have a range of less than 10 ms, less than 5 ms, less than 1 ms, less than 0.5 ms, less than 0.1 ms, less than 90 µs, less than 80 µs, less than 70 µs, less than 60 µs, less than 50 µs, less than 40 µs, less than 30 µs, less than 20 µs, less than 10 µs, less than 5 µs, or less than 1 µs. In some embodiments, the time bins have a value between 10 ms and 0.1 µs, between 5 ms and 0.1 µs, between 1 ms and 0.1 µs, between 0.5 ms and 0.1 µs, between 0.1 ms and 0.1 µs, between 90 µs and 0.1 µs, between 80 µs and 0.1 µs, between 70 µs and 0.1 µs, between 60 µs and 0.1 µs, between 50 µs and 0.1 µs, between 40 µs and 0.1 µs, between 30 µs and 0.1 µs, between 20 µs and 0.1 µs, between 10 µs and 0.1 µs, between 5 µs and 0.1 µs, or between 1 µs and 0.1 µs. In preferred embodiments, the time bins have a range of between 1 µs and 2 ms.

In certain embodiments, the detecting of the light intensity detects a single antibody associated with the biological nanoparticle. In particular embodiments, the detecting of the light intensity detects a single antibody comprising multiple detectable agents, wherein the antibody is associated with a biological nanoparticle. In some embodiments, the detecting of the light intensity detects a single antibody associated with at least one detectable agent, wherein the antibody is associated with a biological nanoparticle.

Detecting on a Particle-by-Particle Basis

As described herein, a plurality of biological nanoparticles can be detected using a particle-by-particle basis. The particle-by-particle basis of detection describes the detection of singular biological nanoparticles from the plurality of biological nanoparticles. In some embodiments, the particle-by-particle basis comprises single-file detection, wherein a portion of the plurality of biological nanoparticles are detected sequentially as the portion of the plurality of biological nanoparticles passes through a microfluidic channel or the constricted portion (the constriction of) a microfluidic channel. A particle-by-particle basis indicates physical separation between at least some of the plurality of biological nanoparticles.

In some embodiments, detecting at least one biological nanoparticle on a particle-by-particle basis comprises illuminating an individual biological nanoparticle, detecting an individual biological nanoparticle, or a combination thereof. As disclosed further herein, the detection of an individual biological nanoparticle, and/or illuminating an individual biological nanoparticle, can refer to a biological nanoparticle that is in a fluid sample comprising a plurality of biological nanoparticles, but is illuminated and/or detected absent any of the other biological nanoparticles of the plurality. The detection and/or illumination of an individual biological nanoparticle is distinct from the detection and/or illumination of an aggregation of biological nanoparticles (i.e., two or more biological nanoparticles attached to each other). As a non-limiting example, an individual biological nanoparticle can pass through a light beam, resulting in a light intensity that is detected. The individual biological nanoparticle can pass through the light beam in the absence of any of the other biological nanoparticles of the plurality, the individual biological nanoparticle thus being detected and/or illuminated by itself.

In some embodiments, the individual biological nanoparticle is surrounded by a solvent or fluid from the sample. In certain embodiments, the individual biological nanoparticle is completely surrounded by a solvent or fluid from the sample. An aggregation of two or more biological nanoparticles precludes each of the biological nanoparticles from the aggregation from being completely surrounded by a solvent or fluid from the sample. Accordingly, an aggregation of two or more biological nanoparticles is not an individual biological nanoparticle, and an individual biological nanoparticle is not an aggregation of two or more biological nanoparticles.

In some embodiments, a portion of the plurality of biological nanoparticles flows through a microfluidic channel, and at least one of the biological nanoparticles is detected as an individual biological nanoparticle. In some embodiments, a portion of the plurality of biological nanoparticles flows through a constriction of the microfluidic channel, and at least one of the biological nanoparticles is detected in the constriction as an individual biological nanoparticle. In certain embodiments, at least 1% of the portion of the detected biological nanoparticles from the plurality of biological nanoparticles is detected as an individual biological nanoparticle. In some embodiments, at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% of the portion of the plurality of detected biological nanoparticles is detected as an individual biological nanoparticle (i.e., on a particle-by-particle basis). In preferred embodiments, at least 90% of the detected biological nanoparticles from the portion of the plurality of biological nanoparticles is detected as an individual biological nanoparticle.

In some embodiments, a portion of the plurality of biological nanoparticles flows through a microfluidic channel, and at least one of the biological nanoparticles is illuminated as an individual biological nanoparticle. In some embodiments, a portion of the plurality of biological nanoparticles flows through a constriction of the microfluidic channel, and at least one of the biological nanoparticles is illuminated in the constriction as an individual biological nanoparticle. In certain embodiments, at least 1% of the portion of the plurality of illuminated biological nanoparticles is illuminated as an individual biological nanoparticle. In some embodiments, at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% of the portion of the plurality of the illuminated biological nanoparticles is illuminated as an individual biological nanoparticle (i.e., on a particle-by-particle basis). In preferred embodiments, at least 90% of the illuminated biological nanoparticles from the portion of the plurality of biological nanoparticles is illuminated as an individual biological nanoparticle.

In some embodiments, a portion of the plurality of biological nanoparticles flows through a microfluidic channel, and at least one of the biological nanoparticles is measured as an individual biological nanoparticle. In some embodiments, a portion of the plurality of biological nanoparticles flows through a constriction of the microfluidic channel, and at least one of the biological nanoparticles is measured in the constriction as an individual biological nanoparticle. In some embodiments, the detection or measurement occurs in a constriction present in the microfluidic channel. In certain embodiments, at least 1% of the portion of the plurality of measured biological nanoparticles is measured as an individual biological nanoparticle. In some embodiments, at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% of the portion of the plurality of measured biological nanoparticles is measured as an individual biological nanoparticle (i.e., on a particle-by-particle basis). In preferred embodiments, at least 90% of the measured biological nanoparticles from the portion of the plurality of biological nanoparticles is measured as an individual biological nanoparticle.

In some embodiments, a portion of the plurality of biological nanoparticles flows through a microfluidic channel, and comprises a void volume between the plurality of biological nanoparticles. In some embodiments, a portion of the plurality of biological nanoparticles flows through a constriction of the microfluidic channel, and comprises a void volume between the plurality of biological nanoparticles. The void volume describes a volume (and in a microfluidic channel having a width, describes a void distance) between individual biological nanoparticles in the portion of the plurality of biological nanoparticles. For example, a portion of biological nanoparticles can be separated from each other (i.e., are not aggregates) and have an average void distance between them. The value of a void distance and a void volume are directly related. The void volume can refer to the volume of fluid that passes through a microfluidic channel after the detection and/or illumination of one biological nanoparticle, and before the detection and/or illumination of another biological nanoparticle. In some embodiments, the void volume refers to the volume between biological nanoparticles passing sequentially through a microfluidic channel. In some embodiments, the void distance can refer to the distance between individual biological nanoparticles. In some embodiments, the average void distance between the portion of the plurality of biological nanoparticles is greater than 0.5-fold, greater than 1-fold, greater than 1.1-fold, greater than 1.2-fold, greater than 1.3-fold, greater than 1.4-fold, greater than 1.5-fold, greater than 1.6-fold, greater than 1.7-fold, greater than 1.8-fold, greater than 1.9-fold, greater than 2-fold, greater than 3-fold, greater than 4-fold, greater than 5-fold, greater than 6-fold, greater than 7-fold, greater than 8-fold, greater than 9-fold, greater than 10-fold, greater than 15-fold, greater than 20-fold, greater than 25-fold, greater than 50-fold, greater than 75-fold, greater than 100-fold, greater than 250-fold, greater than 500-fold, or greater than 1,000-fold the average hydrodynamic diameter of the portion of the plurality of biological nanoparticles.

In some embodiments, the average void distance is sufficient to have on average a single individual biological nanoparticle pass through a detection region and/or an illumination region of a microfluidic channel. In certain embodiments, the average void distance is sufficient to have at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% of the portion of the plurality of biological nanoparticles pass through the detection region and/or illumination region on a particle-by-particle basis. In preferred embodiments, the average void distance is sufficient to have at least 90% of the portion of the plurality of biological nanoparticles pass through the detection and/or illumination region on a particle-by-particle basis.

In some embodiments, the average distance between the portion of the plurality of biological nanoparticles is greater than the width of a detection region, an illumination region, or a combination thereof. A detection region, illumination region, or a combination thereof can describe a region of at least one microfluidic channel that is illuminated by a source of radiation (e.g., a source of illumination, thus forming an illumination region) and/or detected with a detector (thus forming a detection region). In some embodiments, the microfluidic channel comprises a constriction, and the constriction comprises the detection region. In some embodiments, the constriction is the detection region. In some embodiments, the average distance between the portion of the plurality of biological nanoparticles is greater than 0.5-fold, greater than 1-fold, greater than 1.1-fold, greater than 1.2-fold, greater than 1.3-fold, greater than 1.4-fold, greater than 1.5-fold, greater than 1.6-fold, greater than 1.7-fold, greater than 1.8-fold, greater than 1.9-fold, greater than 2-fold, greater than 3-fold, greater than 4-fold, greater than 5-fold, greater than 6-fold, greater than 7-fold, greater than 8-fold, greater than 9-fold, greater than 10-fold, greater than 15-fold, greater than 20-fold, greater than 25-fold, greater than 50-fold, greater than 75-fold, or greater than 100-fold the length of the detection region. In some embodiments, the average distance between the portion of the plurality of biological nanoparticles is greater than 0.5-fold, greater than 1-fold, greater than 1.1-fold, greater than 1.2-fold, greater than 1.3-fold, greater than 1.4-fold, greater than 1.5-fold, greater than 1.6-fold, greater than 1.7-fold, greater than 1.8-fold, greater than 1.9-fold, greater than 2-fold, greater than 3-fold, greater than 4-fold, greater than 5-fold, greater than 6-fold, greater than 7-fold, greater than 8-fold, greater than 9-fold, greater than 10-fold, greater than 15-fold, greater than 20-fold, greater than 25-fold, greater than 50-fold, greater than 75-fold, or greater than 100-fold the length of the illumination region. As a non-limiting example, the illumination region can comprise a beam of light having a width, and the average distance between the portion of the plurality of biological nanoparticles is greater than the width of the beam of light.

In some embodiments, a portion of the plurality of biological nanoparticles flows through a channel at a rate sufficient to allow for the detection of individual biological nanoparticles from the portion of the plurality of biological nanoparticles. In some embodiments, the portion of the plurality of biological nanoparticles flows through the channel at a rate of fewer than 300,000 biological nanoparticles per second, fewer than 200,000 biological nanoparticles per second, fewer than 100,000 biological nanoparticles per second, fewer than 75,000 biological nanoparticles per second, fewer than 50,000 biological nanoparticles per second, or fewer than 25,000 biological nanoparticles per second, fewer than 15,000 biological nanoparticles per second, fewer than 10,000 biological nanoparticles per second, fewer than 5,000 biological nanoparticles per second, or fewer than 1,000 biological nanoparticles per second. In preferred embodiments, the portion of the plurality of biological nanoparticles flows through the channel at a rate of fewer than 50,000 biological nanoparticles per second.

In some embodiments, detecting a portion of a plurality of biological nanoparticles on a particle-by-particle basis comprises detecting at least two of the biological nanoparticles sequentially. As the portion of the plurality of biological nanoparticles flow through a microfluidic channel, the plurality of biological nanoparticles can have an average distance between them (e.g., having a void distance as described above) sufficient to detect the at least two biological nanoparticles individually. In some embodiments, the portion of the plurality of biological nanoparticles flow through a constriction of a microfluidic channel, and the plurality of biological nanoparticles can have an average distance between them (e.g., having a void distance as described above) sufficient to detect the at least two biological nanoparticles individually. The at least two biological nanoparticles can pass through a detection region and/or illumination region of the microfluidic channel one at a time (i.e., not aggregated together) and are thus illuminated and/or detected sequentially (i.e., one after the other). In some embodiments, at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% of the biological nanoparticles from the portion of the plurality of the illuminated biological nanoparticles (i.e., the biological nanoparticles that are illuminated) are illuminated sequentially, detected sequentially, or a combination thereof. In preferred embodiments, at least 90% of the biological nanoparticles from the portion of the plurality of the illuminated biological nanoparticles are illuminated sequentially, detected sequentially, or a combination thereof.

In some embodiments, the method comprises detecting a signal from at least one of the plurality of biological nanoparticles, and the signal comprises an emission from the at least one biological nanoparticle. In some embodiments, the signal comprises an emission intensity, an emission wavelength, or a combination thereof. The signal can comprise a background noise value. The background noise can describe the detected signal when none of the plurality of biological nanoparticles is detected (e.g., when none of the plurality of biological nanoparticles pass through a detection region). In some embodiments, the signal comprises an emitted light intensity from at least one biological nanoparticle of the plurality of biological nanoparticles, and the background noise comprises the absence of the signal emitted from the at least one biological nanoparticle. In some embodiments, as a biological nanoparticle flows through the detection region, an emitted light intensity is observed and detected, and as the biological nanoparticle flows out of the detection region, the observed light intensity decreases to background noise value. In some embodiments, detecting on a particle-by-particle basis comprises detecting a first light intensity emitted from a first biological nanoparticle flowing through a microfluidic channel, the detected light intensity decreasing to the background noise value, and detecting a second light intensity emitted from a second biological nanoparticle flowing through the microfluidic channel. In certain embodiments, detecting on a particle-by-particle basis comprises detecting a first light intensity emitted from a first biological nanoparticle flowing through a microfluidic channel, the detected light intensity decreasing to less than 90%, less than 80%, less than 70%, less than 60%, less than 50%, less than 40%, less than 30%, less than 25%, less than 20%, less than 15%, less than 10%, less than 9%, less than 8%, less than 7%, less than 6%, less than 5%, less than 4%, less than 3%, less than 2%, or less than 1% of the peak intensity value, and detecting a second light intensity emitted from a second biological nanoparticle flowing through the microfluidic channel. In preferred embodiments, detecting on a particle-by-particle basis comprises detecting a first light intensity emitted from a first biological nanoparticle flowing through a microfluidic channel (or a constriction of a microfluidic channel), the detected light intensity decreasing to less than 10% of the peak intensity value, and detecting a second light intensity emitted from a second biological nanoparticle flowing through the microfluidic channel (or the constriction of the microfluidic channel). In certain embodiments, the detection of a first biological nanoparticle followed by a decrease in light intensity (e.g., to less than 20% of the peak light intensity), followed by the detection of a second biological nanoparticle describes the detection of a portion of the plurality of biological nanoparticles on a particle-by-particle basis.

In some embodiments, the particle-by-particle basis comprises the physical separation between at least some of the plurality of biological nanoparticles. A biological nanoparticle that is physically separated from other biological nanoparticles is a biological nanoparticle that is not directly contacted with any of the other biological nanoparticles from the plurality of biological nanoparticles. In some embodiments, at least 0.5%, at least 1%, at least 2%, at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% of the biological nanoparticles from a portion of the plurality of biological nanoparticles are physically separated from any of the other biological nanoparticles in the portion of the plurality of biological nanoparticles. In preferred embodiments, at least 90% of the biological nanoparticles from a portion of the plurality of biological nanoparticles are physically separated from any of the other biological nanoparticles in the portion of the plurality of biological nanoparticles.

In some embodiments, detecting on a particle-by-particle basis uses an apparatus and/or system comprising a microfluidic chip comprising a plurality of microfluidic channels, and a radiation source illuminating the plurality of microfluidic channels. In some embodiments, the plurality of microfluidic channels are in a parallel configuration. The system and/or apparatus can comprise a source of radiation, wherein the source for radiation illuminates the plurality of microfluidic channels. In some embodiments, the source for radiation illuminates the plurality of microfluidic channels at an angle perpendicular to the microfluidic channels. In some embodiments, the apparatus and/or system further comprises a plurality of detectors, each detector set up to detect a region of a single microfluidic channel. As a non-limiting example, a microfluidic chip can comprise 10 microfluidic channels in parallel, and a source for radiation can illuminate the 10 microfluidic channels; 10 detectors can be arrayed to detect signals from each of the 10 microfluidic channels, with each detector being paired with a single microfluidic channel.

In some embodiments, detecting on a particle-by-particle basis uses an apparatus and/or system comprising a microfluidic chip comprising a plurality of microfluidic channels, and a plurality of radiation sources illuminating the plurality of microfluidic channels. In some embodiments, the plurality of microfluidic channels are in a parallel configuration. The system and/or apparatus can comprise a plurality of sources of radiation, wherein the sources for radiation illuminate the plurality of microfluidic channels. In some embodiments, the sources for radiation illuminate the plurality of microfluidic channels at angles perpendicular to the microfluidic channels. In some embodiments, the apparatus and/or system further comprises a plurality of detectors, each detector set up to detect a region of a single microfluidic channel. As a non-limiting example, a microfluidic chip can comprise 10 microfluidic channels in parallel, and four sources for radiation can illuminate the 10 microfluidic channels at 5 μm intervals; 10 detectors can be arrayed to detect signals from each of the 10 microfluidic channels, with each detector being paired with a single microfluidic channel.

Assigning a Size Value to Biological Nanoparticles

As described herein, a biological nanoparticle can emit a light intensity. In some embodiments a source for interrogating activates the light intensity. The present disclosure provides for methods of detecting the light intensity emitted by a biological nanoparticle. In specific embodiments, this disclosure provides for a method of measuring the light intensity emitted by a biological nanoparticle and assigning a size value to the biological nanoparticle. In specific embodiments, the size value corresponds with the light intensity. In certain embodiments, the size value is assigned according to the light intensity.

In particular embodiments, the present disclosure provides for methods comprising detecting a light intensity from a biological nanoparticle while the particle is in transit through a microfluidic chip. In particular embodiments, the microfluidic chip comprises translucent or transparent characteristics. For example, a microfluidic chip that comprises at least one surface that is translucent or transparent may be provided a fluidic sample comprising a biological nanoparticle, and the at least one translucent or transparent surface allows the source of interrogating to interact with the biological nanoparticle, such that the biological nanoparticle emits a light intensity that passes through the at least one surface that is translucent or transparent, such that it is detected. In particular embodiments, the light intensity from the biological nanoparticle is detected while in transit through the microfluidic chip, wherein the transit comprises uninterrupted flow.

In some embodiments, the assignment of a size value is binary. In specific embodiments, a positive size value is assigned to a bionanoparticle emitting a light intensity above a threshold value, while a negative size value is assigned to the remaining fluidic sample. In some embodiments, the threshold value is a relative threshold value. In certain embodiments, the threshold value is greater than 10 detected photons, greater than 100 detected photons, greater than 1,000 detected photons, greater than 10,000 detected photons, greater than 100,000 detected photons, greater than 1,000,000 detected photons, greater than 10,000,000 detected photons, or greater than 100,000,000 detected photons. In a preferred embodiment, the threshold value is greater than 10 detected photons. In certain embodiments wherein the assignment of a size value is binary, the sized value assigned to a biological nanoparticle can be either zero or non-zero.

In some embodiments, a nanoparticle is assigned a size value that is relative. In specific embodiments, the relative size value correlates with a relative light intensity emitted by the biological nanoparticle. As a non-limiting example, a first biological nanoparticle emitting a large amount of light intensity can be assigned a high relative size value, while a second biological nanoparticle emitting a low amount of light intensity can be assigned a low relative size value. In some embodiments, a fluid sample can comprise biological nanoparticles having a plurality of relative size values. Relative size values can be organized into bins, such that bionanoparticles that emit similar intensities of light can be grouped together, and assigned a same relative size value. A fluid sample can comprise more than 1 bin, more than 2 bins, more than 3 bins, more than 4 bins, more than 5 bins, more than 6 bins, more than 7 bins, more than 8 bins, more than 9 bins, more than 10 bins, more than 15 bins, more than 20 bins, more than 25 bins, more than 30 bins, more than 40 bins, more than 50 bins, more than 60 bins, more than 70 bins, more than 80 bins, more than 90 bins, more than 100 bins, more than 200 bins, more than 300 bins, more than 500 bins, more than 1,000 bins, or more than 5,000 bins. As a non-limiting example, a fluid sample comprising a plurality of biological nanoparticles can have a light emission scale with a relative minimum of 0 and a relative maximum of 1.0, and five bins set for values of relative emission, wherein the first bin allocates bionanoparticles with an emission of 0.0-0.2, the second bin allocates nanoparticles having an emission of 0.21-0.4, the third bin allocates nanoparticles having an emission of 0.41-0.6, the fourth bin allocates nanoparticles having an emission of 0.61-0.8, and the fifth bin allocates nanoparticles having an emission of 0.81-1.0. Analysis of the fluidic sample can result in the allocation of each detected nanoparticle into its corresponding bin based on its detected light emission, thus assigning the nanoparticle a relative size value. The number of nanoparticles assigned to each bin can be counted, and a histogram can be generated. In this manner, a plurality of biological nanoparticles can be assigned relative size values, wherein each relative size value is determined by a difference in the measured light intensity.

In some embodiments, the actual size value of a biological nanoparticle is determined by calibrating the measured light intensity with a standard. In some embodiments, a calibration of the measuring of light intensity occurs prior to the measuring of the biological nanoparticle light intensity, and thereafter the measured light intensity correlates with the actual size value of the biological nanoparticle. In other embodiments, the calibration of the measuring of light intensity occurs after the measuring of the biological nanoparticle light intensity, and the measured light intensity correlates with a relative size value. In certain embodiments, a relative size value can be assigned an actual size value following calibration with a standard. In some embodiments, the standard comprises a gold nanoparticle. In certain embodiments, the standard comprises a plurality of lipids. In some embodiments, the standard comprises a lipid vesicle. In certain embodiments, the standard comprises a silica bead, a polystyrene bead, a silicone bead, a polymer bead, a polymer nanoparticle, or a combination thereof. In some embodiments, wherein the fluid sample comprises a second biological nanoparticle, the standard comprises the second biological nanoparticle. In some embodiments, the standard is measured with dynamic light scattering.

In specific embodiments, wherein the standard is a second biological nanoparticle from the fluid sample, the second biological nanoparticle is the same as the first type of biological nanoparticle. In other embodiments, the second biological nanoparticle is different from the first biological nanoparticle. The true size value of a second biological nanoparticle may be determined using means known in the art, e.g., dynamic light scattering or TEM microscopy, and the light intensity emitted by the second biological nanoparticle can inform the size value of the first biological nanoparticle. In some embodiments, the determining of the size of the second biological nanoparticle occurs prior to the measure of light intensity from the second biological nanoparticle. In other embodiments, the determining of the size of the second biological nanoparticle occurs after the measure of light intensity from the second biological nanoparticle. For example, a first portion of a fluid sample comprising a plurality of biological nanoparticles may be processed using the methods disclosed herein through a microfluidic chip and assigned relative size values to generate a histogram, as disclosed further herein. A second portion of the fluid sample can be analyzed using dynamic light scattering or TEM microscopy, and true size values assigned to the biological nanoparticles. The second portion may then be processed through the microfluidic chip in the same manner as the first portion, and the resulting true size histogram can be used to assign the true size value to the biological nanoparticles of the first portion of the fluid sample. In at least this manner, a standard may comprise at least one of the biological nanoparticles from the fluid sample.

In assigning a size value to a bionanoparticle by correlating the size value with a relative light intensity emitted by the biological nanoparticle, it is important to ensure the measured light intensities do not vary from run-to-run or sample-to-sample because of measurement variabilities, and that the difference in the measured light intensities are indeed caused by the difference in the bionanoparticles. This requirement can be difficult to meet in practice, because measured light intensities can be affected by many experimental variabilities that are difficult to control, including the exact z-position of the laser line in the microchannel, or variabilities that can exist from chip-to-chip (e.g., thickness of the coverslip that forms the floor of the microchannel and is in contact with the objective), instrument drifts (e.g., laser or detector alignment), or small uncontrolled variabilities in operational conditions (e.g., flow rate). To overcome these issues, an internal standard can be employed, using the back reflected light intensities or scattered light intensities from gold nanoparticles. For this operation, gold nanoparticles are particularly advantageous because: 1) gold nanoparticles are readily available in different sizes, which allows one to choose the size that would best match the desired detected light intensities in the detection channel; 2) the back-reflected light intensities or scattered light intensities of gold nanoparticles allow their use with any laser excitation wavelength, and thus any color channel; 3) gold nanoparticles can be homogeneous in size or diameter, which can minimize their detected light intensity distribution and thus can facilitate internal calibration and improve quantification accuracy; 4) the surface of gold nanoparticles can be readily modified, such as with PEG so that they do not self-aggregate or non-specifically attach to bionanoparticles or to the microchannel surface; and 5) gold nanoparticles can be robust and do not degrade or aggregate even during long-term (e.g., more than one month) storage.

In some embodiments, the assigning of a size value to a biological nanoparticle comprises the use of a modulation index. In a specific embodiment, the assigning of a size value to a biological nanoparticle comprises the use of an amplitude modulation index. In another embodiment, the assigning of a size value to a biological nanoparticle comprises the use of a frequency modulation index. In yet another embodiment, the assigning of a size value to a biological nanoparticle comprises the use of a phase modulation index. The use of a modulation index indicates by how much the modulated emission of light intensity varies around the unmodulated level. As a non-limiting example, a fluidic sample may comprise bioparticles that autofluoresce when excited by a source for interrogating. The application of a modulation index (e.g., an amplitude modulation index) can account for the background light intensity, providing for a more accurate size value.

In certain embodiments, the size value comprises a range of values. In some embodiments, the difference between the largest value and the smallest value of the range of values is less than 1 micrometer, 500 nanometers, 200 nanometers, 100 nanometers, is less than 80 nanometers, is less than 50 nanometers, is less than 40 nanometers, is less than 30 nanometers, is less than 20 nanometers, is less than 15 nanometers, is less than 10 nanometers, or is less than 5 nanometers. For example, a size value comprising a hydrodynamic diameter range of 40-100 nanometers has a range of values of 60 nanometers.

In some embodiments, the assigning of a size value uses (a) the excitation of the biological nanoparticle by a source for interrogating, and (b) the measure of light intensity emitted by the biological nanoparticle. As described herein, the light intensity can comprise scattered light, fluorescent light, luminescent light, or a combination thereof. In certain embodiments, the source for interrogating uses a light beam modified by stimulated emission depletion (STED). The use of STED provides for increased precision when assigning size values to the biological nanoparticles. In certain embodiments, the source for interrogating uses a plurality of light beams, and in certain embodiments, the plurality of light beams are modified by STED.

In certain embodiments, the size value of the biological nanoparticle is a hydrodynamic diameter. In specific embodiments, the hydrodynamic diameter is less than 1,000 nanometers, less than 900 nanometers, less than 800 nanometers, less than 700 nanometers, less than 600 nanometers, less than 500 nanometers, less than 400 nanometers, less than 300 nanometers, less than 200 nanometers, less than 150 nanometers, less than 100 nanometers, less than 90 nanometers, less than 80 nanometers, less than 70 nanometers, less than 60 nanometers, less than 50 nanometers, less than 40 nanometers, or less than 30 nanometers. In preferred embodiments, the hydrodynamic diameter is less than 100 nanometers. In certain embodiments, the hydrodynamic diameter is determined by measuring dynamic light scattering (DLS), and refers to the size of a hard sphere that diffuses light in the same fashion as that of the biological nanoparticle being measured.

In some embodiments, the hydrodynamic diameter is between 1,000 nanometers and 10 nanometers, between 900 nanometers and 10 nanometers, between 800 nanometers and 10 nanometers, between 700 nanometers and 10 nanometers, between 600 nanometers and 10 nanometers, between 500 nanometers and 10 nanometers, between 400 nanometers and 10 nanometers, between 300 nanometers and 10 nanometers, between 200 nanometers and 10 nanometers, between 100 nanometers and 10 nanometers, between 90 nanometers and 10 nanometers, between 80 nanometers and 10 nanometers, between 70 nanometers and 10 nanometers, between 60 nanometers and 10 nanometers, between 50 nanometers and 10 nanometers, or between 40 nanometers and 10 nanometers. In certain embodiments, the hydrodynamic diameter is between 1,000 nanometers and 800 nanometers, between 800 nanometers and 600 nanometers, between 600 nanometers and 400 nanometers, between 400 nanometers and 200 nanometers, or between 200 nanometers and 10 nanometers. In preferred embodiments, the hydrodynamic diameter is between 200 nanometers and 20 nanometers. In a more preferred embodiment, the hydrodynamic diameter is between 100 nanometers and 40 nanometers. Unless noted otherwise, the term "between" when used in the context of two values is inclusive of the outlying values (e.g., between 40 nanometers and 10 nanometers encompasses all values from 10 nanometers to 40 nanometers, including 10 nanometers and 40 nanometers).

In some embodiments, the assigning of a size value to a biological nanoparticle uses a duty cycle. A duty cycle may be defined as a detection method having a binary on/off cycle, wherein the on cycle correlates with the detection of light intensity from the biological nanoparticle above a threshold value, and wherein the off cycle correlates with a lack of detection of light intensity above a threshold value. The duty cycle is the fraction of a period in which the detection of light intensity is observed above the threshold value. The duty cycle ratio may be expressed as $D=(T_{on}/T_{total})$, wherein D is the duty cycle ratio, $T_{on}$ is the time that the observed light intensity is above the threshold value, and $T_{total}$ is a total measurement time. For example, a biological nanoparticle that emits a light intensity above the threshold value of detection can pass through the source for interrogating, and when the light intensity is detected, the duty is in an on state. When the nanoparticle passes out of the source for interrogating, the light intensity drops below the threshold value of detection and the duty is in an off state. The size of a source for interrogating is its pulse width. In certain embodiments, a plurality of sources for interrogating may be used to calculate a duty cycle, and the plurality of sources for interrogating are spatially separated. In specific embodiments, two sources for interrogating can be used to calculate a duty cycle. In other embodiments, three sources for interrogating can be used to calculate a duty cycle, four sources for interrogating can be used to calculate a duty cycle, five sources for interrogating can be used to calculate a duty cycle, or more than five sources for interrogating can be used to calculate a duty cycle. In some embodiments, the plurality of sources for interrogating comprise sources for interrogating having the same pulse width. In other embodiments, the plurality of sources for interrogating comprise sources for interrogating having different pulse widths. In preferred embodiments, the spatial separation between the plurality of sources for interrogating comprises a zero length. As used herein, a "zero length" is a region through which the biological nanoparticle travels between sources for interrogating, wherein light intensity emitted by the bionanoparticle above the threshold value is not observed. The calculated duty cycle ratio can provide a size value for the biological nanoparticles that pass through the sources for interrogating. In certain embodiments, a small biological nanoparticle will have a small duty cycle (e.g., the amount of time spent with an "on" state is small when compared to the amount of time spent with an "off" state), while in comparison a large biological nanoparticle will have a large duty cycle (e.g., the amount of time spent with an "on" state is large when compared to the amount of time spent with an "off" state). The time wherein the duty is in an off state is $T_{off}$, which equals $T_{total}-T_{on}$. In other embodiments different combinations of $T_{off}$, $T_{on}$ and $T_{total}$ (such as $T_{off}/T_{total}$ or $T_{off}/T_{on}$) could be used instead of D.

Sorting and Analyzing Biological Nanoparticles

In one aspect, the present disclosure provides methods and apparatuses for measuring, detecting, and/or sorting biological nanoparticles in a fluid sample. In one embodiment, the methodology can be characterized as (i) detecting the presence or absence of a biological nanoparticle, (ii) ranking the biological nanoparticle according to a size value, and (iii) directing the flow or collection of the biological nanoparticle based on the assigned ranking. In certain embodiments, the detection components can detect a single molecule associated with the biological nanoparticle. In some embodiments, the ranking of the nanoparticle includes parameters other than the size value.

A non-limiting example of the method and apparatus for measuring, detecting, and/or sorting biological nanoparticles in a fluid sample can be seen at FIG. 16. A fluidic sample comprising a plurality of biological nanoparticles, some of which are associated with a detectable agent (1602), are introduced into a microfluidic chip (1603) comprising an inlet and two outlets connected by microfluidic channels. The bionanoparticles flow through the inlet channel (1642) toward a detection region (1604), where the size value and association (or lack of association) of the detectable agent with the biological nanoparticle can be determined. A bionanoparticle associated with the detectable agent (1641) is given a positive value and travels downstream, where it is sorted (mechanism for directing flow not pictured) to a positive microfluidic channel (1621), leading to an enrichment container or further processing. Positively sorted bionanoparticles (1661) can travel through a second detection region (1622), which can confirm whether the correct sorting has taken place. Biological nanoparticles that are not associated with the detectable agent (1601) are assigned a negative value and travel downstream, where they are sorted to a negative microfluidic channel (1611). The negatively sorted bionanoparticles (1651) can be transported to a waste container.

As used herein, a "fluid sample" refers to any liquid that may contain a biological nanoparticle of interest. In preferred embodiments, the fluid sample comprises a bodily fluid. In certain embodiments, the fluid sample may be a biological fluid sample, for example a serum sample, a plasma sample, a saliva sample, a urine sample, a milk sample, a synovial sample, an amniotic sample, a lymph sample, a spinal fluid sample, and the like. In specific embodiments, the bodily fluid comprises serum, plasma, spinal fluid, or lymph fluid.

As used herein, the term "ranking" refers to assessing a quantitative property, qualitative property, or importance of a biological nanoparticle by categorization. In one embodiment, a biological nanoparticle may be ranked as either null (for example, when a biological nanoparticle is not detected) or nonzero (for example, when a biological nanoparticle is detected). In one embodiment, the ranking may be binary. In other embodiments, a biological nanoparticle may be ranked according to additional categories, for example, which correlate with the size value of the bionanoparticle, the identity of the nanoparticle, a detectable characteristic of the biological nanoparticle, a detectable agent associated with the biological nanoparticle, and the like. In this fashion, any number of categories may be assigned. These rankings may be assigned an arbitrary number corresponding to one of a number of predetermined quantitative or qualitative categories (e.g., 0, 1, 2, 3, 4, 5, etc.), or a number corresponding to an actual value for the biological nanoparticle (e.g., its size value).

As used herein, a "detectable characteristic" refers to a property associated with a biological nanoparticle of interest, for example, a photoactive, electroactive, bioactive, or magnetic property that is intrinsic to the bionanoparticle or which is associated with the biological nanoparticle.

Examples of photoactive properties include, for example, alterations in optical light intensity (optical reflection, scattering, deflection, transmission, or absorbance) commonly induced by bionanoparticle morphology (particle size, granularity, internal subcellular structures), fluorescence, immunofluorescence, and the like.

Examples of bioactive properties include, for example, detectable interactions with enzymes such as esterases, phosphatases, lipases, peroxidases, galactosidases, and their fluorescent or fluorogenic substrates, or their chemiluminescent or chemifluorescent substrates.

In certain embodiments, moieties that can be used to detect a biological nanoparticle include, without limitation, antibodies and fragments thereof, fluorescent antibodies, polymer molecules, dye molecules, DNA or RNA molecules (e.g. aptamers), protein molecules, lipid molecules (e.g., fluorescent dyes that associate with lipids), and the like.

As used herein an "antibody" refers to a polypeptide comprising a framework region from an immunoglobulin gene or fragments thereof that specifically binds and recognizes an antigen. The recognized immunoglobulin genes include the kappa, lambda, alpha, gamma, delta, epsilon, and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD and IgE, respectively. Typically, the antigen-binding region of an antibody will be most critical in specificity and affinity of binding. Antibodies can be polyclonal or monoclonal, derived from serum, a hybridoma or recombinantly cloned, and can also be chimeric, primatized, or humanized.

An exemplary immunoglobulin (antibody) structural unit comprises a tetramer. Each tetramer is composed of two identical pairs of polypeptide chains, each pair having one "light" (about 25 kD) and one "heavy" chain (about 50-70 kD). The N-terminus of each chain defines a variable region of about 100 to 110 or more amino acids primarily responsible for antigen recognition. The terms variable light chain (VL) and variable heavy chain (VH) refer to these light and heavy chains respectively.

Antibodies exist, e.g., as intact immunoglobulins or as a number of well-characterized fragments produced by digestion with various peptidases. Thus, for example, pepsin digests an antibody below the disulfide linkages in the hinge region to produce F(ab)'$_2$ a dimer of Fab which itself is a light chain joined to $V_H$-$C_H$1 by a disulfide bond. The F(ab)'$_2$ may be reduced under mild conditions to break the disulfide linkage in the hinge region, thereby converting the F(ab)'$_2$ dimer into an Fab' monomer. The Fab' monomer is essentially Fab with part of the hinge region (see *Fundamental Immunology* (Paul ed., 3d ed. 1993). While various antibody fragments are defined in terms of the digestion of an intact antibody, one of skill will appreciate that such fragments may be synthesized de novo either chemically or by using recombinant DNA methodology. Thus, the term antibody, as used herein, also includes antibody fragments either produced by the modification of whole antibodies, or those synthesized de novo using recombinant DNA methodologies (e.g., single chain Fv) or those identified using phage display libraries (see, e.g., McCafferty et al., *Nature*, 348:552-554 (1990)).

In one embodiment, the antibody is conjugated to a label or detectable moiety. In certain embodiments, the antibody is associated with the biological nanoparticle. In particular embodiments, a biological nanoparticle is associated with an antibody, the antibody comprising multiple detectable agents. In certain embodiments, a biological nanoparticle is associated with an antibody, and the antibody is associated with multiple detectable agents. In some embodiments, a biological nanoparticle is associated with an antibody, and the antibody is associated with at least one detectable agent.

As used herein, a "label" or a "detectable moiety" refers to a composition detectable by spectroscopic, photochemical, biochemical, immunochemical, chemical, or other physical means. For example, useful labels include, without limitation radionuclides, fluorescent dyes (e.g., fluorescein, fluorescein isothiocyanate (FITC), Oregon Green™, Alexa™, rhodamine, Texas red, tetrarhodimine isothiocynate (TRITC), Cy3, Cy5, etc.), fluorescent markers (e.g., green fluorescent protein (GFP), phycoerythrin, etc.), autoquenched fluorescent compounds that are activated by tumor-associated proteases, enzymes (e.g., luciferase, esterase, lipase, peroxidase, phosphatase, etc.), nanoparticles, biotin, digoxigenin, and the like.

In certain embodiments, detection reagents may be perfused to selectively label biological nanoparticles of interest. Examples of such reagents include, without limitation, fluorescent, immunofluorescent, dye-conjugated molecules (such as antibodies, fab fragments, aptamers, polymers, ligands, agonists, antagonists, or combinations thereof)

magnetic, electroactive, bioactive, or photoactive compounds. An example is to use a stain that reacts with exosomes. Other dye examples include fluorescein isothiocyanate (FITC)-conjugated mouse anti-human epithelial antibody (HEA) and phycoerythrin (PE)-conjugated anti-CD63. Other examples of dye-conjugated antibodies include but are not limited to those that target tetraspanins (e.g. CD9, CD63 and CD81), heat shock proteins (e.g. HSC70 and HSC90), membrane transporters (e.g. GTPases) and lipid-bound proteins, a cell-adhesion protein, a lipid bound protein, a transmembrane protein, an enzyme, the pan-cytokeratin antibody A45B/B3, AE1/AE3, or CAM5.2 (pan-cytokeratin antibodies that recognize Cytokeratin 8 (CK8), Cytokeratin 18 (CK18), or Cytokeratin 19 (CK19) and ones against: breast cancer antigen NY-BR-1 (also known as B726P, ANKRD30A, Ankyrin repeat domain 30A); B305D isoform A or C (B305D-A ro B305D-C; also known as antigen B305D); Hermes antigen (also known as Antigen CD44, PGP1); E-cadherin (also known as Uvomorulin, Cadherin-1, CDH1); Carcino-embryonic antigen (CEA; also known as CEACAM5 or Carcino-embryonic antigen-related cell adhesion molecule 5); β-Human chorionic gonadotophin (β-HCG; also known as CGB, Chronic gonadotrophin, (β polypeptide); Cathepsin-D (also known as CTSD); Neuropeptide Y receptor Y3 (also known as NPY3R; Lipopolysaccharide-associated protein3, LAP3, Fusion; Chemokine (CXC motif, receptor 4); CXCR4); Oncogene ERBB1 (also known as c-erbB-1, Epidermal growth factor receptor, EGFR); Her-2 Neu (also known as c-erbB-2 or ERBB2); GABA receptor A, pi (π) polypeptide (also known as GABARAP, GABA-A receptor, pi (π) polypeptide (GABA A(π), γ-Aminobutyric acid type A receptor pi (π) subunit), or GABRP); ppGalNac-T(6) (also known as β-1-4-N-acetyl-galactosaminyl-transferase 6, GalNActransferase 6, GalNAcT6, UDP-N-acetyl-d-galactosamine:polypeptide N-acetylgalactosaminyltransferase 6, or GALNT6); CK7 (also known as Cytokeratin 7, Sarcolectin, SCL, Keratin 7, or KRT7); CK8 (also known as Cytokeratin 8, Keratin 8, or KRT8); CK18 (also known as Cytokeratin 18, Keratin 18, or KRT18); CK19 (also known as Cytokeratin 19, Keratin 19, or KRT19); CK20 (also known as Cytokeratin 20, Keratin 20, or KRT20); Mage (also known as Melanoma antigen family A subtypes or MAGE-A subtypes); Mage3 (also known as Melanoma antigen family A 3, or MAGA3); Hepatocyte growth factor receptor (also known as HGFR, Renal cell carninoma papillary 2, RCCP2, Protooncogene met, or MET); Mucin-1 (also known as MUC1, Carcinoma Antigen 15.3, (CA15.3), Carcinoma Antigen 27.29 (CA 27.29); CD227 antigen, Episialin, Epithelial Membrane Antigen (EMA), Polymorphic Epithelial Mucin (PEM), Peanut-reactive urinary mucin (PUM), Tumor-associated glycoprotein 12 (TAG12)); Gross Cystic Disease Fluid Protein (also known as GCDFP-15, Prolactin-induced protein, PIP); Urokinase receptor (also known as uPR, CD87 antigen, Plasminogen activator receptor urokinase-type, PLAUR); PTHrP (parathyroid hormone-related proteins; also known as PTHLH); BS106 (also known as B511S, small breast epithelial mucin, or SBEM); Prostatein-like Lipophilin B (LPB, LPHB; also known as Antigen BU101, Secretoglobin family 1-D member 2, SCGB1-D2); Mammaglobin 2 (MGB2; also known as Mammaglobin B, MGBB, Lacryglobin (LGB) Lipophilin C (LPC, LPHC), Secretoglobin family 2A member 1, or SCGB2A1); Mammaglobin (MGB; also known as Mammaglobin 1, MGB1, Mammaglobin A, MGBA, Secretoglobin family 2A member 2, or SCGB2A2); Mammary serine protease inhibitor (Maspin, also known as Serine (or cystein) proteinase inhibitor clade B (ovalbumin) member 5, or SERPINBS); Prostate epithelium-specific Ets transcription factor (PDEF; also known as Sterile alpha motif pointed domain-containing ets transcription factor, or SPDEF); Tumor-associated calcium signal transducer 1 (also known as Colorectal carcinoma antigen CO17-1A, Epithelial Glycoprotein 2 (EGP2), Epithelial glycoprotein 40 kDa (EGP40), Epithelial Cell Adhesion Molecule (Ep-CAM), Epithelial-specific antigen (ESA), Gastrointestinal tumor-associated antigen 733-2 (GA733-2), KS1/4 antigen, Membrane component of chromosome 4 surface marker 1 (M4S1), MK-1 antigen, MIC18 antigen, TROP-1 antigen, or TACSTD1); Telomerase reverse transcriptase (also known as Telomerase catalytic subunit, or TERT); Trefoil Factor 1 (also known as Breast Cancer Estrogen-Inducible Sequence, BCEI, Gastrointestinal Trefoil Protein, GTF, pS2 protein, or TFF1); folate; Trefoil Factor 3 (also known as Intestinal Trefoil Factor, ITF, p1.B; or TFF3); HSPA8, Actin, β (ACTB), Glyceraldehyde-3-phosphate dehydrogenase (GAPDH), Enolase 1, α (ENO1), Heat shock protein 90, α (cytosolic), class A member 1 (HSP90AA1), CD9 antigen (CD9), CD81 antigen (CD81), Tyrosine 3-monooxygenase/tryptophan 5-monooxygenase activation protein, zeta polypeptide (YWHAZ), or Pyruvate kinase, muscle (PKM2).

The phrase "specifically (or selectively) binds" to an antibody or "specifically (or selectively) immunoreactive with," when referring to a biological nanoparticle, refers to a binding reaction that is determinative of the presence of the bionanoparticle of interest, often in a heterogeneous population of nanoparticles and other biologics. Thus, under designated immunoassay conditions, the specified antibodies bind to a particular biological nanoparticle at least two times greater than the background and more typically more than 10 to 100 times greater than the background. Specific binding to an antibody under such conditions requires an antibody that is selected for its specificity for a particular biological nanoparticle. For example, polyclonal antibodies can be selected to obtain only those polyclonal antibodies that are specifically immunoreactive with the selected antigen and not with other proteins. This selection may be achieved by subtracting out antibodies that cross-react with other molecules.

In some embodiments of the methods provided herein, multiple parameters are detected in a single measurement. In certain embodiments, the multiple parameters include different size values. In some embodiments, the multiple parameters include the presence or absence of detectable agents.

In some embodiments, the biological nanoparticle ranking is binary, for example an assigned value of "0" is applied if a biological nanoparticle of interest is not detected, and a value of "1" is assigned if the bionanoparticle is detected. In other embodiments, the ranking is non-binary, for example, the value is assigned based on the size of the biological nanoparticle or the identity of the biological nanoparticle. In certain embodiments, the ranking is performed by a computer and a software representing a ranking algorithm. In certain embodiments, the measuring is performed by a computer and a software representing a measuring algorithm.

In some embodiments, the methods provided herein further comprise a step of channeling the biological nanoparticles based on their ranking. For example, the flow or collection of the biological nanoparticle is directed based on the value assigned to the biological nanoparticle. In certain embodiments, this is achieved by the use of external fields or by creating flow disturbances. In specific embodiments, this is achieved using a mechanism for directing flow. In certain embodiments, the directing of flow and/or the control of the mechanism for directing flow is performed by a computer and a software representing a directing algorithm.

In certain embodiments, the method may comprise concentrating the biological nanoparticles of interest by collecting and/or pooling biological nanoparticles with similar ranking. In specific embodiments, the concentrating of biological nanoparticles is a result of directing flow. For example, biological nanoparticles having a size value of interest may be directed to a specific flow channels, and may be collected in a collecting device at the end of the flow channel, resulting in an increased local concentration of the biological nanoparticles having the size value.

In another aspect, the present disclosure provides a device configured to detect one or more bionanoparticles in a sample fluid; said device comprising: (a) one or more detectors configured to detect the presence or absence of one or more detectable agents associated with one or more biological nanoparticle wherein at least one of said one or more biological nanoparticle comprises multiple detectable agents; and (b) a computer with software for ranking said biological nanoparticles based on presence or absence of said one or more detectable agents. In one embodiment, the ranking is binary. In other embodiments, wherein the device is used to detect multiple types of bionanoparticles, and/or wherein the device is used to detect multiple types of detectable agents associated with the biological nanoparticles, the ranking is non-binary.

In another aspect, the present disclosure provides a device configured to detect one or more bionanoparticles in a sample fluid; said device comprising: (a) one or more detectors configured to detect the presence or absence of biological nanoparticles comprising a size value; and (b) a computer with software for ranking said biological nanoparticles based on the size value. In one embodiment, the ranking is binary. In other embodiments, wherein the device is used to detect multiple sizes of bionanoparticles, the ranking is non-binary.

In another embodiment, the present disclosure provides a device configured to detect one or more bionanoparticles in a sample fluid; said device comprising: (a) one or more detectors configured to detect the presence or absence of biological nanoparticles comprising a size value, and detecting the presence or absence of one or more detectable agents associated with the biological nanoparticle; and (b) a computer with software for ranking said biological nanoparticles based on the size value and/or the presence or absence of the one or more detectable agents associated with the biological nanoparticle. In one embodiment, the ranking is binary. In other embodiments, wherein the device is used to detect multiple sizes of bionanoparticles and/or wherein the device is used to detect multiple types of bionanoparticles and/or wherein the device is used to detect multiple types of detectable agents associated with the biological nanoparticles, the ranking is non-binary.

In certain embodiments, the microfluidic chip comprises a transparent or translucent material. In some embodiments, at least a portion of the microfluidic chip is transparent or translucent. In certain embodiments, at least one side of the microfluidic chip is transparent or translucent. In some embodiments, the microfluidic chip is transparent or translucent. In particular embodiments, the transparent or translucent property of a microfluidic chip allows light emitted from biological nanoparticles to be detected.

In certain embodiments, the device may further comprise channels for channeling said nanoparticles based on said ranking. In particular embodiments, the channels are treated with anticoagulant or anti-aggregation compounds, compounds that preferentially prevent binding of the biological nanoparticles, compounds that prevent bionanoparticles agglomeration, or a combination thereof.

In certain embodiments, the device may further comprise electrodes for tracking and manipulating the trajectory of said biological nanoparticles. In some embodiments, the device may comprise magnetic elements for the separation of biological nanoparticles with attached magnetic particles. In certain embodiments, the device may comprise acoustical elements for tracking and manipulating the trajectory of the biological nanoparticles.

In certain embodiments, the biological nanoparticles may be further manipulated or analyzed. For example, the biological nanoparticles may be further partitioned or sorted via traditional flow cytometry, or the bionanoparticles of interest may be analyzed to provide further information, such as nucleic acid analysis, protein analysis, lipid analysis, small-molecule analysis, carbohydrate analysis, or a combination thereof. The contents within each bionanoparticle may be individually analyzed for DNA, RNA, DNA sequence, metabolite, lipid, carbohydrate, protein content, or the like. For example, exosomal nucleic acids, such as micro RNA (miRNA or miR-), may be applied for diagnostics of various tumors. For example, elevated levels of exosomal miRNAs miR-141 and miR-375 in serum may be correlated with the progression of prostate cancer; elevated levels of exosomal miRNA-21 and miRNA-1246 may be correlated with esophageal cancer. Other exosomal miRNAs may be potential diagnostic markers for renal fibrosis or cardiovascular disease. In addition, urinary exosomal miRNA miR-320c and miR-6068 may be upregulated in diabetic nephropathy patients. With regard to progressive degenerative disorders, high expression levels of several miRNAs, such as miR-9, miR-107, miRNA-128, miRNA134 and miRNA-137 miRNA124, may be associated with Alzheimer's disease. Other miRNA of diagnostic value include, but are not limited to, miR-21, miR-141, miR-200a, miR-200b, miR-200c, miR-203, miR-205, miR-214; miR-17, miR-3p, miR-21, miR-20b, miR-223, miR-301, let-7f; miR-141, miR-375; miR-21, miR-1246; miR-21; and Let-7 family miRNAs.

In one embodiment, the fluid sample may comprise more than one type of biological nanoparticle, for example, 2, 3, 4, 5, 6, 7, 8, 9, 10 or more types of biological nanoparticles. Accordingly, in certain embodiments, the fluid sample is simultaneously contacted with a plurality of differentiable detectable agents, each having a different specificity under conditions sufficient to transform the plurality of detectable agents into a plurality of complexes comprising the detectable agents and a plurality of biological nanoparticles. In some embodiments, the plurality of complexes are detected simultaneously, for example, by using an apparatus that comprises more than one interrogation device and/or more than one detection device.

For example, in the case that two or more differentiable detectable agents are associated with a biological nanoparticle, and each detectable agent is to be detected simultaneously, each biological nanoparticle associated with the detectable agents may be detected by one of two or more detection devices. Furthermore, wherein the detectable agents comprise fluorescent moieties, two or more interrogation devices (e.g., two lasers producing radiation at different wavelengths corresponding to excitation wavelengths of the different fluorescent moieties) may be used and the respective fluorescent emission intensity may be detected by two different detection devices. Accordingly, in one embodiment, the detectable agents are differentiable by fluorescence at different wavelengths.

In yet another embodiment, the two or more biological nanoparticles may be detected in series. For example, in one embodiment, the method may comprise detecting a first bionanoparticle at a first location of an apparatus and detecting a second biological nanoparticle at a second location of an apparatus. In this fashion, the bionanoparticles may be channeled after the first detection step, after the second detection step, or after both detection steps.

In certain embodiments of the disclosure, detection of a characteristic from a biological nanoparticle can be simultaneous or cumulative over time. For example, detection of a characteristic can emanate at once ("simultaneous") from a bionanoparticle. In certain embodiments, in which the method is performed in a simultaneous mode, the bionanoparticles may be carried by a flow of variable velocity. As an example, bionanoparticles may be carried by a steady flow as they traverse through the detection volume. Alternatively, the flow may be decelerated, or accelerated as the nanoparticles traverse through the detection volume. Flow may be regulated with one of the following either upstream or downstream of the detection volume: a valve, a bubble, an electric field, a magnetic field, an optical field, a pneumatic pressure source, a solid particle, a membrane, an immiscible droplet, a gravitational differential, or a coating to alter surface tension of the channel.

In some embodiments of the methods provided herein, the detection step is performed during continuous flow of the fluid sample through a flow channel. In preferred embodiments, the flow is uninterrupted. In certain embodiments, the individual biological nanoparticles are not physically separated, but rather are defined by the optical detection step, i.e., biological nanoparticle may be defined by the biomarkers or detectable agents associated with the biological nanoparticle present in the detection volume at the instant the detection occurs.

In certain embodiments, the detection event will occur with a regular frequency, which is dependent upon both the concentration of the biological nanoparticles and the flow rate of the fluid sample. For example, if the concentration of a particular fluid sample is 1,000 bionanoparticles per 100 µL, and the fluid sample is flowed through the apparatus at a rate of 100 µL per second, a different biological nanoparticle may be detected, on average, every 1 millisecond, or at a rate, on average, of 1,000 Hz.

In preferred embodiments, at least one detection event corresponds directly with the measuring of light intensity emitted by a biological nanoparticle and the assigning of a size value to the biological nanoparticle. For example, a biological nanoparticle in transit through a microfluidic chip may be exposed to two sources of interrogation; a first source of interrogation causes the biological nanoparticle to emit a light intensity that is measured, and a size value can be assigned; a second source of interrogation causes a detectable agent associated with the biological nanoparticle to emit a fluorescence that is detected, and the identification of the associated detectable marker can be determined.

In certain embodiments, dependent upon the geometry of the apparatus and the volume of the fluid to be processed, discrete bionanoparticles traverse through the detection volume at an average rate between 0.1 kHz and 100 MHz. In another embodiment, the discrete bionanoparticles traverse through the detection volume at an average rate between about 10 Hz and about 10 MHz. In other embodiments, the discrete bionanoparticles may traverse through the detection volume at an average frequency of between about 0.1 kHz and about 100 kHZ, or between about 1 kHz and about 10 MHz, or between about 1 kHz and about 5 MHz, or between about 1 kHz and about 1 MHz. In certain embodiments, the average frequency by which the bionanoparticles traverse through the detection volume may be at least about 0.1 kHz, or at least about 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 60, 70, 80, 90, 100, 125, 150, 200, 250, 300, 400, 500, 600, 700, 800, or 900 kHz, or at least about 1 MHz, or at least about 2, 3, 4, 5, 6, 7, 8, 9, 10, 15, 20, 25, 30, 35, 40, 45, 50, 60, 70, 80, 90, or 100 MHz.

In some embodiments of this disclosure, the fluid sample, for example a biological fluid sample, may be stabilized prior to detection of a bionanoparticle. In certain embodiments, the fluids may be stabilized with a reagent, including but not limited to, an antiaggregant; an anticoagulant such as citrate, heparin, ethylenediamine tetraacetic acid (EDTA), serum albumin, polyethylene glycol (PEG), diethylenetriamine pentaacetic acid (DTPA), 1,2-diaminocyclohexane tetraacetic acid (DCTA), or ethylene bis(oxyethylenenitrilo) tetraacetic acid (EGTA); an aldehyde such as methylol, hydroxymethyl derivatives of amines or amides of formaldehyde, diazolinidinyl urea, imidazolidinyl urea, methenamine, paraformaldehyde, glutaraldehyde, or glyoxal, and the like.

In yet other embodiments of this disclosure, the methods provided herein may be further coupled to a secondary process occurring after channeling of the biological nanoparticles of interest. Examples of processes and/or functions that may be coupled to a method provided herein include, for example, selective reactions to identify bionanoparticle contents (e.g. DNA, RNA, microRNA, lipids, metabolites, carbohydrates, or proteins encapsulated within bionanoparticles or complexed with bionanoparticles). These reactions include Polymerase Chain Reaction (PCR), Reverse-Transcription Polymerase Chain Reaction (RT-PCR), isothermal nucleic acid amplification, reactions to determine the epigenetic states of DNA, single-molecule hybridization reactions to determine the microRNA and siRNA contents, or aptamer (short strands of DNA)-selective reactions.

In certain embodiments, the methods provided herein may further be coupled to an assay protocol following biological nanoparticle sorting or collection. Non-limiting examples of assays that may be coupled to the methods provided herein include nucleic-acid based methods such as RNA extraction (with or without amplification), cDNA synthesis (reverse transcription), gene microarrays, DNA extraction, Polymerase Chain Reactions (PCR) (single, nested, quantitative real-time, or linker-adapter), or DNA-methylation analysis; cytometric methods such as fluorescence in situ hybridization (FISH), flow cytometry, fluorescence activated sorting, or comparative genomic hybridization (CGH) studies; chemical assay methods such as electrophoresis, Southern blot analysis or enzyme-linked immunosorbent assay (ELISA); assays to determine the microRNA and siRNA contents; assays to determine the DNA/RNA content; assays to determine lipid contents; assays to determine carbohydrate contents; assays to determine metabolite contents; assays to determine protein contents; functional assays, and the like.

In some embodiments, the methods provided herein may further be coupled with an analysis following biological nanoparticle sorting or collection. In certain embodiments, the analysis comprises nucleic acid analysis. In particular embodiments, nucleic acid analysis comprises sequencing, PCR, or digital PCR. In certain embodiments, the analysis comprises protein analysis. In particular embodiments, protein analysis comprises ELISA, digital ELISA, or mass spectrometry. In some embodiments, the analysis comprises lipid analysis. In certain embodiments, the analysis comprises small-molecule analysis. In particular embodiments, the small-molecule analysis comprises analysis of metabolites, analysis of signaling molecules, analysis of drugs, mass spectrometry, or a combination thereof. In certain embodiments, the analysis comprises mass spectrometry. In some embodiments, the analysis comprises nuclear magnetic resonance spectroscopy. In some embodiments, the analysis comprises carbohydrate analysis. In specific embodiments, the carbohydrate analysis comprises mass spectrometry, nuclear magnetic resonance, Fourier-transform spectroscopy, or a combination thereof.

In yet another embodiment, the methods provided herein may further be coupled to flow cytometry, for example, to further partition or isolate biological nanoparticles present in a fluid sample. In one embodiment, a channel of the device used for the methods provided herein may be in fluidic communication with a flow cytometer. In certain embodiments, the coupling of device and flow cytometry allows for selected biological nanoparticles to be further examined or serially sorted to further enrich a population of bionanoparticles of interest. In certain embodiments of the methods provided herein, this configuration allows for upstream gross-sorting of biological nanoparticles and only directs biological nanoparticles comprising a desired size value, or biological nanoparticles associated with a particular detectable agent, into downstream processes such as flow cytometry, in order to decrease time, cost, and/or labor.

Ranking Biological Nanoparticles

In one embodiment of the methods provided herein, a detected biological nanoparticle is assigned either a first value if the nanoparticle is associated with a detectable agent or a second value if the bionanoparticle is not associated with a detectable agent. In another embodiment of the methods provided herein, a biological nanoparticle is assigned either a first value if the nanoparticle emits a light intensity detected above a threshold value or a second value if the nanoparticle does not emit a light intensity detected above a threshold value. In a particular embodiment, the ranking (i.e., assignment of a value) is binary. For example, each biological nanoparticle emitting a light intensity above a detectable threshold value is assigned a value of 1, while each bionanoparticle not emitting a light intensity above a detectable threshold value is assigned a value of 0.

In another embodiment of the methods provided herein, the biological nanoparticle is assigned a value according to the detectable agents associated with the biological nanoparticle. For example, biological nanoparticle containing 4 detectable agents may be assigned a value of 4. Alternatively, a biological nanoparticle containing 4 detectable agents may be assigned a value that corresponds to a particular range of detectable agent quantities, for example 0 to 5 detectable agents, 1 to 10 detectable agents, 4 to 6 detectable agents, etc.

In another embodiment of the methods provided herein, the biological nanoparticle is assigned a value according to the light intensity emitted by the biological nanoparticle. For example, biological nanoparticle emitting a light intensity 3 times above the threshold value may be assigned a value of 3. Alternatively, a biological nanoparticle emitting a light intensity may be assigned a value that corresponds to a particular range of light intensity quantities, for example 1 to 5 times above the threshold value, 1 to 10 times above the threshold value, 2 to 3 times above the threshold value, etc.

In yet another embodiment of the methods provided herein, wherein more than one type of biological nanoparticle are present in a single fluid sample, a biological nanoparticle is assigned a value according to the nanoparticle size value or the identities of any detectable agents associated with the bionanoparticle. For example, wherein a fluid sample contains two types of detectable agents, A and B, a biological nanoparticle associated with neither A nor B may be assigned a value of 0, a biological nanoparticle associated with only A may be assigned a value of 1, a biological nanoparticle associated with only B may be assigned a value of 2, and a biological nanoparticle associated with both A and B may be assigned a value of 3; using the methods disclosed herein, nanoparticles assigned a value of 2 can be selectively isolated, resulting in a concentrated sample of biological nanoparticles specifically associated with only detectable agent B. Accordingly, in one embodiment of the methods provided herein, wherein more than one type of detectable agent are present in a single fluid sample, the ranking (i.e., assignment of a value) is not binary.

In some embodiments of the methods provided herein, wherein more than one type of biological nanoparticle are present in a fluid sample, a biological nanoparticle is assigned a value according to multiple parameters. Multiple parameters can comprise a biological nanoparticle size value, light intensity emitted by a biological nanoparticle, detectable agents associated with a biological nanoparticle, the identity of a biological nanoparticle, and the like. The ranking, or the assigning of a value, may have more than one variable. For example, wherein a fluid sample contains two types of biological nanoparticles, and wherein each type of biological nanoparticle exists as a plurality of sizes, multiple parameters can be used to assign a ranking to the biological nanoparticles. Each of the two types of biological nanoparticle may be associated with a detectable agent, A or B; likewise, each of the two types of biological nanoparticle may emit a light intensity that is associated with a size value varying from 20-50 nm in hydrodynamic diameter. Accordingly, a ranking can be applied with both size (e.g., assigning a size value of 20-30 nm a value of 1, a size value of 31-40 nm a value of 2, and a size value of 41-50 nm a value of 3), and detectable agent association (e.g., assigning a detectable agent value of "A" when the nanoparticle is associated with A, assigning a detectable agent value of "B" when the nanoparticle is associated with B, assigning a detectable agent value of "AB" when the nanoparticle is associated with both A and B, and assigning a detectable agent value of "Z" when the nanoparticle is associated with neither A nor B). The multiple parameter ranking can be applied to the biological nanoparticles while they are in transit through a microfluidic chip. Sorting may be applied to enrich the population of desired biological nanoparticles by any of the multiple parameters. For example, using the population of biological nanoparticles above, a counting or sorting event can take place for all biological nanoparticles having an "A" value, or more specifically a counting or sorting event can take place for all biological nanoparticle having a 2-A value (e.g., all biological nanoparticles having a size value corresponding with 31-40 nm hydrodynamic diameter, and associated with detectable agent A). In this manner, population enrichment, sorting, and/or counting may occur by a plurality of parameters. In specific embodiments, the plurality of parameters of a biological nanoparticle includes emitted light intensity, size value, association with detectable agent, identity, and the like.

In certain embodiments, a non-null assigned value may depend on either the identity of the biological nanoparticle or the concentration of the biological nanoparticle in the fluid sample.

In certain embodiments, multiple biological nanoparticles having the same assigned value are pooled or channeled together.

In one embodiment of the methods of the present disclosure, an active decision is required to rank or assign a value to a biological nanoparticle. In certain embodiments, a computer, controller, chip with integrated circuits, circuit board, electronic element, software, and/or algorithm is used to rank or assign a value to a biological nanoparticle.

In some embodiments, at least one of the values assigned to a biological nanoparticle may be a biomarker value. A biomarker value can be a biomarker identity, a count of biomarkers, a count of a particular type of biomarker, a copy number of the biomarker, and the like. In particular embodiments, a biological nanoparticle comprises at least one biomarker. In some embodiments, a biological nanoparticle is associated with at least one biomarker. The methods disclosed herein provide for the steps of detecting at least one biomarker associated with a biological nanoparticle, and assigning a biomarker value to the biological nanoparticle. In some embodiments, the biomarker value is assigned from a binary system. For example, a plurality of biological nanoparticles may comprise a fraction of nanoparticles that are associated with a biomarker, A—a binary biomarker value may be applied to the biological nanoparticles, so that the nanoparticles associated with the biomarker can be differentiated from the nanoparticles that are not associated with the biomarker.

In some embodiments, the present disclosure provides methods comprising determining at least one copy number of at least one biomarker associated with a biological nanoparticle. The determination of a copy number can provide at least one option of identifying biological nanoparticles and/or biomarkers associated with the biological nanoparticles. Variation to the copy numbers may also be analyzed, which can relate to the gain or loss of function of the biomarker and/or the bionanoparticle. For example, variations to copy numbers of biomarkers, such as protein biomarkers or nucleic acids, can provide information regarding the biomarkers and their association with biological nanoparticles. In some embodiments, the present disclosure provides methods comprising determining at least one copy number of at least one biomarker, wherein a biological nanoparticle comprises the at least one biomarker. For example, a detected biological nanoparticle may provide a copy number value for a biomarker, such as the number of tri-nucleotide repeats present in the biomarker. In some embodiments, the determination of a copy number uses a restriction enzyme. In certain embodiments, the determination of a copy number uses a standard. In specific embodiments, the standard used to determine the copy number has not been amplified. In some embodiments, the copy number and/or copy number variation of a protein biomarker is determined. In some embodiments, the copy number and/or copy number variation of a nucleic acid is determined.

In some embodiments, the biomarker is a protein biomarker. In certain embodiments, the protein biomarker is selected from proteins specific to epithelial derived cells, tetraspanins (e.g., CD9, CD63 and CD81), heat shock proteins (e.g., HSC70 and HSC90), membrane transporters (e.g., GTPases), and lipid-bound proteins, a cell-adhesion protein, a lipid bound protein, a transmembrane protein, an enzyme, the pan-cytokeratin A45B/B3, AE1/AE3, or CAM5.2 (pan-cytokeratin antibodies that recognize Cytokeratin 8 (CK8), Cytokeratin 18 (CK18), or Cytokeratin 19 (CK19) and ones against: breast cancer antigen NY-BR-1 (also known as B726P, ANKRD30A, Ankyrin repeat domain 30A); B305D isoform A or C (B305D-A ro B305D-C; also known as antigen B305D); Hermes antigen (also known as Antigen CD44, PGP1); E-cadherin (also known as Uvomorulin, Cadherin-1, CDH1); Carcino-embryonic antigen (CEA; also known as CEACAM5 or Carcino-embryonic antigen-related cell adhesion molecule 5); β-Human chorionic gonadotophin (β-HCG; also known as CGB, Chronic gonadotrophin, polypeptide); Cathepsin-D (also known as CTSD); Neuropeptide Y receptor Y3 (also known as NPY3R; Lipopolysaccharide-associated protein3, LAP3, Fusion; Chemokine (CXC motif, receptor 4); CXCR4); Oncogene ERBB1 (also known as c-erbB-1, Epidermal growth factor receptor, EGFR); Her-2 Neu (also known as c-erbB-2 or ERBB2); GABA receptor A, pi ($\pi$) polypeptide (also known as GABARAP, GABA-A receptor, pi ($\pi$) polypeptide (GABA A($\pi$), γ-Aminobutyric acid type A receptor pi ($\pi$) subunit), or GABRP); ppGalNac-T(6) (also known as β-1-4-N-acetyl-galactosaminyl-transferase 6, GalNActransferase 6, GalNAcT6, UDP-N-acetyl-d-galactosamine:polypeptide N-acetylgalactosaminyltransferase 6, or GALNT6); CK7 (also known as Cytokeratin 7, Sarcolectin, SCL, Keratin 7, or KRT7); CK8 (also known as Cytokeratin 8, Keratin 8, or KRT8); CK18 (also known as Cytokeratin 18, Keratin 18, or KRT18); CK19 (also known as Cytokeratin 19, Keratin 19, or KRT19); CK20 (also known as Cytokeratin 20, Keratin 20, or KRT20); Mage (also known as Melanoma antigen family A subtypes or MAGE-A subtypes); Mage3 (also known as Melanoma antigen family A 3, or MAGA3); Hepatocyte growth factor receptor (also known as HGFR, Renal cell carninoma papillary 2, RCCP2, Protooncogene met, or MET); Mucin-1 (also known as MUC1, Carcinoma Antigen 15.3, (CA15.3), Carcinoma Antigen 27.29 (CA 27.29); CD227 antigen, Episialin, Epithelial Membrane Antigen (EMA), Polymorphic Epithelial Mucin (PEM), Peanut-reactive urinary mucin (PUM), Tumor-associated glycoprotein 12 (TAG12)); Gross Cystic Disease Fluid Protein (also known as GCDFP-15, Prolactin-induced protein, PIP); Urokinase receptor (also known as uPR, CD87 antigen, Plasminogen activator receptor urokinase-type, PLAUR); PTHrP (parathyroid hormone-related proteins; also known as PTHLH); BS106 (also known as B511S, small breast epithelial mucin, or SBEM); Prostatein-like Lipophilin B (LPB, LPHB; also known as Antigen BU101, Secretoglobin family 1-D member 2, SCGB1-D2); Mammaglobin 2 (MGB2; also known as Mammaglobin B, MGBB, Lacryglobin (LGB) Lipophilin C (LPC, LPHC), Secretoglobin family 2A member 1, or SCGB2A1); Mammaglobin (MGB; also known as Mammaglobin 1, MGB1, Mammaglobin A, MGBA, Secretoglobin family 2A member 2, or SCGB2A2); Mammary serine protease inhibitor (Maspin, also known as Serine (or cystein) proteinase inhibitor clade B (ovalbumin) member 5, or SERPINB5); Prostate epithelium-specific Ets transcription factor (PDEF; also known as Sterile alpha motif pointed domain-containing ets transcription factor, or SPDEF); Tumor-associated calcium signal transducer 1 (also known as Colorectal carcinoma antigen CO17-1A, Epithelial Glycoprotein 2 (EGP2), Epithelial glycoprotein 40 kDa (EGP40), Epithelial Cell Adhesion Molecule (EpCAM), Epithelial-specific antigen (ESA), Gastrointestinal tumor-associated antigen 733-2 (GA733-2), KS1/4 antigen, Membrane component of chromosome 4 surface marker 1 (M4S1), MK-1 antigen, MIC18 antigen, TROP-1 antigen, or TACSTD1); Telomerase reverse transcriptase (also known as Telomerase catalytic subunit, or TERT); Trefoil Factor 1 (also known as Breast Cancer Estrogen-Inducible Sequence, BCEI, Gastrointestinal Trefoil Protein, GTF, pS2 protein, or TFF1); folate; or Trefoil Factor 3 (also known as Intestinal Trefoil Factor, ITF, p1.B; or TFF3); HSPA8, Actin, β (ACTB), Glyceraldehyde-3-phosphate dehydrogenase (GAPDH), Enolase 1, α (ENO1), Heat shock protein 90, α (cytosolic), class A member 1 (HSP90AA1), CD9 antigen (CD9), CD81 antigen (CD81), Tyrosine 3-monooxygenase/tryptophan 5-monooxygenase activation protein, zeta polypeptide (YWHAZ), Pyruvate kinase, muscle (PKM2), an enzyme such as an esterase, a phosphatase, or a lipase. In some embodiments, the biomarker is a nucleic acid biomarker. In certain embodiments, the nucleic acid biomarker is selected from a micro RNA (miRNA or miR-), such as exosomal miRNAs, including miR-141, miR-375, miRNA-21, miRNA-1246, miR-320c, miR-6068, miR-9, miR-107, miRNA-128, miRNA134, miRNA-137, miRNA124, miR-21, miR-141, miR-200a, miR-200b, miR-200c, miR-203, miR-205, miR-214; miR-17, miR-3p, miR-21, miR-20b, miR-223, miR-301, miR-141, miR-375, miR-21, miR-1246; miR-21, let-7f, or other Let-7 miRNAs.

In some embodiments, at least one of the values assigned to a biological nanoparticle may be a tag value. A tag value can be a tag identity, a count of tags, a count of a particular type of tag, and the like. In particular embodiments, a biological nanoparticle comprises at least one tag. In some embodiments, a biological nanoparticle is associated with at least one tag. The methods disclosed herein provide for the steps of detecting at least one tag associated with a biological nanoparticle, and assigning a tag value to the biological nanoparticle. In some embodiments, the tag value is assigned from a binary system. For example, a plurality of biological nanoparticles may comprise a fraction of nanoparticles that are associated with a tag, A—a binary tag value may be applied to the biological nanoparticles, so that the nanoparticles associated with the tag can be differentiated from the nanoparticles that are not associated with the tag.

In specific embodiments, the present disclosure provides methods comprising determining at least one value of at least one tag associated with a biological nanoparticle. In some embodiments, the present disclosure provides methods comprising determining the identify of at least one tag, wherein a biological nanoparticle comprises the at least one tag. For example, a detected biological nanoparticle may provide the identity of a tag.

In certain embodiments, a tag value is assigned from a plurality of values. For example, a plurality of biological nanoparticles may comprise a population associated with any of six tags, each of which provides a unique tag value dependent on the identity of the tag. The methods disclosed herein comprise the detection of specific tags, and sorting based on the tag value. In some embodiments, the tag value is assigned from a binary system. In specific embodiments, the system comprises non-zero and zero values. In some embodiments, the system comprises positive or negative values (e.g., a biological nanoparticle associated with a tag of interest may be assigned a positive value, while a nanoparticle not associated with the tag will be assigned a negative value, thus allowing for detection and/or sorting of biological nanoparticles associated with the tag of interest).

In certain embodiments, a tag is selected from signals derived from protein markers associated with a bionanoparticle, signals derived from a size of a bionanoparticle, signals derived from membrane dyes associated with a bionanoparticle, signals derived from a volume dyes associated with a bionanoparticle, signals derived from dyes associated with nucleic acids of a bionanoparticle, signals derived from dyes associated with lipids of a bionanoparticle, or signals derived from dyes associated with a bionanoparticle.

In some embodiments, the biological nanoparticles comprise an extracellular vesicle, an organelle, a microvesicle, a cell-derived vesicle, a protein aggregate, a nucleic acid aggregate, a lipid aggregate, a virus, a bacterium, an exosome, or a combination thereof. In particular embodiments, the biological nanoparticles comprise an exosome. In specific embodiments, the biological nanoparticle is an exosome.

Channeling and Fluid Flow

In certain embodiments of the present disclosure, directing the flow or collection of a biological nanoparticle is based on the value assigned to the biological nanoparticle. For example, a biological nanoparticle assigned a null or "0" value may be directed into a first channel (channeled) or waste outlet and a biological nanoparticle assigned a positive or "1" value may be directed into a second channel or collection chamber. As another example, a biological nanoparticle having a value assigned by any of a plurality of parameters may be directed to either a first channel or a second channel.

In certain embodiments of the present disclosure, directing the flow or collection of a biological nanoparticle is based on a size value. In other embodiments of the present disclosure, directing the flow or collection of a biological nanoparticle is based on the association of the biological nanoparticle with a detectable agent. In some embodiments of the present disclosure, directing the flow or collection of a biological nanoparticle is based on the size value of the biological nanoparticle and the biomarker value of the biological nanoparticle. In some embodiments, the directing of the flow or collection of the biological nanoparticle sorts the biological nanoparticle into an enriched population. In preferred embodiments, the sorting of the biological nanoparticle into an enriched population is determined by the size value and the biomarker value of the biological nanoparticle. In other embodiments of the present disclosure, directing the flow or collection of a biological nanoparticle is based on the association of the biological nanoparticle with a tag. In some embodiments of the present disclosure, directing the flow or collection of a biological nanoparticle is based on the size value of the biological nanoparticle and the tag value of the biological nanoparticle. In certain embodiments, the sorting of the biological nanoparticle into an enriched population is determined by the size value and the tag value of the biological nanoparticle. In some embodiments, the sorting of the biological nanoparticle into an enriched population is determined by the size value of the biological nanoparticle. In particular embodiments, the directing of the flow directs a biological nanoparticle to a collection, generating a collection of biological nanoparticles based on the size value.

In certain embodiments, a biomarker value is assigned from a plurality of values. For example, a plurality of biological nanoparticles may comprise a population associated with any of four biomarkers, each of which provides a unique biomarker value dependent on the identity of the biomarker. The methods disclosed herein comprise the detection of specific biomarkers, and sorting based on the biomarker value. In some embodiments, the biomarker value is assigned from a binary system. In specific embodiments, the system comprises non-zero and zero values. In some embodiments, the system comprises positive or negative values (e.g., a biological nanoparticle associated with a biomarker of interest may be assigned a positive value, while a nanoparticle not associated with the biomarker will be assigned a negative value, thus allowing for detection and/or sorting of biological nanoparticles associated with the biomarker of interest).

In some embodiments, the methods provided herein may further comprise sorting at least one biological nanoparticle into an enriched population. In particular embodiments, sorting of a biological nanoparticle into an enriched population is determined by the size value of a bionanoparticle, the presence of a biomarker associated with a bionanoparticle, the measured light intensity emitted by a bionanoparticle, the measured light intensity emitted by a detectable agent associated with a bionanoparticle, a wavelength of light emitted by a bionanoparticle, a wavelength of light emitted by a detectable agent associated with a bionanoparticle, a plurality of wavelengths emitted by a bionanoparticle, a plurality of wavelengths emitted by a detectable agent associated with a bionanoparticle, an identification of a biological nanoparticle, or a combination thereof. For example, biological nanoparticles having a hydrodynamic diameter of between 40-100 nanometers may be selectively enriched by their size value, thus producing a sample comprising a more concentrated population of biological nanoparticles having a hydrodynamic diameter of between 40-100 nanometers. In preferred embodiments, the sorting uses a mechanism for directing flow.

In particular embodiments, the sorting of a biological nanoparticle into an enriched population is determined by the size value of the biological nanoparticle. In some embodiments, the enriched population has a diameter variance of less than 1000%, a diameter variance of less than 900%, a diameter variance of less than 800%, a diameter variance of less than 700%, a diameter variance of less than 600%, a diameter variance of less than 500%, a diameter variance of less than 400%, a diameter variance of less than 300%, a diameter variance of less than 200%, a diameter variance of less than 100%, a diameter variance of less than 75%, a diameter variance of less than 50%, or a diameter variance of less than 25%. In preferred embodiments, the enriched population has a diameter variance of less than 100%. As provided herein, the term "variance" is intended to describe a parameter for values that are greater than or less than an indicated value. For example, if the size value of interest is a diameter of 100 nm, an enriched population having a diameter variance of less than 25% would include values from greater than 75 nm to less than 125 nm. A person of skill will appreciate that as used herein, variance provides a parameter for measuring accuracy having greater than or less than a stated value (e.g., a value with a variance of less than 20% provides for the true value±less than 20%).

In some embodiments, the enriched population has a diameter range within 500% of a diameter value, within 400% of a diameter value, within 300% of a diameter value, within 200% of a diameter value, within 100% of a diameter value, within 50% of a diameter value, or within 25% of a diameter value. In particular embodiments, the enriched population has a diameter range within 100% of a diameter value. In some embodiments, an enriched population having a diameter variance or diameter range additionally has a confidence interval for the enriched population, wherein the confidence interval is greater than 99%, greater than 98%, greater than 97%, greater than 96%, greater than 95%, greater than 90%, greater than 80%, greater than 70%, or greater than 50%. In preferred embodiments, the confidence interval is greater than 95%. The confidence interval can be applied to any of the enriched population diameter variances or diameter ranges. For example, a population having a diameter within 100% of a diameter value, wherein the diameter value is 75 nm, and a confidence interval of 95%, indicates that there is a 95% probability that a biological nanoparticle of the enriched population has a diameter within 100% of the 75 nm hydrodynamic diameter.

In some embodiments, the sorting of a biological nanoparticle into an enriched population is determined by an association with at least one detectable agent. In some embodiments, the sorting of a biological nanoparticle into an enriched population is determined by an association with a plurality of detectable agents. In particular embodiments of an enriched population, greater than 50% of the biological nanoparticles is associated with a detectable agent, greater than 60% of the biological nanoparticles is associated with a detectable agent, greater than 70% of the biological nanoparticles is associated with a detectable agent, greater than 75% of the biological nanoparticles is associated with a detectable agent, greater than 80% of the biological nanoparticles is associated with a detectable agent, greater than 85% of the biological nanoparticles is associated with a detectable agent, greater than 90% of the biological nanoparticles is associated with a detectable agent, greater than 93% of the biological nanoparticles is associated with a detectable agent, greater than 95% of the biological nanoparticles is associated with a detectable agent, greater than 97% of the biological nanoparticles is associated with a detectable agent, greater than 98% of the biological nanoparticles is associated with a detectable agent, or greater than 99% of the biological nanoparticles is associated with a detectable agent. In preferred embodiments, greater than 80% of the biological nanoparticles of an enriched population is associated with a detectable agent. In preferred embodiments, the detectable agent is the same type of detectable agent.

As used herein, the terms "channeling" and "directing" of flow can be used interchangeably. The terms "channeling" and "directing" flow indicate control of fluid motion in a manner that may compel the destination, trajectory, or movement of a biological nanoparticle.

In some embodiments of the present disclosure, wherein more than one type of biological nanoparticle is present in the fluid sample, a bionanoparticle may be channeled based on the particular emission of light intensity from the biological nanoparticle. In one embodiment, a biological nanoparticle may be directed into a first channel or waste outlet if the nanoparticle emits a light intensity below a threshold value, a biological nanoparticle may be directed into a second channel or a first collection chamber if the biological nanoparticle emits a light intensity above the threshold value corresponding with a first size value, and a biological nanoparticle may be directed into a third channel or second collection chamber if the biological nanoparticle emits a light intensity above the threshold value corresponding with a second size value.

In another embodiment of the present disclosure, wherein more than one type of biological nanoparticle is present in the fluid sample, a biological nanoparticle may be channeled based on the particular detectable agents associated with the bionanoparticle. In one embodiment, a biological nanoparticle associated with no detectable agents may be directed into a first channel or waste outlet, a biological nanoparticle associated with a first type of detectable agent may be directed into a second channel or a first collection chamber, and a biological nanoparticle associated with a second type of detectable agent may be directed into a third channel or second collection chamber.

In certain embodiments, a biological nanoparticle containing more than one parameter value may be directed into a particular flow channel or collection chamber. Alternatively, the biological nanoparticle may be directed into a mixing or dilution chamber and subsequently the mixed or diluted biological nanoparticles may be further partitioned such that the biological nanoparticles are partitioned into different aliquots. The biological nanoparticles in the aliquots may then be detected again such that the bionanoparticles can be separated from each other.

In one embodiment of the methods provided herein, channeling (i.e., directing the flow or collection of the biological nanoparticles) may be performed by the use of external fields or by creating flow disturbances. In particular embodiments, the channeling uses a mechanism for directing flow.

In one aspect of this disclosure, once a bionanoparticle is ranked, external fields may be used to alter the bionanoparticle direction. The fields may include electric field, magnetic field, electrokinetic, electrophoretic, electro-osmotic, dielectrophoretic, hydrodynamic, gravitational, pneumatic or optical forces. Alternatively, external flow disturbances may be induced with an introduction of materials immiscible with suspension, such as air, immiscible organic liquid, or microbeads.

In certain embodiments, the flow can be delivered by, for example, methods and devices that induce hydrodynamic fluidic pressure, which includes but is not limited to those that operate on the basis of mechanical principles (e.g. external syringe pumps, pneumatic membrane pumps, vibrating membrane pumps, vacuum devices, centrifugal forces, and capillary action); electrical or magnetic principles (e.g. electroosmotic flow, electrokinetic pumps piezoelectric/ultrasonic pumps, ferrofluidic plugs, electrohydrodynamic pumps, and magnetohydrodynamic pumps); thermodynamic principles (e.g. gas bubble generation/phase-change-induced volume expansion); surface-wetting principles (e.g. electrowetting, chemically, thermally, and radioactively induced surface-tension gradient); and the like.

In yet other embodiments, the fluid can be delivered or channeled by a fluid drive force provided by gravity feed, surface tension (like capillary action), electrostatic forces (electrokinetic flow), electro-osmotic flow, centrifugal flow (substrate disposed on a compact disc and rotated), acoustic forces, magnetic forces (oscillating ions causes flow), magnetohydrodynamic forces and a vacuum or pressure differential.

In certain embodiments, fluid flow control devices, such as those enumerated with regard to methods and devices for inducing hydrodynamic fluid pressure or fluid drive force, can be coupled to an input port or an output port of the present disclosure. In one example, multiple ports are provided at either or both of the inlet and outlet and one or more ports are coupled to a fluid flow control device.

In some embodiments, the directing of flow comprises flow displacement. As used herein, the term "flow displacement" is used interchangeably with "fluid displacement". In some embodiments, the flow displacement is positive displacement, negative displacement, or a combination thereof. In certain embodiments, flow displacement provides a means for directing flow with decreased stress on the biological nanoparticles. Flow displacement may cause a disturbance in flow, and the flow disturbance can direct the biological nanoparticle or adjust its trajectory. In some embodiments, a sorting device as described above is used to cause a flow displacement. In certain embodiments, the sorting comprises flow-displacement sorting. In some embodiments, the sorting does not use acoustic sorting or physical barriers. In certain embodiments, the sorting has the proviso that sorting does not include acoustic sorting or the use of physical barriers.

In particular embodiments, the directing of the flow comprises electroosmotic flow. In some embodiments, the directing of the flow comprises the application of pressure.

In some embodiments, the directing of a biological nanoparticle takes no more than 100 ms, no more than 50 ms, no more than 10 ms, no more than 5 ms, no more than 3 ms, no more than 1 ms, no more than 500 µs, no more than 100 µs, no more than 50 µs, or no more than 10 µs. In preferred embodiments, the directing of a biological nanoparticle takes no more than 1 ms. In another preferred embodiment, the directing of a biological nanoparticle takes no more than 100 µs.

In certain embodiments, the sorting is determined by the size value of a bionanoparticle, the presence of a biomarker associated with a bionanoparticle, the measured light intensity emitted by a bionanoparticle, the measured light intensity emitted by a detectable agent associated with a bionanoparticle, a wavelength of light emitted by a bionanoparticle, a wavelength of light emitted by a detectable agent associated with a bionanoparticle, a plurality of wavelengths emitted by a bionanoparticle, a plurality of wavelengths emitted by a detectable agent associated with a bionanoparticle, an identification of a biological nanoparticle, or a combination thereof.

In some embodiments of the methods provided herein, a biological nanoparticle is isolated. In particular embodiments, sorting or directing may be used to isolate a biological nanoparticle. In some embodiments, the biological nanoparticle is isolated in an isolation chamber. An isolation chamber may be, e.g., wells of a multi-well plate, an Eppendorf tube, a vial, and the like. In some embodiments, a plurality of biological nanoparticles are isolated into a single isolation chamber. In specific embodiments, an enriched population of biological nanoparticles are isolated in a single isolation chamber. For example, a plurality of biological nanoparticles can be sorted, such that only nanoparticles having a hydrodynamic diameter of between 40-100 nm are directed into a vial, which may be reserved for further processing or identification. In some embodiments, a single biological nanoparticle is isolated.

Counting Biological Nanoparticles

In some embodiments of the methods provided herein, a biological nanoparticle is counted. As used herein, the terms "counted" and "quantified" are interchangeable. The term "counted" as used herein indicates the biological nanoparticle has been entered into a measurement of a quantity, such as a counting system (e.g., a tally). For example, a fluid sample comprising 400 biological nanoparticles that have a particular ranking injected into a microfluidic device as provided in the methods described herein can result in the individual counting or quantification of each biological nanoparticle having said ranking, such that 400 biological nanoparticles are counted. In some embodiments, biological nanoparticles having a size value in a fluid sample can be counted to provide the quantity of biological nanoparticles in the sample that have the size value.

In some embodiments, the methods provided herein further comprise quantifying the number of biological nanoparticles. In particular embodiments, the methods provided herein comprise quantifying the number of biological nanoparticles having a size value. In preferred embodiments, the methods provided herein comprise quantifying the number of biological nanoparticles having a particular size value. In some embodiments, the size value is selected prior to the introduction of the fluid sample to the microfluidic device.

In certain embodiments, the methods provided herein further comprise determining the concentration of biological nanoparticles of interest in a fluid sample. In some embodiments, the determination of concentration comprises counting the number of biological nanoparticles of interest and dividing this value by the volume of the fluid sample. As a non-limiting example, a sample fluid having a volume of 1 µL comprising a plurality of biological nanoparticles that have a size value of 30-50 nm can be introduced to a microfluidic chip; quantifying the number of biological nanoparticles having the size value of 30-50 nm can provide a total count of 6,000 detected biological nanoparticles sharing said size value; therefore, the concentration of the biological nanoparticles of interest in the sample is measured as 6,000 nanoparticles/µL. In this manner, the methods provided herein can comprise determining the concentration of a fluid sample.

In some embodiments, the methods of determining sample concentration comprise counting a spike frequency of the fluid sample. As used herein, the term "spike frequency" refers to the frequency of the detection of light emission from a biological nanoparticle, wherein the light emission is above a threshold value (e.g., a system comprising a detector observes and registers a "spike" when a bionanoparticle having light emission above a threshold passes through the detection volume), or within a desired value range. In certain embodiments, a flow rate is known. In some embodiments, the flow rate is constant. In other embodiments, the flow rate is an average flow rate. The spike frequency corresponds with the number of biological nanoparticles of interest that pass through a detection volume over a period of time. For example, if a fluid sample in a microchannel pass through a detection volume, and 10 spikes are detected (e.g., 10 emission signals having a certain value) over a period of 1 second, then the spike frequency is 10 spikes/second. Given a flow rate, volume of fluid sample that passed through the detection region, and/or total volume of the sample, the concentration can be determined. For example, if the flow rate for the example above was a constant 1 µL/second, and the spike frequency was 10 spikes/second, then the concentration of the biological nanoparticles of interest is 10 bionanoparticles per 1 µL.

As used herein, "spike" describes an observed emission within a parameter. A spike can correspond to a size value, a light emission intensity, association with a detectable agent, and the like. For example, if the desired biological nanoparticles emit a light intensity 4-fold to 5-fold above a threshold limit, then any biological nanoparticles observed within these bounds would register as a spike. In some embodiments, the number of spikes are counted. In specific embodiments, the number of spikes are counted over a period of time to determine the spike frequency. The observation of a spike and calculation of spike frequency can be conducted using apparatus as described in this disclosure.

In certain embodiments, the spike frequency correlates with a parameter value of the biological nanoparticles. The parameter value can be a size value, the presence of a detectable agent, an intensity of light emission, and the like. For example, a spike frequency targeting bionanoparticles labeled with detectable agent A can be determined from a plurality of biological nanoparticles, by measuring the frequency that the detectable agent A is observed.

In some embodiments, the concentration of the sample is determined by counting a spike frequency of the sample and comparing it to the volume of the sample. In some embodiments, the concentration of a sample is determined by counting the spike frequency of the sample and comparing it to the spike frequency of a calibration particle standard. For example, if a standard has biological nanoparticles of interest with a known concentration of 100 nanoparticles/µL, and the standard presents a spike frequency of 10 spikes/ms, then a sample having an unknown concentration of desired biological nanoparticles that is analyzed using the same conditions and presents a spike frequency of 5 spikes/ms could be determined to have a concentration of 50 nanoparticles/µL. In certain embodiments, the concentration of a sample is determined by counting the spike frequency of the sample, comparing it to a calibration particle standard spike frequency, and comparing the spike frequency of the sample to the volume of the sample. Any of a plurality of standard particles can be used, as described further in this disclosure. In some embodiments, the calibration particle standard comprises gold nanoparticles. In certain embodiments, the gold nanoparticle standard of known concentration (and thus spike frequency) is mixed with the biological nanoparticle sample of unknown concentration to form one sample solution, such that by comparing the spike frequency of the gold nanoparticle with the spike frequency of the biological nanoparticles, the concentration of the biological nanoparticles in the sample solution can be determined.

In certain aspects, the biological nanoparticles transit through a microfluidic chip at a high rate. In specific embodiments, the biological nanoparticles transit through the microfluidic chip at a rate of more than 1 million particles per hour, more than 2 million particles per hour, more than 3 million particles per hour, more than 4 million particles per hour, more than 5 million particles per hour, more than 6 million particles per hour, more than 7 million particles per hour, more than 8 million particles per hour, more than 9 million particles per hour, more than 10 million particles per hour, more than 15 million particles per hour, more than 20 million particles per hour, more than 25 million particles per hour, more than 30 million particles per hour, more than 35 million particles per hour, more than 40 million particles per hour, more than 45 million particles per hour, or more than 50 million particles per hour. In preferred embodiments, the biological nanoparticles transit through the microfluidic chip at a rate of more than 5 million nanoparticles per hour.

Apparatus and Methods of Capturing Biological Nanoparticles

In some embodiments, the present disclosure provides methods, systems, devices, and apparatuses for the capture (also referred to as adsorption), manipulation, and analyses of biological nanoparticles on a coated planar surface. In certain embodiments, the capture of biological nanoparticles on a planar surface provides for a preferential capture system, at least because analysis may be performed quickly following capture. In contrast to this disclosure is the use of coated beads, which may be exposed to a sample fluid comprising biological nanoparticles, and capture biological nanoparticles. Bionanoparticles captured on a bead cannot be readily visualized with, e.g., a microscope, in order to allow for rapid analysis. Methods using beads that capture bionanoparticles frequently require a step of dissociating or detaching the biological nanoparticles from the coated surface, which may decrease the yield of captured biological nanoparticles, or may damage the bionanoparticles. This disclosure provides for methods, systems, devices, and apparatus for capturing biological nanoparticles in a manner that may be quickly and easily analyzed and/or further processed. In certain embodiments, the present disclosure provides methods of capturing biological nanoparticles of interest from a fluid sample onto a planar surface.

In certain embodiments, the present disclosure provides a method for capturing biological nanoparticles on a planar surface, the method comprising (a) providing at least one planar surface having a coating; (b) contacting a fluid sample comprising a plurality of biological nanoparticles with the coating; (c) providing a force to the fluid sample in contact with the at least one planar surface to facilitate contact of the biological nanoparticles with the coating; and (d) capturing at least some of the plurality of nanoparticles with the coating.

In specific embodiments, the present disclosure provides a method for capturing biological nanoparticles on a coated planar surface, the method comprising (a) providing at least one planar surface having a coating, the coating comprising a non-specific adsorption resisting material, and a plurality of capturing molecules; (b) contacting a fluid sample comprising a plurality of biological nanoparticles with the coating; (c) centrifuging the fluid sample in contact with the at least one planar surface to facilitate contact of the biological nanoparticles with the coating; and (d) capturing at least some of the plurality of nanoparticles with at least some of the plurality of capturing molecules.

In other specific embodiments, the present disclosure provides a method for capturing biological nanoparticles on a coated planar surface, the method comprising (a) providing at least one planar surface having a coating, the coating comprising a non-specific adsorption resisting material, and a plurality of capturing molecules; (b) contacting a fluid sample comprising a plurality of biological nanoparticles with the coating; (c) centrifuging the fluid sample in contact with the at least one planar surface to facilitate contact of the biological nanoparticles with the coating; (d) capturing at least some of the plurality of nanoparticles with at least some of the plurality of capturing molecules; and (e) imaging the plurality of captured biological nanoparticles on the planar surface with fluorescence microscopy.

The methods, systems, devices, and apparatus provided herein can capture biological nanoparticles. Details of the biological nanoparticles are provided further herein. In certain embodiments, the biological nanoparticles are associated with a detectable agent, as provided herein. In some embodiments, the biological nanoparticles comprise a detectable agent, as provided herein. In some embodiments, the biological nanoparticles are associated with at least one detectable agent, as provided herein. In certain embodiments, the biological nanoparticles comprise a binding target, as provided herein. In some embodiments, the biological nanoparticles are associated with at least one binding target, as provided herein. In some embodiments, the biological nanoparticles are associated with at least one tag, as provided herein. The biological nanoparticles provided for determining size while in transit can in any way share the properties as provided in this disclosure with the biological nanoparticles captured with a coated planar surface.

Planar Surfaces

The methods disclosed herein provide for the capture of biological nanoparticles on a coated planar surface. In some embodiments, the planar surface is provided with a previously applied coating. In certain embodiments, the planar surface is manufactured with a coating. In some embodiments, the planar surface is provided, and a coating is applied as a separate step. Any of a plurality of means that are known in the art may be used to apply or otherwise provide a coating to the planar surface.

In some embodiments, at least a portion of the planar surface is transparent. In certain embodiments, at least a portion of the planar surface is translucent. In some embodiments, the planar surface is transparent. In certain embodiments, the planar surface is translucent. The planar surface may provide a platform through which light may pass, so that biological nanoparticles attached to the coating may be observed through the surface. For example, a planar surface with biological nanoparticles attached to one side may be placed above a source for interrogating (e.g., a lightbulb), and the light or interrogating body can pass through the plate, and interact with the captured biological nanoparticles, and continue to be detected. In certain embodiments, the detector is a camera (e.g., when using an optical microscope).

In preferred embodiments, the planar surface comprises glass. In certain embodiments, the planar surface is glass. In some embodiments, the planar surface is a glass slide. As used herein, the terms "glass slide" and "glass coverslip" can be used interchangeably.

A variety of planar surfaces can be used in this disclosure. In some embodiments, the size of the planar surface provides ease of use in a laboratory, research, and/or hospital setting. For example, a planar surface that is the size of a glass slide that is readily accommodated for analysis with an optical microscope provides a means for analyzing without requiring modifications of equipment, customization of equipment, and/or purchase of specialized equipment. In preferred embodiments, the planar surface has dimensions that are user-friendly and/or can be shipped and/or manufactured using sizing standards that are known to those skilled in the art.

In some embodiments, the glass slide is circular, oval, rectangular, square, rhombus-shaped, triangular, or has some other polygonal dimensions. The glass slide can also have beveled or rounded corners, and can be asymmetrical in shape. In particular embodiments, the glass side is circular. In some embodiments, the glass slide is oval. In some embodiments, the planar surface comprises a diameter of between 0.1 mm and 100 cm, between 0.1 mm and 20 cm, between 1 mm and 20 cm, between 5 mm and 10 cm, between 1 mm and 5 cm, between 10 mm and 10 cm, between 5 mm and 5 cm, or between 1 cm and 50 cm. In preferred embodiments, the planar surface comprises a diameter of between 1 cm and 50 cm. In certain embodiments, the planar surface has a diameter of greater than 90 cm, greater than 80 cm, greater than 70 cm, greater than 60 cm, greater than 50 cm, greater than 40 cm, greater than 30 cm, greater than 20 cm, greater than 10 cm, greater than 5 cm, greater than 4 cm, greater than 3 cm, greater than 2 cm, greater than 1 cm, greater than 0.75 cm, greater than 0.5 cm, greater than 0.25 cm, or greater than 0.1 cm. In preferred embodiments, the planar surface comprises a diameter of greater than 1 cm.

In certain embodiments, the planar surface is square. In some embodiments, the planar surface is rectangular. In certain embodiments, the planar surface has a width of between 1 cm and 100 cm, between 1 mm and 1 cm, between 1 mm and 20 cm, between 5 mm and 20 cm, between 10 mm and 20 cm, between 100 mm and 20 cm, between 1 cm and 20 cm, or between 1 cm and 50 cm. In preferred embodiments, the planar surface has a width of between 1 cm and 50 cm. In some embodiments, the planar surface has a length of between 0.1 mm and 100 cm, between 1 mm and 20 cm, between 1 mm and 10 cm, between 5 mm and 20 cm, between 10 mm and 20 cm, between 100 mm and 20 cm, between 1 cm and 20 cm, or between 1 cm and 50 cm. In preferred embodiments, the planar surface has a length of between 1 cm and 50 cm.

As provided by this disclosure, the planar surface comprises a surface area. In some embodiments, the surface area is between 200 cm$^2$ and 100 cm$^2$, the surface area is between 150 cm$^2$ and 80 cm$^2$, the surface area is between 150 cm$^2$ and 1 cm$^2$, the surface area is between 200 cm$^2$ and 1 mm$^2$, the surface area is between 120 cm$^2$ and 1 mm$^2$, the surface area is between 80 cm$^2$ and 1 mm$^2$, the surface area is between 50 cm$^2$ and 1 mm$^2$, the surface area is between 20 cm$^2$ and 1 mm$^2$, the surface area is between 1 cm$^2$ and 1 mm$^2$, the surface area is between 75 mm$^2$ and 1 mm$^2$, the surface area is between 50 mm$^2$ and 1 mm$^2$, the surface area is between 25 mm$^2$ and 1 mm$^2$, or the surface area is between 10 mm$^2$ and 1 mm$^2$. In preferred embodiments, the surface area is between 150 cm$^2$ and 50 cm$^2$.

In some embodiments, the planar surface comprises the base of a multi-well plate.

In certain embodiments, the planar surface comprises a coverslip. In specific embodiments, the planar surface is a coverslip. In certain embodiments, the planar surface is compatible with microscopy. In preferred embodiments, the planar surface is compatible with fluorescence microscopy. For example, this disclosure provides methods of capturing biological nanoparticles of interest on a coated glass coverslip, and analyzing the glass coverslip using fluorescence microscopy to analyze the captured biological nanoparticles.

Planar Surface Coating

In some aspects, the methods provided herein further comprise providing at least one planar surface a coating, wherein the coating comprises a non-specific adsorption resisting material and a plurality of capturing molecules. In certain embodiments, the planar surface has a coating comprising a non-specific adsorption resisting material and a plurality of capturing molecules.

In certain embodiments, the coating has a thickness of less than 10 μm, less than 5 μm, less than 1 μm, less than 500 nm, less than 400 nm, less than 300 nm, less than 200 nm, less than 100 nm, less than 90 nm, less than 80 nm, less than 70 nm, less than 60 nm, less than 50 nm, less than 40 nm, less than 30 nm, less than 20 nm, less than 10 nm, or less than 5 nm. In preferred embodiments, the coating layer has a thickness of less than 100 nm.

In some embodiments, the coating is attached directly to the planar surface. In other embodiments, the coating is attached to a buffer layer, and the buffer layer is associated with both the coating and the planar surface. In certain embodiments, the coating is attached to the planar surface using physisorption, chemisorption, covalent grafting, or plasma polymerization.

In certain embodiments, the coating covers 100% of the planar surface. In some embodiments, the coating covers less than 100% of the planar surface. In specific embodiments, the coating covers at least 99% of the planar surface, at least 95% of the planar surface, at least 90% of the planar surface, at least 85% of the planar surface, at least 80% of the planar surface, at least 70% of the planar surface, at least 60% of the planar surface, at least 50% of the planar surface, at least 40% of the planar surface, at least 30% of the planar surface, at least 20% of the planar surface, at least 10% of the planar surface, at least 5% of the planar surface, or at least 1% of the planar surface. In preferred embodiments, the coating covers at least 80% of the planar surface.

In some aspects, the coating comprises a non-specific adsorption resisting material. The term "non-specific adsorption resisting material" may be used interchangeably with "non-fouling material" herein. The non-specific adsorption resisting material reduces the adsorption and/or adhesion of biological nanoparticles or other substances to the coating. The non-fouling material prevents attachment of unwanted matter. Preventing the adsorption of assorted substances increases the ability to analyze the biological nanoparticles that do associate with the coating with more precision and accuracy. A variety of non-fouling materials suitable for the present disclosure are generally well known in the art and can, for example, be found in journal articles (e.g., Hucknall et al. *Adv. Mater.*, 2009, 21(23), 2441-2446).

In some embodiments, the non-fouling material comprises PEG, PEG-containing copolymers, self-assembled monolayers, zwitterions (e.g., carboxybetaine), bovine serum albumin (BSA), oligo(ethylene glycol)methacrylate (OEGMA), poly(OEGMA), derivatives thereof, or a combination thereof.

In particular embodiments, the non-specific absorption resisting material comprises polyethylene glycol. In certain embodiments, the non-specific absorption resisting material comprises zwitterions. In specific embodiments, the non-fouling material comprises a zwitterionic surface. In particular embodiments, the non-specific absorption resisting material comprises carboxybetaine. In some embodiments, the non-specific absorption resisting material comprises bovine serum albumin.

In some aspects, the coating comprises a plurality of capturing molecules. The capturing molecules increase adsorption and/or adhesion of biological nanoparticles of interest. Capturing molecules are selective in their attachment, and when combined with a non-fouling material, provide a coating that increases attachment of desired biological nanoparticles, while decreasing adhesion of other materials that may be present in the fluid sample. For example, a fluid sample comprising biological nanoparticles "A" and "B" in contact with a coating comprising a non-specific adsorption resisting material and a plurality of capturing molecules chosen to selectively attach to "A" will result in the increased capture of "A" while adhesion of "B" is resisted. In some embodiments, more than one type of capturing molecule is provided in the coating. In other embodiments, the plurality of capturing molecules comprise the same type of capturing molecule.

In certain embodiments, the plurality of capturing molecules comprises an antibody. In specific embodiments, the plurality of capturing molecules comprises a biotinylated antibody. In some embodiments, the plurality of capturing molecules comprises biotin. In certain embodiments, the plurality of capturing molecules comprises a streptavidin. In some embodiments, the plurality of capturing molecules comprises a nucleic acid. In some embodiments, the plurality of capturing molecules comprises an aptamer. In some embodiments, the plurality of capturing molecules comprises a biotinylated aptamer. In some embodiments, the plurality of capturing molecules comprises a peptide. In some embodiments, the plurality of capturing molecules comprises a protein. In some embodiments, the plurality of capturing molecules comprises an affibody. In some embodiments, the plurality of capturing molecules comprises a nanobody.

In some embodiments, the plurality of capturing molecules are attached to the planar surface with a linking moiety. In other embodiments, the plurality of capturing molecules are attached directly to the planar surface. In certain embodiments, the plurality of capturing molecules are attached to the coating with a linking moiety. In some embodiments, the plurality of capturing molecules are directly associated with the coating. As used herein, the terms "associated" and "attached" are used interchangeably, and in the context of a capturing molecule, a coating, and optionally a linking moiety, includes covalent, non-covalent, ionic, and/or non-ionic interactions. For example, the capturing molecules can be covalently attached to the coating. As another example, the capturing molecules can be covalently attached to linking moieties, and the linking moieties can be covalently attached to the coating.

In certain embodiments, the coating comprises ligands. In specific embodiments, the coating comprises nitrilotriacetate ligands. In some embodiments, the coating comprises iminodiacetic acid ligands. In certain embodiments, the coating comprises a polymer. In specific embodiments, the polymer comprises polyacrylic acid, chitosan, a temperature-sensitive polymer, a pH-sensitive polymer, or a combination thereof. In certain embodiments, the coating comprises an antibody. In some embodiments, the coating comprises an enzyme. In some embodiments, the coating comprises an inorganic metal. In specific embodiments, the coating comprises gold.

Contacting Sample with the Coating

In some aspects, the present disclosure provides methods further comprising contacting a fluid sample comprising a plurality of biological nanoparticles with the coating. The contacting can allow for biological nanoparticles within the fluid sample to interact with the coating, and to adhere to the capturing molecules.

In some embodiments, the fluid sample is provided in a thin layer. Having a small layer thickness increases the probability of biological nanoparticles to interact with the coating, and to adhere to the capturing molecules. Having a small layer thickness reduces the distance over which biological nanoparticles have to travel (e.g., when biological nanoparticles are transported through the layer under influence of centrifugal force) to interact with the coating, and to adhere to the capturing molecules. In certain embodiments, at least a portion of the fluid sample has a layer thickness less than 10 mm, less than 9 mm, less than 5 mm, less than 1 mm, less than 900 µm, less than 800 µm, less than 700 µm, less than 600 µm, less than 500 µm, less than 400 µm, less than 300 µm, less than 200 µm, or less than 100 µm. In preferred embodiments, at least a portion of the fluid sample has a layer thickness less than 10 mm. In other preferred embodiments, at least a portion of the fluid sample has a layer thickness less than 9 mm. In preferred embodiments, at least a portion of the fluid sample has a layer thickness less than 1 mm. In other preferred embodiments, at least a portion of the fluid sample has a layer thickness less than 500 µm.

As disclosed above, the methods provided herein may comprise a fluid sample having a thin layer thickness. A sample having thin layer thickness may be susceptible to evaporation, which can hamper or perturb the intended movement of biological nanoparticles in the fluid sample. In certain embodiments, the present disclosure provides methods further comprising covering the fluid sample with an evaporation prevention layer. In certain embodiments, the evaporation prevention layer is tape. In some embodiments, the evaporation prevention layer comprises oil. In specific embodiments, the evaporation prevention layer comprises mineral oil.

In certain aspects, the present disclosure provides methods further comprising providing a containing device comprising a plurality of compartments, wherein at least one of the plurality of compartments comprise the at least one planar surface and the fluid sample. Compartments may be used to facilitate contact of a fluid sample with the coating, or to partition a planar surface into portions, so that a plurality of fluid samples may be in contact with the coating of the same planar surface. For example, a 96-well plate may comprise a planar surface, wherein the planar surface is coated as described above, which provides a means for analyzing a plurality of fluid samples, and contacting the plurality of fluid samples with the same coating.

In some embodiments, the containing device comprises a well plate. In specific embodiments, the plurality of compartments comprises a well. In certain embodiments, the containing device comprises a microfluidic chip. In specific embodiments, the plurality of compartments comprises a microfluidic channel.

In some embodiments, the containing device is a block comprising a plurality of holes, and the plurality of compartments comprises the plurality of holes. In some aspects, the block is provided separately from the planar surface.

In some aspects, the present disclosure provides methods further comprising attaching the containing device to the coated planar surface. In certain embodiments, the attaching of the containing device to the coated planar surface uses an adhesion material. In particular embodiments, the adhesion material comprises a glue. In other embodiments, the adhesion is accomplished via bonding.

In certain embodiments, the containing device is attached to a top device. The top device may allow for customization of the fluid sample that is in contact with the coating. For example, a filter may be attached to the containing device, and a fluid sample comprising unwanted matter provided to the filter will pass through it, resulting in the removal of the unwanted matter from the fluid in contact with the coating. In some embodiments, the top device comprises a filter. In certain embodiments, the top device comprises a microfluidic chip. In some embodiments, the top device comprises a multi-well plate.

In some aspects, the present disclosure provides methods further comprising removing the planar surface from a containing device. In certain embodiments, the removing occurs after biological nanoparticles have been captured by the coating. For example, containing device may comprise 4 planar surfaces, each coated with the same coating; following the contacting of the coating with a fluid sample and the capture of biological nanoparticles, the planar surfaces may be removed from the containing device, and further processed and/or analyzed.

Centrifuging and Capturing

In certain aspects, the present disclosure provides methods further comprising capturing at least some of a plurality of biological nanoparticles with at least some of a plurality of capturing molecules.

In some aspects, the present disclosure provides methods further comprising providing a force to the fluid sample in contact with a planar surface to facilitate contact of the biological nanoparticles with the coating. In some aspects, the present disclosure provides methods further comprising providing a force to the biological nanoparticles contained in the fluid in contact with a planar surface to facilitate contact of the biological nanoparticles with the coating. In certain embodiments, the force to facilitate contact between the fluid sample and the coating comprises centrifugal force, applied force, electrical force, magnetic force, or a combination thereof. In certain embodiments, the force to facilitate contact between the biological nanoparticles and the coating comprises centrifugal force, applied force, electrical force, magnetic force, or a combination thereof. In preferred embodiments, the force comprises centrifugal force. In some embodiments, the force is centrifugal force.

In certain aspect, the present disclosure provides methods further comprising centrifuging a fluid sample in contact with at least one planar surface to facilitate contact of biological nanoparticles with a coating. Centrifugation can increase contact of biological nanoparticles within a fluid sample with the coating, and therefore facilitates interactions of the biological nanoparticles of interest with the capturing molecules, leading to increased adhesion. Centrifugal force can additionally aid in the utility of aforementioned top devices. In specific embodiments, centrifugal force can aid in the utility of the aforementioned top devices by driving flow of the fluid sample. For example, a sample comprising a plurality of biological nanoparticles and unwanted matter can be introduced to a filter on top of a containing device, wherein the containing device comprises a planar surface having a coating with a non-fouling material and a plurality of capturing molecules. Centrifugal force can drive the sample through the filter, retaining the unwanted matter within the filter, while the fluid sample comprising biological nanoparticles is contacted with the planar surface comprising the coating. The centrifugal force can drive the biological nanoparticles toward the coating, increasing the probability of interaction with the capturing molecules, and adhesion to said capturing molecules.

In some aspects, the present disclosure provides methods for filtering the fluid sample. In certain aspects, the filtering of the fluid sample occurs prior to the fluid sample coming in contact with the at least one planar surface. In some embodiments, the filtering is used in order to remove unwanted materials. In specific aspects, the filtering is driven by centrifugal force.

In certain embodiments, the centrifugal force is applied simultaneously to a plurality of planar surfaces. For example, a centrifuge rotor comprising four swinging plate carriers may be loaded with more than one planar surface, and the centrifugal force may be applied simultaneously to each of the planar surfaces placed into the centrifuge.

As disclosed herein, centrifugation can provide for increased contact between biological nanoparticles and the coating, and more specifically between biological nanoparticles and the capturing molecules. In certain aspects, the present disclosure provides methods wherein the centrifugation takes place for a period of time, and the number of biological nanoparticles associated with the coating is at least 10% greater, at least 20% greater, at least 30% greater, at least 40% greater, at least 50% greater, at least 60% greater, at least 70% greater, at least 80% greater, at least 90% greater, at least 100% greater, at least 150% greater, at least 200% greater, at least 300% greater, at least 400% greater, at least 500% greater, or at least 1,000% greater than a comparable experiment omitting the centrifuging step, wherein the comparable fluidic sample is in contact with the coating for the same period of time. In preferred embodiments, the number of biological nanoparticles associated with the coating is at least 100% greater than a comparable experiment omitting the centrifuging step, wherein the comparable fluidic sample is in contact with the coating for the same period of time. For example, a containing device having one coated planar surface divided by two wells can have an aliquot from a fluid sample introduced into one of the wells; the device is centrifuged for 30 minutes, and analysis of the planar surface shows 180 biological nanoparticles are captured. A second aliquot of the same size and from the same fluid sample can be introduced into the second well, and left on a benchtop for 30 minutes; analysis of the planar surface shows that 100 biological nanoparticles are captured. In this example, centrifugation increased the capture of biological nanoparticles by 80% over the same period of time. In certain embodiments, the period of time is less than 1 hour, less than 30 minutes, less than 15 minutes, less than 10 minutes, less than 5 minutes, or less than 1 minute.

In certain embodiments, at least 5%, at least 10%, at least 20%, at least 30%, at least 40%, at least 50%, at least 60%, at least 70%, at least 80%, at least 90%, at least 95%, or at least 99% of the plurality of biological nanoparticles from the fluid sample are captured with the coating. In preferred embodiments, at least 10% of the plurality of biological nanoparticles from the fluid sample are captured with the coating. In specific embodiments, at least 10% of the plurality of biological nanoparticles from the fluid sample are associated with the plurality of capturing molecules. As defined herein, "associated" in the context of a biological nanoparticle and a capturing molecule includes covalent, non-covalent, ionic, and/or non-ionic interactions. For example, the biological nanoparticle can be covalently attached to the capturing molecule. In some embodiments, the biological nanoparticle can be ionically attached to the capturing molecule. In some embodiments, the biological nanoparticle can be attached to the capturing molecule via van deer Waals interactions. In some embodiments, the biological nanoparticle can be attached to the capturing molecule via a combination of electrostatic and van deer Waals interactions. In some embodiments, the biological nanoparticle can be attached to the capturing molecule via antibody-antigen binding. In some embodiments, the biological nanoparticle is attached to the capturing molecule via antibody-antigen binding. As used herein in the context of biological nanoparticles and capturing molecules, the terms "associated with", "captured", "attached", "adhered", and the like can be used interchangeably. As used herein in the context of biological nanoparticles and the coating, the terms "associated with" and the like are understood to be the same as "associated with" the capturing molecules of the coating.

In some aspects, the present disclosure provides methods further comprising increasing the stability of the coated planar surface. In some embodiments, increasing the stability comprises lyophilization. In some embodiments, the increasing of stability of the coated planar surface takes place prior to incorporation of the capturing molecules associated with the coating. In some embodiments, the increasing of stability of the coated planar surface takes place after the incorporation of capturing molecules associated with the coating. In some embodiments, the increasing of stability of the coated planar surface takes place prior to the capturing of biological nanoparticles but after incorporating of capturing molecules to the coated surface or as part of the coated surface. In specific embodiments, the coated planar surface is lyophilized after incorporation of antibody to the coated surface or as part of the coated surface. Increasing the stability of the coating (e.g., with lypholization) increases shelf life of the coating, especially if the coating comprises proteins such as antibodies or streptavidin, whereas a non-lyophilized sample may degrade or dissociate within that time. In some embodiments, increasing the stability occurs after the capturing of at least some of the plurality of biological nanoparticles with at least some of the plurality of capturing molecules associated with the coating. In specific embodiments, the coated planar surface is lyophilized following the capture of biological nanoparticles with the coating. Increasing the stability of the coating (e.g., with lyphilization) increases shelf life of the coating and any biological nanoparticles that may be adhered to the coating. For example, a plurality of biological nanoparticles associated with a coated planar surface may be lyophilized, and the resulting lyophilized planar surface can be stored and analyzed at a later time, whereas a non-lyophilized sample may degrade or dissociate within that time.

Analysis of Captured Biological Nanoparticles

In some aspects, the present disclosure provides methods further comprising analyzing the planar surface. In specific embodiments, the present disclosure provides methods comprising analyzing the captured biological nanoparticles. In certain embodiments, the analyzing comprises imaging the biological nanoparticles associated with the coating using microscopy. In some embodiments, the analyzing comprises imaging the biological nanoparticles associated with the coating using fluorescence microscopy. In certain embodiments, the analyzing comprises counting the number of biological nanoparticles associated with the coating. In certain embodiments, the analyzing comprises determining the presence or absence of protein biomarkers or nucleic acid biomarkers associated with the biological nanoparticles. In some embodiments, the analyzing comprises determining the colocalization of biomarkers on individual biological nanoparticles using multi-color fluorescence microscopy. In certain embodiments, the analyzing comprises determining the copy number of biomarkers associated with the biological nanoparticles. In some embodiments, the analyzing comprises determining the size of individual biological nanoparticles. In some embodiments, the determining of the size of individual biological nanoparticles comprises using interferometric imaging. In some embodiments, the determining of the size of individual biological nanoparticles comprises using interferometric reflectance imaging.

In some embodiments, the analyzing comprises measuring an emitted light intensity from the biological nanoparticles associated with the coating. Further specifics of measuring an emitted light intensity from biological nanoparticles are provided herein. As provided herein, the measuring of an emitted light intensity can correspond with an assigning of a size value.

In certain embodiments, the analyzing comprises imaging the biological nanoparticles associated with the coating. In some aspects, the present disclosure provides methods further comprising associating a detectable agent with at least one of the plurality of nanoparticles. In some embodiments, the associating occurs prior to the capture of the biological nanoparticles. In some embodiments, the associating occurs after the capture of the biological nanoparticles. For example, a plurality of biological nanoparticles can be captured on a coating as detailed further herein, and a fluid comprising a plurality of detectable agents can be introduced to the coating, wherein the detectable agents associate specifically with the biological nanoparticles, resulting in biological nanoparticles associated with detectable agents being attached to the coating. This can facilitate the analysis of biological nanoparticles, for example, by aiding the detection and counting of detectable nanoparticles, or by providing information relating to the association of detectable agents that may be specifically targeting proteins of interest associated with the biological nanoparticles.

As disclosed herein, the capturing molecules may be attached to the planar surface or the coating via a linking moiety. In certain aspects, the present disclosure provides methods further comprising cleaving the linking moiety. Cleaving the linking moiety can release the previously captured biological nanoparticles, which can facilitate further analysis. In some aspects, the present disclosure provides methods further comprising releasing at least some of the plurality of biological nanoparticles from the coating. In certain embodiments, the at least some released biological nanoparticles are structurally intact. In other embodiments, the at least some released biological nanoparticles are lyzed, and the lysate is collected for analysis. In specific embodiments, the analysis of the lysate comprises nucleic acid analysis, sequencing, polymerase chain reaction, protein analysis, ELISA, mass spectrometry, carbohydrate analysis, small molecule analysis, drug analysis, lipid analysis, or a combination thereof. In specific embodiments, biological nanoparticles are captured by biotinylated antibodies that are attached to streptavidin molecules associated with the coating; biological nanoparticles can then be released by the addition of free biotin molecules to the coated surface, which disrupt the binding of biotinylated antibodies to the streptavidin molecules thereby releasing the biological nanoparticles from the planar surface.

In certain embodiments, at least some of the plurality of biological nanoparticles can be released from the coating. In specific embodiments, the releasing of at least some of the plurality of biological nanoparticles from the coating comprises elution with biotin.

As used herein, the term "captured biological nanoparticles" and the like refers to biological nanoparticles that have been attached to the coating, or to biological nanoparticles that were previously attached to the coating. For example, a fluid sample comprising biological nanoparticles is in contact with a coated surface; as soon as the biological nanoparticles associate with a capturing molecule, the biological nanoparticles are captured biological nanoparticles. Further processing, e.g., cleaving a linking moiety, will release the biological nanoparticles, but these biological nanoparticles are still referred to as captured biological nanoparticles, and are differentiated from nanoparticles that did not associate with the coating.

In certain embodiments, the analyzing of the captured biological nanoparticles occurs while the biological nanoparticles are attached to the coating and/or the planar surface. In other embodiments, the analyzing of the captured biological nanoparticles occurs after the biological nanoparticles have been detached from the coating and/or the planar surface.

In some aspects, the present disclosure provides methods further comprising washing the planar surface to remove at least some of the fluid sample that has not been captured by the at least some of the plurality of capturing molecules. Washing the planar surface to remove non-captured material facilitates the processing and analysis of the captured biological nanoparticles. For example, washing may remove any materials that are not biological nanoparticles of interest associated with the coating, therefore increasing precision and accuracy of downstream analysis.

In some embodiments, at least some of the plurality of biological nanoparticles captured with the coating are imaged. In certain embodiments, the imaging comprises fluorescence microscopy. In specific embodiments, the fluorescence microscopy is super-resolution imaging. In specific embodiments, the fluorescence microscopy is TIRF microscopy (total-internal-reflection fluorescence). In some embodiments, the fluorescence microscopy uses at least one membrane dye associated with the biological nanoparticles. In specific embodiments, the at least one membrane dye comprises FM 143, a dye of the FM 143 family, a derivative of FM 143, or a combination thereof. In some embodiments, the at least one membrane dye comprises an ANEPPS dye, a dye of the ANEP (aminonaphthylethenylpyridinium) family, a derivative of an ANEP dye, Di-4-ANEPPS, Di-8-ANEPPS, an ANEPEQ dye, Di-2-ANEPEQ, Di-8-ANEPPQ, Di-12-ANEPPQ, a styryl dye, RH237, RH414, RH421, RH795, a SynaptoGreen™ dye, AM1-43, AM1-44, AM2-10, AM3-25, HM1-43, a SynaptoRed™ dye, an Oregon Green™ dye, Oregon Green™ Diacetate, AM4-64, AM4-65, AM4-66, a DiBAC dye (e.g., DiBAC$_4$(3) (Bis-(1, 3-Dibutylbarbituric Acid) Trimethine Oxonol)), a Calcein™ dye, a Calcein™ ester, a derivative of a Calcein™ ester, a fluorescein dye, a fluorescein ester, or a derivative of a fluorescein ester, an Alexa™, an Alexa™ ester, or a derivative of an Alexa™ ester, an ATTO™ dye, an ATTO™ ester, or a derivative of an ATTO™ ester, a cyanine dye, a cyanine ester, or a derivative of a cyanine ester, DiOC$_2$(3) (3,3'-Diethyloxacarbocyanine iodide), DiOC$_5$(3) (3,3-dipentyloxcarbocyanine iodide), a lanthanide dye, TMRE (tetramethylrhodamine ethyl ester), TMRM (tetramethylrhodamine methyl ester), any derivative thereof, or a combination thereof. In certain embodiments, the imaging comprises atomic force microscopy. In some embodiments, the imaging comprises transmission electron microscopy. In some embodiments, the imaging comprises interferometric microscopy. In some embodiments, the imaging comprises interferometric reflectance microscopy. In certain embodiments, the imaging comprises photographic capture. In some embodiments, the imaging comprises real-time monitoring and/or video capture.

In some embodiments, the analysis provides a set of information. In specific embodiments, the imaging provides a set of information. For example, imaging a plurality of biological nanoparticles attached to the coating can provide information relating to the type of captured biological nanoparticles, interactions with detectable agents, the number of captured biological nanoparticles, the copy number of biomarkers associated with the biological nanoparticles, the size of the biological nanoparticles, and the like. In certain embodiments, the set of information comprises identifying the biomarkers present on the nanoparticles. In some embodiments, the set of information comprises identifying the antibodies associated with the biological nanoparticles. In some embodiments, the set of information comprises identifying the size of the bionanoparticles.

In certain embodiments, the size of the biological nanoparticles attached to the coating is determined. Methods of determining the size of biological nanoparticles are disclosed herein. In specific embodiments, the size of the biological nanoparticles is a relative size value, and the relative size value is determined by a difference in measured light intensity. In some embodiments, the methods further comprise calibrating the measured light intensity with a standard to determine the actual size value of the nanoparticle. In some embodiments, the calibrating occurs prior to the measuring of the light intensity. In some embodiments, the calibrating occurs after the measuring of the light intensity. In some embodiments, the calibrating occurs at the same time as the measuring of the light intensity. In certain embodiments, the size of the biological nanoparticle is an actual size value. Any of a plurality of standards can be used, as disclosed further herein. In some embodiments, the light intensity comprises dynamic light scattering. In certain embodiments, the size of the standard is measured with dynamic light scattering. In some embodiments, the size of the standard is measured with transmission electron microscopy. In certain embodiments, the size of the standard is measured with interferometric microscopy. In some embodiments, the size of the standard is measured with interferometric reflectance microscopy.

As described further herein, biological nanoparticles, detectable agents, tags, and the like may be measured with specificity. In some embodiments, the measured light intensity has single-nanoparticle sensitivity. In certain embodiments, the measured light intensity has single-molecule sensitivity.

In some embodiments, the measured light intensity detects a single antibody comprising multiple detectable agents. In certain embodiments, the measured light intensity detects a single antibody associated with multiple detectable agents. For example, a captured biological nanoparticle may associate with an antibody, wherein the antibody is associated with 3 detectable agents, and the measured light intensity can detect each of the detectable agents. In some embodiments, the multiple detectable agents are the same. In other embodiments, the multiple detectable agents are different. In certain embodiments, the detectable agents are dye-tagged antibodies. In some embodiments, the detectable agents are dyes.

In some embodiments, the set of information comprises identifying the concentration of the sample. In specific embodiments, the set of information comprises identifying the concentration of biological nanoparticles of interest in the sample.

As described further herein, in some embodiments the biological nanoparticle comprises at least one biomolecule. In certain embodiments, the set of information comprises identifying the copy number of biomolecules associated with the biological nanoparticles. In some embodiments, the set of information comprises identifying the copy number of at least one biomolecule.

As described further herein, in some embodiments the biological nanoparticle is associated with at least one detectable agent. In certain embodiments, the biological nanoparticle is associated with a plurality of detectable agents. In some aspects, at least one of the plurality of detectable agents is attached to the surface of the biological nanoparticle, at least one of the plurality of detectable agents is in the surface of the biological nanoparticle, at least one of the plurality of detectable agents is within the interior of the biological nanoparticle, or a combination thereof. In some embodiments, the plurality of detectable agents comprise more than one type of detectable agent. In certain embodiments, the plurality of detectable agents have different emission profiles. In some embodiments, the emission profiles have different peak wavelengths.

As described further herein, in some embodiments the biological nanoparticle comprises at least one biomarker. In some embodiments, the detectable agent or plurality of detectable agents associate with the biomarker. In certain embodiments, the plurality of detectable agents are colocalized. In preferred embodiments, the presence of colocalized detectable agents provides a set of information. In specific embodiments, the presence of colocalized detectable agents provides a set of information comprising the presence of the at least one biomarker, the absence of the at least one biomarker, or a combination thereof. A biomarker associated with detectable agents can provide colocalized information, e.g., the emission of three different wavelengths of light intensity from the same location indicates three detectable agents are associated with a biomarker of interest, and the presence of the biomarker.

Apparatuses and Kits

In one aspect, the present disclosure provides a device for capturing biological nanoparticles. In one embodiment, the device comprises: (a) at least one planar surface having a coating, the coating comprising a non-specific adsorption resisting material, and a plurality of capturing molecules; and (b) a containing device to facilitate contact of a fluid sample with the coating, wherein the containing device is compatible with centrifugation.

In certain embodiments, at least one planar surface comprises glass. In some embodiments, the at least one planar surface has a diameter of between 0.1 mm and 100 cm, between 0.1 mm and 20 cm, between 1 mm and 20 cm, between 5 mm and 10 cm, between 1 mm and 5 cm, between 10 mm and 10 cm, between 5 mm and 5 cm, or between 1 cm and 50 cm. In preferred embodiments, the at least one planar surface has a diameter of greater than 1 cm.

In some embodiments, the at least one planar surface has a width of between 1 cm and 100 cm, between 1 mm and 1 cm, between 1 mm and 20 cm, between 5 mm and 20 cm, between 10 mm and 20 cm, between 100 mm and 20 cm, between 1 cm and 20 cm, or between 1 cm and 50 cm. In certain embodiments, the at least one planar surface has a length of between 0.1 mm and 100 cm, between 1 mm and 20 cm, between 1 mm and 10 cm, between 5 mm and 20 cm, between 10 mm and 20 cm, between 100 mm and 20 cm, between 1 cm and 20 cm, or between 1 cm and 50 cm.

In certain embodiments, the at least one planar surface has a surface area, wherein the surface area is between 200 $cm^2$ and 100 $cm^2$, the surface area is between 150 $cm^2$ and 80 $cm^2$, the surface area is between 150 $cm^2$ and 1 $cm^2$, the surface area is between 200 $cm^2$ and 1 $mm^2$, the surface area is between 120 $cm^2$ and 1 $mm^2$, the surface area is between 80 $cm^2$ and 1 $mm^2$, the surface area is between 50 $cm^2$ and 1 $mm^2$, the surface area is between 20 $cm^2$ and 1 $mm^2$, the surface area is between 1 $cm^2$ and 1 $mm^2$, the surface area is between 75 $mm^2$ and 1 $mm^2$, the surface area is between 50 $mm^2$ and 1 $mm^2$, the surface area is between 25 $mm^2$ and 1 $mm^2$, or the surface area is between 10 $mm^2$ and 1 $mm^2$.

In some embodiments, the non-specific adsorption resisting material comprises polyethylene glycol, a zwitterionic surface, a carboxybetaine, bovine serum albumin, or a combination thereof. In certain embodiments, the capturing molecules comprise an antibody, a biotinylated antibody, a biotin, a streptavidin, an affibody, a nanobody, a peptide, a nucleic acid, an aptamer, or a combination thereof. In some embodiments, the capturing molecules are attached to the coating via a linking moiety.

In certain embodiments, the device further comprises a centrifuge rotor equipped to accept the containing device. For example, a centrifuge rotor can be manufactured to accept a containing device, and the rotor may be inserted into a centrifuge to provide a means to induce centrifugal force to the sample.

In certain aspects, the present disclosure provides a device for capturing biological nanoparticles, further comprising any of the aspects from the methods or apparatus provided herein.

In certain embodiments, the device comprises at least one source for interrogating. In other embodiments, the device comprises at least one detector configured to detect the absence or presence of captured biological nanoparticles. In some embodiments, the device comprises at least one source for interrogating and at least one detector configured to detect the absence or presence of captured biological nanoparticles.

In some embodiments, the source for interrogating comprises a source of electromagnetic radiation. In specific embodiments, the source for interrogating is selected from the group consisting of a solid state laser, a diode-pumped laser, an ion laser, a dye laser, a light-emitting diode (LED), a lamp, an arc discharge, a magnetic pulse, and a natural light.

In certain embodiments, the detector detects fluorescent light. In some embodiments, the detector detects luminescent light. In certain embodiments, the detector can detect a plurality of different emission profiles. In some embodiments, the detector can detect scattered light. In certain embodiments, the detector has single-nanoparticle sensitivity. In preferred embodiments, the detector has single-molecule sensitivity.

In some aspects of the present disclosure, the device also includes an imaging device, such as a microscope (e.g., a fluorescence microscopy, a confocal microscope, spinning disk microscope, multi-photon microscope, planar illumination microscope, Bessel beam microscope, differential interference contrast microscope, phase contrast microscope, epifluorescence microscope, a TIRF (total-internal-reflection fluorescence) microscope, transmission electron microscope, atomic force microscope, or a combination thereof). Optionally, the source of interrogating is a component of the imaging device, e.g., provides illumination for imaging. In certain aspects, the imaging device is used to obtain image data of the biological nanoparticles, e.g., when captured by the coating. Optionally, the image data is used as a basis for assigning a biological nanoparticle identification. In some aspects, this process occurs manually, e.g., a user views the image data and input instructions to assign an identifier based on, e.g., detectable agents associated with the biological nanoparticle. In other aspects, this process occurs automatically, e.g., the device comprises one or more processors to analyze the image data, such as by using computer vision or image analysis algorithms, and assign a value to the biological nanoparticles without requiring user input. In alternative aspects, the assigning is semi-automated, e.g., involving some user input and some automatic processing.

In some aspects, the devices described herein include a computer comprising one or more processors and a memory device with executable instructions stored thereon. In some aspects, the computer is used to perform the methods described herein. In various aspects, a computer can be used to implement any of the devices or methods illustrated and described above. In some aspect, a computer includes a processor that communicates with a number of peripheral subsystems via a bus subsystem. These peripheral subsystems can include a storage subsystem, comprising a memory subsystem and a file storage subsystem, user interface input devices, user interface output devices, and a network interface subsystem.

In some aspects, a bus subsystem provides a mechanism for enabling the various components and subsystems of the computer to communicate with each other as intended. The bus subsystem can include a single bus or multiple busses.

In some aspects, a network interface subsystem provides an interface to other computers and networks. The network interface subsystem can serve as an interface for receiving data from and transmitting data to other systems from a computer. For example, a network interface subsystem can enable a computer to connect to the Internet and facilitate communications using the Internet.

In some aspect, the computer includes user interface input devices such as a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to a computer.

In some aspects, the computer includes a storage subsystem that provides a computer-readable storage medium for storing the basic programming and data constructs. In some aspects, the storage subsystem stores software (programs, code modules, instructions) that when executed by a processor provides the functionality of the methods and systems described herein. These software modules or instructions can be executed by one or more processors. A storage subsystem can also provide a repository for storing data used in accordance with the present disclosure. The storage subsystem can include a memory subsystem and a file/disk storage subsystem.

The software can be used for analyzing the biological nanoparticles. For example, identification based on the presence or absence of an emitted detectable light intensity, or measuring a size value of biological nanoparticles based on the light intensity emitted by the biological nanoparticles.

In some embodiments, the software can be used for quantifying the number of captured biological nanoparticles having a particular size value. In certain embodiments, the software can be used for determining the concentration of a fluid sample. In particular embodiments, the software can be used for determining the concentration of particular biological nanoparticles in a fluid sample.

In some embodiments, the software can be used for determining at least one copy number of a biomarker associated with the captured biological nanoparticle. In some embodiments, the software can be used for determining the presence, absence, and/or co-localization of biomarkers associated with the captured biological nanoparticle.

In some aspects, the computer includes a memory subsystem that can include a number of memories including a main random access memory (RAM) for storage of instructions and data during program execution and a read only memory (ROM) in which fixed instructions are stored. A file storage subsystem provides a non-transitory persistent (non-volatile) storage for program and data files, and can include a hard disk drive, a solid state drive, a Compact Disk Read Only Memory (CD-ROM) drive, an optical drive, removable media cartridges, and other like storage media.

The computer can be of various types including a personal computer, a portable computer, a tablet, a smart phone, a workstation, a network computer, a mainframe, a kiosk, a server or any other data processing system. Due to the ever-changing nature of computers and networks, the description of computer contained herein is intended only as a specific example for purposes of illustrating the aspect of the computer. Many other configurations having more or fewer components than the system described herein are possible.

In certain embodiments, the device comprises a containing device comprising a plurality of compartments. In some embodiments, the containing device is a well plate. In certain embodiments, the plurality of compartments comprises a well. In some embodiments, the containing device is a microfluidic chip. In certain embodiments, the plurality of compartments comprises a microfluidic chip. In some embodiments, the containing device is a block, and the plurality of compartments comprise a plurality of holes. In certain embodiments, the containing device further comprises a lid. In some embodiments, the lid can prevent evaporation. In certain embodiments, the lid can comprise a filtration device. In some embodiments, the filtration device can prevent unwanted materials from coming into contact with the planar surface and coating.

In certain aspects, the present disclosure provides a kit for capturing biological nanoparticles, the kit comprising (a) at least one planar surface having a coating, the coating comprising a non-specific adsorption resisting material, and a plurality of capturing molecules; and (b) a containing device comprising a plurality of compartments, the containing device being compatible with centrifugation. As used herein, the term "compatible with centrifugation" indicates the device can withstand the forces of centrifugation required for the methods disclosed herein, and the device is compatible with developed platforms for centrifuging.

The containing device, planar surface, coating, non-specific adsorption resisting material, plurality of capturing molecules, and plurality of compartments are described further herein.

In some aspects, the present disclosure provides a kit further comprising a fluid sample, wherein the fluid sample comprises a plurality of biological nanoparticles. In some embodiments, the plurality of biological nanoparticles comprise an extracellular vesicle, an organelle, a microvesicle, a cell-derived vesicle, a protein aggregate, a nucleic acid aggregate, a lipid aggregate, a virus, a bacterium, an exosome, or a combination thereof.

In certain embodiments, the kit further comprises a set of instructions.

In some embodiments, the kit further comprises a detectable agent. In some embodiments, the kit comprises a plurality of detectable agents. Detectable agents are described further herein.

In certain embodiments, the kit further comprises a standard for calibrating. Standards are described further herein.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

EXAMPLES

The specific dimensions of any of the apparatuses, devices, systems, and components thereof, of the present disclosure can be readily varied depending upon the intended application, as will be apparent to those of skill in the art in view of the disclosure herein. Moreover, it is understood that the examples and aspects described herein are for illustrative purposes only and that various modifications or changes in light thereof can be suggested to persons skilled in the art and are included within the spirit and purview of this application and scope of the appended claims. Numerous different combinations of aspects described herein are possible, and such combinations are considered part of the present disclosure. In addition, all features discussed in connection with any one aspect herein can be readily adapted for use in other aspects herein. The use of different terms or reference numerals for similar features in different aspects does not necessarily imply differences other than those expressly set forth. Accordingly, the present disclosure is intended to be described solely by reference to the appended claims, and not limited to the aspects disclosed herein.

Example 1

Determination of Particle Size by Light Scattering

This Example describes a method of determining the size of a biological nanoparticle by measuring the amount of observed backscatter in a microfluidic device.

An apparatus configured to detect scattered light is used, as shown in FIG. 1. The apparatus comprises a light source, a first lens (L1), a second lens (L2), a cylindrical lens (CL), a dichroic mirror (DM), an objective (O), a stage (ST), a slit (S1), a third lens (L3), and an avalanche photodiode (APD). An 85 mW laser beam is used as the light source. The beam is expanded by lenses L1 and L2. The beam subsequently passes through the cylindrical lens to focus the light into a line, and thereafter is transmitted to the back focal plane of the objective by the dichroic mirror. As the beam passes through the objective, the beam is focused into a narrow oval detection beam with a minor radius less than 1 μm. The beam contacts particles passing through a microfluidic channel (the stage), with a resulting emission of scattered light. The backward scattering signal passes through the objective lens and dichroic mirror. The backward scattering signal then passes through the slit and the third lens, which focuses the signal onto the avalanche photodiode. The amount of backscatter is observed as an intensity reading by the avalanche photodiode, and is dependent on the time required for the particle to pass through the detection beam, as well as the size of the particle.

Figure 2B:
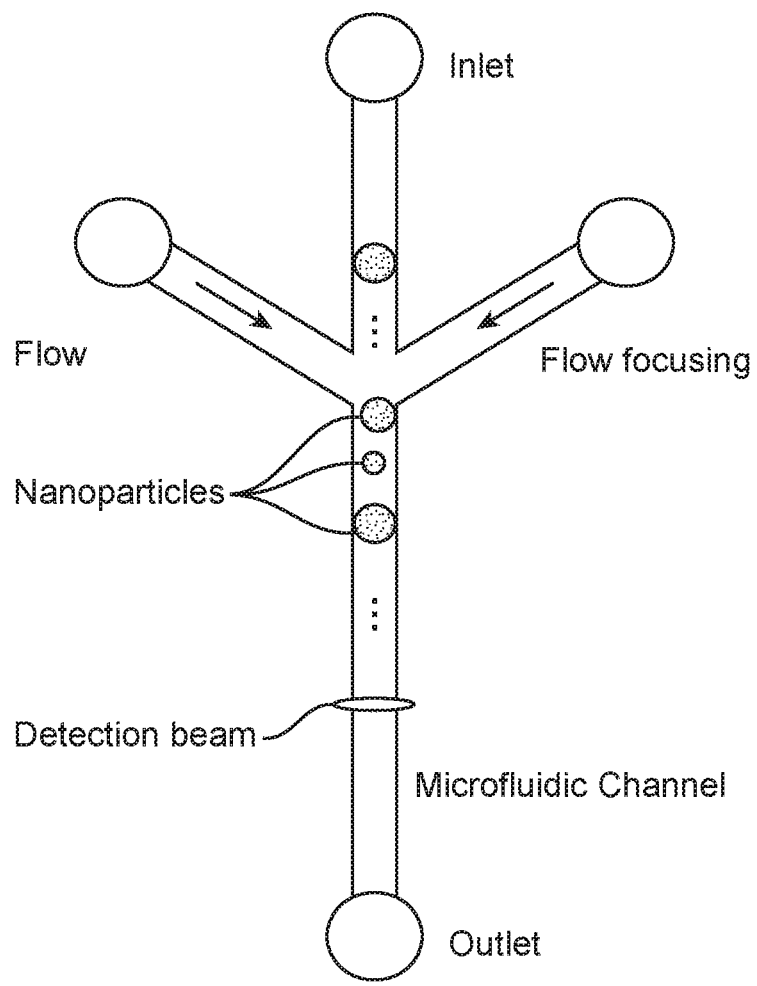
FIG. 2B depicts an apparatus comprising a microfluidic chip with two flow focusing channels to focus nanoparticles in the plane of the microfluidic chip.
Figure 2C:
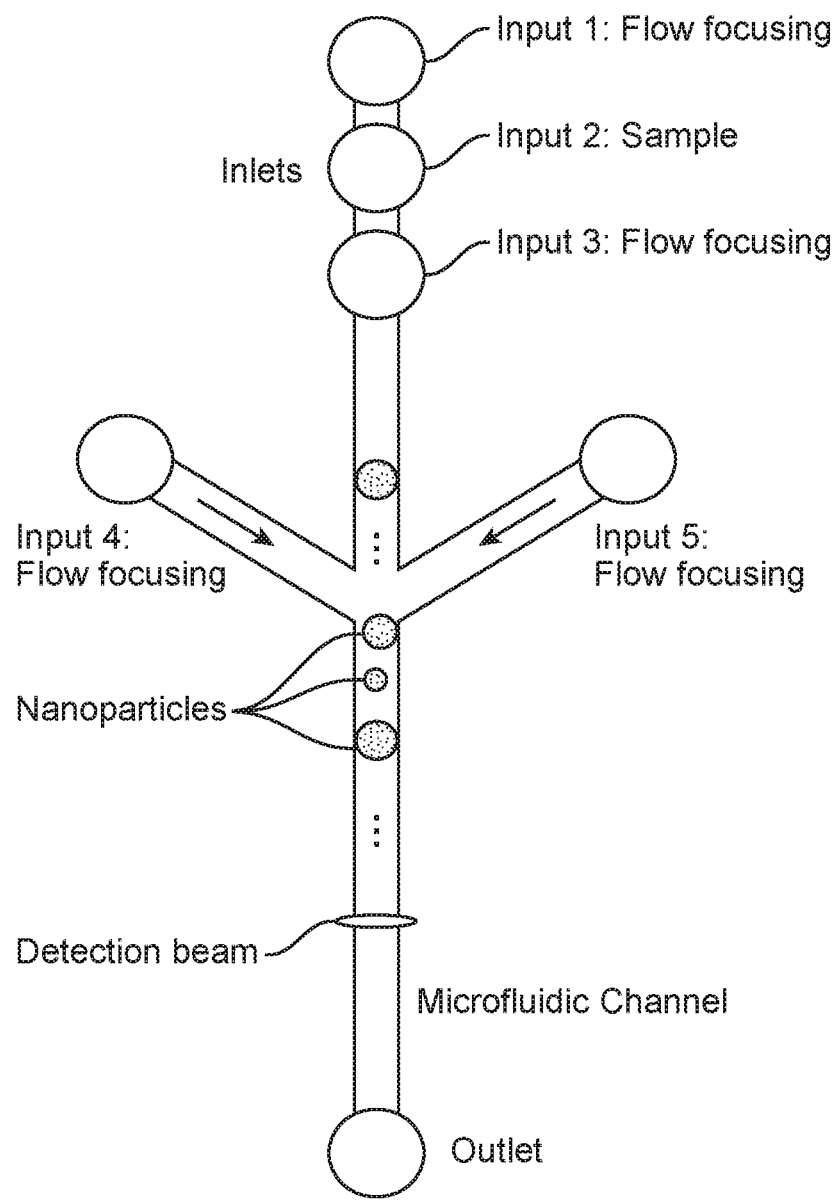
FIG. 2C depicts an apparatus comprising a microfluidic chip with four flow focusing channels to focus nanoparticles both in the plane of the microfluidic chip and orthogonal to the plane of the microfluidic chip.

A microfluidic channel device comprising an inlet, a microfluidic channel, and an outlet is used, as shown in FIG. 2A-C. The device uses hydrodynamic focusing to induce the flow of a single stream of particles. The flow in the microfluidic channel is controlled to have a substantially constant velocity from run-to-run and over time. A fluid standard comprising five types of particles having known diameters is injected into the inlet, and the particles individually pass through the detection beam, resulting in scattering of light. By having a substantially constant velocity, the amount of backscatter observed is dependent on the size of the particles. A burst trace is obtained having distinct peak height clusters, which correspond with the standard particles of known diameter. This shows that the amount of backscatter observed corresponds with the diameter of the particle, and has good signal to noise ratio.

A histogram is generated compiling bursts over the course of an extended period of time. The fluid standard comprising five types of particles is injected into the inlet, and the resulting backscatter is observed over a period of 60 seconds. A histogram comparing the resulting burst areas with number of incidents is created. The distinct particles are observable in the histogram, and each is fitted with a Gaussian curve. The burst areas are plotted as a function of particle size resulting in the formation of a non-linear equation. This results in a mathematical function of backscatter relation to particle diameter, and the equation is used in the analysis of particles having unknown diameter.

To confirm the use of this equation in determining backscatter to particle diameter, a sample comprising particles of known diameter is injected into the inlet. As a particle passes the detection beam, the backscatter is quantified and particle diameter is calculated using the equation from above. A histogram is created charting the calculated particle diameter and the number of incidences. The histogram displays distinct sizes of particles, which are in agreement with the known diameter of particles in the sample. This result shows that the size of a particle corresponds to the amount of backscatter the particle produces when passing through the detection beam.

Example 2

Determination of Extracellular Vesicle Size with Surface Membrane Dyes

This Example describes a method of determining the size of a particle by measuring the emitted light of surface fluorescent agents (FIG. 3A-E).

Extracellular vesicles are membrane vesicles, and are of interest in a clinical setting because they are abundant in bio-fluids such as blood, urine, and semen. The presence of these membrane vesicles are useful as biomarkers, and can aid clinical diagnosis or determination of therapeutic targets. Traditionally, conventional flow cytometry was used to detect the size of cells with light scattering, but the scattering signals from extracellular vesicles are much weaker. Furthermore, this process required the use of polymer beads to calculate a calibration curve for size determination. Polymer beads and vesicles have a substantially different refractive index, and the resulting size determination could be inaccurate.

The inaccuracies of previous methods are currently addressed by using extracellular vesicles or liposomes as standards, which have substantially similar refractive indexes as the unknown vesicles. Additionally, FM 4-64—a lipophilic dye—is used to selectively label the external surface lipid membrane of extracellular vesicles with known diameter, as shown in FIG. 3A. FM 4-64 produces a bright signal, with excitation $\lambda_{max}$=515 nm, emission $\lambda_{max}$=734 nm, and a 40-fold increased quantum yield when attached to the lipid membrane than when in aqueous solution. This generation of a strong signal greatly improves the signal-to-noise ratio in the detection and thus significantly increases the throughput (i.e., the number of extracellular vesicles measured per unit of time) of the measurement.

The signal emitted by the lipophilic dye corresponds to the size of the extracellular vesicle, as shown in FIG. 3B. The intensity of the lipid dye ($I_1$) is proportional to the surface area of the vesicle having diameter D, wherein the surface area=$\pi \times D^2$. A correction factor ($C_1$) is used such that the diameter of an extracellular vesicle can be calculated based on the intensity of the emitted signal. The following formula is used:

$$D = C_1 \times \left(\frac{I_1}{\pi}\right)^{\frac{1}{2}}$$

A standard having exosomes with a size range from 30 nm to 150 nm is obtained. The standard is analyzed using a Malvern Zetasizer with dynamic light scattering, and the resulting reference size distribution is charted (FIG. 3C). The standard exosomes are labeled with the FM 4-64 dye. A microfluidic channel device (FIG. 2A-C) is used. The flow in the microfluidic channel is controlled to have a velocity that is substantially constant, and the same substantially constant velocity used for measurements using the sample as well as the standard. The standard comprising dyed exosomes is injected into the inlet. The detection beam wavelength is set to 515 nm for maximum fluorophore excitement, and the resulting emission intensity is measured. A histogram comparing the emission intensity against the number of instances is created, and an uncorrected intensity distribution of dyed exosomes is obtained (FIG. 3D). The FM 4-64 histogram is overlaid with the size distribution determined by the Zetasizer reference, and the correction factor $C_1$ is calculated (FIG. 3E). This example shows that the size of an extracellular vesicle can be determined by the intensity of surface membrane fluorescent dyes.

Example 3

Determination of Extracellular Vesicle Size with Volume Dyes

This Example describes a method of determining the size of a particle by measuring the emitted light of fluorescent agents encompassed by the particle (FIG. 4A-E).

An alternative to labeling the surface of a particle is to label the volume within the particle. This technique uses extracellular vesicles or liposomes as standards, which have substantially similar refractive indexes to unknown vesicles. A volume dye is used to selectively label the interior volume of extracellular vesicles with known diameter, as shown in FIG. 4A.

The signal emitted by the volume dye corresponds to the size of the extracellular vesicle, as shown in FIG. 4B. The intensity of the volume dye ($I_2$) is proportional to the volume of the vesicle having diameter D, wherein the volume=$\pi \times D^3/6$. A correction factor ($C_2$) is used such that the diameter of an extracellular vesicle can be calculated based on the intensity of the emitted signal. The following formula is used:

$$D = C_2 \times \left(\frac{6 \times I_2}{\pi}\right)^{\frac{1}{3}}$$

A standard is obtained having exosomes with a size range from 30 nm to 150 nm. The standard is analyzed using a Malvern Zetasizer with dynamic light scattering, and the resulting reference size distribution is charted (FIG. 4C). The standard exosomes are labeled with the volume dye. A microfluidic channel device (FIG. 2A-C) is used. The flow in the microfluidic channel is controlled to have a constant velocity substantially the same as used for the standard sample. The standard comprising dyed exosomes is injected into the inlet. The detection beam wavelength is set for maximum fluorophore excitement, and the resulting emission intensity is measured. A histogram comparing the emission intensity against the number of instances is created, and an uncorrected intensity distribution of dyed exosomes is obtained (FIG. 4D). The volume dye histogram is overlaid with the size distribution determined by the Zetasizer reference, and the correction factor $C_2$ is calculated (FIG. 4E). This example shows that the size of an extracellular vesicle can be determined by the intensity of fluorescent volume dyes.

Example 4

Determination of Extracellular Vesicle Size with Volume and Surface Dyes

Figures 5A, 5B:
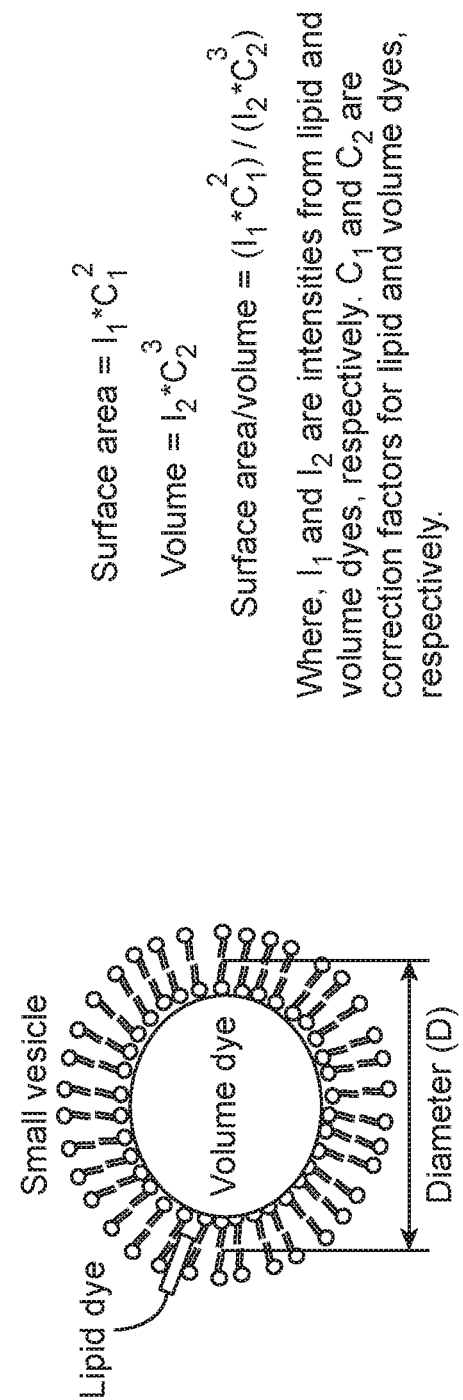
FIG. 5A-B depicts a biological nanoparticle size determination using volume dye and surface membrane dye.

This Example describes a method of determining the size of a particle by measuring the emitted light of fluorescent agents associated with a particle. The fluorescent agents comprise a volume dye encompassed by the particle and a surface dye attached to the exterior of the particle (FIG. 5A-B).

A combination of surface and volume dyes results in a labeling system that improves homogeneity. This technique uses extracellular vesicles or liposomes as standards, making them suitable as standards to compare with other extracellular vesicles. A lipophilic dye is selected for attachment to the extracellular vesicle standard surface membrane, and a volume dye is selected to occupy the interior of the standard vesicles. The standard extracellular vesicles have a known diameter, D, as shown in FIG. 5A. The surface membrane dye and the volume dye have emission bandwidths that do not substantially overlap.

The intensity of the surface membrane dye ($I_1$) is proportional to the surface area of the vesicle with diameter D, having a correction factor ($C_1$) such that the diameter of a particle is calculated based on the intensity of the emitted signal:

$$D = C_1 \times \left(\frac{I_1}{\pi}\right)^{\frac{1}{2}}$$

The correction factor $C_1$ is determined using the sample standard, following the method as described in Example 2, above.

The intensity of the volume dye ($I_2$) is proportional to the volume of the vesicle with diameter D, having a correction factor ($C_2$) such that the diameter of a particle is calculated based on the intensity of the emitted signal:

$$D = C_2 \times \left(\frac{6 \times I_2}{\pi}\right)^{\frac{1}{3}}$$

The correction factor $C_2$ is determined using the sample standard, following the method as described in Example 3, above.

A ratio of the surface area and the volume of the particle is calculated by comparing the corrected fluorescent intensities (FIG. 5B). The corrected surface area=$I_1 \times C_1^2$. The corrected volume=$I_2 \times C_2^3$. The ratio of the surface to volume of the particle is:

$$\frac{\text{Surface area}}{\text{Volume}} = \frac{I_1 \times C_1^2}{I_2 \times C_2^3}$$

The size of an unknown extracellular vesicle is determined by the ratio of the corrected intensity of the volume dye and the corrected intensity of the surface membrane dye. The unknown extracellular vesicle is labeled with the surface membrane dye and the volume dye. A microfluidic channel device (FIG. 2A-C) is used. The flow in the microfluidic channel is controlled to have a constant velocity substantially the same as used for the standard sample. The vesicle comprising volume and surface dyes is injected into the inlet. The detection beam wavelength is set for maximum fluorophore excitement of both volume and surface dyes, and the resulting emission intensity of each is measured. The size of a substantially spherical vesicle relates to the surface area and volume as:

$$\frac{\text{Volume}}{\text{Surface area}} = \frac{\frac{4}{3}\pi r^3}{4\pi r^2} = \frac{r}{3}$$

and the intensity of the volume and surface area are related by the ratio:

$$\frac{\text{Volume}}{\text{Surface area}} = \frac{I_2 \times C_2^3}{I_1 \times C_1^2}$$

therefore the radius of the vesicle, (r) is calculated by the intensity of the vesicle as:

$$r = 3 \times \left( \frac{I_2 \times C_2^3}{I_1 \times C_1^2} \right)$$

This example shows that the size of an extracellular vesicle can be determined by the corrected intensity of fluorescent volume dyes in combination with fluorescent surface membrane dyes. This example further shows that by analyzing the ratio of the signal obtained from the surface membrane dye to the volume dye (i.e., the surface-to-volume ratio), information about the shape of a non-spherical extracellular device can also be extracted.

Example 5

Determination of Particle Size by Duty Cycle

This Example describes a method of determining the size of a particle by measuring the emitted light of fluorescent agents associated with a particle as the particle passes through two excitation beams.

A particle comprising a substantial uniform distribution of fluorescent agents is measured by its transit path. The size of the particle is determined by the transit path, and particles of substantially similar size having different numbers of dye molecules will afford the same measurement using this method. The size measurement is not directly calculated from emission intensity measurements, as with the previous examples.

Figure 6:
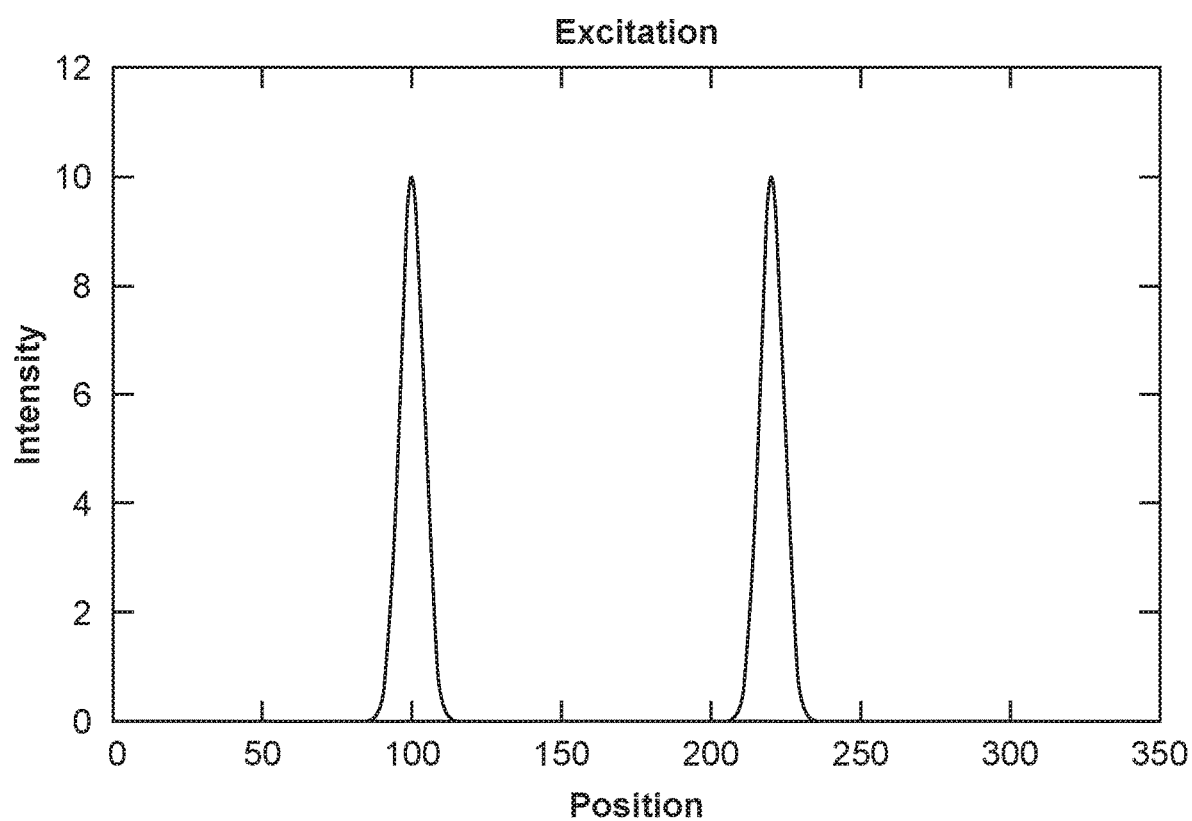
FIG. 6 depicts two detection beams that can be used to determine biological nanoparticle size by using a duty cycle.

A microfluidic channel device comprising an inlet, a microfluidic channel, and an outlet is used. The device uses hydrodynamic focusing to induce the flow of a single stream of particles. The flow in the microfluidic channel is controlled to have a substantially constant velocity. The device further comprises two detection beams, the beams being modulated by Spatial Light Modulators (SLMs). The SLMs shape the beams into light patterns having defined width, the width of the full-width at half-maximum (FWHM) being 10 bins, as shown in FIG. 6. The width of the beam at FWHM is less than or equal to the width of the smallest particle of interest. The distance between the two beams is greater than the width of the largest particle of interest.

A fluidic sample is obtained, the sample comprising particles homogenously coated with a surface fluorescent dye. The particles are of known size having 400 nm, 300 nm, 200 nm, 80 nm, and 40 nm diameters. The two detection beams have a wavelength corresponding to the excitation $\lambda_{max}$ of the particle fluorescent dye. The fluidic sample is injected into the inlet, and the particles flow through the two detection beams toward the outlet.

Figure 7:
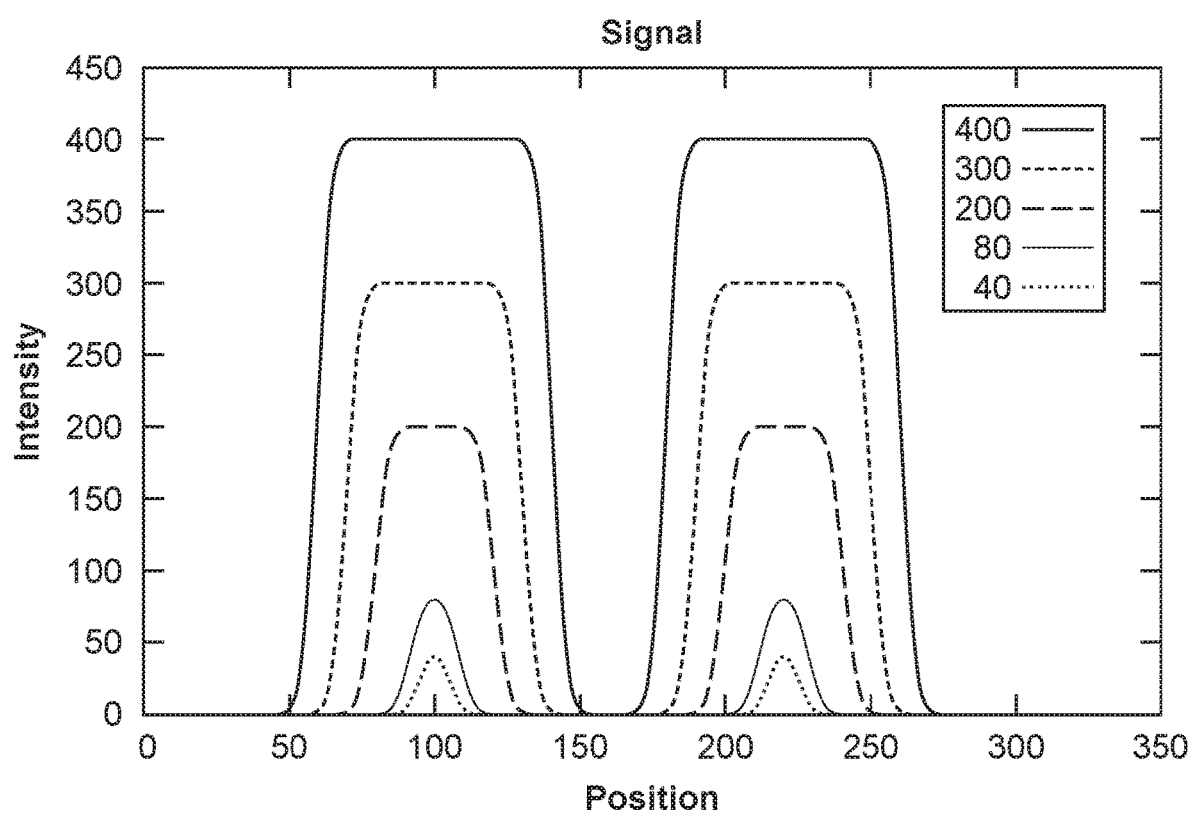
FIG. 7 depicts an intensity emission output detected when a biological nanoparticle associated with a fluorescent dye passes through detection beams and is excited.

As a particle passes the first detection beam, the fluorescent dyes are excited, and the subsequent emission is detected (FIG. 7). As the particle enters the first detection beam, the intensity of the emission increases until a maximum intensity is reached; as the particle exits the first detection beam, the intensity of emission decreases until it is indistinguishable from the baseline. Subsequently, the particle passes through the second detection beam, providing similar data.

Figure 8:
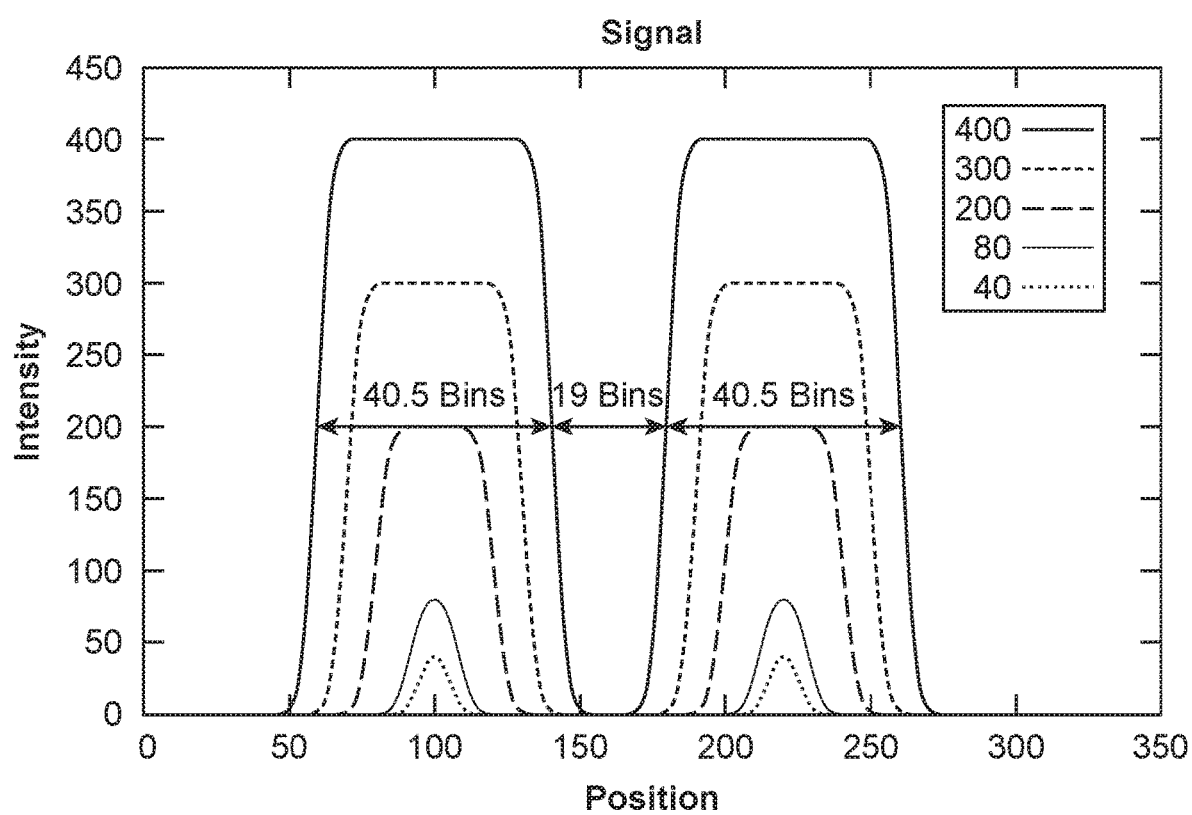
FIG. 8 shows that a duty cycle can be used to determine the size of a biological nanoparticle.

The duty-cycle/off-cycle is calculated using the emission results. A threshold for signal width calculation is set as half of the maximum intensity. For example, in FIG. 8, the particles having a diameter of 400 nm have a maximum intensity of 400, so the duty cycle calculations are conducted using the width of the peaks having an intensity of 200. The 400 nm particle emission as it crosses the first detection beam has a width of 40.5 bins. The particle then enters the "zero length" where there is no excitation by either beam, and therefore no emission is observed. The 400 nm zero length is measured as 19 bins. The particle subsequently passes through the second detection beam. The 400 nm particle emission as it crosses the second detection beam has a width of 40.5 bins. The total length of the duty-cycle/off-cycle is from the point where intensity first crosses the threshold (the particle entering the first beam) to where it falls below the last threshold (the particle leaving the second beam). The duty cycle and off cycle are calculated as a fraction of total length, having a sum with a value of 1. For example, the duty cycle of the 400 nm particle combines its half-maximum emission widths for a total of 81 bins, while the zero length is 19 bins, for a total length of 100 bins. The duty cycle of the 400 nm particle is therefore 0.81, and the off cycle is 0.19. The calculated duty and off cycles for the standard particles having known diameter is shown in Table 1.

TABLE 1

The duty cycles and off cycles calculated for particles of known diameter

| Particle Diameter (nm) | Duty Cycle | Off Cycle |
|---|---|---|
| 40 | 0.17 | 0.83 |
| 80 | 0.25 | 0.75 |
| 200 | 0.51 | 0.49 |
| 300 | 0.67 | 0.33 |
| 400 | 0.81 | 0.19 |

Figure 9:
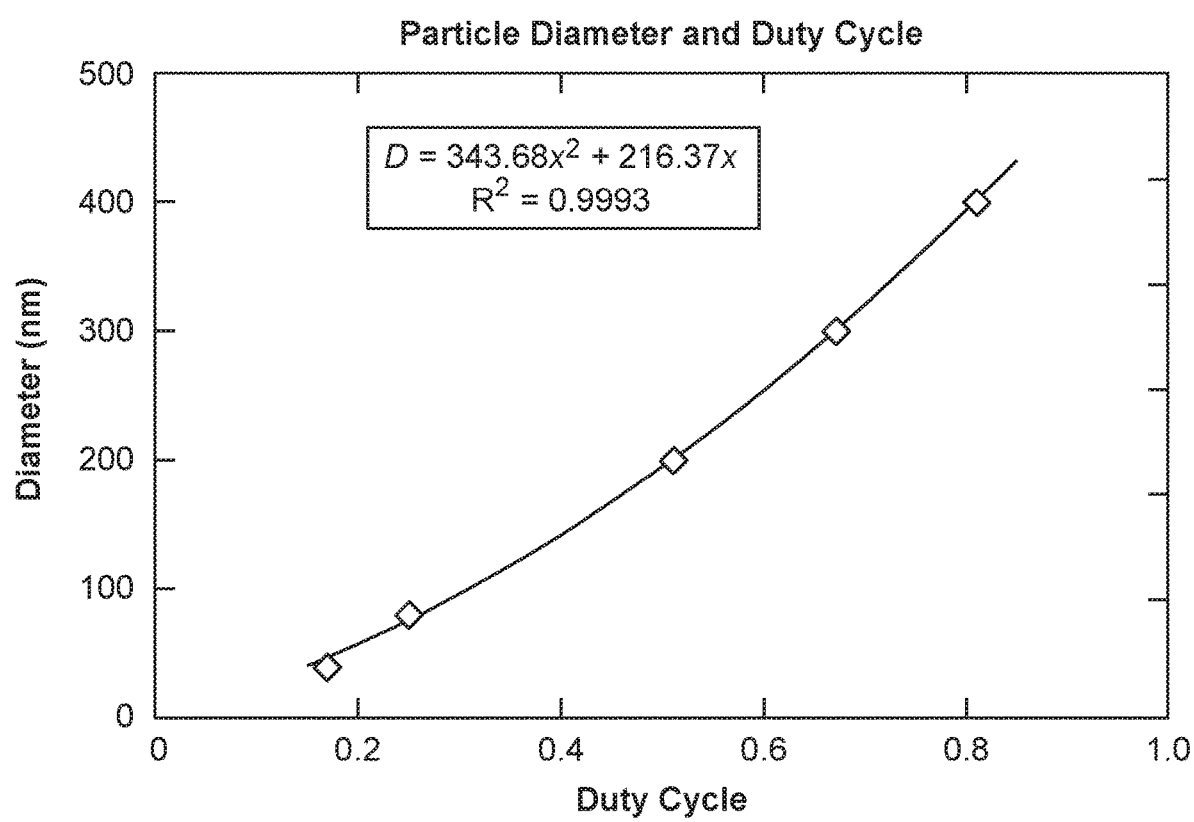
FIG. 9 shows that an equation can be generated to correlate duty cycle with nanoparticle size.

The flow is controlled so that the particles are traveling at a substantially constant velocity. As a result, the amount of time which the particle emission is above the threshold is proportional to the number of bins in FIG. 7, where the emission is above the threshold. Similarly, the amount of time which the particle is in the "zero length" region is proportional to the number of bins in the "zero length" region for the particle in FIG. 7. The measurement of these times is used to calculate the duty cycle. The data comparing duty cycle with particle diameter is charted, and an equation is calculated correlating the duty cycle with diameter (FIG. 9). Particles of unknown diameter having a substantial uniform distribution of fluorescent agents are injected into the inlet of the apparatus, and the resulting duty cycle of emission is determined. Using the emission duty cycle observed for each particle, the diameter is calculated.

In the example above, each position bin is 5 nm, the FWHM of the beams is 50 nm, the separation between the two excitation lines is 600 nm, and the spheres range in diameter from 40 to 400 nm. This method of determining size by duty cycle is applicable to particles having different ranges. For example, if each position bin is set to a length of 100 nm, the FWHM of the beams is 1000 nm, the separation between the two excitation lines is 12 microns, and particles having a diameter from 800 to 8000 nm will be measured. Increasing the separation further will increase the upper bound on the size of particles whose diameters can be measured. In determining the duty cycle, a substantially constant flow during the transit of particles over the total length of detection is important, but the actual velocity is not paramount. This shows that the size of a particle can be determined by using a duty cycle based on detected fluorescence emission. The use of a microfluidic chip with a planar geometry having a coverslip bottom enables the use of a high numerical aperture objective for shaping of the laser focal regions.

Example 6

Determination of Exosome Size by Single Beam Modified by Stimulated Emission Depletion This Example describes a method of determining the size of exosomes by measuring the emitted light of fluorescent agents associated with an exosome as the exosome passes through a single excitation beam modified by Stimulated Emission Depletion (STED) beams.

The size of an exosome is substantially smaller than many other particles of interest, with a typical range of 40-100 nm. Methods with enhanced detection techniques for small particles, such as exosomes, are beneficial. STED microscopy can improve resolution of the detection region, creating a focal resolution of approximately 30 nm. Use of STED microscopy overcomes resolution issues relating to diffraction limits.

Figure 10:
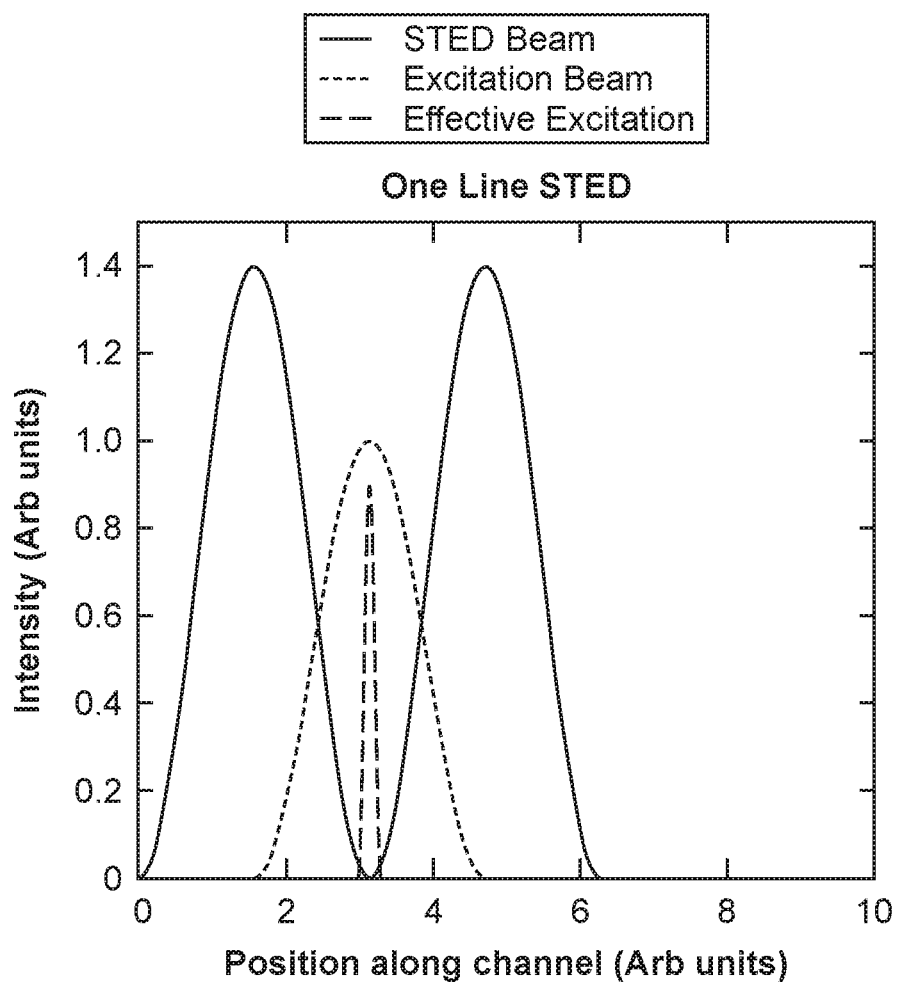
FIG. 10 depicts an excitation beam modified by STED beams to generate a narrow region of effective excitation.

A profile representation of a single beam modified by STED beams is provided in FIG. 10. An excitation beam is produced as detailed above in Example 5. This excitation beam is partly overlapped with two STED beams, having a wavelength greater than the wavelength of the excitation beam ($\lambda_{STED} > \lambda_{excitation}$). Fluorescent dyes undergoing absorption within the excitation beam region have an electron enter the excited state, $S_1$, but if the fluorophore is within a STED beam, the electron undergoes stimulated emission, such that the excited electron relaxes to a higher vibrational state of $S_0$, and therefore does not release a photon having the normal emission wavelength of the fluorophore. The fluorophores are therefore selectively deactivated when within the STED beam. This results in an effective excitation substantially narrower than the excitation beam, allowing for more precise measurements, such as those useful for the measurement of exosomes.

A particle passing through the effective excitation region is measured, and the diameter of the particle is calculated when the transit time of the particle and the local velocity are known. This example shows that the size of a particle in flow can be determined, even when the particle would not be accurately measured using alternate methods.

Example 7

Determination of Exosome Size by Two Beams Modified by Stimulated Emission Depletion This Example describes a method of determining the size of exosomes by measuring the emitted light of fluorescent agents associated with an exosome as the exosome passes through two excitation beams modified by Stimulated Emission Depletion (STED) beams.

Development of a method to determine the size of particles in flow without reliance on local velocity is beneficial to the screening process. STED microscopy can improve resolution of the detection region as discussed above in Example 6, and using two excitation beams modified by STED results in a method for determining the size of particles that is not dependent on knowing the velocity of the particles.

Figure 11:
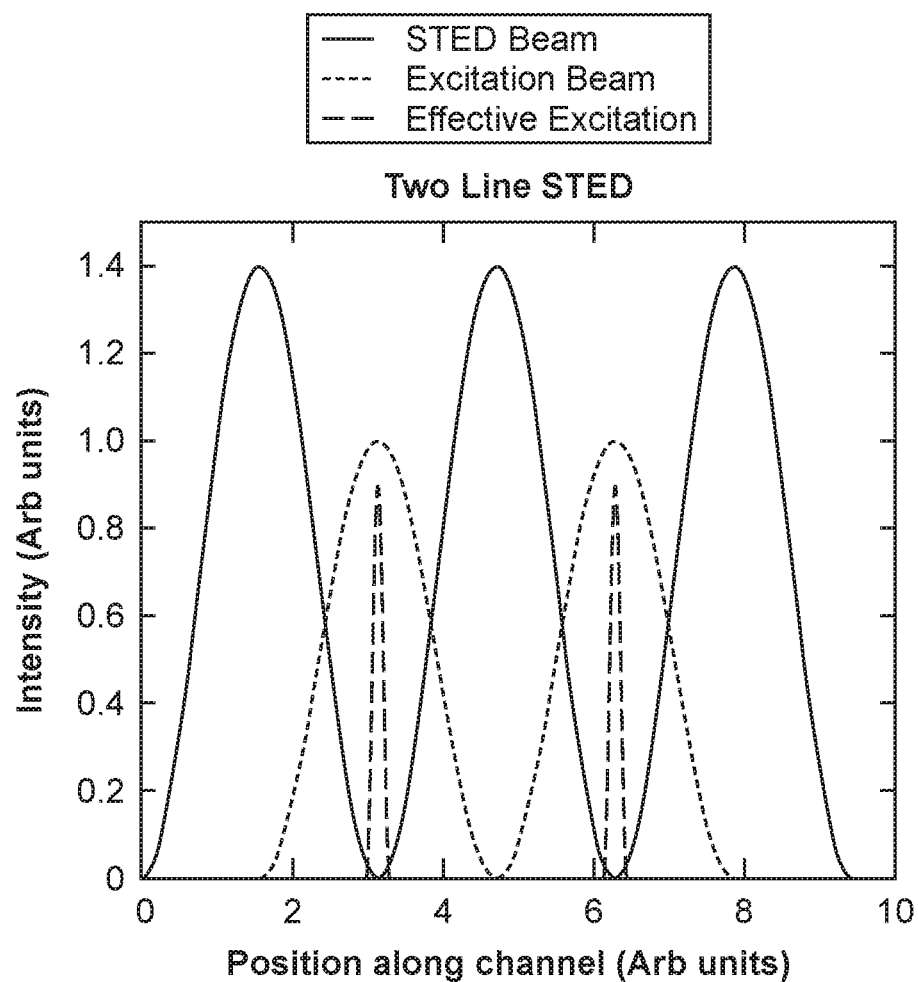
FIG. 11 depicts two excitation beams modified by STED beams to generate two narrow regions of effective excitation.

A profile representation of two beams modified by STED beams is provided in FIG. 11. Two excitation beams are produced as detailed above in Examples 5 and 6. These excitation beams are overlapped with three STED beams, having a wavelength greater than the wavelength of the excitation beam ($\lambda_{STED} > \lambda_{excitation}$). As discussed above in Example 6, the fluorophores are selectively deactivated when within the STED beam. This results in effective excitation beams substantially narrower than the excitation beams, allowing for more precise measurements, such as those useful for the measurement of exosomes. The resulting setup produces emission of fluorescence only when the particle is in contact with the narrow effective excitation regions of the beams, with no excitation occurring in between.

A microfluidic channel device comprising an inlet, a microfluidic channel, and an outlet is obtained. The device uses hydrodynamic focusing to induce the flow of a single stream of particles. The flow in the microfluidic channel is controlled to have a substantially constant velocity. The device further comprises two excitation beams, the beams being modulated by STED beams to produce two effective excitation beams. The widths of the effective excitation beams are equal to or less than the width of the smallest particle of interest. The distance between the two effective excitation beams is greater than the width of the largest particle of interest.

A fluidic sample standard is obtained, the standard comprising exosomes homogenously coated with a surface fluorescent dye. The exosomes are of known size, having 30 nm, 40 nm, 50 nm, and 70 nm diameters. The two detection beams have a wavelength corresponding to the excitation $\lambda_{max}$ of the surface fluorescent dye. The fluidic sample standard is injected into the inlet, and the particles flow through the two detection beams toward the outlet.

Figure 12:
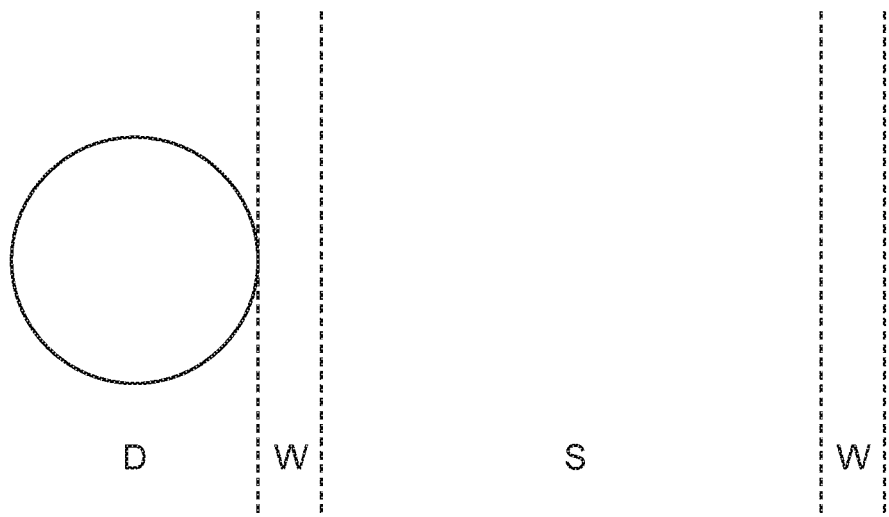
FIG. 12 depicts a nanoparticle passing through two excitation beams and a zero length.

The exosomes travel through the microfluidic channel and individually pass through the effective excitation beams. The scheme of the exosomes passing through the excitation beams and the zero length between is shown in FIG. 12. An exosome having diameter D does not emit fluorescence (having wavelength=$\lambda_{em}$) until it is in contact with the first effective excitation beam having width W. While the exosome is in contact with the first effective excitation region, it emits fluorescent photons. Subsequently, the exosome exits the first effective excitation region and enters the zero length, where no fluorescence is observed, the zero length having a width of S. The exosome then passes through the second effective excitation beam having width W, and it again emits fluorescent photons until it completely exits the second effective excitation region.

The motion of the exosome is dominated by the velocity of the fluid, V. The time for the center of the sphere to travel a distance D can be calculated as $T_D$=D/V, the time to travel a distance W is $T_W$=W/V, and the time to travel a distance S is $T_S$=S/V. The time from when the leading edge of the exosome first enters the first effective excitation region to when the trailing edge of the exosome exits the second effective excitation region is:

$$T_{total} = \frac{D}{V} + \frac{2W}{V} + \frac{S}{V}$$

The amount of time that the exosome is entirely within the dark region and does not emit fluorescence is:

$$T_{dark} = \frac{S}{V} - \frac{D}{V}$$

The ratio of time that there is no fluorescence divided by the total transit time between the two effective excitation regions can be calculated as:

$$R = \frac{T_{dark}}{T_{total}} = \frac{\frac{S}{V} - \frac{D}{V}}{\frac{D}{V} + \frac{2W}{V} + \frac{S}{V}} = \frac{S - D}{D + 2W + S}$$

The velocities cancel out of the equation with the assumption that velocity remains substantially constant for each exosome—but it is not necessary that each exosome have the same velocity. For example, an exosome remains in the center of the microfluidic channel where transit is the fastest, or an exosome remains along the wall of the microfluidic channel where transit is slower. It is assumed the exosome does not substantially move laterally within the channel.

Having at least two standards of known diameter D, the actual values of the width of effective excitation beam region (W) and the width of the zero region (S) are calculated. A standard comprising 50 nm exosomes or liposomes or other nanoparticles produces fluorescence for 72.2% of its transit through the total detection region (no fluorescence observed for 27.8% of the transit; R=0.278). Plugging into the ratio equation above, the following calculation is obtained:

$$R = 0.278 = \frac{S - 50 \text{ nm}}{50 \text{ nm} + 2W + S}$$

and solving for effective beam width, W affords: W=1.35× S−117.6 nm.
A second standard comprising 30 nm exosomes or liposomes or other nanoparticles produces fluorescence during 60.0% of its transit through the total detection region (R=0.400). Plugging into the equation above and solving for W affords: W=0.75×S−52.5 nm. Combining these equations, the values of W and S are solved, with S=109 nm and W=30 nm.

Having solved for the actual values of S and W above, a sample comprising exosomes of unknown size is injected into the microfluidic channel inlet, and the diameter of the exosomes is determined based on the ratio of time the exosome is within the dark region ($T_{dark}$) versus the total transit time ($T_{total}$). This example shows that narrow effective excitation beams can be used to determine the diameter of exosomes, and that the diameter of exosomes can be readily calculated with two excitation beams modified by STED.

Example 8

Determination of Exosome Size and Exosome Sorting

This Example describes a method of determining the size of exosomes using light scattering in flow, and subsequent sorting of the exosomes by determined size and detectable agents present on the exosomes.

Figure 13:
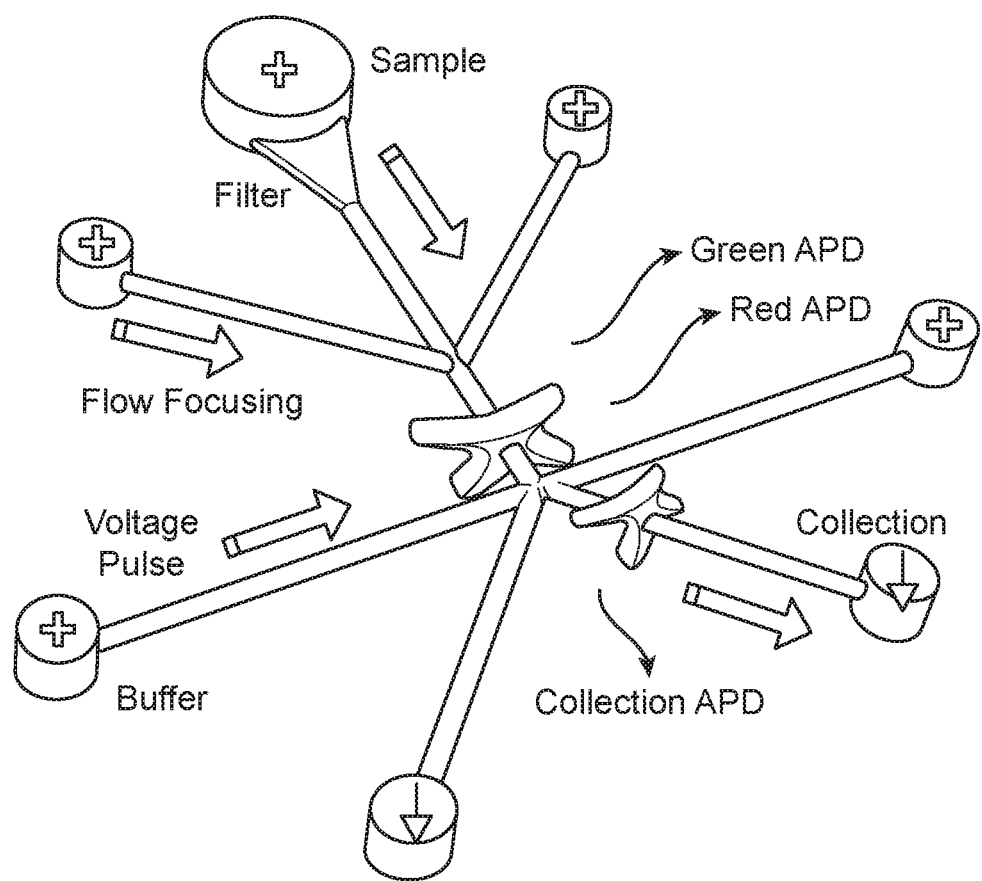
FIG. 13 depicts an apparatus for controlling directional flow, which can be used to sort and enrich samples with nanoparticles of interest.

The methods developed to determine the size of an exosome in flow are applied to the sorting of exosomes by size. An apparatus is used, the apparatus comprising a microfluidic channel having an inlet and two flow focusing channels, the microfluidic channel being connected to a junction, the junction being further connected to two fluid-flow-control channels, and two collection channels each having an outlet, all being in fluidic communication (FIG. 13). The apparatus controls flow using both pressure and electroosmotic flow (EOF). Directional flow is controlled using the fluid-flow-control channels by applying voltage pulses to control EOF, which directs flow toward one of the two collection channels. The apparatus further comprises two detecting regions, as shown in FIG. 11. One detecting region is located between the inlet and the junction, and one detecting region is located between the junction and one outlet. Each detecting region is connected to photodetectors for generating an observable output. The apparatus is additionally connected to an electronic circuit with a sorting algorithm, which allows for a sorting time faster than what is observed using a computer. Using an electronic circuit connected to the output of the first detector and further attached to the two fluid-flow-control channels, pulses of up to 1 kV are achieved having a 1-2 µs rise time.

The detecting regions are calibrated using exosomes of known diameter having a substantially homogenous surface coating of fluorescent dye, as provided in Example 2. The electronic circuit algorithm is adjusted such that directional flow by default is directed toward the first collection channel, but when an exosome having a fluorescent dye coating and diameter of interest is detected, flow is briefly directed toward the second collection channel, and is then directed back toward the first collection channel. The second detecting region is connected to the second collection channel, and determines if the exosomes having diameter of interest are appropriately sorted.

The electronic circuit algorithm is adjusted to selectively collect exosomes having 40-60 nm diameter. A sample comprising exosomes of unknown size is injected into the inlet, and the sorting is conducted. A 100 µs sorting pulse time is used, and the flow rate is such that 10,000 sorts are conducted per second. Using these parameters, 90% of exosomes having a diameter of 40-60 nm are recovered in the second channel, having a purity of 95%. This example shows that exosomes can be sorted using electroosmotic flow, and that this sorting can be conducted using exosome size and biomarker detection methods described herein to both initially detect exosomes of interest, and to confirm the sorting.

Example 9

Determination of Copy Number of Biomolecules on Individual Nanoparticles

This Example describes a method of determining the copy number of biomarkers on individual nanoparticles using Au nanoparticles as an internal standard. Gold nanoparticles are used because: i.) they are readily available in different sizes, allowing for customization and matching of desired spike intensities in the detection channel; ii.) the back-reflected signal allows the use of gold nanoparticles with any laser excitation wavelength, and thus any color channel; iii.) gold nanoparticles are homogenous in size and show strong scattering, which minimizes their detected intensity distribution, and which facilitates calibration and improved quantification accuracy; iv.) the surface of gold nanoparticles are readily modified, such as with PEG, so that they do not self-aggregate or non-specifically attach to the channel surface; v.) gold nanoparticles are robust and do not degrade or aggregate even during long-term (multiple months) storage; and vi.) gold nanoparticles are inexpensive compared to other nanoparticles.

Figure 17A:
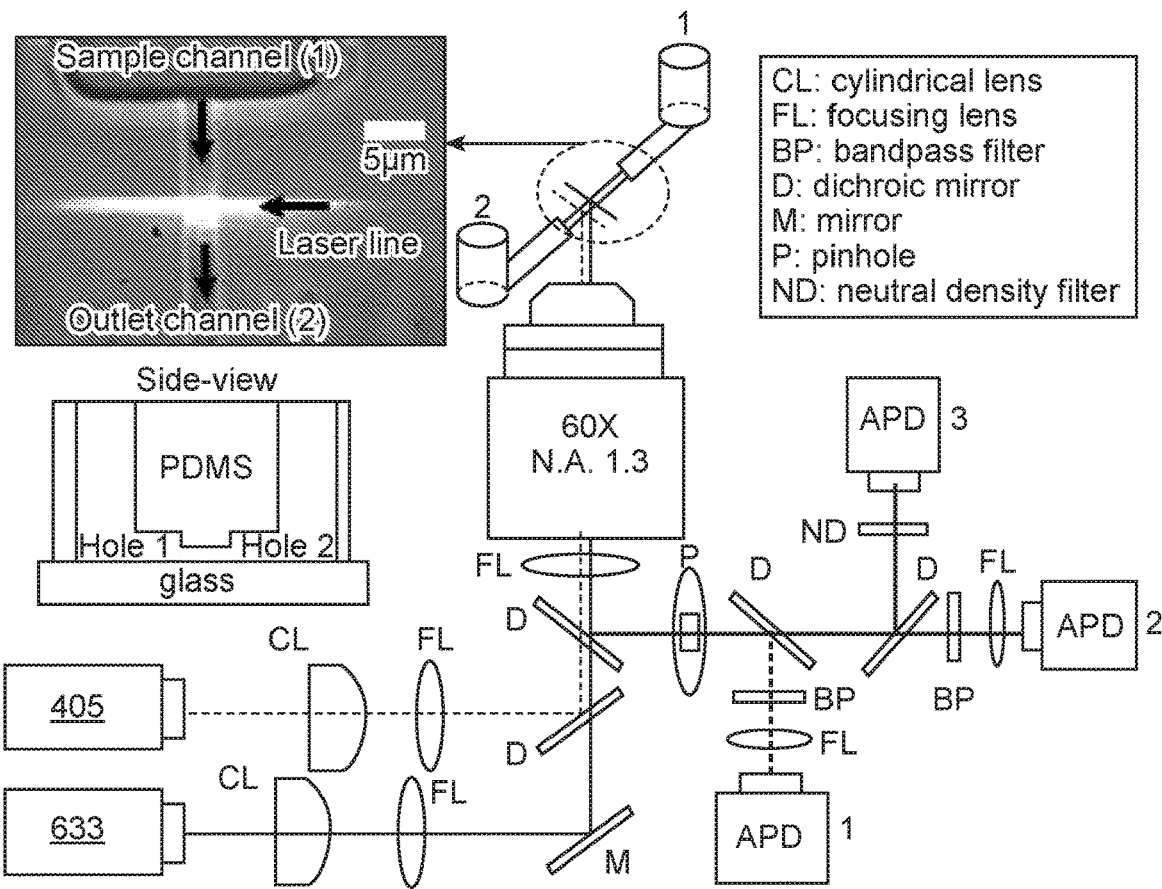
FIG. 17A-B depicts a microfluidic chip and optical apparatus with single-dye molecule sensitivity and which utilizes an internal calibration (Au nanoparticles) for normalizing detected optical signals between different measurements.

An apparatus is used, the apparatus comprising a microfluidic chip in close proximity to a high numerical aperture objective to enable single-dye molecule sensitivity and the use of Au nanoparticles as an internal standard for calibration. FIG. 17A illustrates the single-molecule flow platform, which employed a line-confocal detection system for the high-sensitivity and high-throughput detection of fluorescence from single-dye molecules and the back scattering of single Au nanoparticles. The microfluidic channel was fabricated to have a 2 μm-wide and 75 μm-long constriction. For sample injection and flow, two holes were punched having approximately 1-2 mm diameter; hole 1 was used for loading approximately 5 μL of sample, and hole 2 was left empty as the waste outlet. Prior to loading the sample, the channel was first filled with buffer, after which residual solutions in both reservoirs were withdrawn; upon pipetting approximately 5 μL of sample solution, flow was readily initiated without external pump because of the height difference (approximately 5-10 mm) in the fluid level between the two reservoirs, which made operation simple. The length of the illumination laser line was around 20 μm for the 633 nm laser (FIG. 17A). The 633 nm laser line was made to be ten times longer than the width of the channel so that the laser illumination was homogeneous across the width of the channel; this was important for single-molecule counting to minimize any variability in detection sensitivity as the molecules pass through the channel at different lateral positions. The 405 nm laser was made shorter (~5 μm). The two illumination laser lines were co-linear and were positioned around 6 μm into the constricted channel, but other experiments have been performed wherein the laser lines were positioned so they were spatially separated by about 5 μm.

Figure 17B:
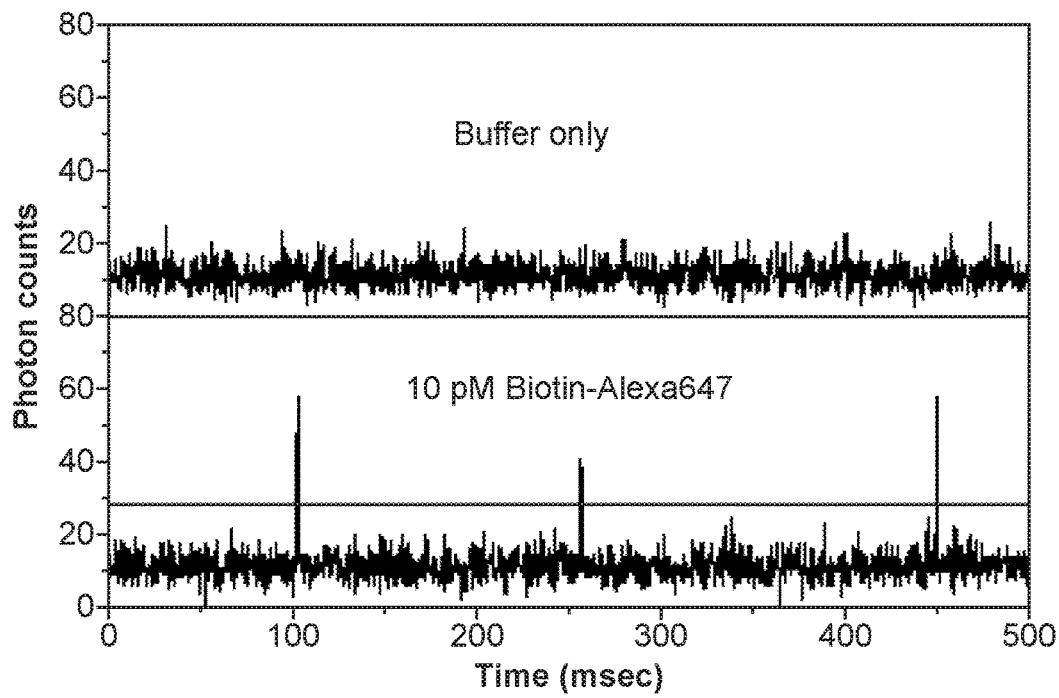

In addition to the two APD detectors used to detect fluorescence excited by the 633 nm and 405 nm lasers, a third APD is used to detect the back scattered light from the Au nanoparticles for use as an internal standard to calibrate the detected light intensities from the bionanoparticles. FIG. 17B shows the detection sensitivity for single-dye molecules (Alexa647 attached to a biotin molecule); the top trace is buffer only and the bottom trace shows the detection of three biotin-Alexa647 molecules.

Figure 18:
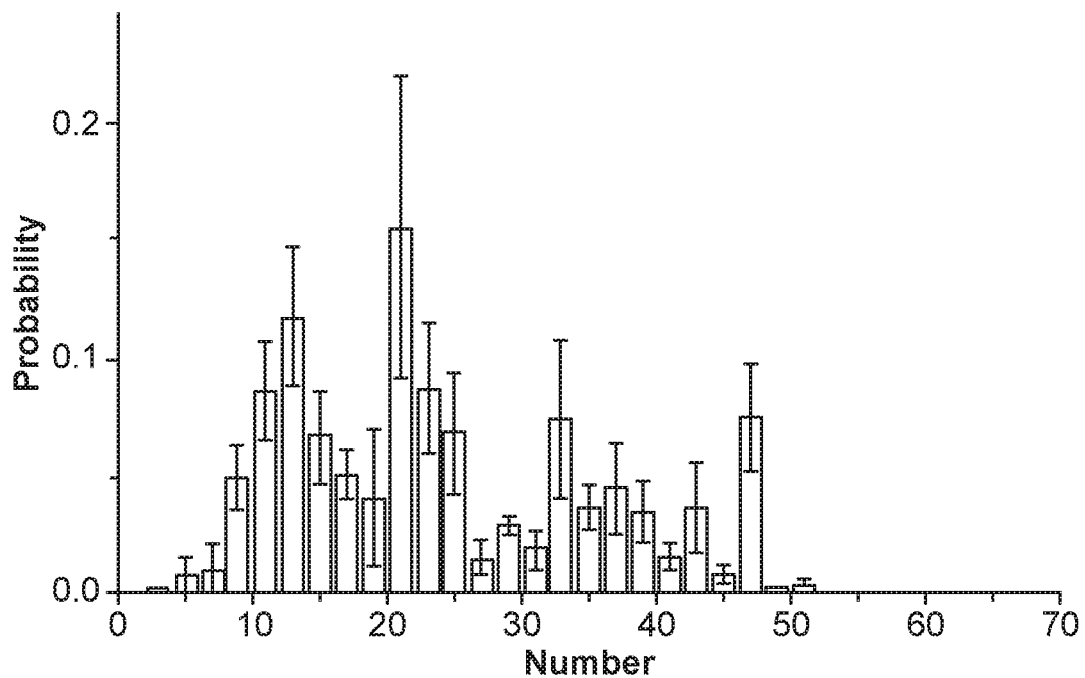
FIG. 18 shows a result of counting the copy number of biomolecules on individual nanoparticles achieved using Au nanoparticles as an internal standard for calibrating intensities between measurements.

Furthermore, the microfluidic chip and apparatus described above and in FIG. 17A-B were used to count the number of biomolecules associated with individual nanoparticles (FIG. 18). This example shows the ability to precisely count the copy number of biomarkers on individual nanoparticles and to study the differences or variance in the copy number of biomarkers at the level of single nanoparticles. This example also shows the capability of precisely measuring the concentration of a sample by carrying out high-throughput counting of individual bionanoparticles relative to a known prepared concentration of an internal standard, that is, by comparing spike frequencies of the bionanoparticles with that of the gold nanoparticles of a known prepared concentration. In addition to the identity of biomarkers present on bionanoparticles, information about the copy number of each biomarker present on each bionanoparticle provides important information about the function, identity, and/or biological state of the nanoparticle.

Example 10

Capture of Bionanoparticles with a Coated Planar Surface

Figure 14:
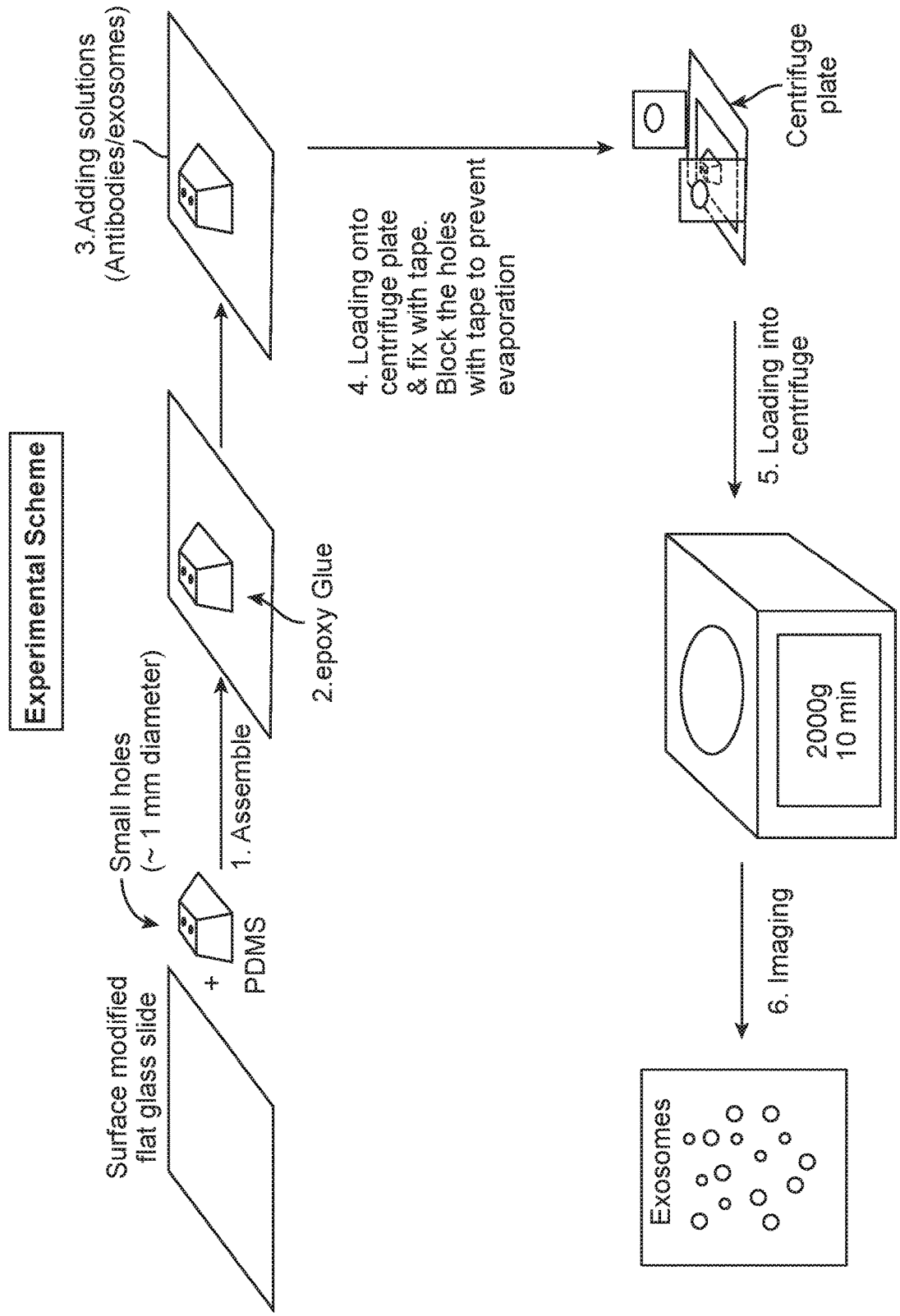
FIG. 14 depicts an apparatus for capturing biological nanoparticles with a coated planar surface.

This Example describes a method of capturing biological nanoparticles on a coated planar surface using centrifugation (FIG. 14).

A planar glass coverslip was modified with a non-specific adsorption resistant coating and capture molecules. The non-specific adsorption resistant coating comprised PEG, and the capture molecules comprised streptavidin, which can bind to biotinylated antibody. The modified glass coverslip had a thickness that was compatible with high-numerical aperture (numerical aperture of 1.4) fluorescence imaging. The modified glass coverslip was attached to a PDMS block with 1-cm sized holes punched into it prior to assembly with the glass coverslip (FIG. 14, step 1). After assembling the glass coverslip and PDMS block, epoxy glue was applied and the assembled device was held together for 5 mins to ensure strong attachment that could withstand centrifugal force (FIG. 14, step 2), thus forming a coverslip-well assembly.

Separately, two antibody solutions were prepared: 1) biotinylated anti-human CD63 (5 μg/ml), for capturing exosomes, and 2) biotinylated anti-mouse IgG (2AB) (5 μg/ml), for use as a negative control. The wells of the modified coverslip were incubated with one of the two antibody solutions for 10 minutes, so the biotinylated antibodies were bound to streptavidin (FIG. 14, step 3). Half of the wells were incubated with solution 1, and the other half of the wells were incubated with solution 2. Following the 10-minute incubation, the wells were washed with buffered solution.

A sample comprising semen exosomes was added into each of the treated streptavidin-antibody-PEG coated coverslip-wells, and the modified coverslip assembly was loaded onto a plate centrifuge compatible with spinning planar devices or substrates (FIG. 14, step 4). To prevent potential evaporation, the openings of the wells in the PDMS block were taped closed. In other experiments, mineral oil (less dense than water) was added to the top of the sample to prevent evaporation. The modified coverslip assembly was then loaded into the plate centrifuge (FIG. 14, step 5) and was spun at 2000 g for 10 minutes. The wells were washed with buffered solution to remove unbound exosomes.

A second, separate coverslip-well assembly was prepared as above, to act as a non-centrifuged negative control. The wells of the second modified coverslip were incubated with the biotinylated anti-human CD63 (5 µg/ml) solution for 10 minutes. Following the incubation, the wells were washed with buffered solution. The sample comprising semen exosomes was added to the wells, and the wells were taped closed and allowed to sit for 10 minutes. The wells were then washed with buffered solution to remove unbound exosomes.

Figures 15A, 15B:
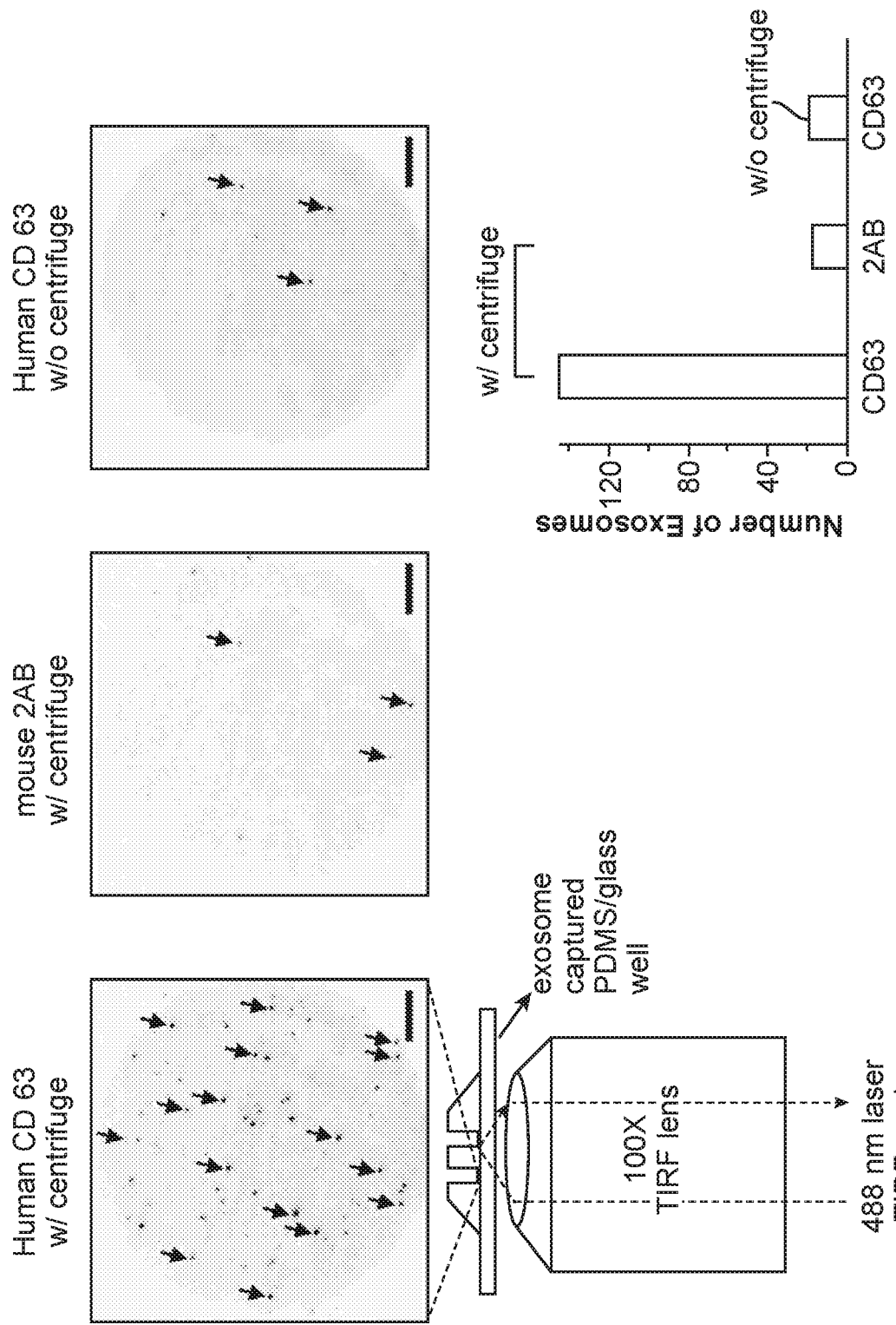
FIG. 15A-B depicts a comparison of biological nanoparticles captured on a coated planar surface with and without centrifugation.

To study the captured exosomes, the modified coverslips containing the captured exosomes were transferred to a fluorescence microscope for imaging (FIG. 14, step 6). The exosomes bound to the modified coverslip were analyzed (FIG. 15A-B). To detect the bound exosomes, and to determine the size of the captured exosomes, 4 µM FM 1-43 lipid dye (maximum excitation wavelength is ~480 nm and maximum emission wavelength is ~570 nm) was added to the modified coverslip and incubated for 5 minutes. Additional fluorescent antibodies with binding specific to exosomes could also be added. The images of captured exosomes were taken using fluorescence microscopy (488 nm laser excitation and 510-550 nm emission) (FIG. 15A). The number of labeled exosomes were counted and summarized (FIG. 15B). The centrifuged negative control (i.e., biotinylated anti-mouse IgG (2AB), which cannot selectively bind to exosomes, but was centrifuged) showed only a small amount of signal when compared to the sample comprising biotinylated anti-human CD63 which was centrifuged. Similarly, the non-centrifuged negative control (i.e., biotinylated anti-human CD63 which was not centrifuged) showed only a small amount of signal when compared to the sample comprising biotinylated anti-human CD63 which was centrifuged. The use of specific capture antibodies (streptavidin-antibody against CD63) together with centrifugation resulted in an increased capture of exosomes.

Example 11

Determination of Co-Localization of Different Protein Biomarkers on Individual Vesicles This Example describes a method of determining the co-localization of different biomarkers on individual vesicles using different laser excitations, and detecting different color emissions from single vesicles labeled with different antibodies tagged with different fluorescent probes.

Figure 19:
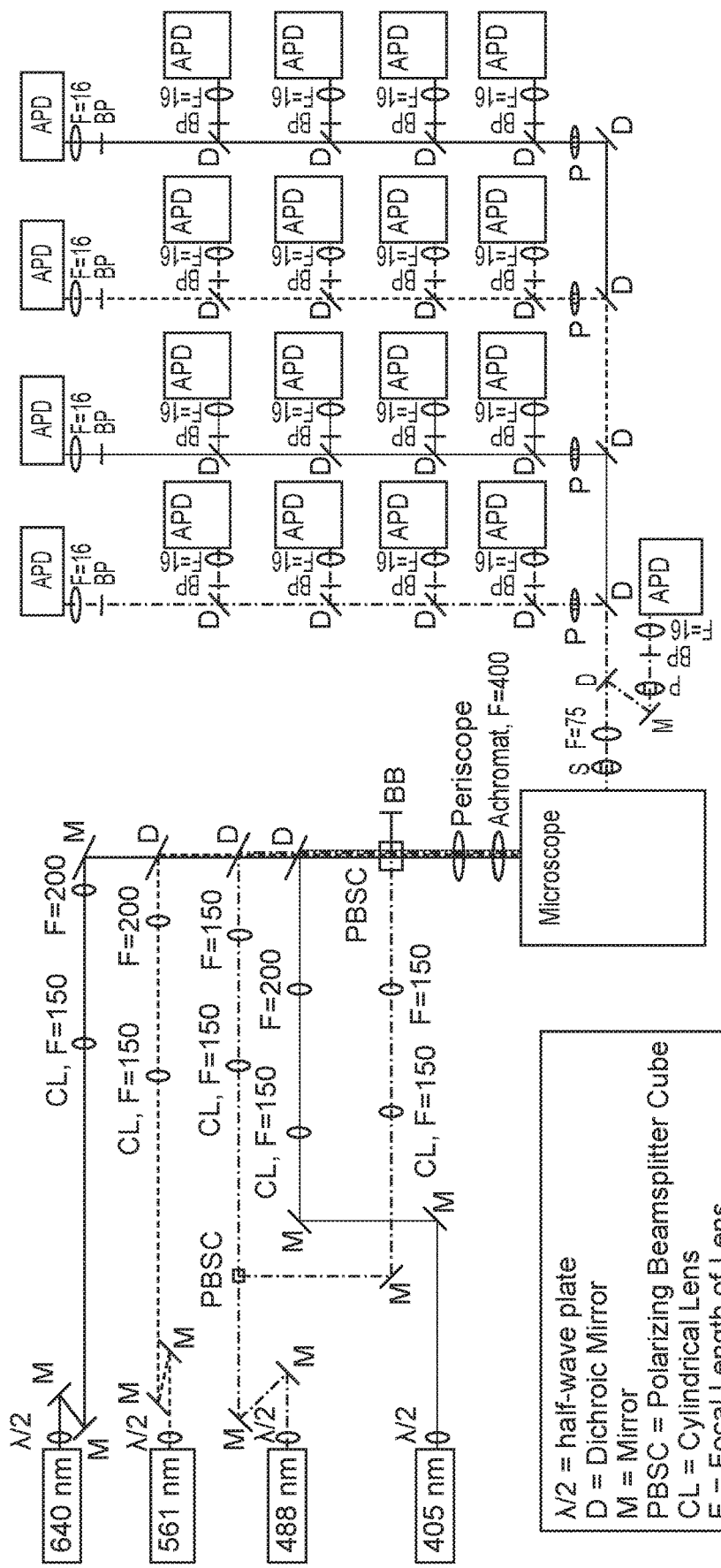
FIG. 19 depicts a schematic illustration of the optical layout of an instrument used to enable single-molecule sensitivity detection.

An apparatus was used, the apparatus comprising a microfluidic chip in close proximity to a high numerical aperture objective to enable single-molecule sensitivity. The apparatus had four different laser excitations and twenty-one different APD (avalanche photodiode) detectors, each for a different color channel corresponding to a particular laser excitation. FIG. 19 shows a schematic illustration of the optical layout of the instrument.

A microfluidic channel was fabricated to have a 2 µm-wide, 2 µm-tall, and 75 µm-long constriction in a channel that was otherwise 50 µm-wide and 50 µm-tall (i.e., the microchannel had a height of 50 µm and a width of 50 µm). For sample injection and flow, two holes were punched having approximately 1-2 mm diameter; hole 1 was used for loading approximately 5 µL of sample, and hole 2 was left empty as the waste outlet. Prior to loading the sample, the channel was first filled with buffer, after which residual solutions in both reservoirs were withdrawn. Upon pipetting approximately 5 µL of sample solution, flow was readily initiated without external pump because of the height difference (approximately 5-10 mm) in the fluid level between the two reservoirs.

A vesicle sample was incubated with two different color antibodies against two different proteins on vesicles. After incubation, the vesicle sample was diluted 10,000 times, and was then introduced into the microfluidic channel. The diluted sample was introduced to the microfluidic channel. FIG. 20A shows the detection signal time trace from Alexa561-tagged antibody against the vesicle protein VGLUT1; laser excitation at 561 nm was used to excite the Alexa561 tag. FIG. 20B shows the detection signal time trace from Alexa647-tagged antibody against the vesicle protein VATPase; laser excitation at 640 nm was used to excite the Alexa647 tag. These two laser excitation lines were spatially offset from each other by approximately 5 µm.

Figure 20C:
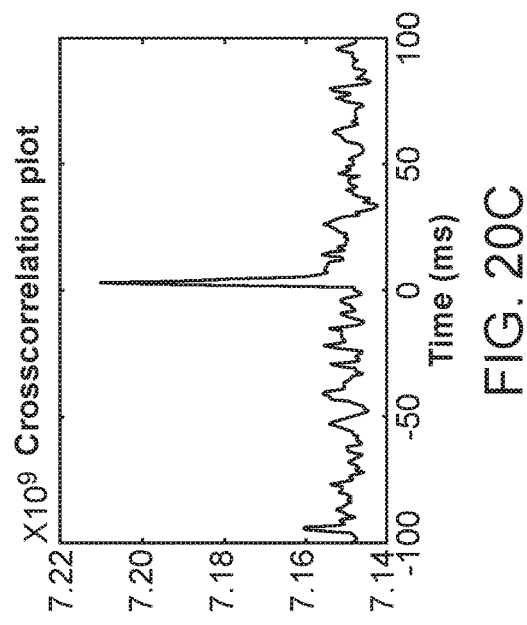
FIG. 20A-C depicts co-localization determination of different protein biomarkers on individual vesicles using different colored antibodies.
Figure 20A:
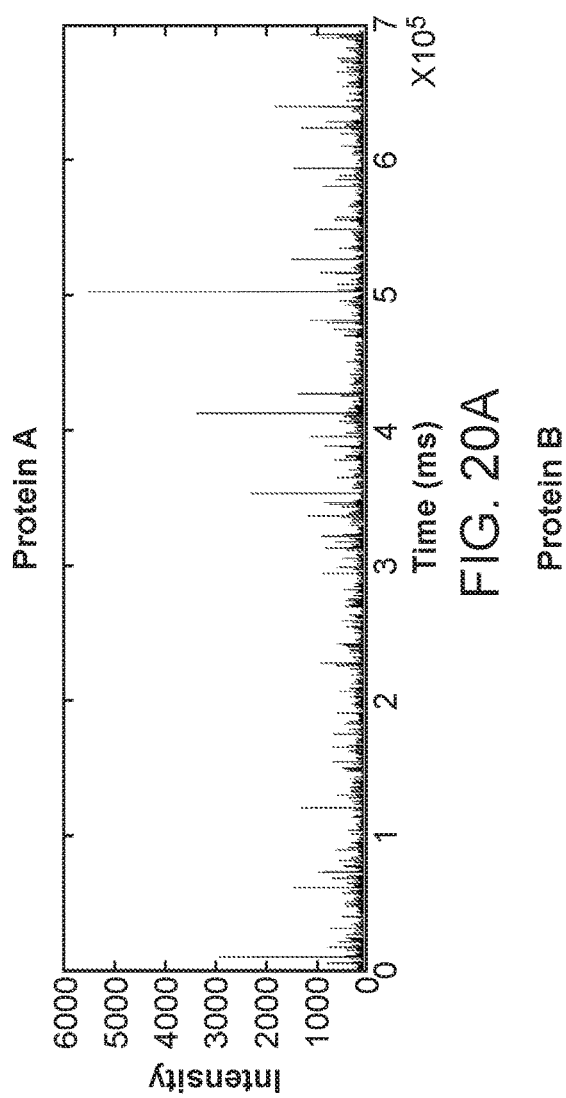
Figure 20B:
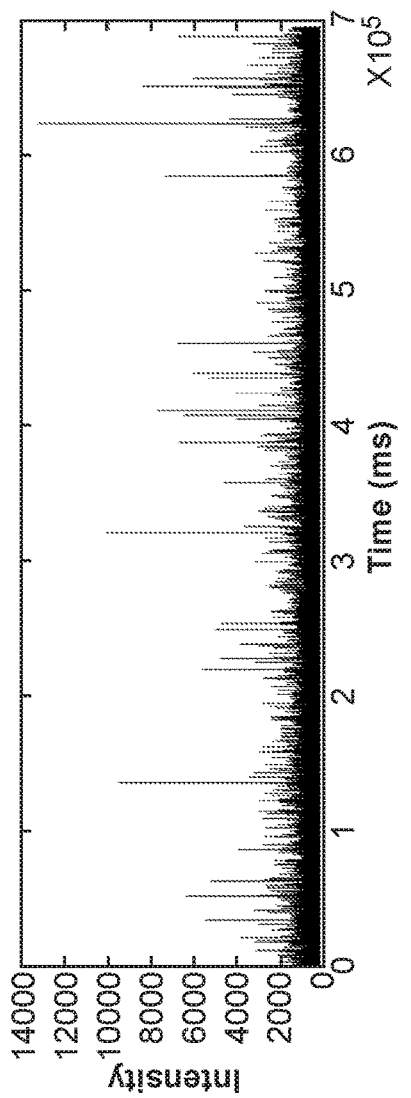

FIG. 20C shows a co-localization analysis (cross-correlation plot) of the signals from the two color channels shown in FIG. 20A and FIG. 20B. The cross-correlation analysis was carried out and the cross-correlation plot was produced based on the following cross-correlation function:

$$c(\tau) = \sum_x f(x) * g(x + \tau)$$

This cross-correlation analysis thus shifts the two time series to find the overlap between the two series at different lag time or shift time, τ.

A single vesicle that emits a signal (photon spike) in both color channels reports the presence of both color antibodies on the vesicle, and thus the presence of both protein biomarkers on the same vesicle. Determining the co-localization of different biomarkers on individual vesicles allows the determination of different subpopulations of vesicles and the subtyping of vesicles.

Example 12

Determination of Co-Localization of Different Protein Biomarkers and Membrane Dyes on Individual Vesicles This Example describes a method of determining the co-localization of different biomarkers together with a membrane dye on individual vesicles. The method used multiple laser excitations, and by detecting different color emissions from single vesicles labeled with various antibodies tagged with different fluorescent probes, and also labeled with a membrane dye.

An apparatus comprising a microfluidic chip in close proximity to a high numerical aperture objective to enable single-molecule sensitivity was used. FIG. 19 shows the apparatus, which had four different laser excitations and twenty-one different APD (avalanche photodiode) detectors, each for a different color channel corresponding to a particular laser excitation. A microfluidic channel was fabricated to have a 2 µm-wide, 2 µm-tall, and 75 µm-long constriction in a channel that was otherwise 50 µm-wide and 50 µm-tall (i.e., the microchannel had a height of 50 µm and a width of 50 µm). For sample injection and flow, two holes were punched having approximately 1-2 mm diameter; hole 1 was used for loading approximately 5 µL of sample, and hole 2 was left empty as the waste outlet. Prior to loading the sample, the channel was first filled with buffer, after which residual solutions in both reservoirs were withdrawn. Upon pipetting approximately 5 µL of sample solution, flow was readily initiated without external pump because of the height difference (approximately 5-10 mm) in the fluid level between the two reservoirs.

A semen exosome vesicle sample was incubated first with antibodies. After incubation, the free antibodies were removed and the vesicle sample was diluted 1,000 times, then labeled with 0.5 µM of ANEPPS (4-[2-[6-(Dioctylamino)-2-naphthalenyl]ethenyl]-1-(3-sulfopropyl)-pyridinium) membrane dye. After two hours of incubation with the membrane dye, the sample was introduced into the microfluidic channel.

The diluted sample was introduced to the microfluidic channel. FIG. 21A shows the detection signal time trace from ANEPPS labeled exosomes; laser excitation at 488 nm was used to excite the ANEPPS label. FIG. 21B shows the detection signal time trace from Alexa647-tagged antibody against the exosome protein CD63; laser excitation at 640 nm was used to excite the Alexa647 tag. These two laser excitation lines were spatially offset from each other by approximately 15 µm.

Figure 21C:
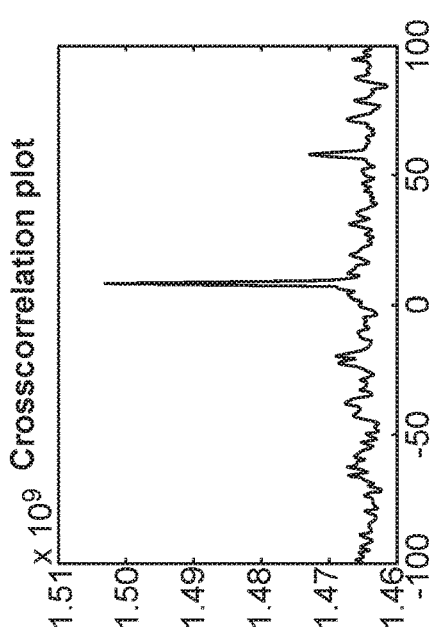
FIG. 21A-D depicts co-localization determination of different protein biomarkers on individual vesicles using different color antibodies that bind specifically to different proteins on the vesicle, together with a membrane dye that reports the presence of membrane and/or size of the vesicle.
Figure 21D:
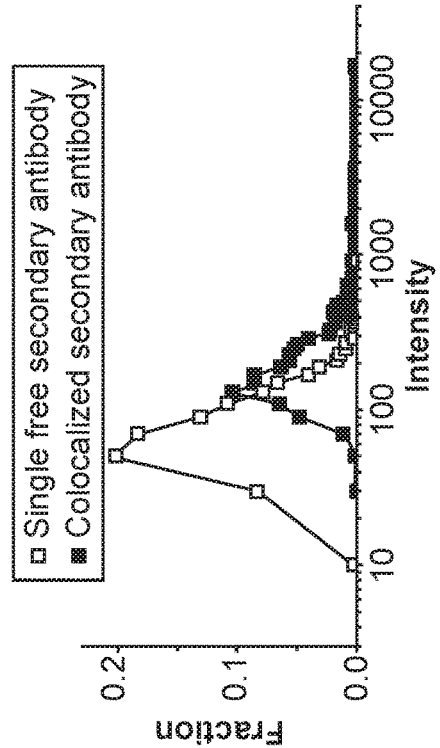
Figure 21A:
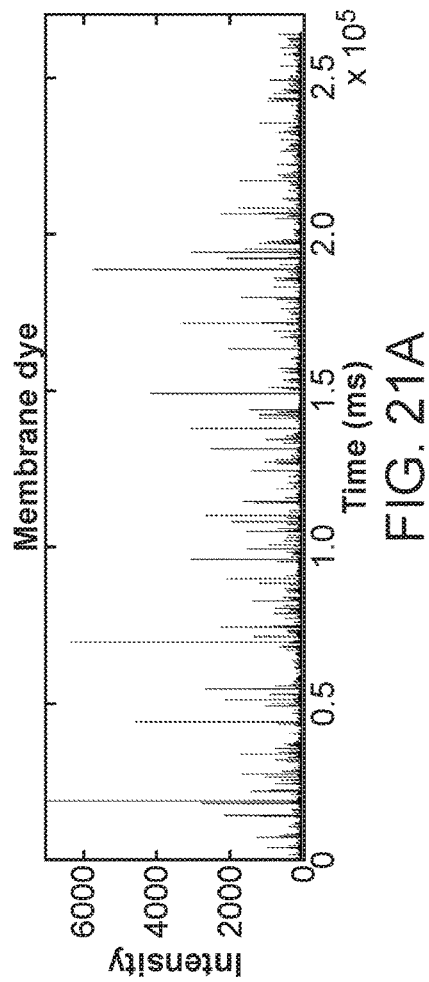
Figure 21B:
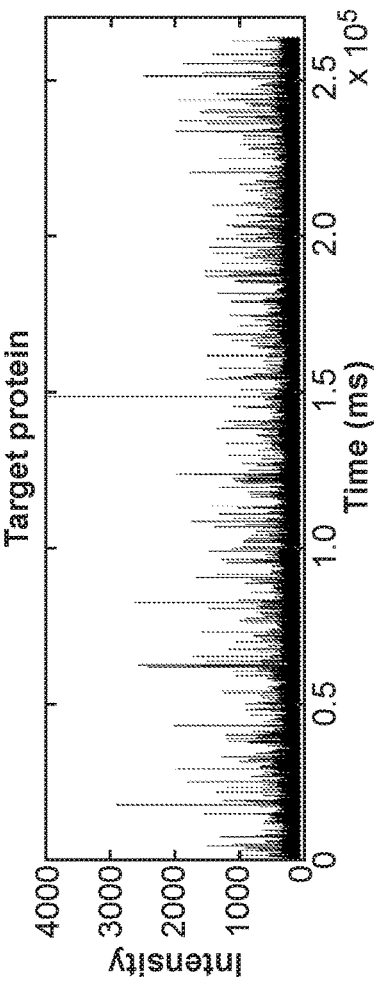

FIG. 21C shows a co-localization analysis (cross-correlation plot) of the signals from the two color channels shown in FIG. 21A and FIG. 21B. This cross-correlation analysis of the co-localization shows the presence of the membrane dye ANEPPS and the anti-CD63 fluorescent antibody on the same vesicle. FIG. 20D shows the fraction of detected antibody signals that were from vesicles (co-localized with the membrane dye) and from free antibodies not completely removed from the sample; the co-localization percentage was calculated to be 23%. By de-convolving the antibody signals from vesicles by the single-antibody signals from the free antibodies, the copy number of the bound antibodies on single vesicles could be obtained.

A single vesicle that emitted a signal (photon spike) in both color channels verified the detected antibody signal was from a vesicle containing membranes. Determining the co-localization of different biomarkers on individual vesicles together with membrane dyes also enables the correlation of the presence of different sets of biomarkers with the sizes of the vesicles, and thus allows the determination of different subpopulations of vesicles and the subtyping of vesicles. Quantifying the fluorescence intensities from antibodies bound to single vesicles together with the sizes of the vesicle as reported by the fluorescence intensities of the membrane dyes also allows for the determination of the copy number of vesicle biomarkers (e.g., a surface protein on vesicle, such as CD63) as a function of the vesicle size.

Example 13

Determination of Co-Localization of Different Protein Biomarkers and Volume Dyes on Individual Vesicles This Example describes a method of determining the co-localization of different biomarkers together with a volume dye on individual vesicles using different laser excitations and by detecting different color emissions from single vesicles labeled with different antibodies tagged with different fluorescent probes as well as a volume dye.

An apparatus comprising a microfluidic chip in close proximity to a high numerical aperture objective to enable single-molecule sensitivity was used. FIG. 19 depicts a schematic of the apparatus that was used, which has four different laser excitations and twenty-one different APD (avalanche photodiode) detectors. The microfluidic channel was fabricated to have a 2 µm-wide, 2 µm-tall, and 75 µm-long constriction. For sample injection and flow, two holes were punched having approximately 1-2 mm diameter; hole 1 was used for loading approximately 5 µL of sample, and hole 2 was left empty as the waste outlet. Prior to loading the sample, the channel was first filled with buffer, after which residual solutions in both reservoirs were withdrawn. Upon pipetting approximately 5 µL of sample solution, flow was readily initiated without external pump because of the height difference (approximately 5-10 mm) in the fluid level between the two reservoirs.

A vesicle sample was incubated first with antibodies. After incubation, the vesicle sample was labeled with 50 µM of Oregon Green Diacetate for 40 mins in a glycine/citrate buffer at pH 5. Before the diacetate group was hydrolyzed, Oregon Green was not fluorescent. To initiate hydrolysis of the dye, the sample was transferred into pH=7.4 glycine/HEPES buffer. Within 10 min, the dye became fluorescent inside the vesicles. Next, the vesicle sample was filtered to remove the free dyes in the solution using Amicon-100K filter. First, the Amicon filter was passivated with 1% BSA in pH 7.4 HEPES-based saline solution using centrifugation for 15 min at 5000 rpm. BSA blocked non-specific binding of vesicles to filter surface.

After sample purification, the vesicle sample of the appropriate dilution was introduced into the microfluidic channel. FIG. 22A shows the detection signal time trace from the Oregon Green volume dye; laser excitation at 488 nm was used to excite the Oregon Green dye. FIG. 22B shows the detection signal time trace from Alexa647-tagged antibody; laser excitation at 640 nm was used to excite the Alexa647 tag. These two laser excitation lines were spatially offset from each other by approximately 15 µm.

FIG. 22C shows a co-localization analysis (cross-correlation plot) of the signals from the two color channels shown in FIG. 22A and FIG. 22B. The co-localization percentage was analyzed and calculated to be 68%. Determining the co-localization of different biomarkers on individual vesicles together with volume dyes enables the correlation of the presence of different sets of biomarkers with the volume dyes that report on the presence of an intact membrane-bound volume and/or with the sizes of the vesicles, and thus allows the determination of different subpopulations of vesicles and the subtyping of vesicles. Quantifying the fluorescence intensities from antibodies bound to single vesicles together with the volume of the vesicle as reported by the fluorescence intensities of the volume dyes also allows for the determination of the copy number of the vesicle biomarker (e.g. surface protein on vesicle, such as CD63 or SV2A) as a function of the intact volume of the vesicle.

Example 14

Determination of Vesicle Protein Copy Numbers and Co-Localization Analysis Comprising Using Back-Scattered Light from Gold Nanoparticles This Example describes a method of calibrating the measured fluorescence intensities from individual vesicles using the back-scattered light from gold nanoparticles used as an internal standard.

An apparatus comprising a microfluidic chip in close proximity to a high numerical aperture objective to enable single-molecule sensitivity was used. FIG. 19 depicts a schematic of the apparatus, which had four different laser excitations and twenty-one different APD (avalanche photodiode) detectors. A microfluidic channel was fabricated to have a 2 μm-wide, 2 μm-tall, and 75 μm-long constriction. For sample injection and flow, two holes were punched having approximately 1-2 mm diameter; hole 1 was used for loading approximately 5 μL of sample, and hole 2 was left empty as the waste outlet. Prior to loading the sample, the channel was first filled with buffer, after which residual solutions in both reservoirs were withdrawn. Upon pipetting approximately 5 μL of sample solution, flow was readily initiated without external pump because of the height difference (approximately 5-10 mm) in the fluid level between the two reservoirs.

A semen exosome sample was incubated first with ANEPPS (4-[2-[6-(Dioctylamino)-2-naphthalenyl]ethenyl]-1-(3-sulfopropyl)-pyridinium) membrane dye to mark the membrane of each exosome, after which gold nanoparticles at a concentration of approximately $10^8$ particles/mL was introduced into the semen exosome sample.

The semen exosome vesicle sample comprising gold nanoparticles was introduced into the microfluidic channel. FIG. 23A shows the detection signal time trace from the membrane dye ANEPPS; laser excitation at 488 nm was used to excite the ANEPPS membrane dye. FIG. 23B shows the detection signal time trace from the back-scattered light from the gold nanoparticles; laser excitation at any of the four different lasers (405 nm, 488 nm, 561 nm, or 640 nm) could be used. FIG. 23B depicts the detection signal time trace from back-scattered light of gold nanoparticles, using the 640 nm wavelength laser.

FIG. 23C and FIG. 23D show examples of the detected signal intensity distributions for the ANEPPS labeled exosomes (FIG. 23C) and gold nanoparticles (FIG. 23D), respectively. FIG. 23C depicts an example signal intensity histogram from the membrane dye-labeled vesicles (n=636 events). FIG. 23D shows an example signal intensity histogram from the gold nanoparticles (n=538 events) measured together with membrane-dye labeled exosomes in the same experiment at the same time The detection and use of the back-scattered light from gold nanoparticles as an internal intensity standard served to correct for any measurement variabilities from run-to-run or chip-to-chip. The gold nanoparticles also can serve as a concentration standard: by comparing the spike (detected photon burst) frequency between the vesicle sample and the known concentration of the gold nanoparticles, the concentration of the vesicles in the sample can be determined.

Example 15

Determining the Co-Localization and Copy Number of Biomarkers Together with Membrane Dyes in Captured Vesicles on a Planar Surface This Example describes the quantification and determination of the co-localization of biomarkers and membrane dyes on vesicles captured on a planar surface.

A semen exosome sample was first incubated with antibodies (0.2 μg of Alexa647-tagged antibody against CD63) for 30 mins, after which the exosome sample was further incubated with 0.1 μM of ANEPPS membrane dye for 1 hr.

The semen exosome sample was added into coverslip-wells of a modified coverslip assembly (FIG. 14), and the modified coverslip assembly was loaded onto a plate centrifuge compatible with spinning planar devices or substrates (FIG. 14, step 4). The modified coverslip assembly was then loaded into the plate centrifuge (FIG. 14, step 5) and was spun at 2000 g for 10 minutes thus capturing labeled semen exosomes on a planar surface. The wells were washed with buffered solution to remove unbound exosomes.

Figure 24C:
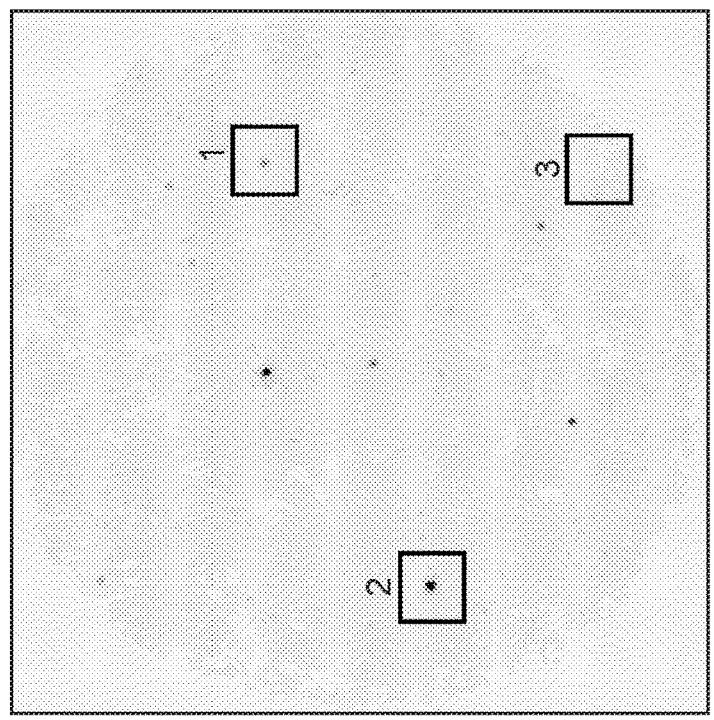
FIG. 24A-C depicts fluorescent images showing size-dependent protein expression on exosomes.
Figure 24B:
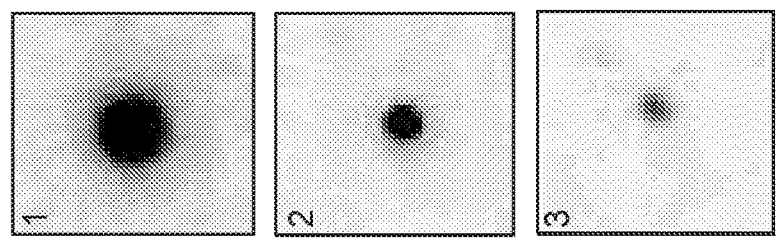
Figure 24A:
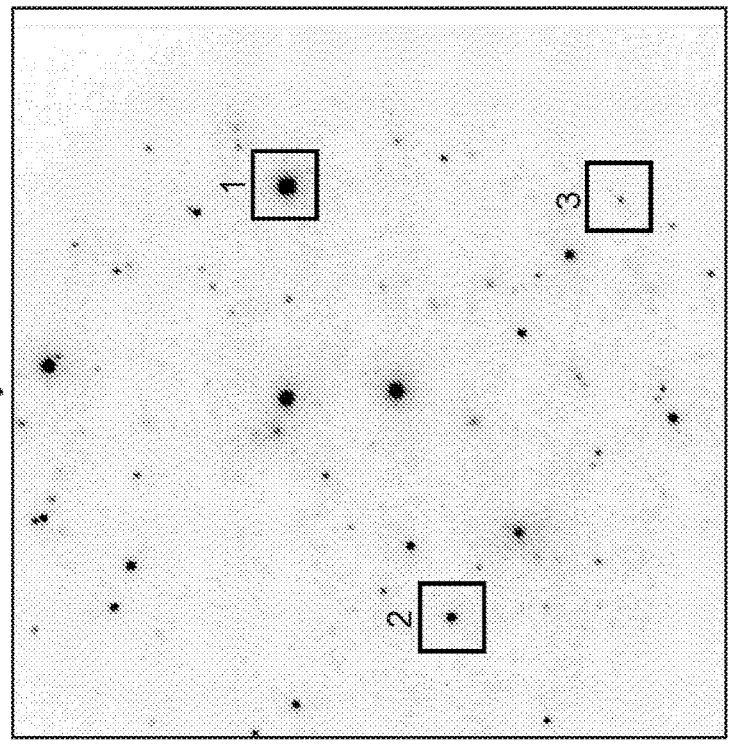

The plate surface was analyzed using fluorescence imaging. FIG. 24A shows a fluorescence image of the captured exosomes on the planar surface, visualized by exciting the ANEPPS membrane dye using 488 nm light excitation. FIG. 24B provides an inset showing three different sized exosomes, as reported by the three different measured intensities from the ANEPPS membrane dye (the largest intensity at (1) is a large vesicle; the medium intensity at (2) is a medium-sized vesicle, and the small detected intensity at (3) is a small vesicle). FIG. 24C shows a fluorescence image of the captured exosomes visualized by exciting the Alexa647 tag (using 640 nm light excitation), and further shows that some of the membrane-containing vesicles as reported by ANEPPS have co-localized Alexa647-tagged antibodies.

This example shows the use of fluorescence imaging to quantify the signal and the amount of membrane dyes present on vesicles of different sizes, as well as the co-localization of the membrane dye and the correlation of vesicle size with the presence of antibodies against protein biomarkers on exosomes.

What is claimed is:

1. A method for determining the size of a biological nanoparticle in a fluid sample, the method comprising:
providing a planar microfluidic chip comprising at least one microfluidic channel, wherein the at least one microfluidic channel comprises at least one constriction comprising a detection region;
introducing the fluid sample into the planar microfluidic chip, the fluid sample comprising a plurality of biological nanoparticles;
flowing a portion of the plurality of biological nanoparticles through the at least one microfluidic channel;
illuminating in the detection region of the at least one microfluidic channel at least one biological nanoparticle from the portion of the plurality of biological nanoparticles on a particle-by-particle basis, wherein the illuminating of the at least one biological nanoparticle comprises using an illumination source having a beam width of less than 2 μm within the at least one microfluidic channel, and wherein the illumination source illuminates the detection region within the at least one microfluidic channel comprising a cross sectional area of less than 10 μm$^2$;
detecting epifluorescent light intensity emitted from the at least one biological nanoparticle; and
assigning a size value to the at least one illuminated biological nanoparticle based on the detected epifluorescent light intensity, wherein a biological nanoparticle with a larger hydrodynamic radius emits a higher intensity of light compared to a biological nanoparticle with a smaller hydrodynamic radius, and wherein the biological nanoparticle has a hydrodynamic diameter of less than 1 μm.

2. The method of claim 1, wherein the size value is a relative size value, and wherein the relative size value is determined by a difference in the measured light intensity.

3. The method of claim 1, wherein the biological nanoparticle is associated with a plurality of detectable agents.

4. The method of claim 3, wherein the plurality of detectable agents comprises more than one type of detectable agent.

5. The method of claim 1, wherein the size value is a relative size value, the method further comprising determining an actual size value of the biological nanoparticle by calibrating the measured light intensity to a measured light intensity of a standard comprising a known size or a known size distribution.

6. The method of claim 1, further comprising directing the flow of the biological nanoparticle based on the size value.

7. The method of claim 1, further comprising quantifying the number of biological nanoparticles having the size value.

8. The method of claim 1, further comprising determining the concentration of the sample.

9. The method of claim 8, wherein the concentration of the sample is determined by counting a spike frequency of the sample.

10. The method of claim 9, further comprising comparing the spike frequency of the sample to a calibration particle standard spike frequency.

11. The method of claim 9, wherein the concentration of the sample is determined by counting the spike frequency of the sample and comparing the spike frequency of the sample to a volume of the sample.

12. The method of claim 1, further comprising collecting the biological nanoparticle for analysis.

13. The method of claim 1, wherein the biological nanoparticle is associated with at least one tag, the method further comprising:

detecting the at least one tag associated with the biological nanoparticle; and assigning a tag value to the biological nanoparticle.

14. The method of claim 13, further comprising sorting the biological nanoparticle into an enriched population, wherein the sorting is determined by the size value and/or the tag value.

15. The method of claim 1, wherein flowing the portion of the plurality of biological nanoparticles through the at least one microfluidic channel comprises flowing the portion of the plurality of biological nanoparticles through the at least one microfluidic channel at a substantially constant flow.

16. The method of claim 1, further comprising:

detecting a backscattered light intensity emitted from the at least one biological nanoparticle; and assigning the size value to the at least one illuminated biological nanoparticle based on the detected backscattered light intensity.

17. The method of claim 1, wherein the detecting a light intensity comprises using a light collection system having a numerical aperture equal to or greater than 0.8 and no greater than 1.5.

18. The method of claim 1, wherein the planar microfluidic chip defines a planar surface.

* * * * *